US011194442B1

(12) United States Patent
Boyers

(10) Patent No.: US 11,194,442 B1
(45) Date of Patent: Dec. 7, 2021

(54) DEVICES, METHODS, AND GRAPHICAL USER INTERFACES FOR SUPPORTING READING AT WORK

(71) Applicant: David Graham Boyers, Los Altos, CA (US)

(72) Inventor: David Graham Boyers, Los Altos, CA (US)

( * ) Notice: Subject to any disclaimer, the term of this patent is extended or adjusted under 35 U.S.C. 154(b) by 1105 days.

(21) Appl. No.: 14/215,073

(22) Filed: Mar. 17, 2014

(51) Int. Cl.
*G06F 3/048* (2013.01)
*G06F 3/0482* (2013.01)
*G06F 3/0484* (2013.01)

(52) U.S. Cl.
CPC ........ *G06F 3/0482* (2013.01); *G06F 3/04842* (2013.01)

(58) Field of Classification Search
CPC ............... G06F 3/0482; G06F 3/04817; G06F 3/04845; G06F 17/30265; G06F 17/3028; G06F 17/30126; G06F 3/048; G06F 3/0481; G06F 3/0484; G06F 8/34; G06F 17/2247; G06F 17/30011; G06F 3/013; G06F 3/04883; G06F 17/30864; G06F 21/44; G06F 3/0488; G06F 9/451; G06F 16/2246; H04L 67/22; H04L 67/306
See application file for complete search history.

(56) References Cited

U.S. PATENT DOCUMENTS 6,166,736 A * 12/2000 Hugh .................... G06F 3/0481 715/777
9,367,211 B1 * 6/2016 Turner .................. G06F 3/0483
2006/0161859 A1 * 7/2006 Holecek .................. G06F 3/048 715/781
2006/0206834 A1 * 9/2006 Fisher ............... G06F 17/30528 715/777
2006/0288304 A1 * 12/2006 Nomoto ................ G06F 16/168 715/781
2008/0307343 A1 * 12/2008 Robert .................. G06F 3/0482 715/765
2010/0083173 A1 * 4/2010 Germann ............ G06F 17/3012 715/810
2010/0107081 A1 * 4/2010 Benenson .............. G11B 27/34 715/730
2010/0185473 A1 * 7/2010 Malkareddy ............ G06F 40/14 705/30
2013/0232447 A1 * 9/2013 Arrouye .................. G06F 16/13 715/810
2014/0040714 A1 * 2/2014 Siegel ..................... G06F 16/93 715/203
2014/0215171 A1 * 7/2014 Daly, Jr. ............. G06F 12/1408 711/162
2015/0301706 A1 * 10/2015 Logan ................... G06F 17/241 715/777

* cited by examiner

*Primary Examiner* — Linh K Pham

(57) ABSTRACT

Devices, methods, and graphical user interfaces for supporting reading at work are described. This includes, detecting the selection of one or more items in an electronic document library of items comprising docs and doc sets; in response to detecting the selection of two or more items in the electronic document library: saving in the electronic document library a doc set comprising links to each selected item, and displaying adjacent to a doc display area tab icons linked to each selected item; detecting the selection of a tab icon; in response to detecting the selection of a tab icon linked to a doc: displaying the doc in the doc display area.

24 Claims, 146 Drawing Sheets

2700

DEVICES, METHODS, AND GRAPHICAL USER INTERFACES FOR SUPPORTING READING AT WORK

RELATED APPLICATIONS

This application claims priority to U.S. Provisional Patent Application, No. 61/852,236, filed by the applicant on Mar. 15, 2013.

This application claims priority to U.S. Provisional Patent Application, No. 61/956,595, filed by the applicant on Jun. 11, 2013.

TECHNICAL FIELD

The disclosed embodiments relate generally to mobile computing devices, particularly to computer-implemented methods and graphical user interfaces for supporting reading at work.

BACKGROUND

Reading at work is poorly supported by existing digital computing platforms. The personal computer has not displaced paper in the work place, because paper supports better than the PC a number of key activities that workers engage in every day when they read and work with documents (docs), both alone and in collaboration with others. Starting with the adoption of the PC in business in the 1980s, many thought that paper would be quickly displaced by the PC as the platform for reading documents, and business would transition to the "paperless office". Today, more than 30 years after adoption of personal computers in business, paper plays much the same role in business that it played in the 1980's. Supporting all of the activities around reading at work is much more challenging than supporting reading at home. If a new platform is to satisfactorily replace paper in the workplace, then that platform must do much more than support linear continuous reading of single documents by people who are alone. Supporting reading at work not only requires supporting reading from a single document but also requires supporting reading from multiple documents. This includes supporting convenient multi-document manipulation and viewing. Workers use this capability when cross-referencing documents and integrating information from multiple docs. This includes supporting fast and flexible search, manipulation, and navigation within and between documents. Workers use this capability when skimming and searching to answer questions. This includes conveniently supporting writing in conjunction with reading. Approximately 50 percent of all reading activity in the workplace is in conjunction with writing. Workers use this capability for new document creation and editing, note taking, annotation of existing docs, and form filling. This includes supporting the use of more than one display surface for reading and writing. Approximately 50 percent of reading and writing in the workplace uses more than one display surface. Workers use this arrangement for extracting information from documents, integrating information, and using one document to write another. This includes supporting joint reading of documents. Approximately 20 percent of reading at work takes place in the context of using documents to support and provide a shared focus for a discussion.

We have developed methods and graphical user interfaces for supporting reading at work on computing devices that overcome the deficiencies of existing solutions.

SUMMARY

A method, comprising: at an electronic document library of items comprising docs and doc sets detecting the selection of one or more items in the electronic document library; in response to detecting the selection of two or more items in the electronic document library: saving in the electronic document library a doc set comprising links to each selected item, and displaying adjacent to a doc display area tab icons linked to each selected item; detecting the selection of a tab icon; in response to detecting the selection of a tab icon linked to a doc: displaying the doc in the doc display area.

A computing device, comprising: a display; one or more processors; memory; and one or more programs, wherein the one or more programs are stored in memory and configured to be executed by the one or more processors, the one or more programs including instructions for: detecting the selection of one or more items in an electronic document library of items comprising docs and doc sets; in response to detecting the selection of two or more items in the electronic document library: saving in the electronic document library a doc set comprising links to each selected item, and displaying adjacent to a doc display area tab icons linked to each selected item; detecting the selection of a tab icon; in response to detecting the selection of a tab icon linked to a doc: displaying the doc in the doc display area.

A computer readable storage medium storing one or more programs, the one or more programs comprising instructions, which when executed by a computing device, cause the device to: detect the selection of one or more items in an electronic document library of items comprising docs and doc sets; in response to detecting the selection of two or more items in the electronic document library: save in the electronic document library a doc set comprising links to each selected item, and display adjacent to a doc display area tab icons linked to each selected item; detecting the selection of a tab icon; in response to detecting the selection of a tab icon linked to a doc: display the doc in the doc display area.

We begin with a brief description of the drawings.

BRIEF DESCRIPTION OF THE DRAWINGS

For a better understanding of the embodiments of the invention, reference should be made to the Description of Embodiments below, in conjunction with the following drawings in which like reference numerals refer to corresponding parts throughout the figures.

The applicant reserves all copyright rights with respect to any figure illustrating a graphical user interface.

DETAILED DESCRIPTION

Reference will now be made in detail to embodiments, examples of which are illustrated in the included drawings. In the following detailed description, many specific details are set forth in order to provide a thorough understanding of the present invention. However, it will be apparent to one of ordinary skill in the art that the present invention may be practiced without these specific details. In other embodiments, well-known methods, procedures, components, circuits, and networks have not been described in detail so as to not obscure aspects of the embodiments.

The terminology used in the description of the invention is for the purpose of describing particular embodiments only and is not intended to be limiting of the invention. As used in the description, the singular forms "a", "an", and "the" are intended to include the plural forms as well, unless the context clearly indicates otherwise. It will also be understood that the term and/or as used herein refers and encompasses any and all possible combinations of one or more of the associated listed items.

Embodiments of computing devices, user interfaces for such devices, and associated processes for using such devices are described. In some embodiments, the computing device is a handheld mobile computing device such as a pad or tablet. Exemplary embodiments of such handheld mobile computing devices include, without limitation, the iPad by Apple computer, the Surface by Microsoft, and Galaxy Tab by Samsung, and the *Nexus* by Google. The device supports a variety of applications including a web browser, an email application, a contacts application, and productivity applications included with the device when sold. The device also supports a variety of applications (apps) developed by third parties that are available for purchase and download from an application store. Typically, an application store makes available applications written to run on a particular mobile operating system. Exemplary operating systems for handheld mobile computing devices include, without limitation, iOS by Apple, Android by Google, and Windows by Microsoft.

In the discussion that follows, a handheld mobile computing device that includes a display and touch-sensitive surface is described. It should be understood, however, that the computing device may include one or more physical user-interface devices, such as a physical keyboard, and mouse, and/or a touchpad.

Attention is now directed towards embodiments of handheld mobile computing devices with touch-sensitive displays.

Figure 1:
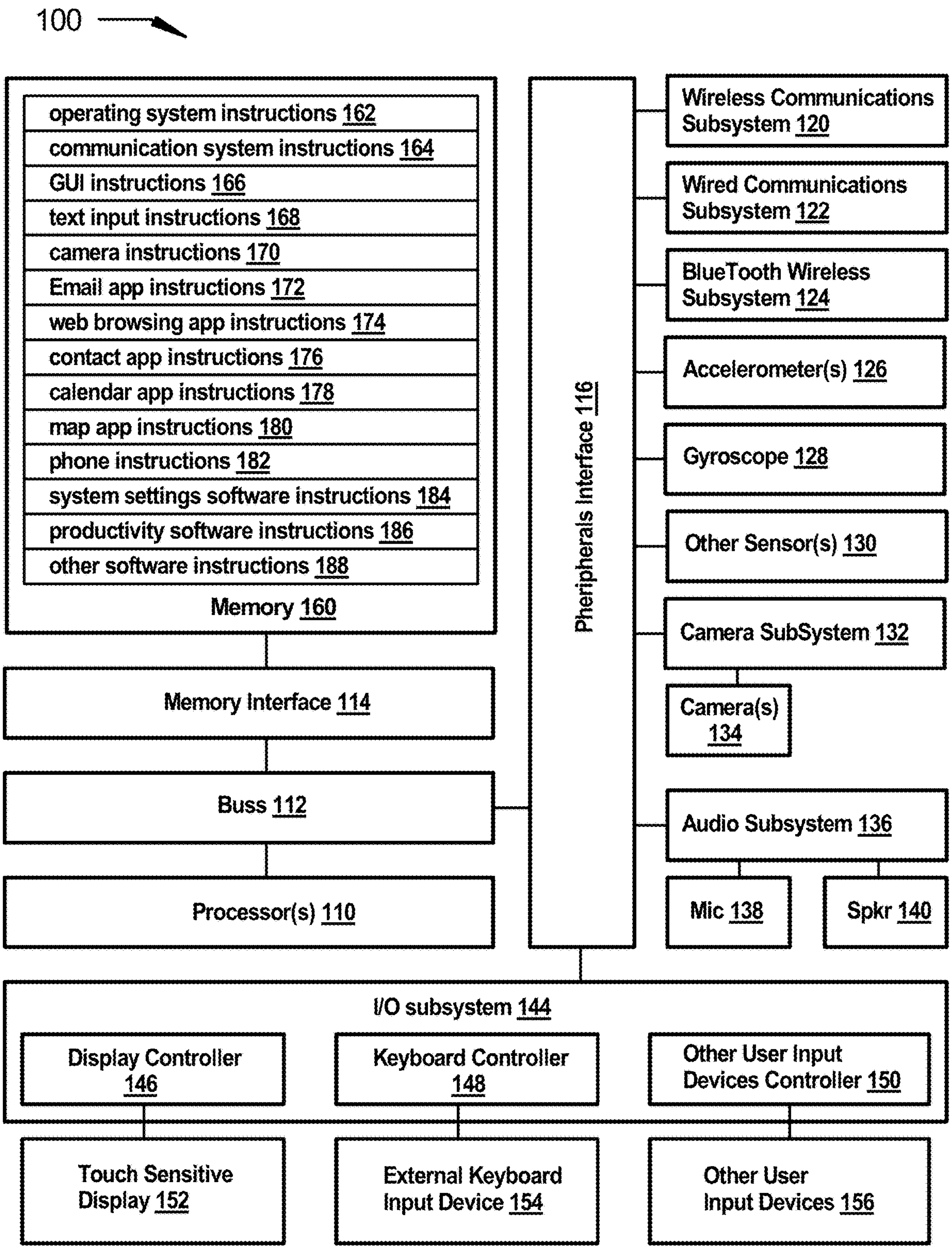
FIG. 1 is a block diagram illustrating a handheld mobile computing device with a touch-sensitive display in accordance with some embodiments.

FIG. 1 is a block diagram illustrating a handheld mobile computing device 100 with a touch-sensitive display in accordance with some embodiments. The device includes processor(s) 110 connected via buss 112 to memory interface 114 to memory 160. The memory will typically contain operating system instructions 162, communication system instructions 164, GUI (graphical user interface) instructions 166, and text input instructions 168. The memory may contain camera instructions 170, email app instructions 172, web browsing app instructions 174, contact app instructions 176, calendar app instructions, map app instructions 180, phone app instructions 182, system settings software instructions 184, productivity software instructions 186, and other software instructions 188. Other software instructions include file viewing instructions to enable viewing of electronic documents in human readable form. An operating system will typically include a set of file viewing instructions for viewing various file types including, but not limited to, documents, spreadsheets, presentations, images, drawings, html files, text files, and PDF files. In addition, the user may install other file viewers for other file types to supplement those included with the operating system. Finally, the user may open and view an electronic document, with an application designed for viewing and editing a particular file type, using the open-in feature of the operating system. File viewers and applications may be hosted locally on the device, or remotely on a server. The computer instructions for carrying out computer-implemented methods of this disclosure for supporting reading at work could be categorized as productivity software instructions. The device also includes processors(s) 110 connected via buss 112 to peripherals interface 116. Peripherals interface 116 may be connected to a wireless communications subsystem 120, wired communications subsystem 122, Bluetooth wireless communications subsystem 124, accelerometer(s) 126, gyroscope 128, other sensor(s) 130, camera subsystem 132, and audio subsystem 136. The wireless communication system includes elements for supporting wireless communication via Wi-Fi or cellular or any other wireless networking system. The accelerometers provide information regarding device orientation to the GUI instructions to enable the change of the orientation of the graphical user interface to match the orientation of the device as the device is viewed in portrait or landscape orientation. The camera subsystem is connected to camera(s) 134. These cameras may include one or more cameras for supporting real time video conferencing over a network connection. The audio system may be connected to microphone 138 and speaker 140. These components may be used to support the audio portion of a discussion that may take the form of a voice only (talk) discussion, a voice discussion plus real time video of participant faces for video conference (FaceTalk), or a voice discussion plus real time sharing of documents (DocTalk). The peripherals interface 116 is connected to the I/O system 144 comprising display controller 146, keyboard controller 148, and other user input devices controller 150. The display controller is connected to touch sensitive display 152. The keyboard controller may be connected to other physical keyboard input device including an external keyboard input device 154. The other user input devices controller may be connected to other user input devices 156, including, but not limited to a mouse, and touchpad, and a visual gaze tracking input device, or other input device.

It should be understood that the device 100 is only one example of a handheld mobile computing device 100, and that the device 100 may have more or fewer components than those shown, may combine two or more components, or may have a different configuration or arrangement of components. The components shown in FIG. 1 may be implemented in hardware, software, or a combination of hardware and software.

Figure 2:
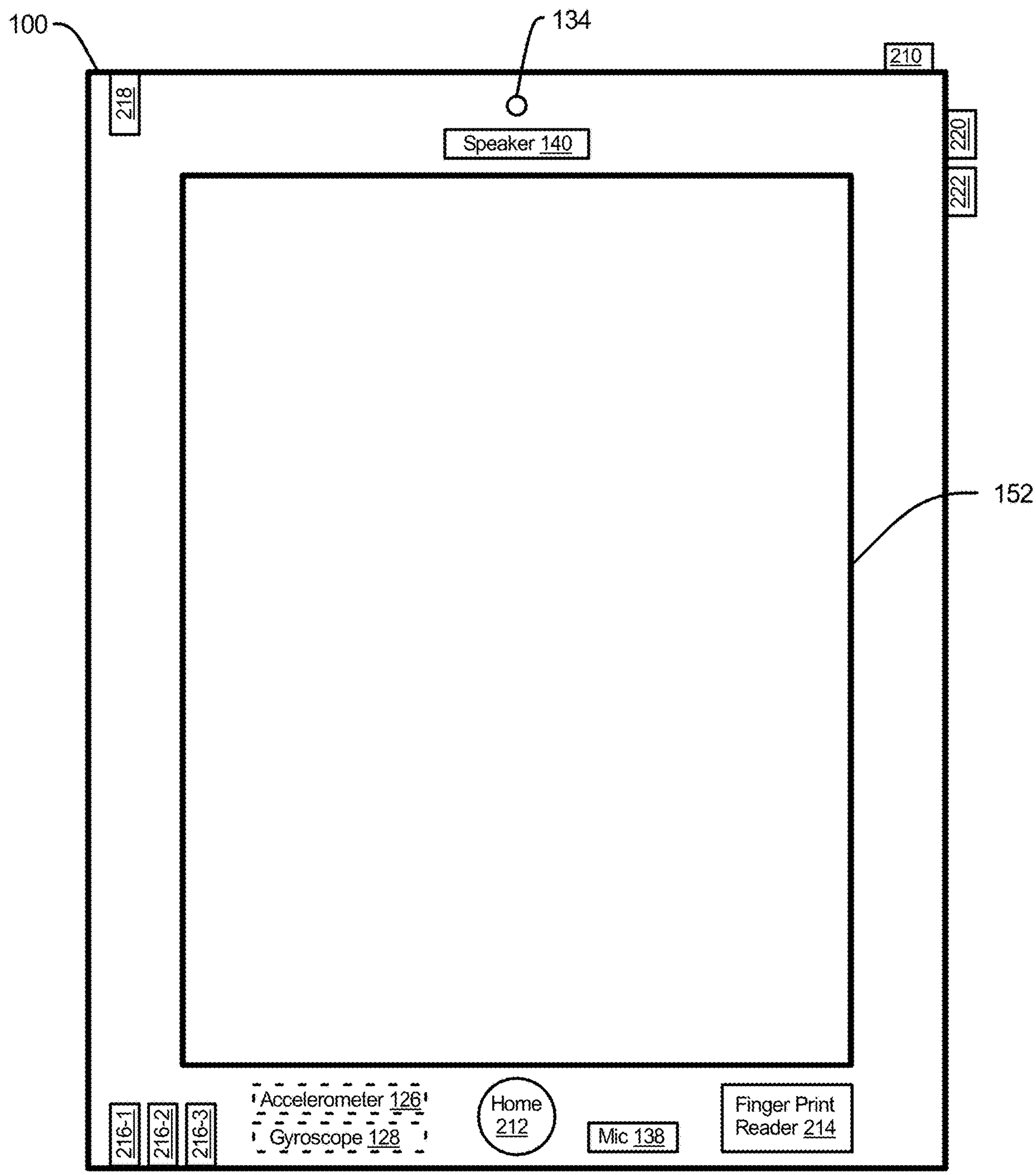
FIG. 2 illustrates a handheld mobile computing device having a touch-sensitive display in accordance with some embodiments.

FIG. 2 illustrates a handheld mobile computing device 100 having a touch-sensitive display 152 in accordance with some embodiments. The touch-sensitive display may display one or more graphics within the user interface on touch-sensitive display 152. In this embodiment, as well as others described below, a user may select one or more graphics (in many instances these graphics are in the form of icons), by making contact with or touching the graphics, for example, with one or more fingers. In some embodiments, selection occurs when the user breaks contact with the one or more graphics. In some embodiments, the contact may include a gesture, such as one or more taps, or swipes. A swipe gesture may be used to drag one icon to the location of another icon, for example. The device 100 may include one or more physical buttons such sleep/wake or power off/on button 210, home button 212, and volume up and down button pair 220 and 222. The device may include one or more accelerometers 126, a gyroscope 128 for sensing the position of the device position in space. The device may include a microphone 138, and speaker 140. The device may include finger printer reader 214 to support user authentication. The device may include earphone/microphone jack 218 for connection to an external headset. The device may include or more status indicators 216-1, 216-2, and 216-3 for displaying status to the user. These indicators may be light emitting diode indicators.

Attention is now directed towards embodiments of user interfaces that may be implemented on handheld mobile computing device 100.

The applicant designed and built a prototype to demonstrate the user interfaces and the methods of the invention. “Screen shots” taken from that prototype are incorporated into the drawings to illustrate exemplary user interfaces for use in implementing the methods presented in the flow diagrams.

It is convenient to begin with an overview of the two key exemplary user interfaces. The first exemplary user interface is named "My Docs" and the second exemplary user interface is named View Docs. The "My Docs" UI could be thought of as the UI to an electronic document library and the View Docs UI could be thought of as the UI to an electronic library-table with links to the electronic documents in the library. The docs can be of any type including, but not limited to documents, spreadsheets, presentations, images, drawings, PDF documents, and html documents. The docs may be stored locally on the device 100, or the docs may be stored on a server "in the cloud". The server may be of any type, including but not limited to, a work server behind a firewall, a personal sever located in an office or home, or a server hosted by a third party.

Figure 3A:
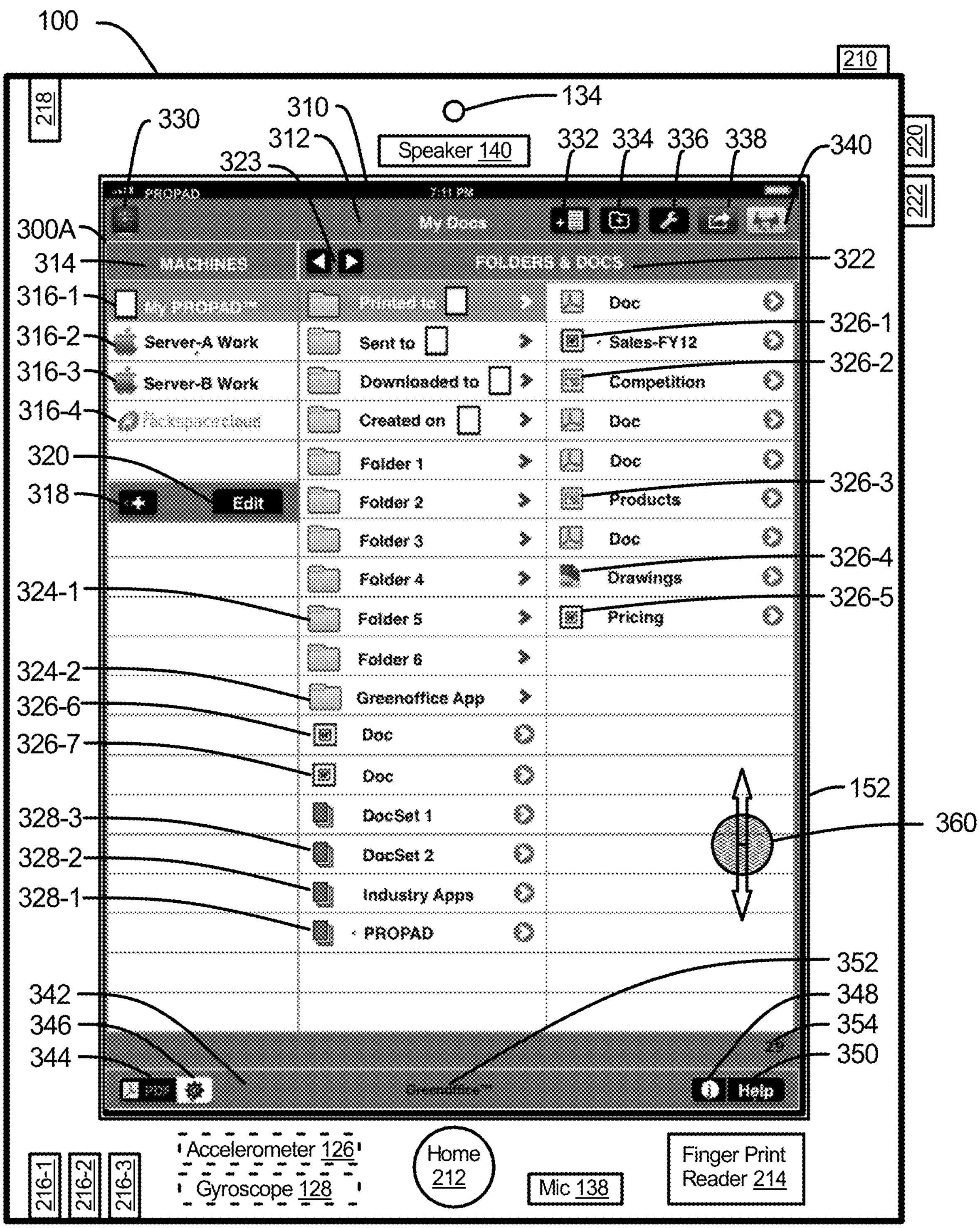
FIGS. 3A-3B illustrate exemplary user interfaces for working with electronic documents in accordance with some embodiments showing the My Docs user interface (UI) and the View Docs UI.
Figure 3B:
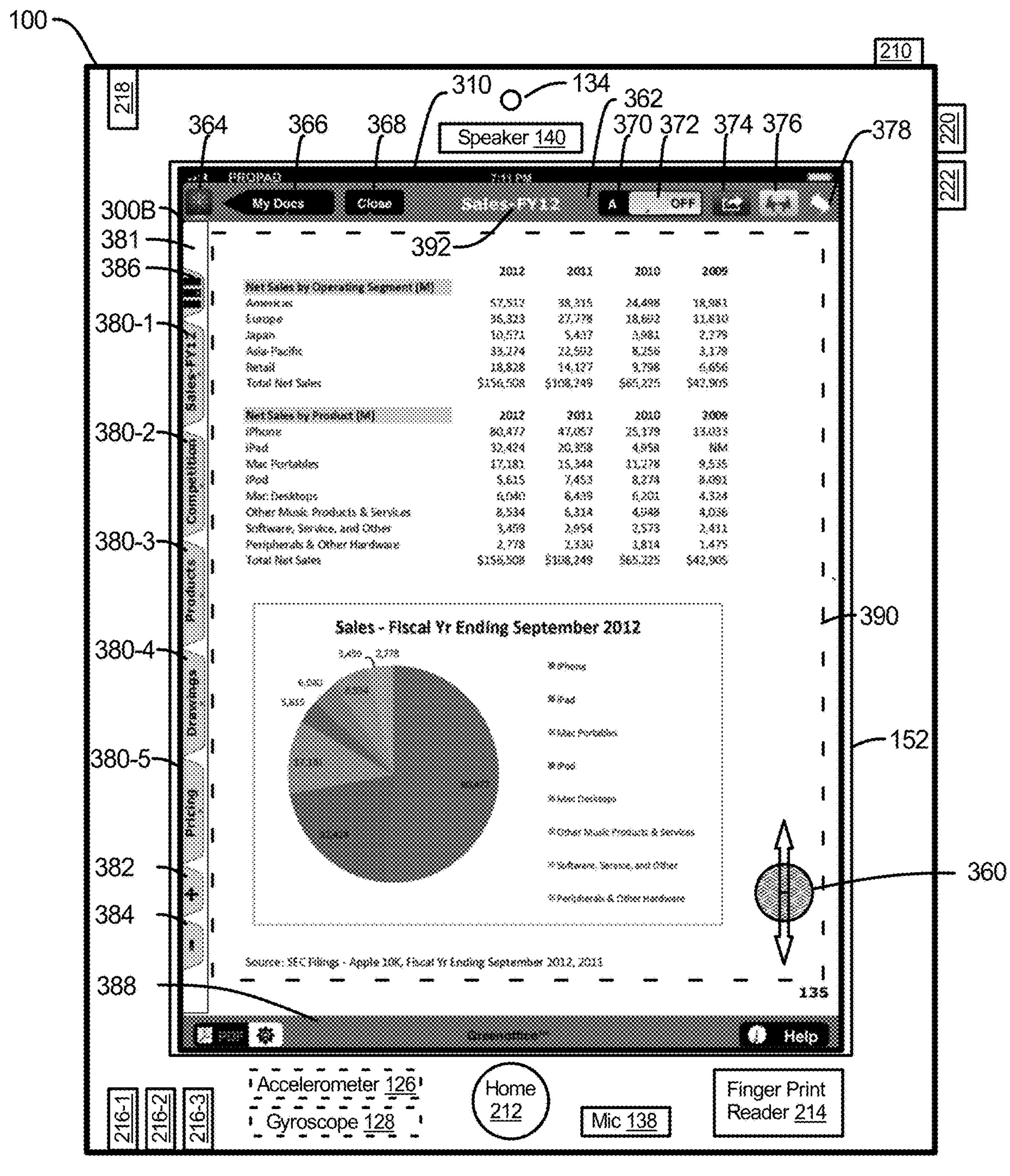

FIGS. 3A-3B illustrate exemplary user interfaces for working with electronic documents in accordance with some embodiments showing the My Docs user interface (UI) and the View Docs UI. FIG. 3A illustrates an exemplary user interface 300A. This is exemplary of the My Docs UI. FIG. 3B illustrates an exemplary user interface 300B. This is exemplary of the View Docs UI. The exemplary My Docs user interface 300A shown in FIG. 3A may include status bar 310, toolbar/navigation bar 312, and "MACHINES" header 314, with machines that may be accessed via the UI displayed thereunder. These machines may include machine 316-1 (device 100), machine 316-2 ("Server A-Work" in this example), machine 316-3 ("Server B-Work" in this example), and machine 316-4 (server service "Rackspace cloud" in this example). The exemplary UI may include add icon 318 for adding other machines which may be accessed via the UI and "Edit" icon 320 for editing the list of machines which are accessible via the UI. The exemplary UI 300A may include "FOLDERS & DOCS" header 322 and folders (324-1, 324-2 for example), docs (326-1, 326-2, 326-3, 326-4, 326-5, 326-6, and 326-7 for example), and doc sets (328-1, 328-2, and 328-3 for example) displayed thereunder. A "doc set" comprises a set of links to docs and/or doc sets. The exemplary UI 300A may include in toolbar/navigation bar 312 a set of tool icons which may include brightness-adjustment icon 330, create-new-doc icon 332, create-new-folder icon 334, tool icon 336 for moving, renaming, and deleting items, action icon 338 for sending, printing, or viewing docs, and discuss icon 340 for initiating a real time discussion via a network connection in one of three modes: a "Talk" discussion—a voice-only discussion; a "FaceTalk" discussion—a voice discussion plus real time face video sharing, or a "DocTalk" discussion—a voice discussion plus real time sharing of docs on a participant's View Docs UI. The exemplary UI 300A may also include helper toolbar 342 comprising "PDF" icon 344, settings icon 346 for accessing settings, information icon 348, and "Help" icon 350. "PDF" icon 344 may provide access to tools for saving a doc to a PDF, searching a PDF, extracting a PDF, merging PDF's, and viewing and editing PDF metadata. Helper toolbar 342 may also include legend 352 with the trade name of the application. We show an example page scroll finger gesture 360 for scrolling the list of items in My Docs. A similar finger gesture may be used to scroll the items under the list of machines. Such page scroll finger gestures may be use throughout the UI to scroll items in the My Docs UI or scroll the list of machines in the My Docs UI, or to scroll the list of open doc sets in the My Docs UI. In this drawing of the exemplary UI 300A the screen-shot frame number 354 is shown in the bottom right corner of the drawing. This number is not included in the UI. This number (29 for this drawing) is used in the preparation of the drawings to insure that the correct screen shot was inserted into the drawing. A screen-shot number is typically shown in the bottom right corner in each drawing of an exemplary user interface in those instances in which a screen shot was used in the preparation of a drawing of an exemplary user interface.

The exemplary View Docs user interface 300B shown in FIG. 3B may include status bar 310, toolbar/navigation bar 362, brightness-adjustment icon 364, "My Docs" navigation icon 366, "Close" icon 368, currently-displayed doc name 392 ("Sales-FY12" in the example), annotation-toolbar-launch icon 370, annotation-enable "ON/OFF" icon 372, and action icon 374 where actions include those for sending or printing a doc or opening a doc in another application. Toolbar/navigation bar 362 may also include discuss icon 376 for initiating a discussion in one of three modes as discussed above for exemplary UI 300A. Finally, toolbar/navigation bar 362 may include full-screen-view icon 378. When full-screen-view icon 378 is selected, the displayed electronic doc is displayed in full-screen mode with all toolbars and tabs hidden until the user taps any location near the UI perimeter to revert to non-full-screen mode. The exemplary UI 300B includes tab icons 380-1 to 380-5 for each of the five items selected by the user as outlined in the method flow diagrams presented in FIGS. 9-13. In this example, each tab is linked to a single doc. In other examples to be discussed below, a tab may be linked to a doc set. In that case selecting a tab will display a UI comprising a tab for each item in the selected set. This will be illustrated further in FIGS. 4-6 to be described below. The exemplary UI 300B also includes add-item(s) icon 382. When add-item(s) icon 382 is selected by the user, the UI and methods presented in the flow diagrams of FIGS. 9-13 enable the user to select additional items to add to the set of items available to be viewed in an exemplary View Docs UI. Exemplary UI 300B also includes remove-item(s) icon 384. When remove-item(s) icon 384 is selected by the user, the UI and methods presented in the flow diagrams of FIGS. 9-13 enable the user to select items to remove from the set of items available to be viewed in an exemplary View Docs UI. UI 300B may also include tab style icon 386 for use in changing the tab style from standard tab style (as shown), to an expanded list style with each tab running from left to right with the full name of the doc or doc set shown in list format, to a compact list style with a number for each doc or doc set displayed in lieu of the full name. These different styles are useful when the set of items selected for viewing is greater than about 5 or 6, and depending upon the orientation of the UI which, although not shown in the figures, has a layout for both portrait and landscape orientation. Tab icons 380-1 to 380-5 are contained in item tab bar 381. Item tab bar 381 may include many tab icons. The tab icons may be displayed in an order set by the user. One example tab order may be the order in which the items were selected and added by the user as used in many of the examples in this disclosure. Another example tab order may be docs first in alpha order, and then doc sets in alpha order. Another example order is a custom order set by the user. The tab icons may be displayed as a fixed or scrollable list of tabs in standard tab style, expanded list style, or compact list style. The UI may be displayed in either portrait or landscape orientation. Most of the illustrations of exemplary graphical user interfaces in this disclosure show the UI for the device in portrait orientation. The UI in landscape orientation is similar to that in portrait orientation with the width of the UI increased and the height of the UI decrease. A user will often choose landscape orientation when the user wishes to view a spreadsheet, presentation, or drawing. Finally the exemplary UI 300 B may include helper toolbar 388 which may contain a set of tools similar or identical to those included in helper toolbar 342 of UI 300A. We show an example page scroll finger gesture 360 for scrolling within the doc "Sales-FY12." Such page scroll finger gestures may be use throughout the UI to scroll the content in the View Docs UI.

A description of exemplary user interfaces for use in implementing the methods presented in the flow diagrams of FIGS. 9-13 is presented below. We will describe these by showing a sequence of screen shots to illustrate the use of the UI to implement key elements of the methods.

Figure 8A:
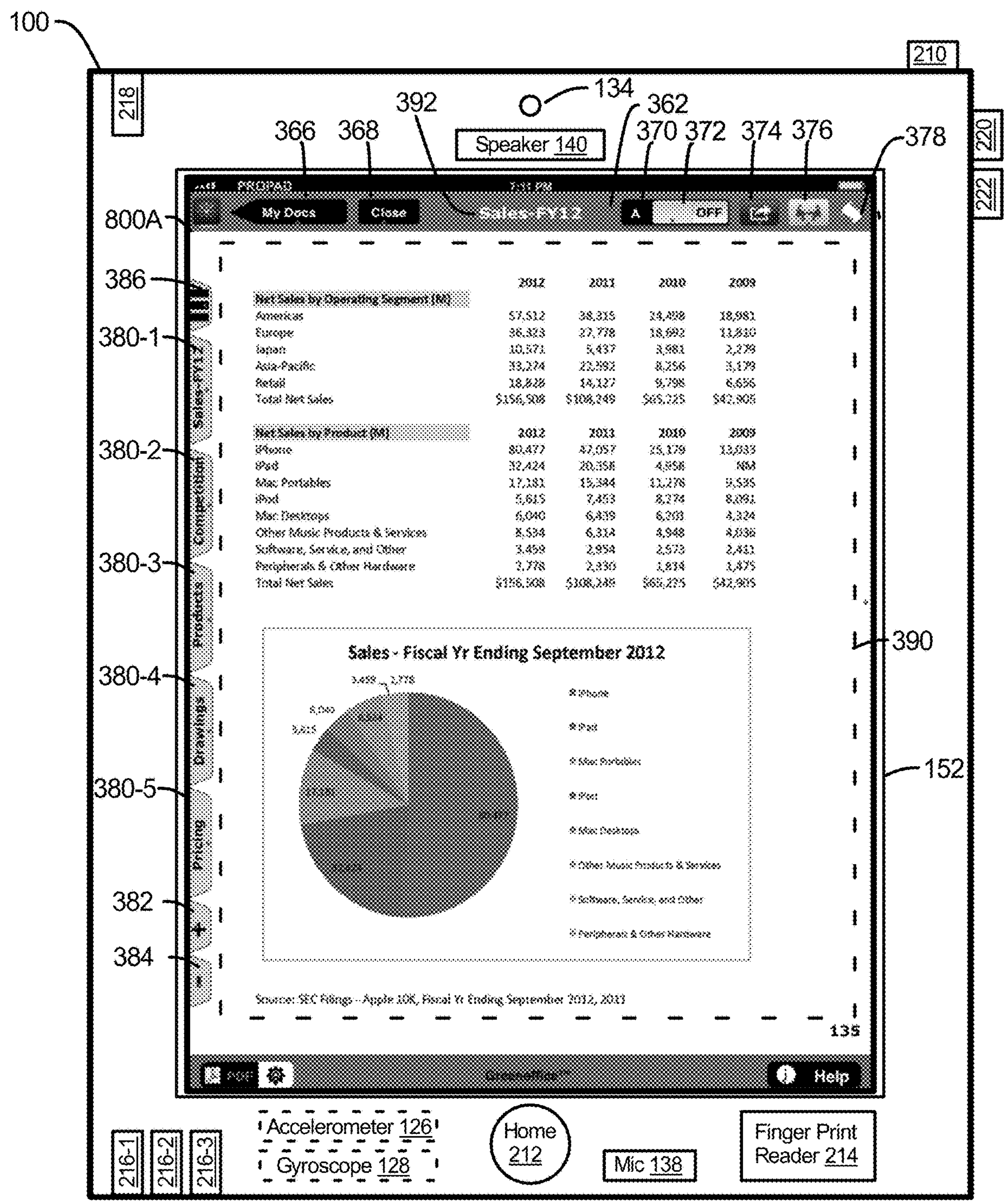
FIGS. 8A-8I illustrate exemplary user interfaces for discussing electronic documents in real time with a colleague in accordance with some embodiments.
Figure 8B:
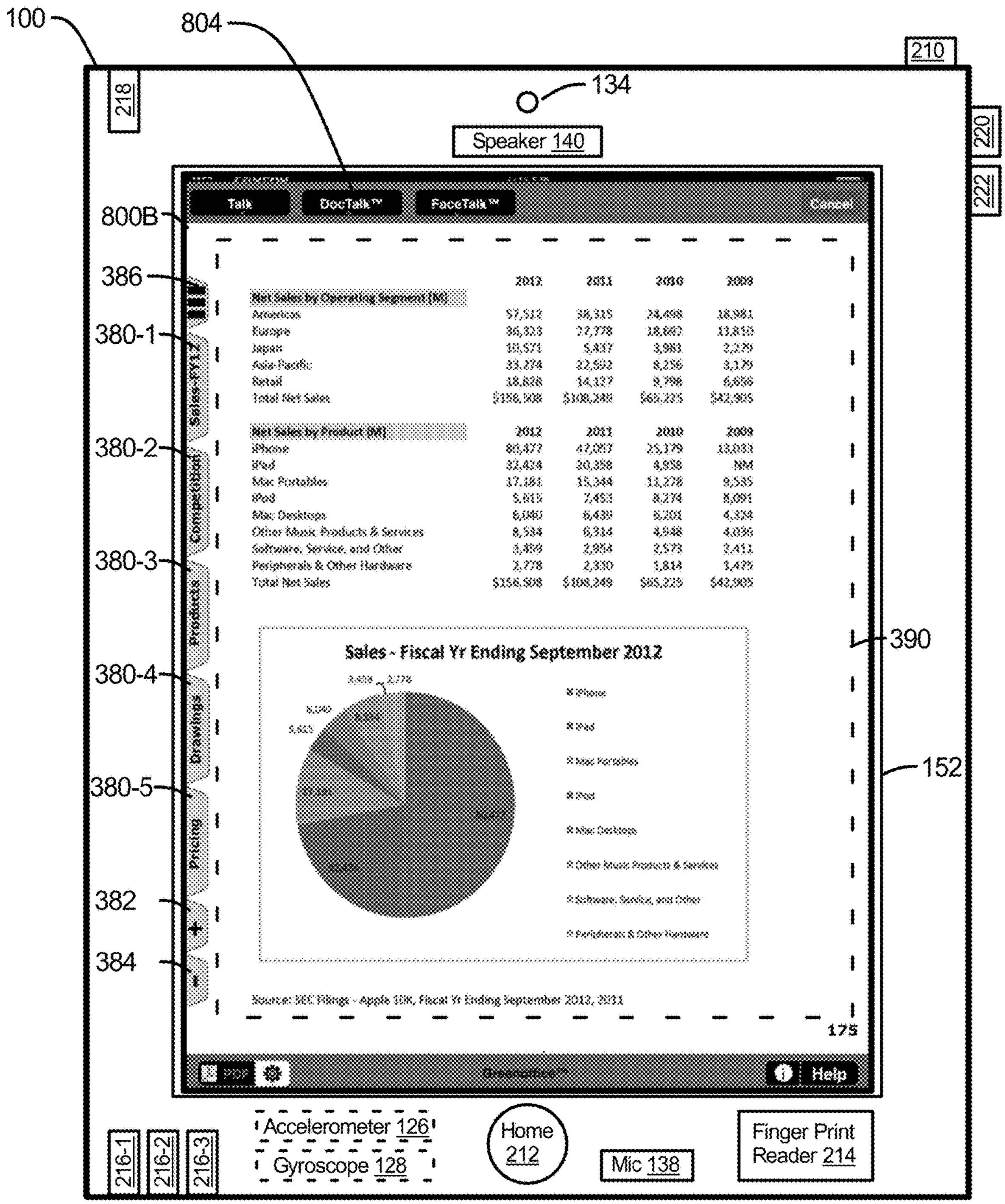
Figure 8C:
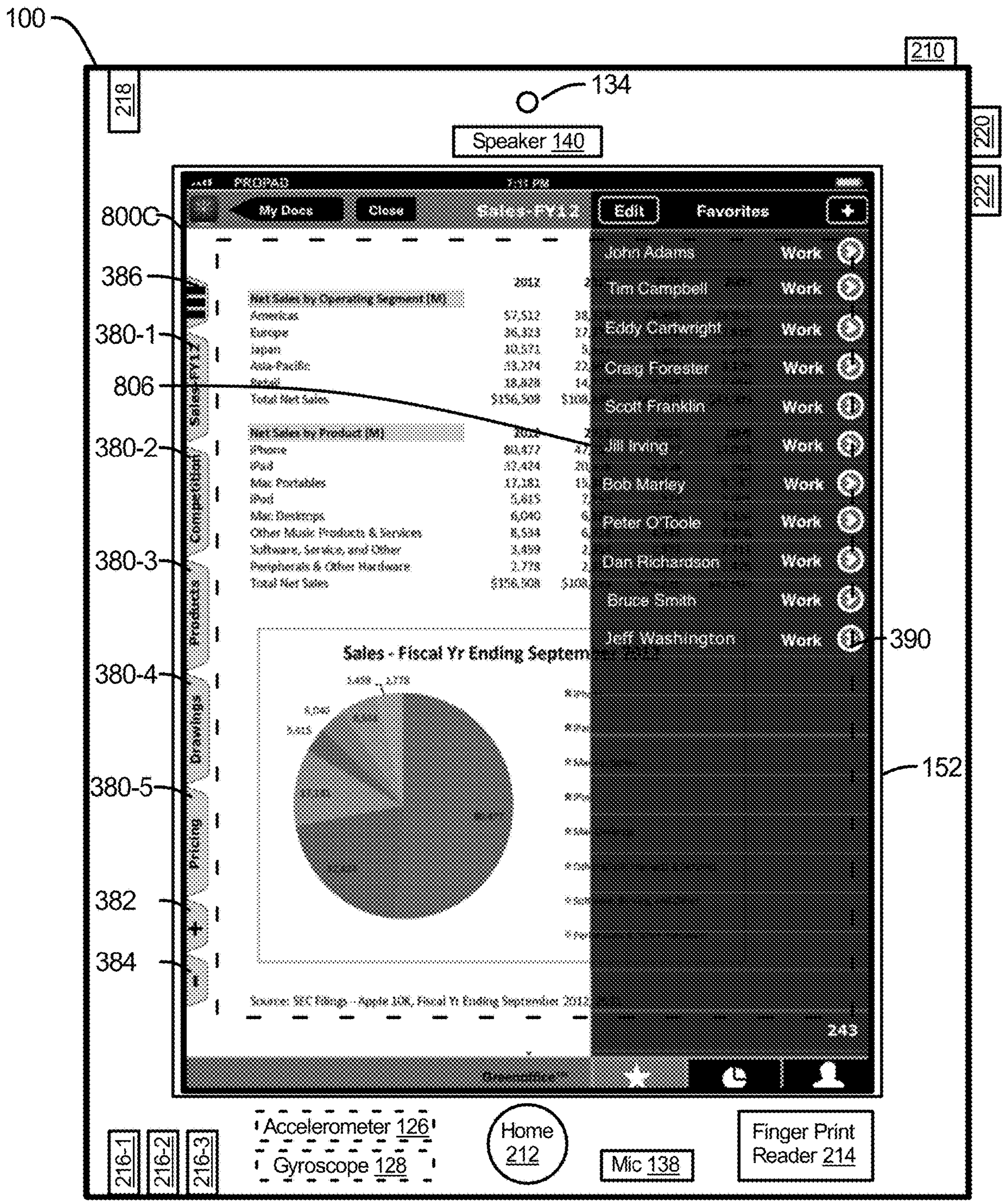
Figure 8D:
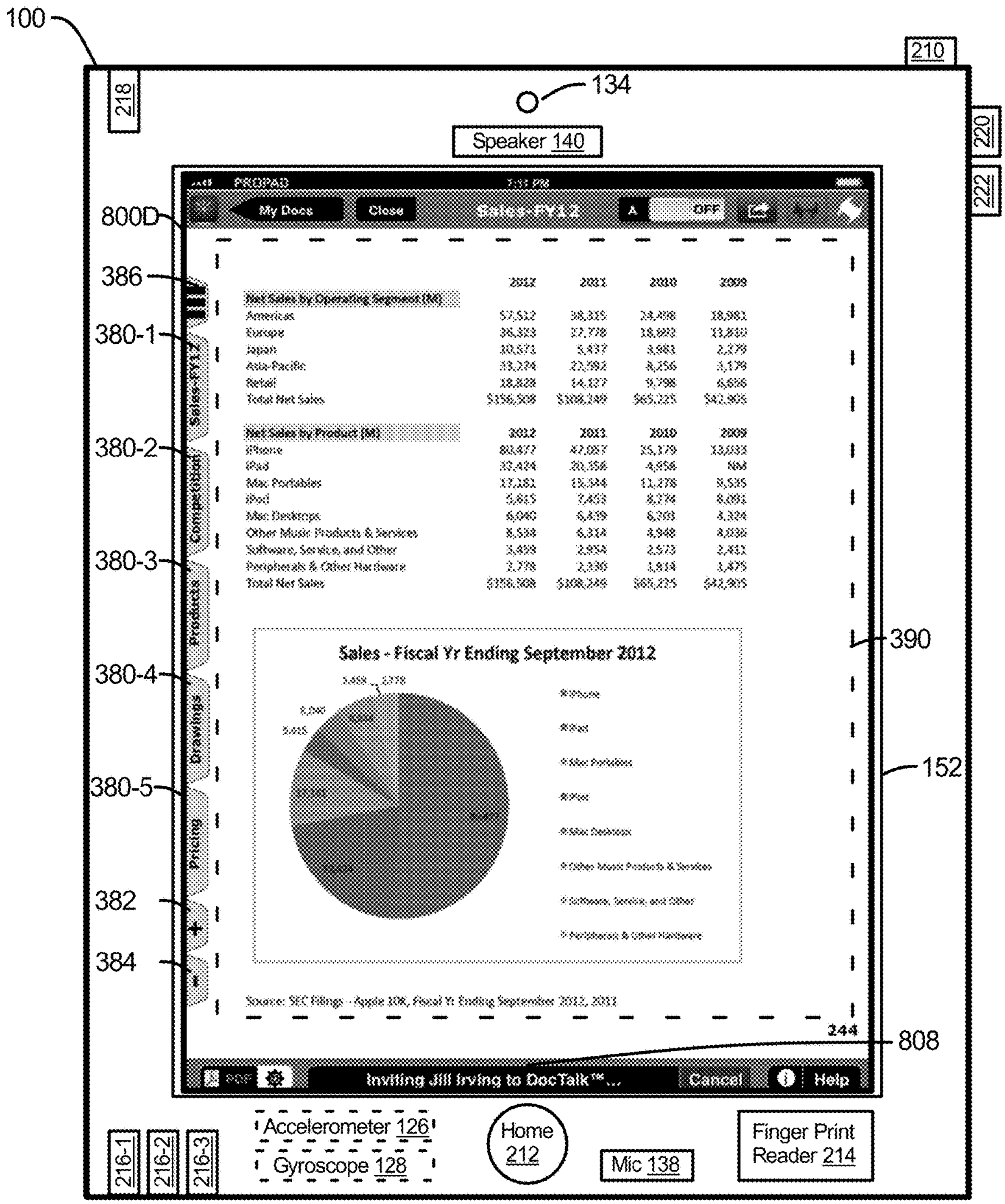
Figure 8E:
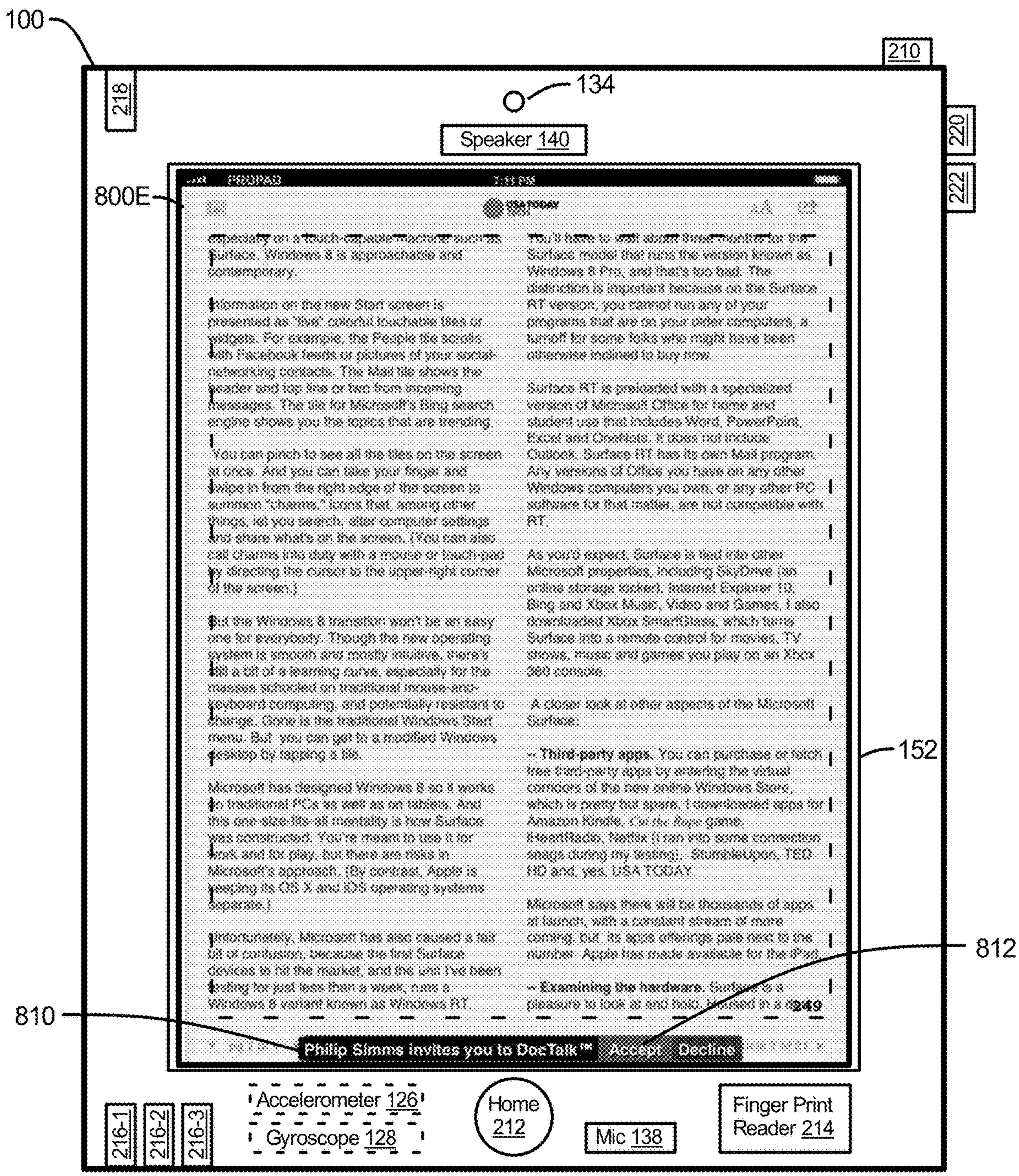
Figure 8F:
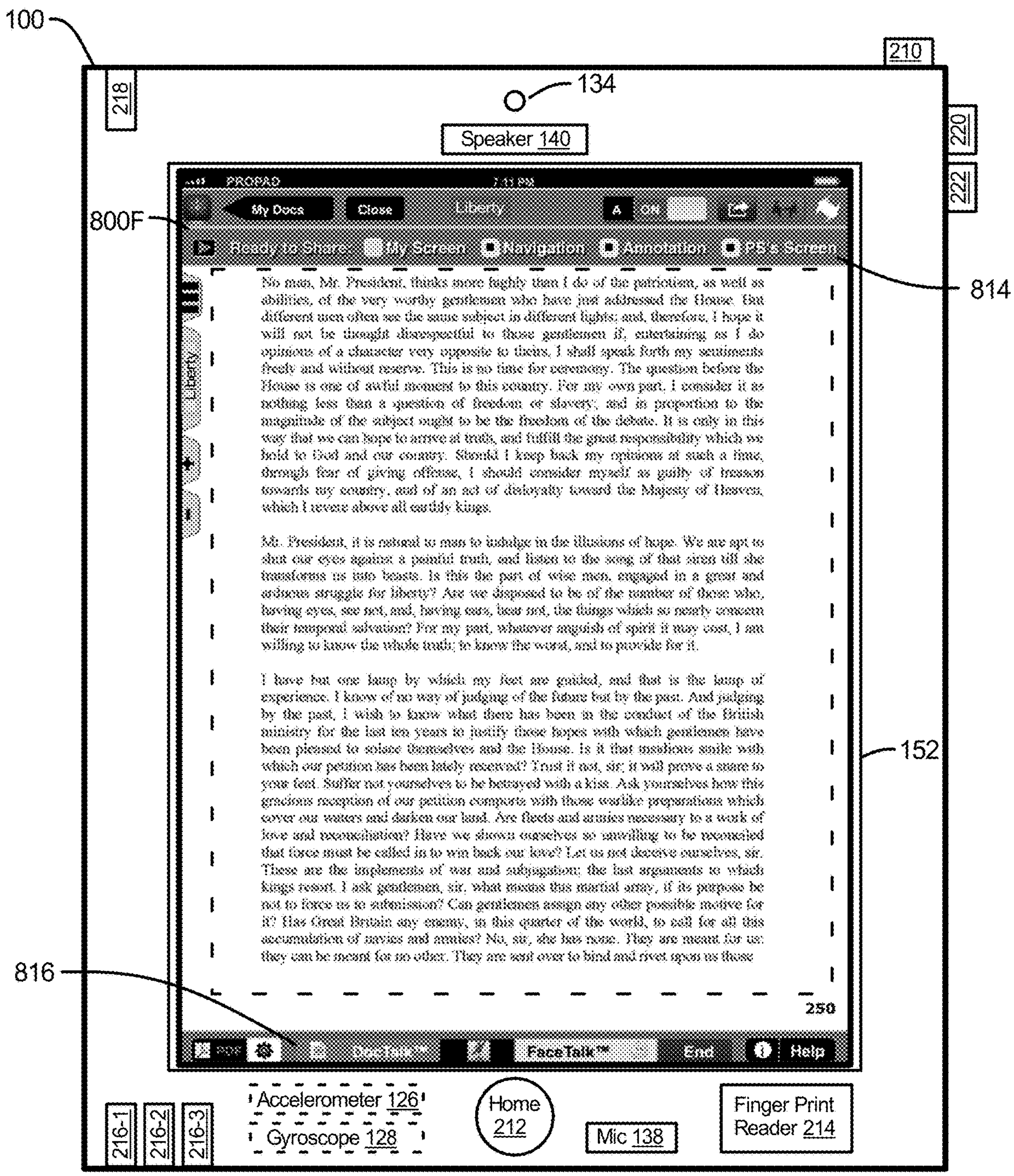
Figure 8G:
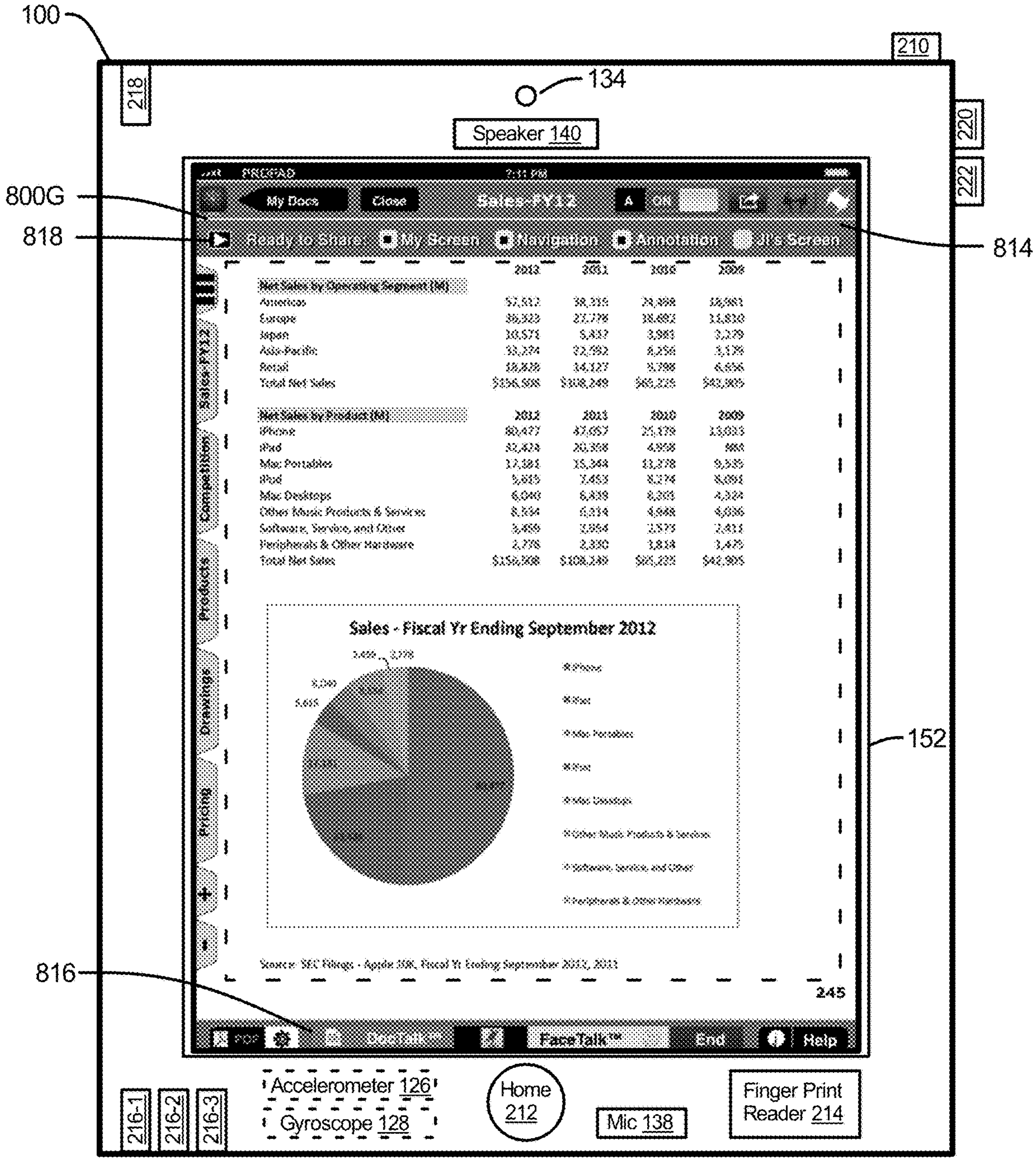
Figure 8H:
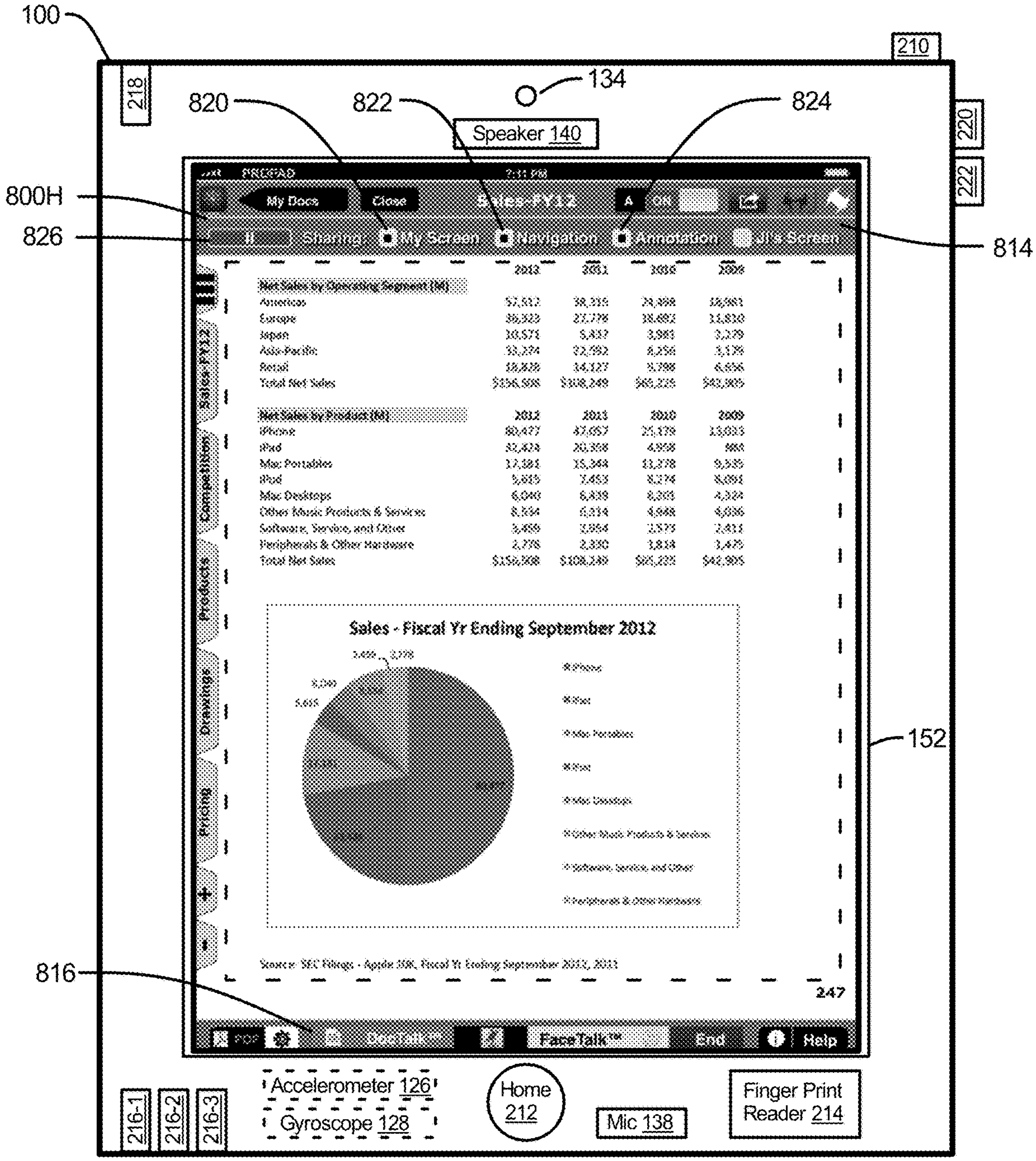
Figure 8I:
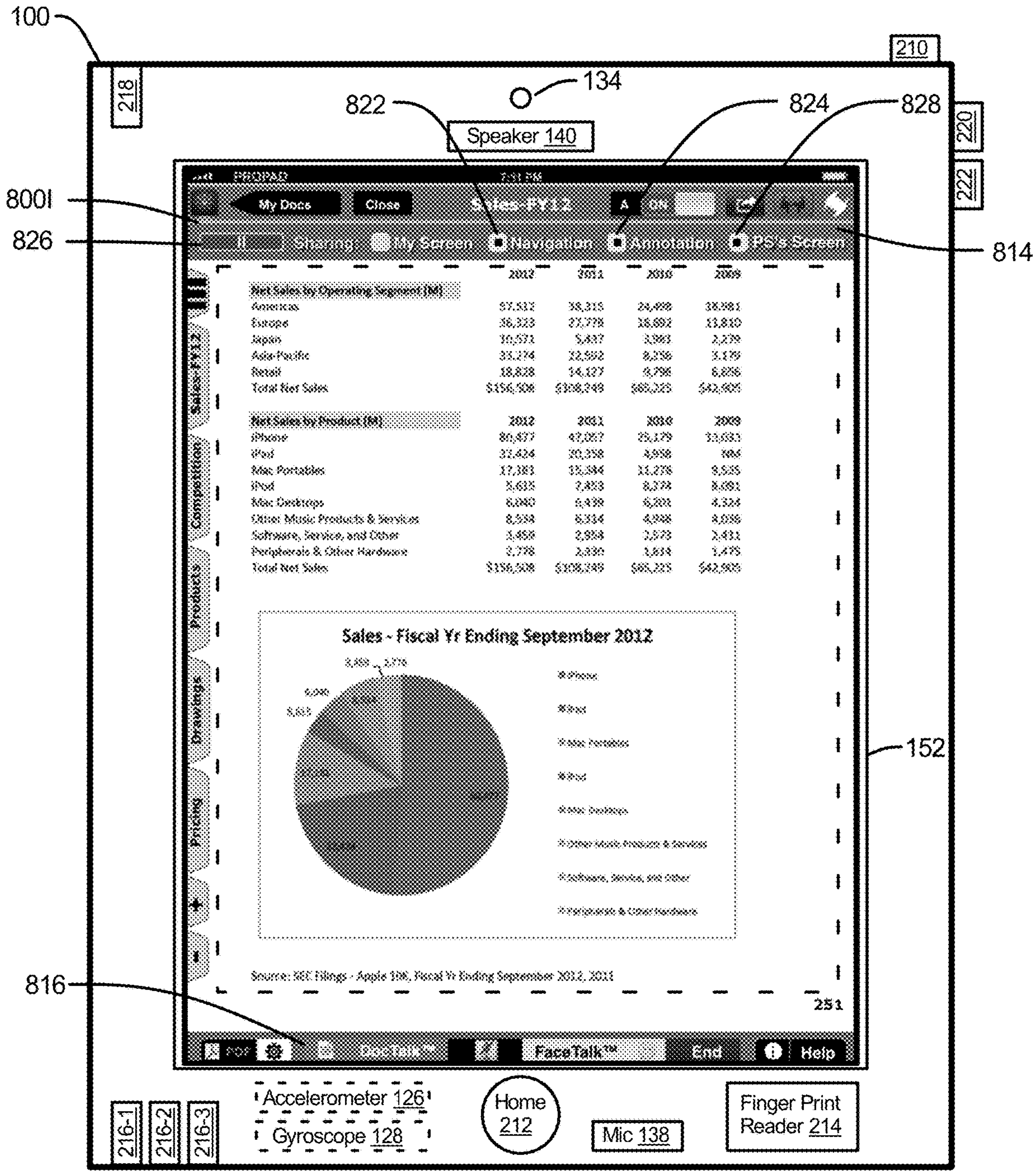
Figure 9A:
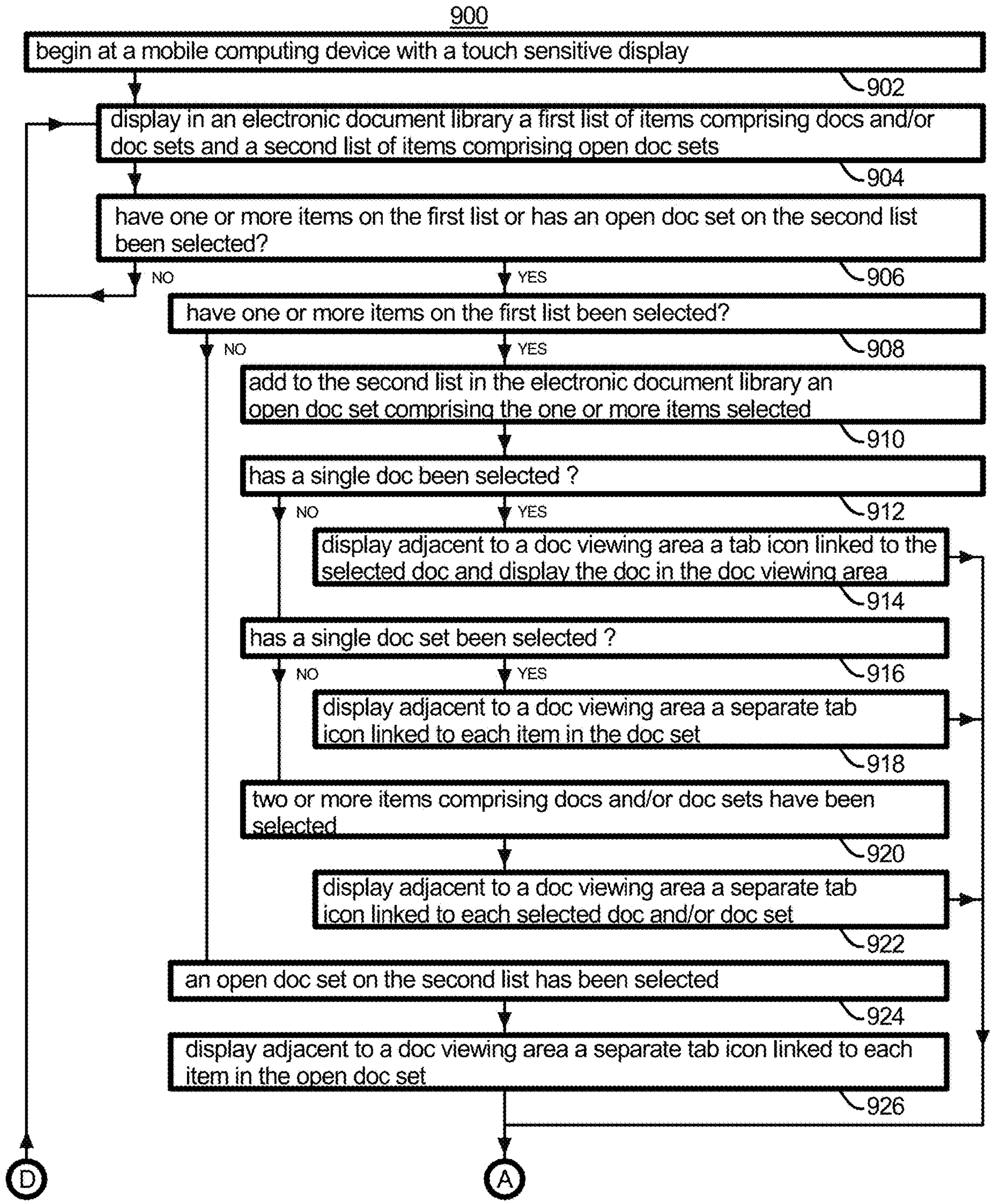
FIGS. 9A-9C is a flow diagram illustrating a process for working with electronic documents in accordance with some embodiments.
Figure 9B:
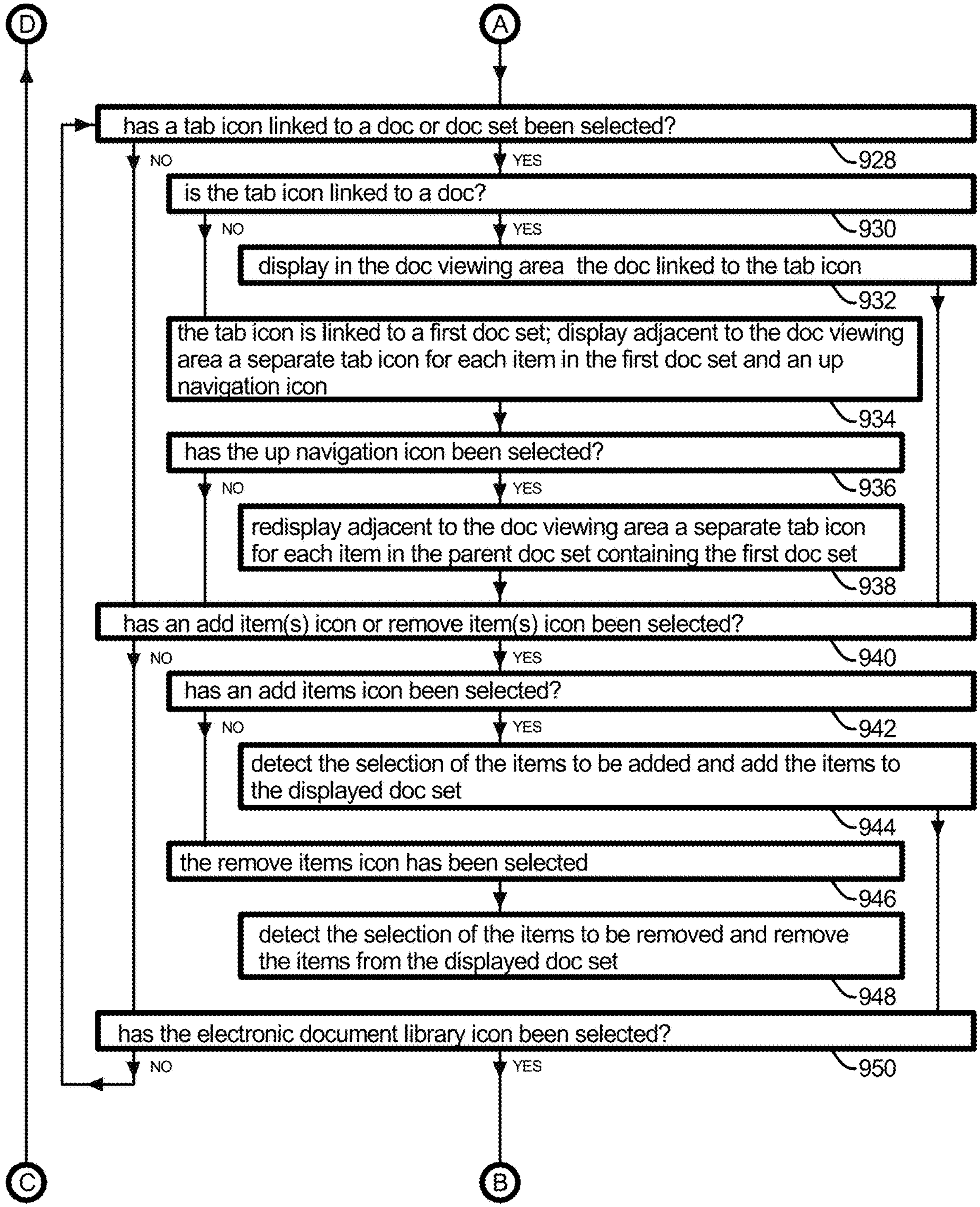
Figure 9C:
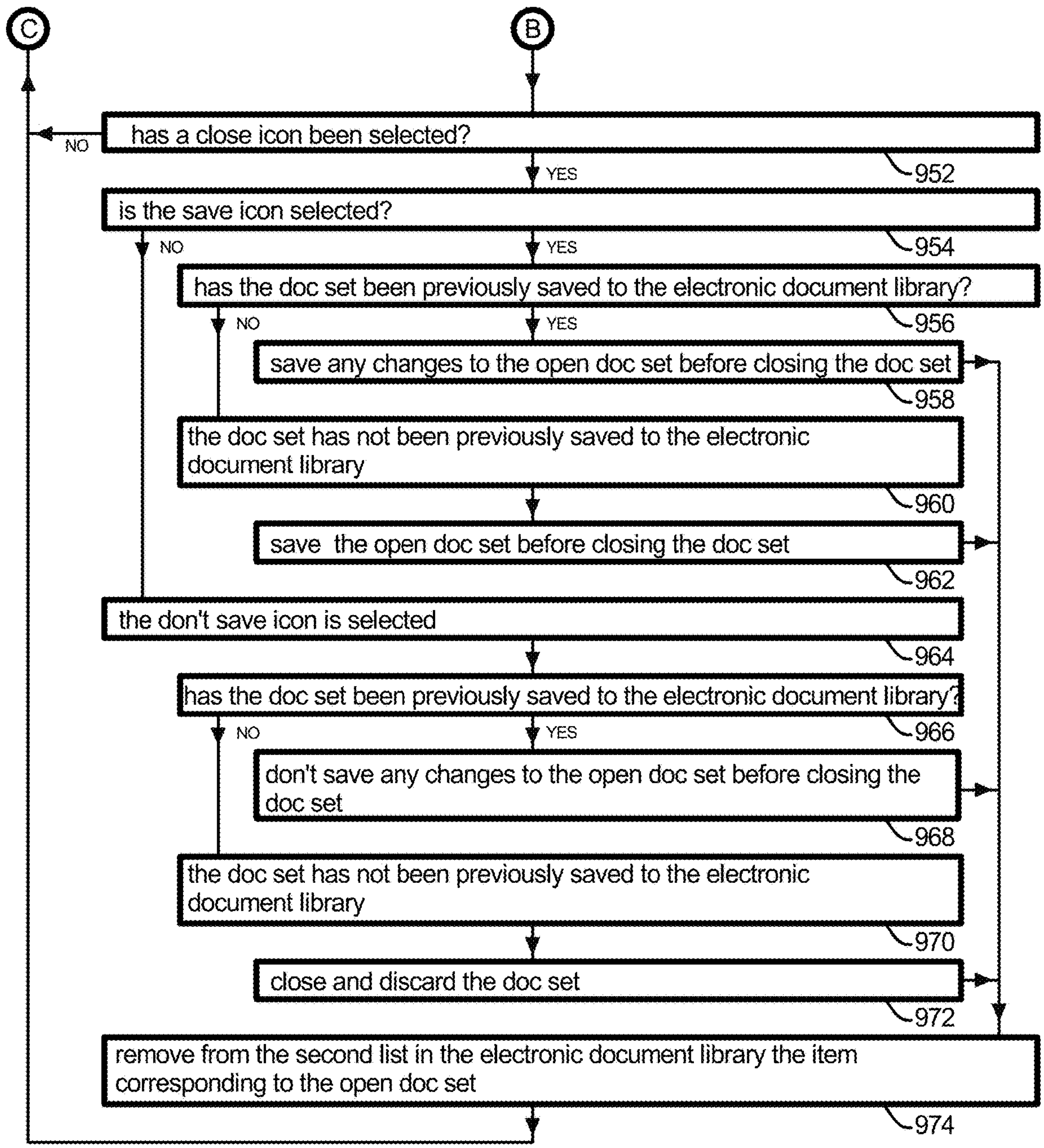
Figure 10A:
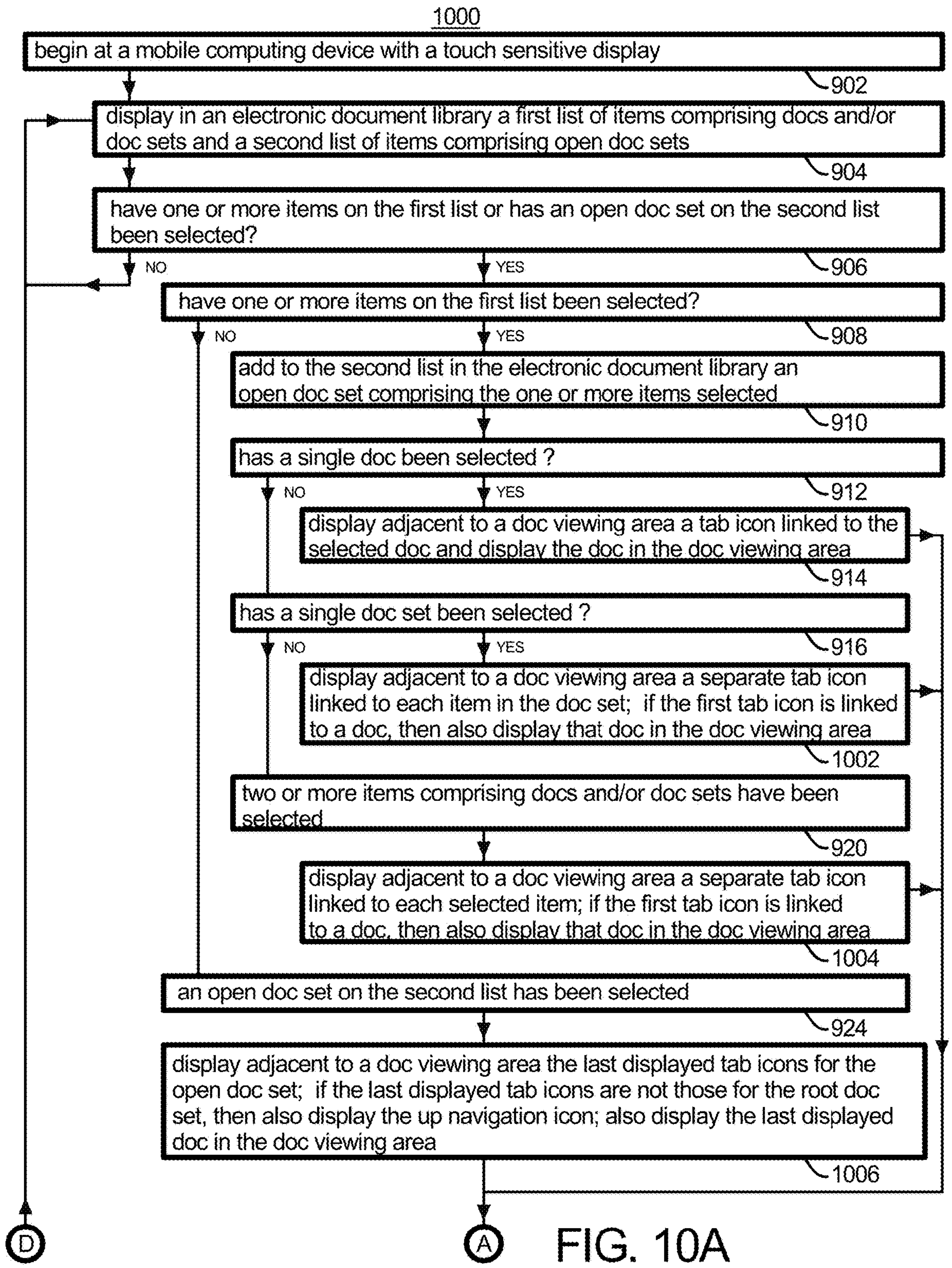
FIGS. 10A-10C is a flow diagram illustrating a process for working with electronic documents that includes methods for treating the first item in a doc set in accordance with some embodiments.
Figure 10B:
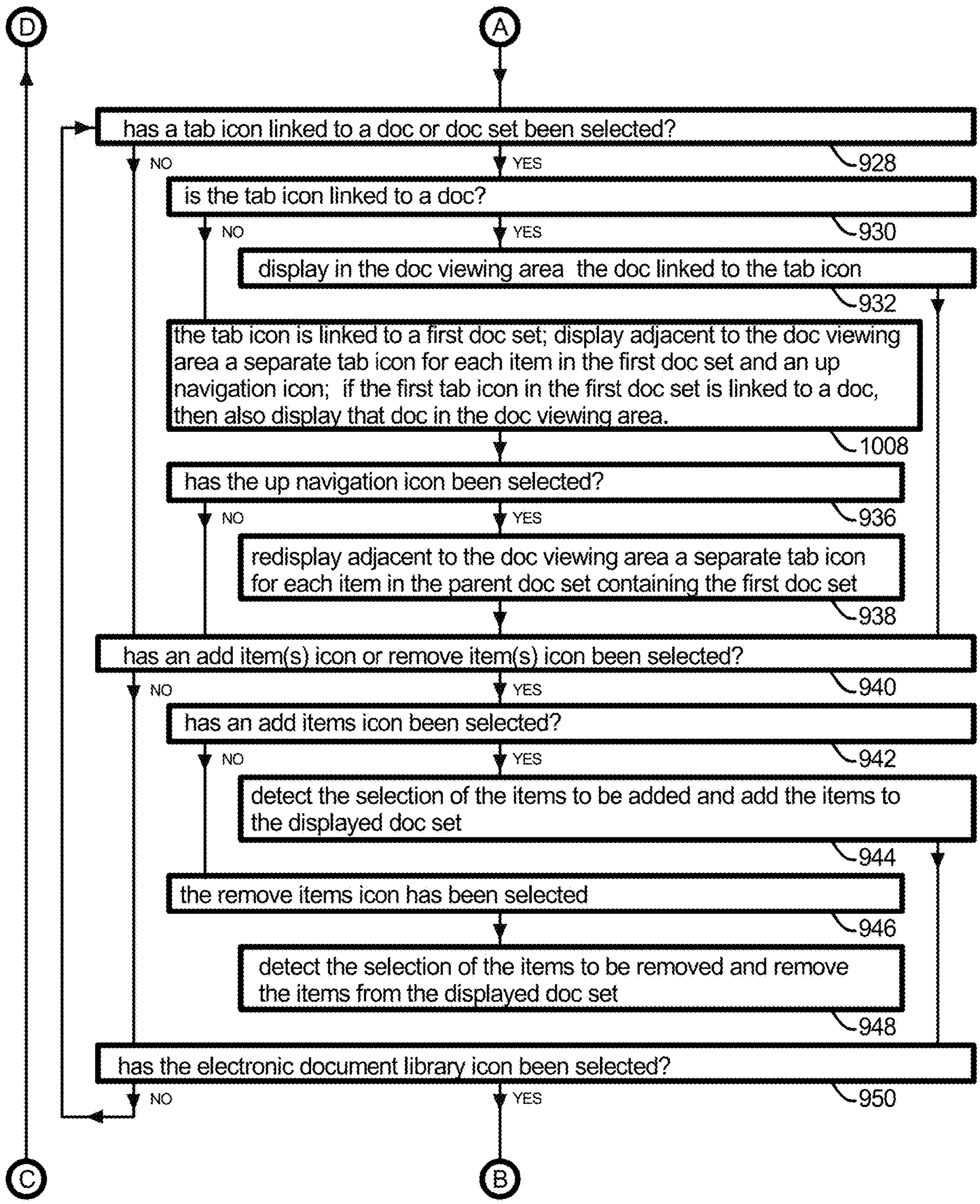
Figure 10C:
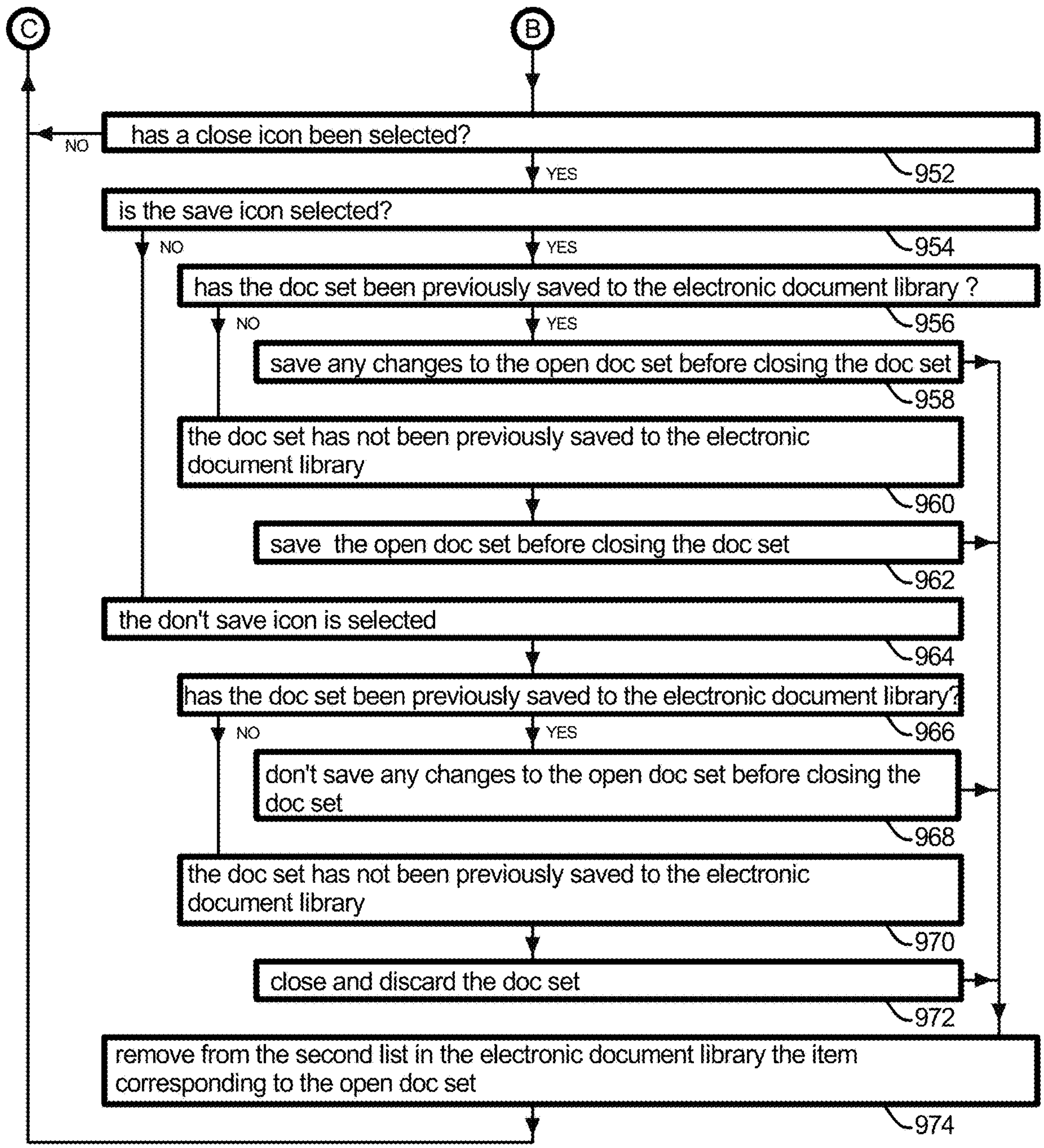

FIGS. 4A-4P, FIGS. 5A-5N, and FIGS. 6A-6N illustrate exemplary user interfaces for use in implementing the methods presented in the flow diagram shown in FIGS. 9A-9C, methods presented in the flow diagram shown in FIGS. 10A-10C, and methods presented in the flow diagram of FIGS. 13A-13D. FIGS. 4A-4P, FIGS. 5A-5N, FIGS. 6A-6N, and FIGS. 7A-7F illustrate exemplary user interfaces for use in implementing the methods presented in the flow diagram shown in FIGS. 11A-11C. FIGS. 4A-4P, FIGS. 5A-5N, FIGS. 6A-6N, and FIGS. 7A-7F, and FIGS. 8A-8I illustrate exemplary user interfaces for use in implementing the methods presented in the flow diagram shown in FIGS. 12A-12D.

Figure 4A:
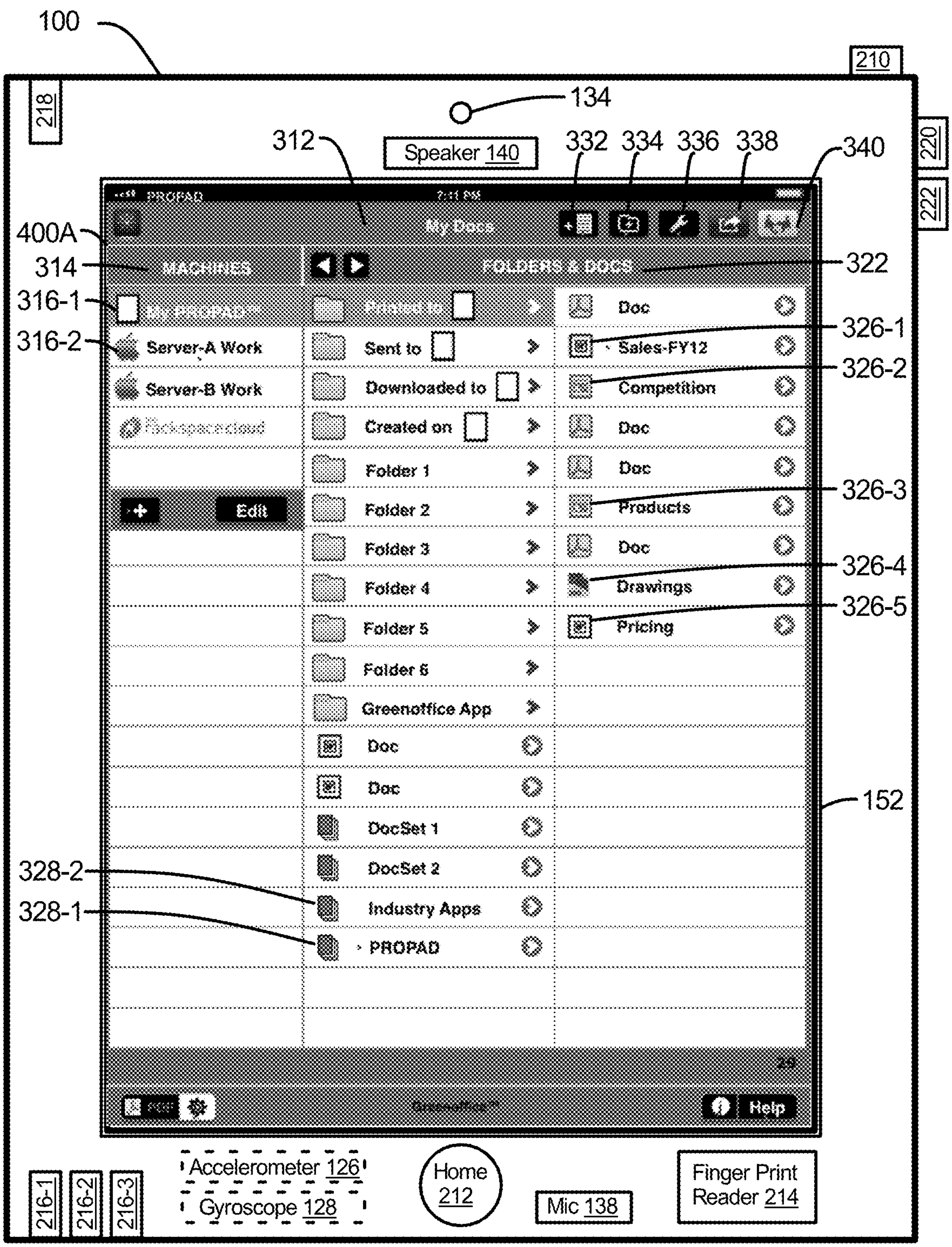
FIGS. 4A-4P illustrate exemplary user interfaces for working with docs and/or doc sets in accordance with some embodiments.
Figure 4B:
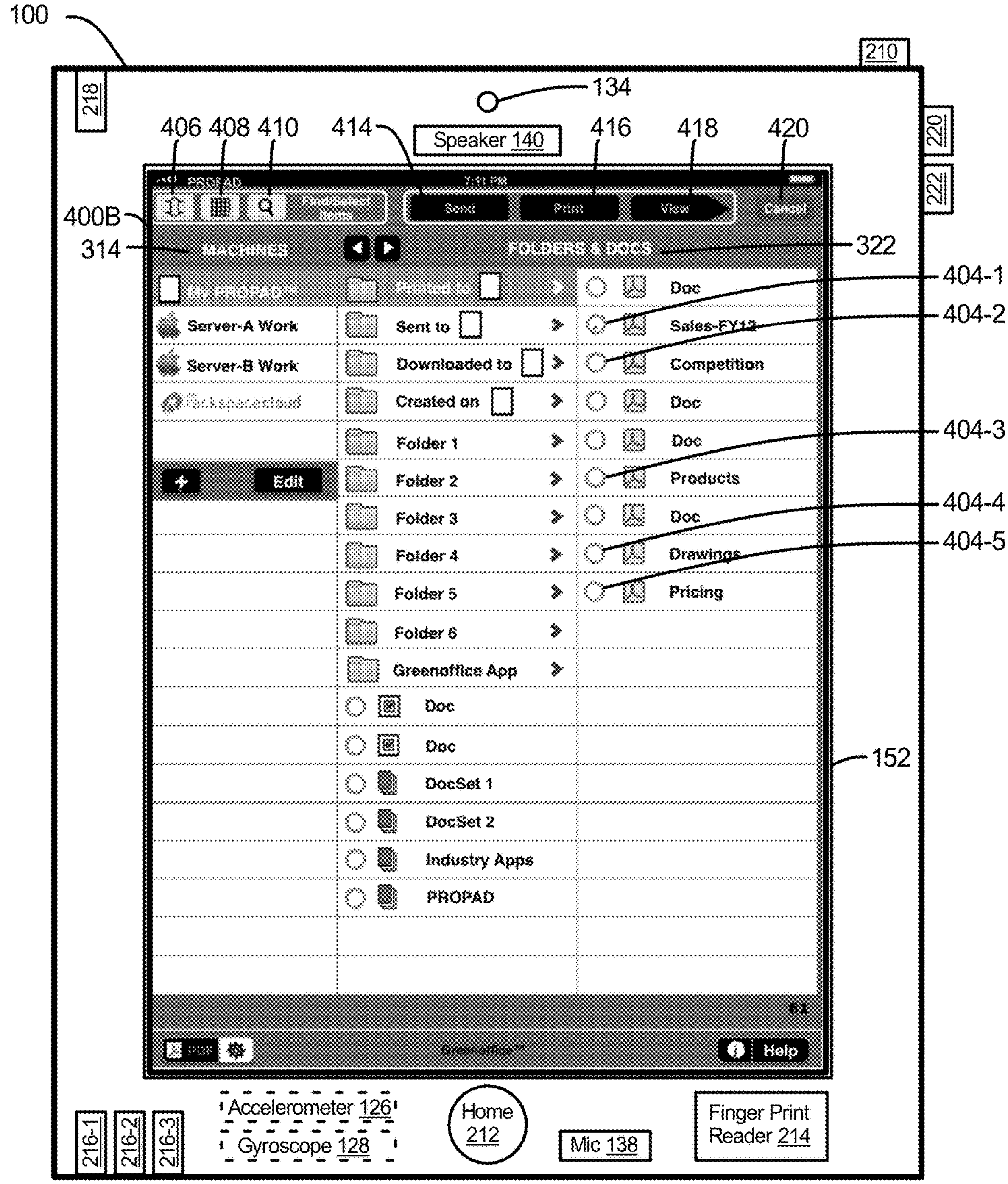
Figure 4C:
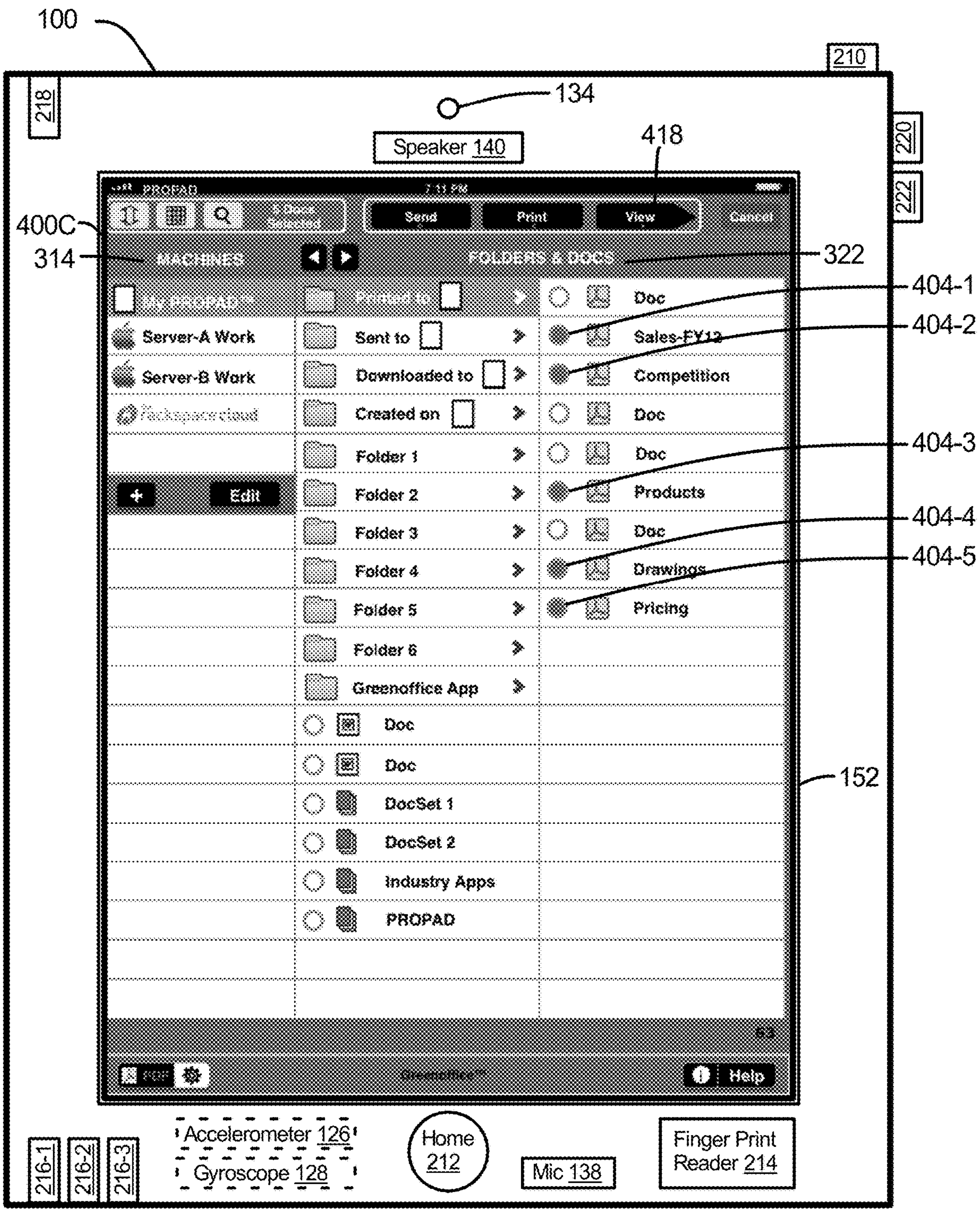
Figure 4D:
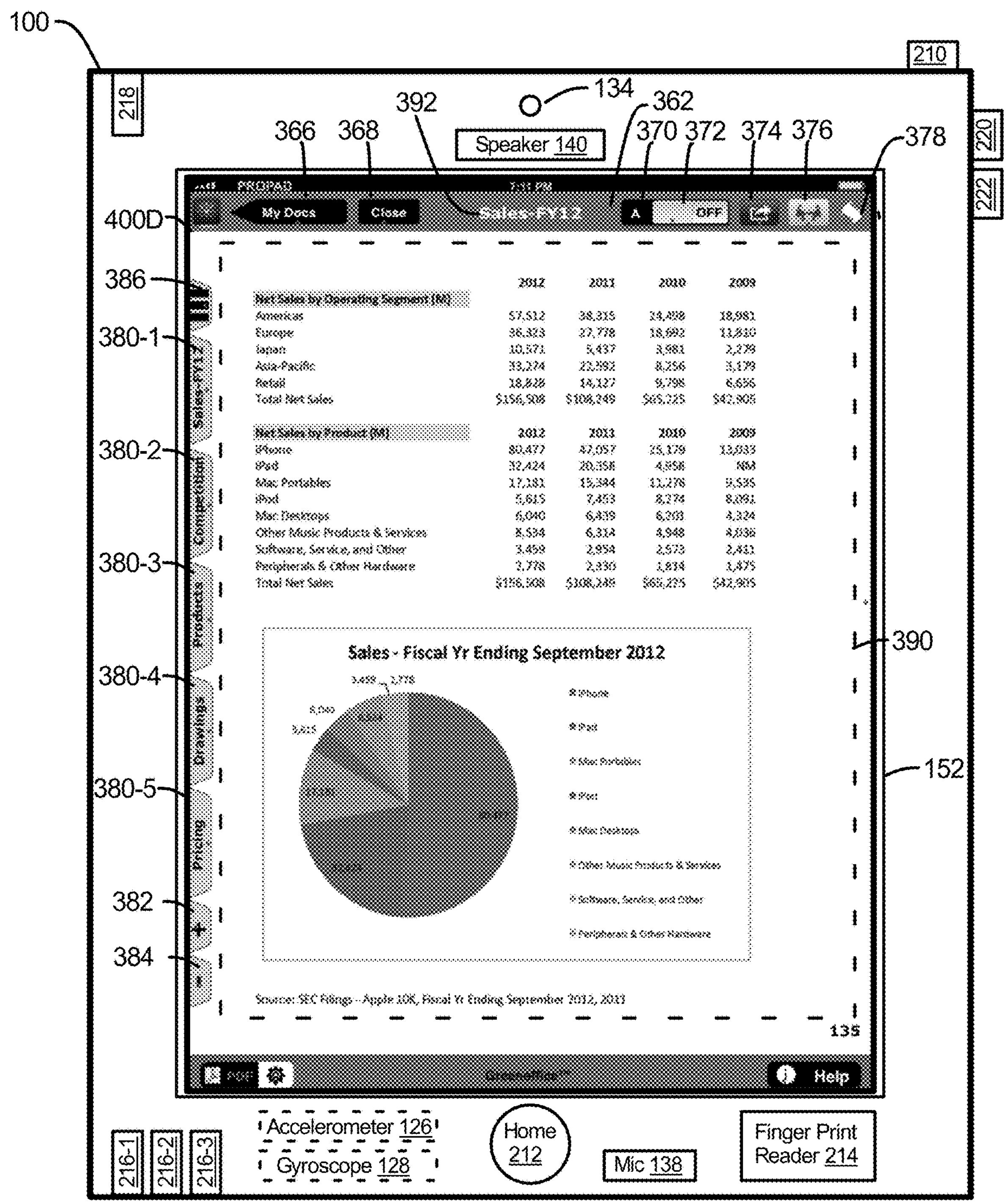
Figure 4E:
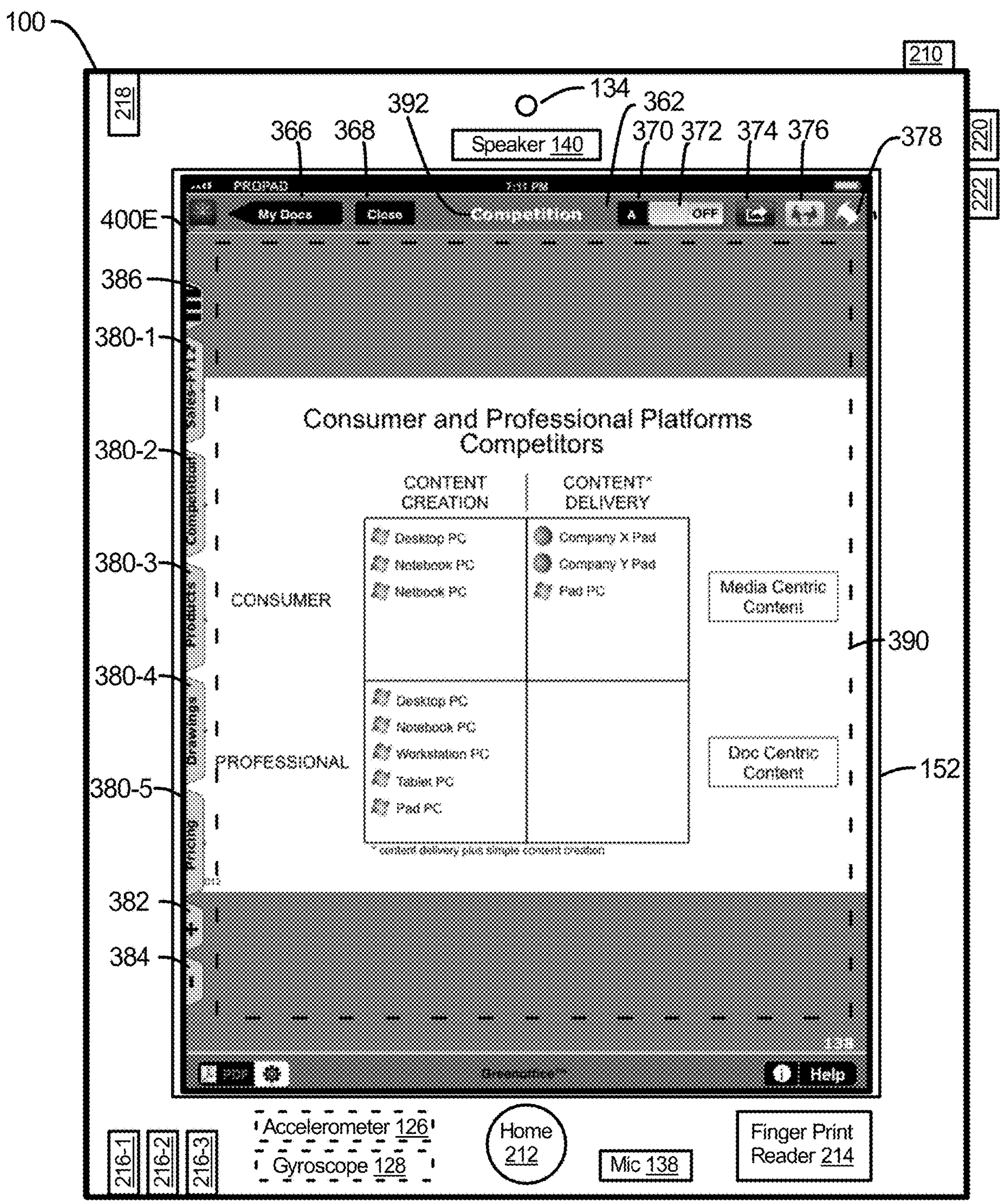
Figure 4F:
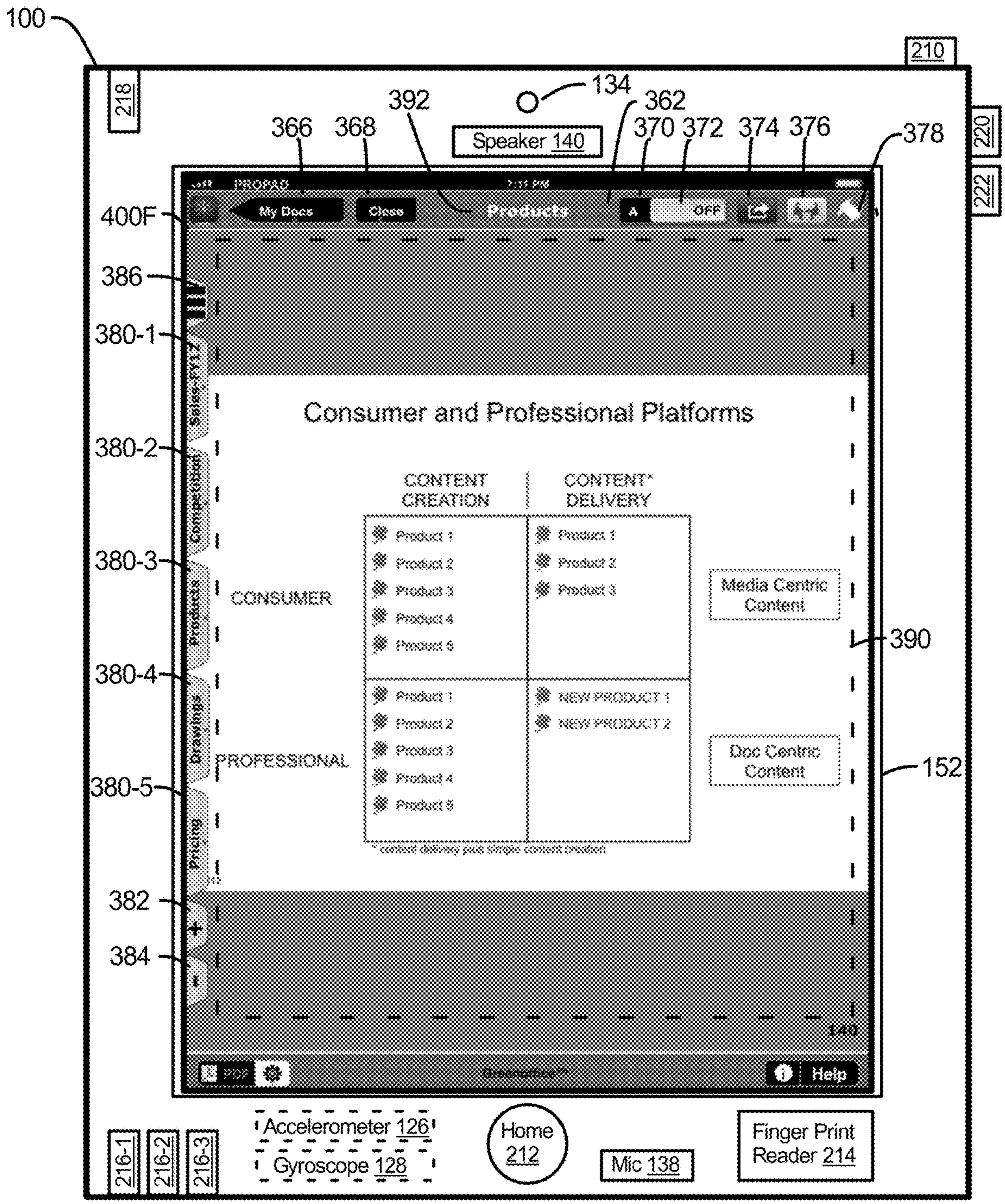
Figure 4G:
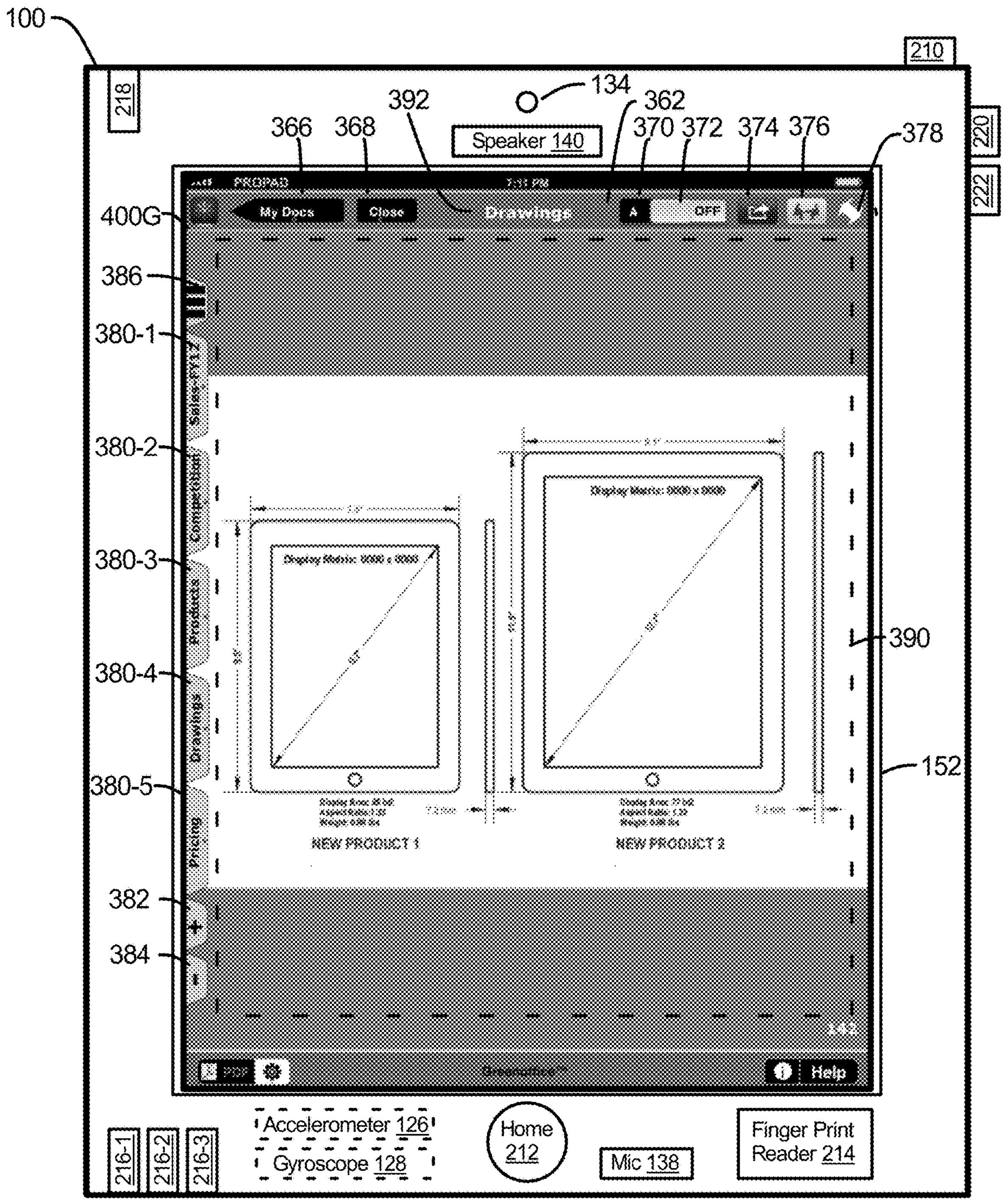
Figure 4H:
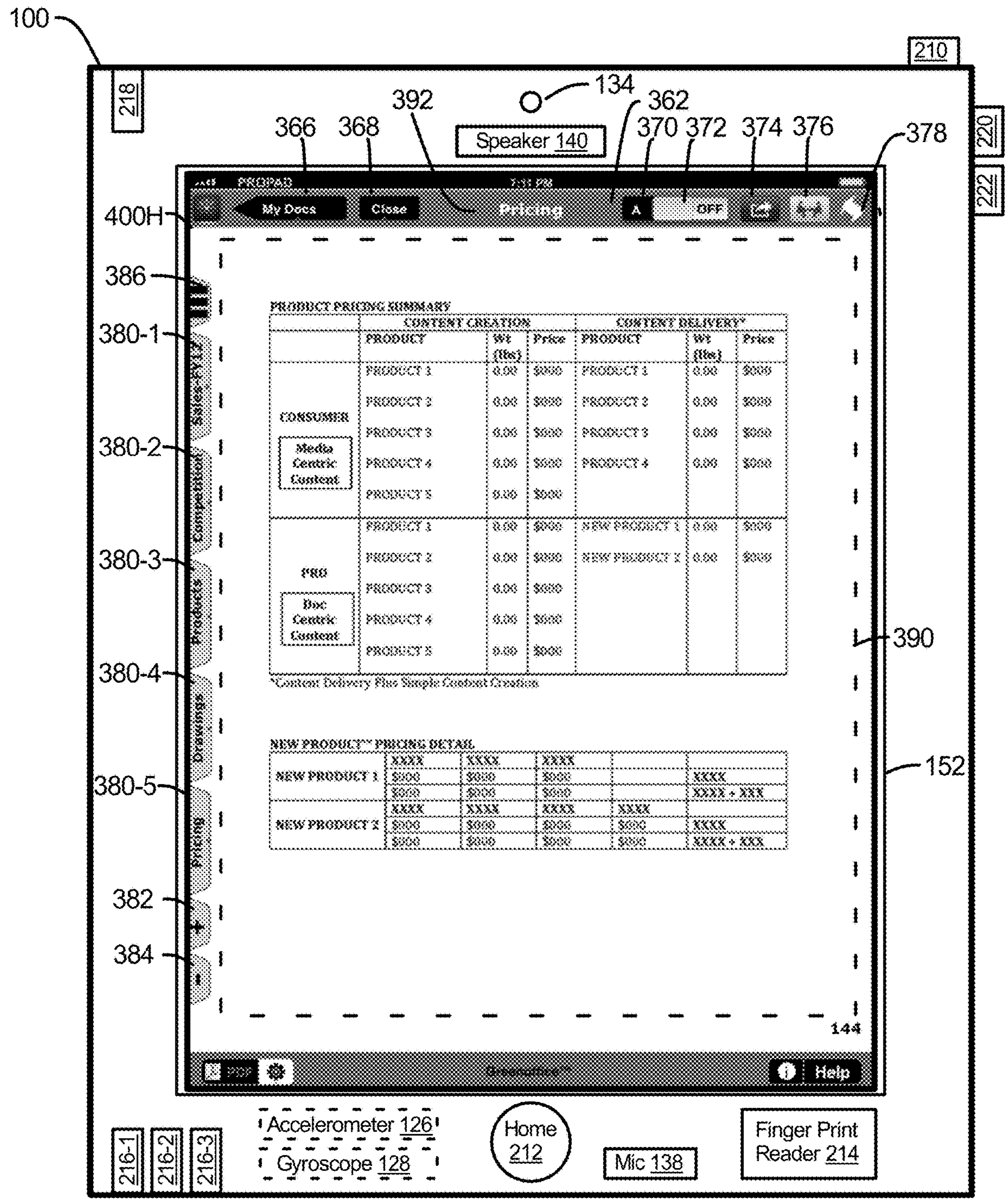
Figure 4I:
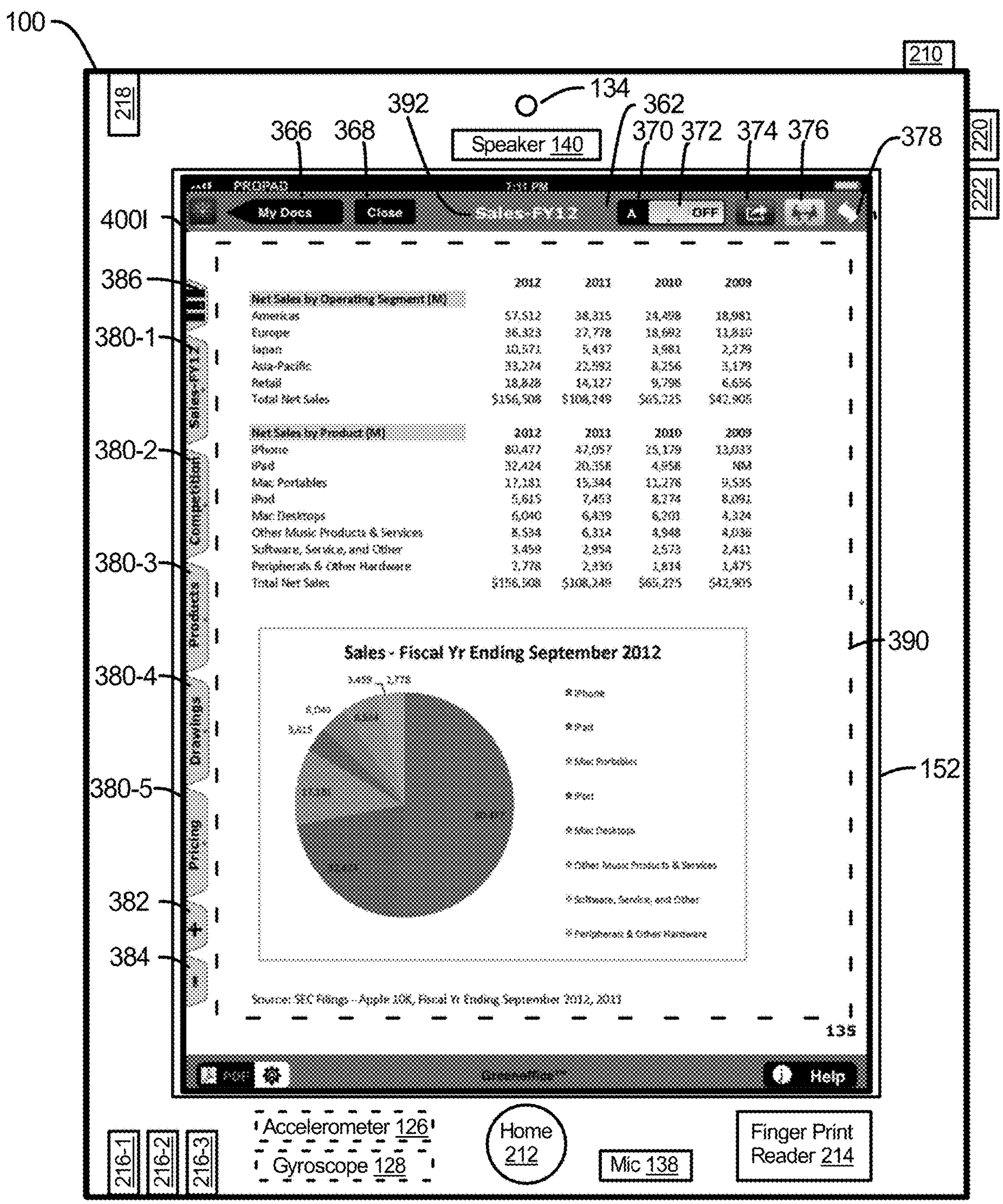
Figure 4J:
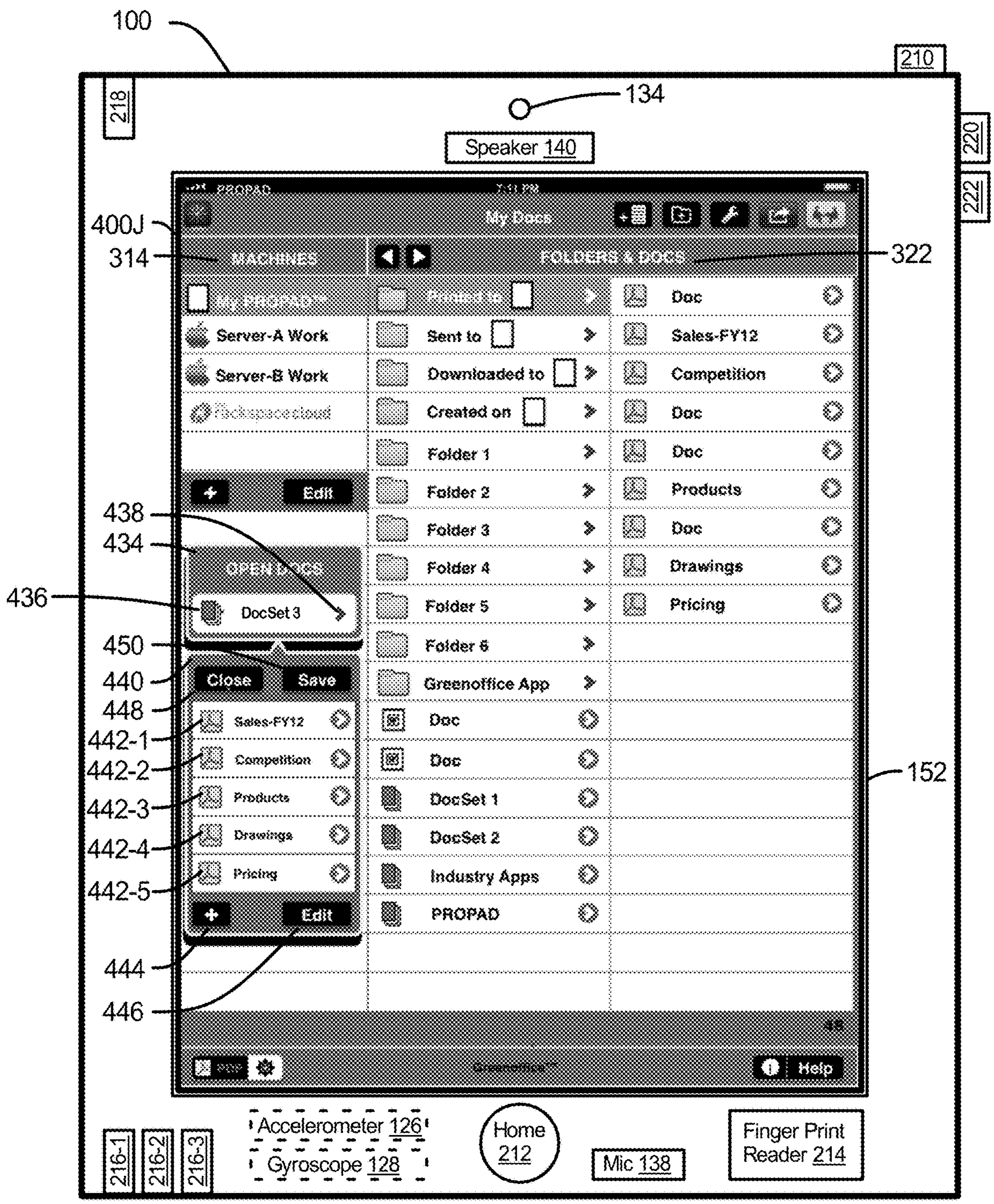
Figure 4K:
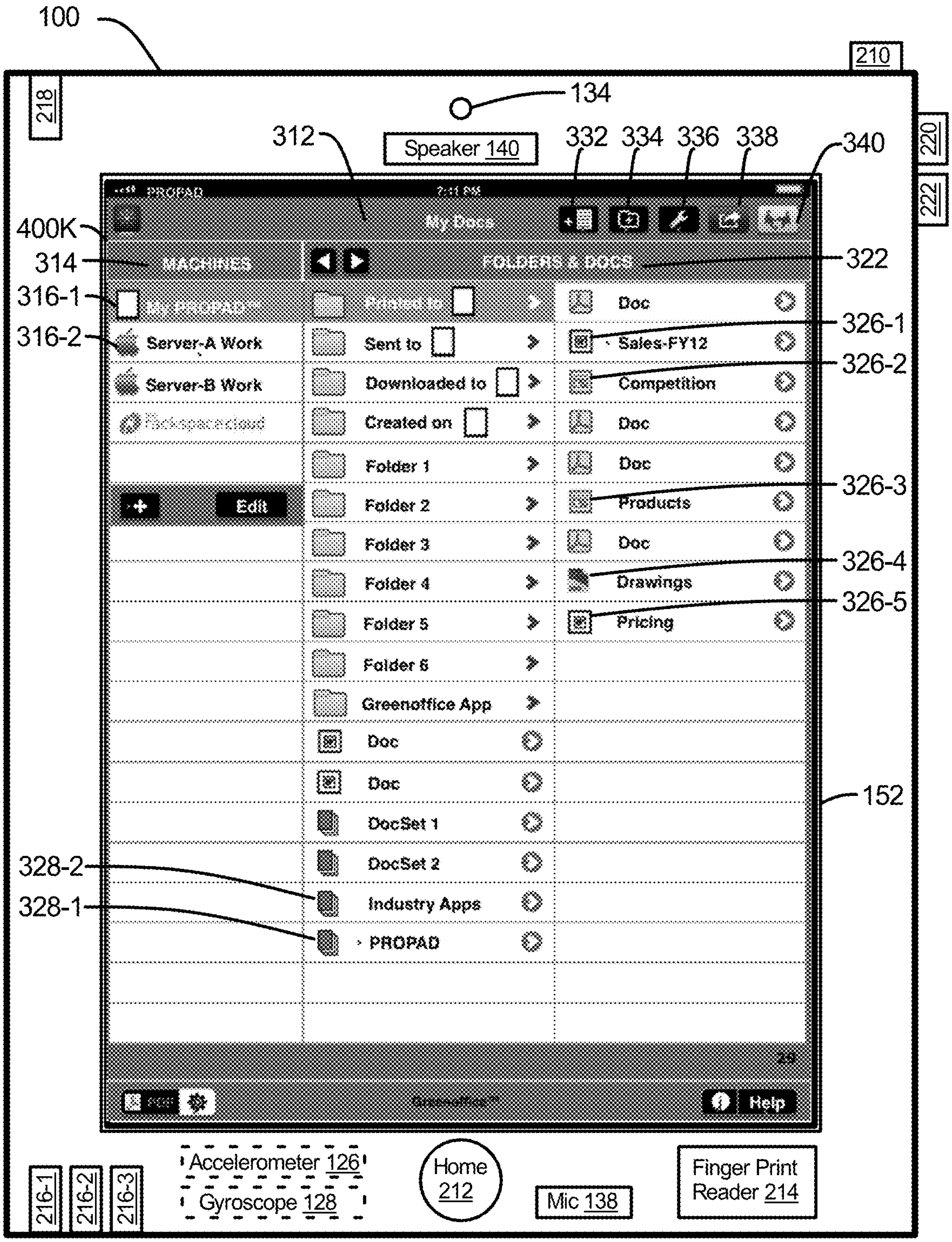
Figure 4L:
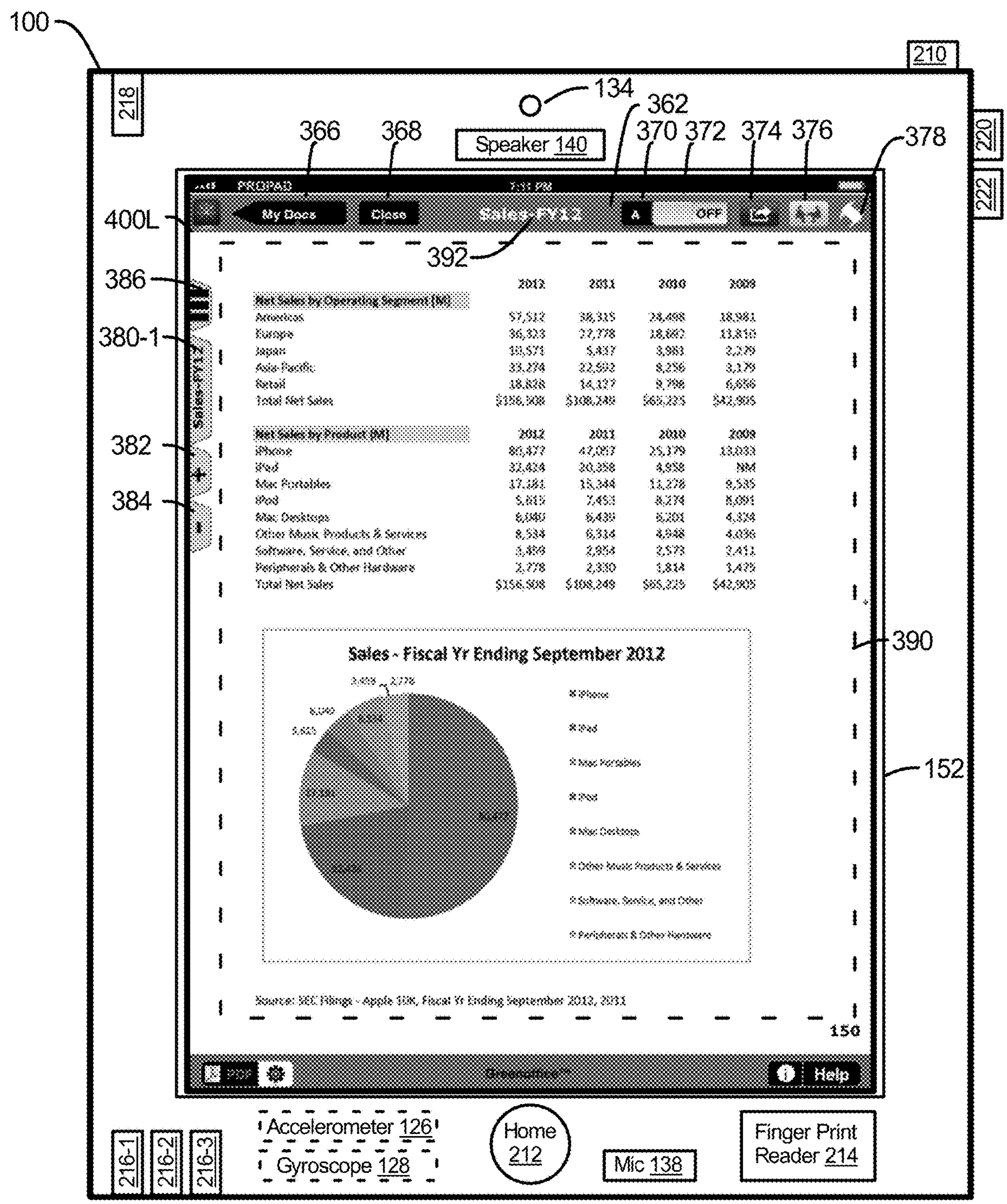
Figure 4M:
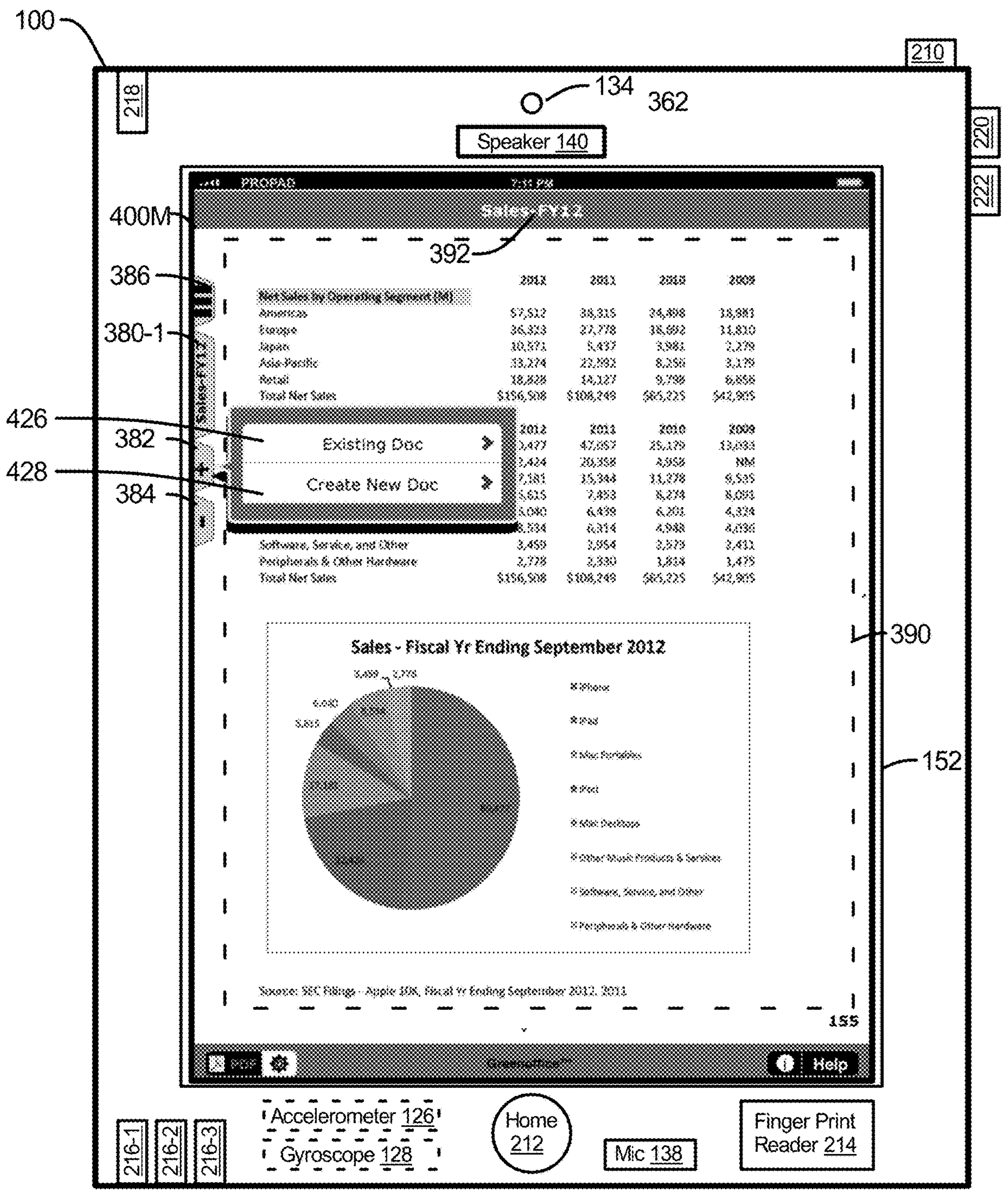
Figure 4N:
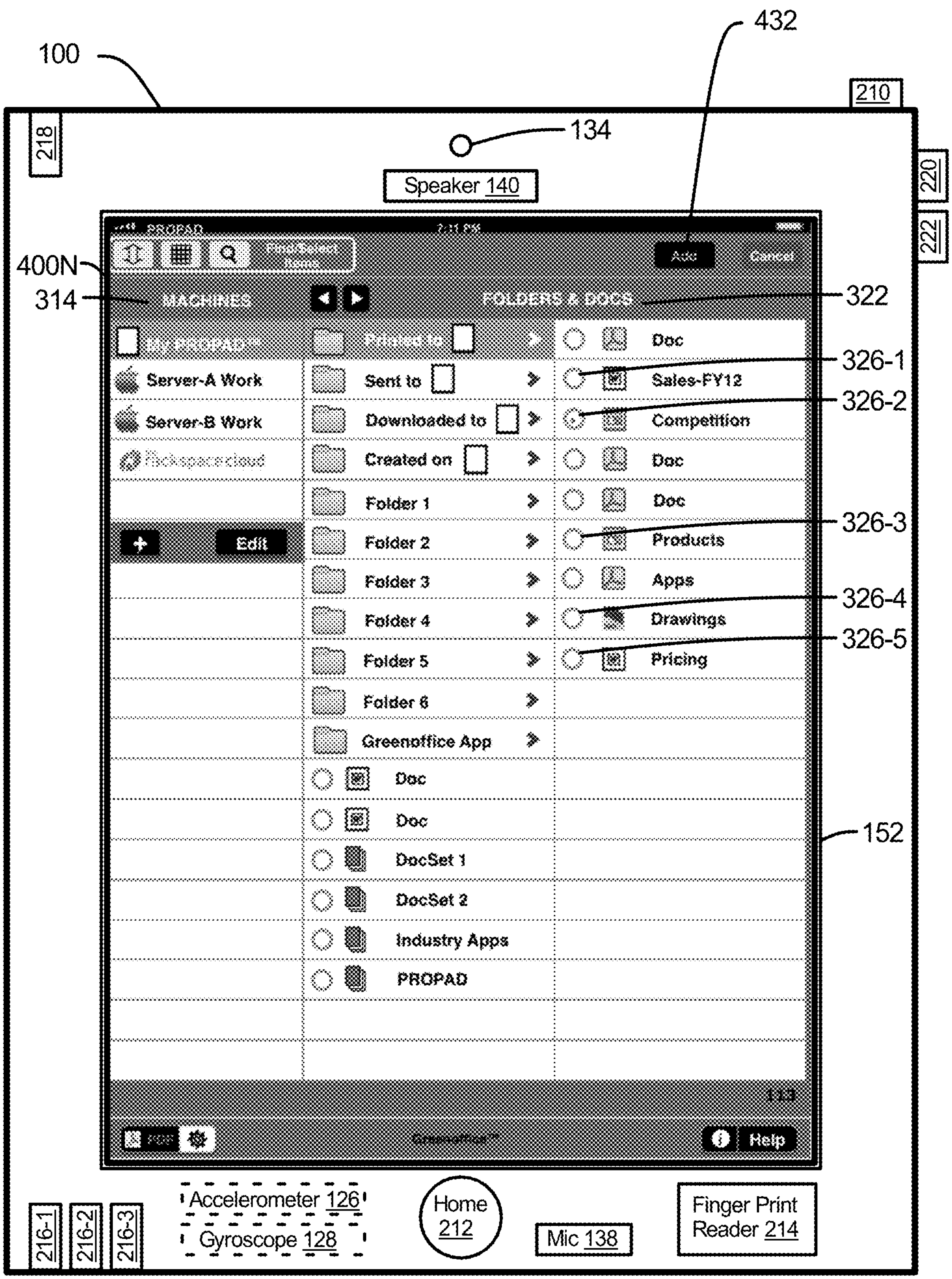
Figure 4O:
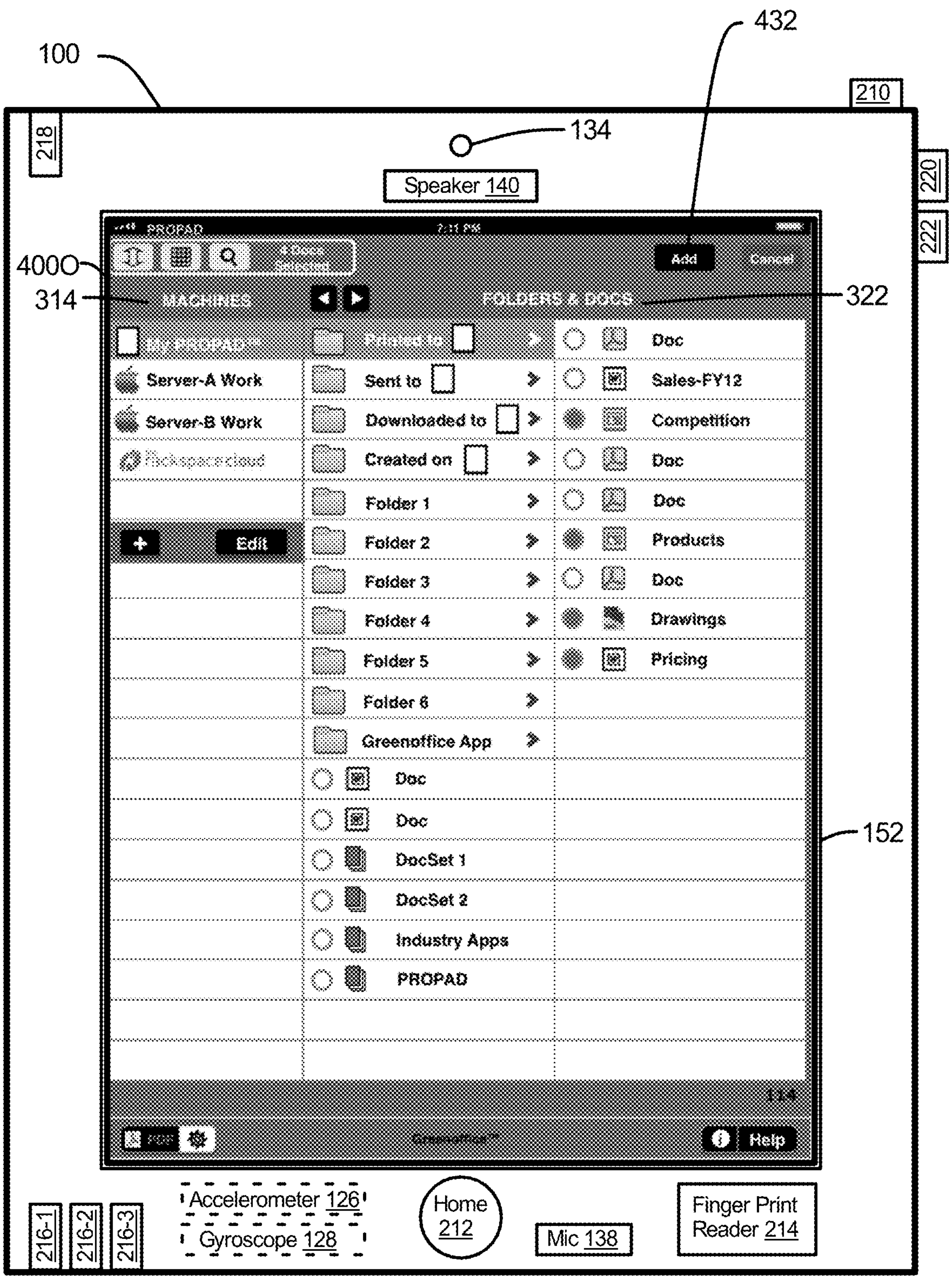
Figure 4P:
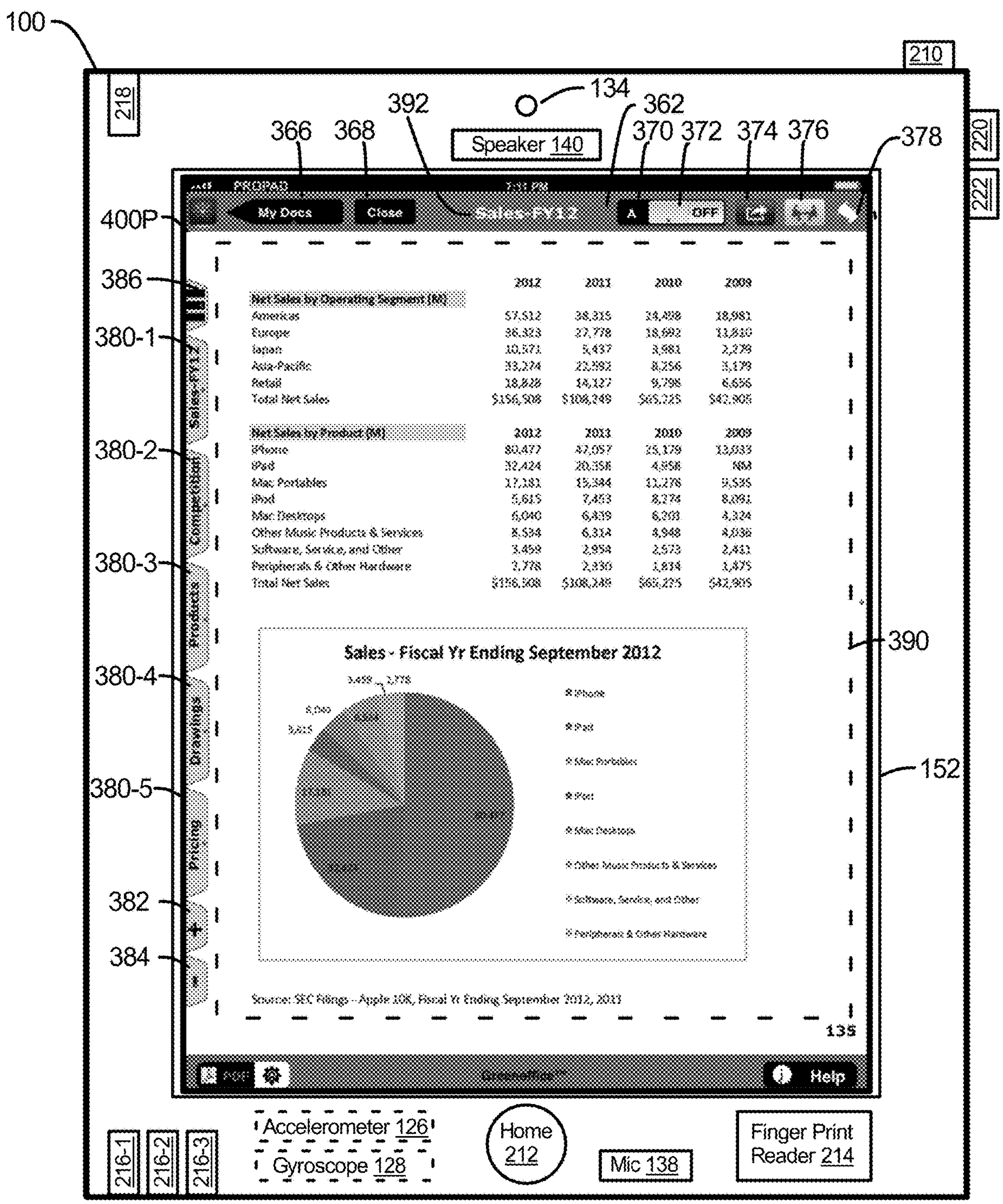

FIGS. 4A-4P illustrate exemplary user interfaces for working with docs and/or doc sets in accordance with some embodiments. In particular, the sequence comprising FIGS. 4A-4D, illustrates the detection of a user's selection of 5 items in the My Docs UI and displaying in the View Docs UI a tab linked to each item selected. In this example, each of the 5 items is a single doc. The user taps action icon 338 (FIG. 4A). As shown in FIG. 4B, toolbar/navigation bar 312 is replaced with action bar 402, which may include browse icon 406, filter icon 408, search icon 410, "Send" icon 414, "Print" icon 416, "View" icon 418, and "Cancel" icon 420. The user then selects selection icons 404-1, 404-2, 404-3, 404-4, and 404-5 to select the items (FIG. 4B). As shown in FIG. 4C, the selection icons for the selected items are highlighted. The user selects "View" icon 418 (FIG. 4C). The device displays UI 400D with tab icons 380-1 to 380-5. Each tab icon is linked to one item selected (FIG. 4D). The device also displays the doc linked to tab icon 380-1 in the document display area 390. In this example, the five selected items are as follows: a document "Sales-FY12", a presentation "Competition", a presentation "Products", a CAD drawing "Drawings", and a document "Pricing". The user is then able to view any doc in the set of selected docs by selecting the tab that links to the doc.

The sequence comprising FIGS. 4E-4H illustrates the device displaying each document when the user selects the tab linked to that doc. In FIG. 4E, the user has selected tab icon 380-2 and the document linked to that tab ("Competition") is displayed in display area 390. In FIG. 4F, the user has selected tab icon 380-3 and the document linked to that tab ("Products") is displayed in display area 390. In FIG. 4G, the user has selected tab icon 380-4 and the document linked to that tab ("Drawings") is displayed in display area 390. In FIG. 4H, the user has selected tab icon 380-5 and the document linked to that tab ("Pricing") is displayed in display area 390.

Docs may be stored locally on device 100 as in this example or they may be stored remotely on a server. In the case in which the item is stored on a server, a cached copy of the item may be stored on device 100, and kept updated using a scheme similar to the Andrew File System (AFS) as developed at Carnegie Mellon University.

When a group of items comprising docs and doc sets is selected in the My Docs screen (FIG. 4C in this example) for viewing in the View Docs screen (FIG. 4D in this example), then a temporary file is created with a system assigned doc set name. In the example of FIG. 4J, this system assigned doc set name is "DocSet 3". This temporary file contains the link (file alias) for each doc and doc set in the group, the tab label name for each doc and doc set in the group (the default is the doc name or doc set name), the displayed tab order, the last displayed tab style, the last displayed doc set, the last displayed tab, and the last displayed page position for each doc in the set. This is further illustrated in the discussion relating to FIGS. 4A-4P and FIGS. 5A-5N.

If the group of items is closed, and the group of items has not been previously saved as a doc set, and the user chooses save, then the information elements listed in the previous paragraph are saved in a file under the system assigned doc set name or a user specified doc set name. If the group of items is closed, and the group of items has been previously saved as a doc set, and the user chooses save, then the information elements listed in the previous paragraph are saved in a file under the system assigned doc set name or a user specified doc set name to reflect any changes to any information element. If the group of items is closed, and the group of items has not been previously saved as a doc set, and the user chooses don't save, then the file containing the information elements listed in the previous paragraph is discarded. If the group of items is closed, and the group of items has been previously saved as a doc set, and the user chooses don't save, then any changes in the information elements listed in the previous paragraph are not saved. This is further illustrated in the discussion relating to FIGS. 4A-4P and FIGS. 5A-5N.

If the user wishes to return to the My Docs UI, the user selects "My Docs" icon 366 (FIG. 4I). The device then displays UI 400J (FIG. 4J). This UI is similar to UI 400A except that the device displays "OPEN DOCS" header 434 and icon 436 labeled with a system assigned doc set name, which in this example is "DocSet 3". The name "DocSet 3" is linked to the most recently displayed set of items, which in this example is the docs named "Sales-FY12", "Competition", "Products", "Drawings", and "Pricing". The user may select "DocSet 3" 436 icon to redisplay that set of docs in UI 400I. At this point the user may select a new group of items to be viewed in a View Docs UI using methods and UI similar to those discussed earlier in reference to FIGS. 4B to 4C. When this new group of items is selected in the My Docs screen for viewing in the View Docs screen, then a new temporary file is created with a new system assigned doc set name for that new group of items. An icon linked to that new doc set name will be displayed under "OPEN DOCS" header 434 together with "DocSet 3" icon 436. The user may at any time select any doc set icon listed under the "OPEN DOCS" header to display the set of items linked to the selected doc set icon.

Detailed view 440 shows the names of the docs (442-1 to 442-5) in "DocSet 3" in the order in which they appeared in UI 400I. Also displayed in detailed view 440 is "Save" icon 450. If the user selects "Save" icon 450, and the group of items has not been previously saved as a doc set, then the information elements listed above are saved in a file under the system assigned doc set name ("DocSet 3" in this example), or a user specified doc set name.

Finally, detailed view 440 displays "Close" icon 448. If the user selects "Close" icon 448, and the group of items has not been previously saved as a doc set, and the user chooses don't save, then the file containing the information elements listed in the previous paragraph is discarded. After the user has selected "Save" icon 450 or "Close" icon 448, the user may select new items to be viewed in a View Docs UI using methods and UI similar to those discussed earlier in reference to FIGS. 4B to 4C.

Detailed view 440 also displays add icon 444 and "Edit" icon 446 that enable the user to modify the set of docs to be linked to "DocSet 3" icon 436.

In a work environment, a user may work with a single doc initially. Once the user has read that document, the user may then be able to identify additional documents that would be helpful in carrying out the knowledge work at hand. In this context, we present the example of a user selecting a single document, opening that document, and selecting four additional items for inclusion in the set of docs that may be viewed from the View Docs UI. The sequence comprising FIGS. 4K-4P illustrates the method for accomplishing this using the UI and methods presented in the flow diagrams of FIGS. 9-13. FIG. 4K shows UI 400K. The user selects icon 326-1 which represents the single doc "Sales-FY12". The device then displays UI 400L (FIG. 4L). The device displays tab icon 380-1 linked to the selected item and displays the item in the doc-viewing area 390. The user then selects add-item icon 382 and the device displays "Existing Doc" icon 426 and "Create New Doc" icon 428 in UI 400 M (FIG. 4M). The user selects "Existing Doc" icon 426 and the device displays UI 400N (FIG. 4N) and enables the user to select any displayed doc or doc set. The user selects 4 items (326-2 to 326-5) and the device shows the items selected in UI 400O (FIG. 4O). The user selects "Add" icon 432 and the device displays UI 400P (FIG. 4P) with the four new tab icons added (380-2 to 380-5), one for each item added.

Figure 5A:
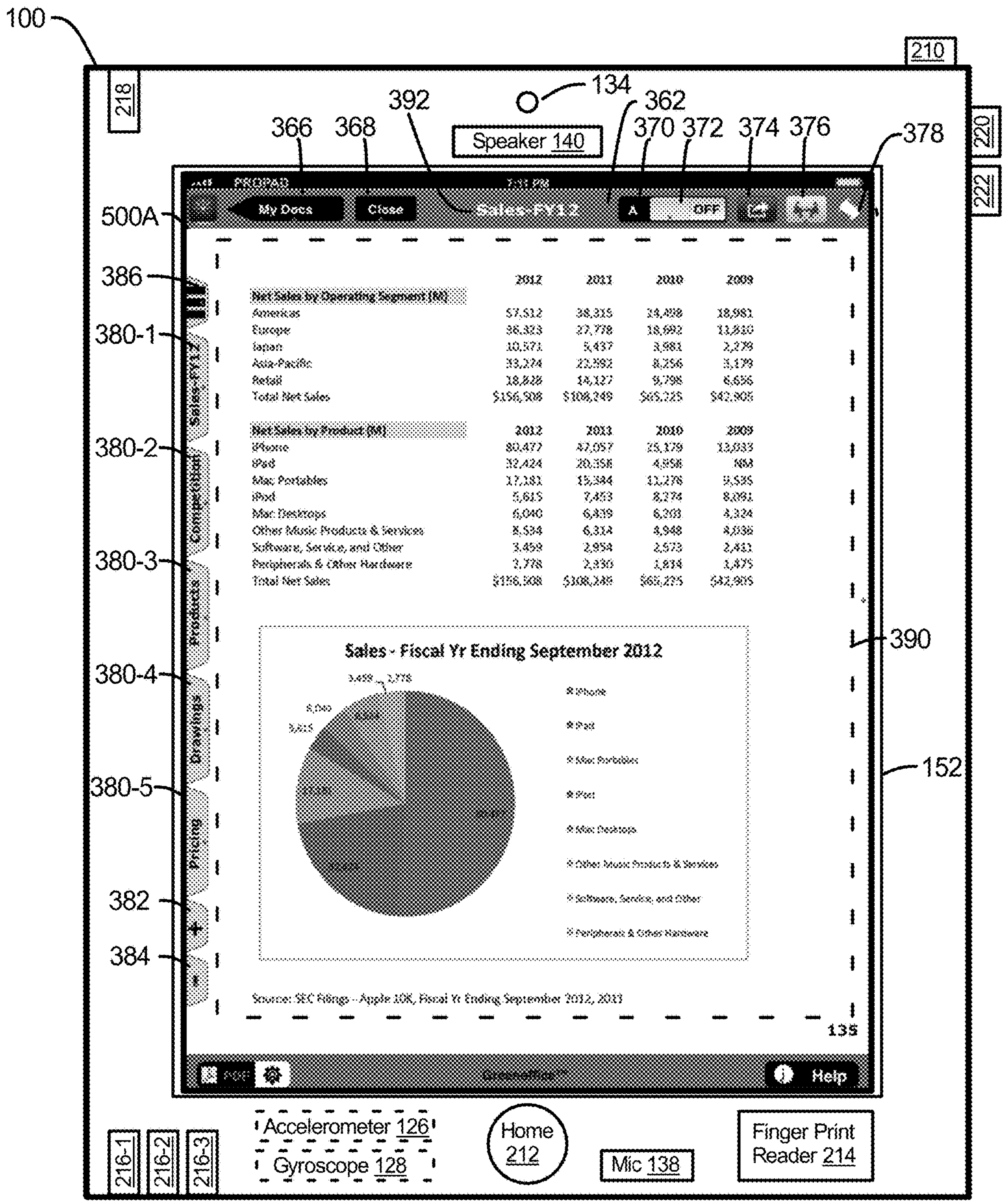
FIGS. 5A-5N illustrate exemplary user interfaces for saving a doc set and viewing a doc set in accordance with some embodiments.
Figure 5B:
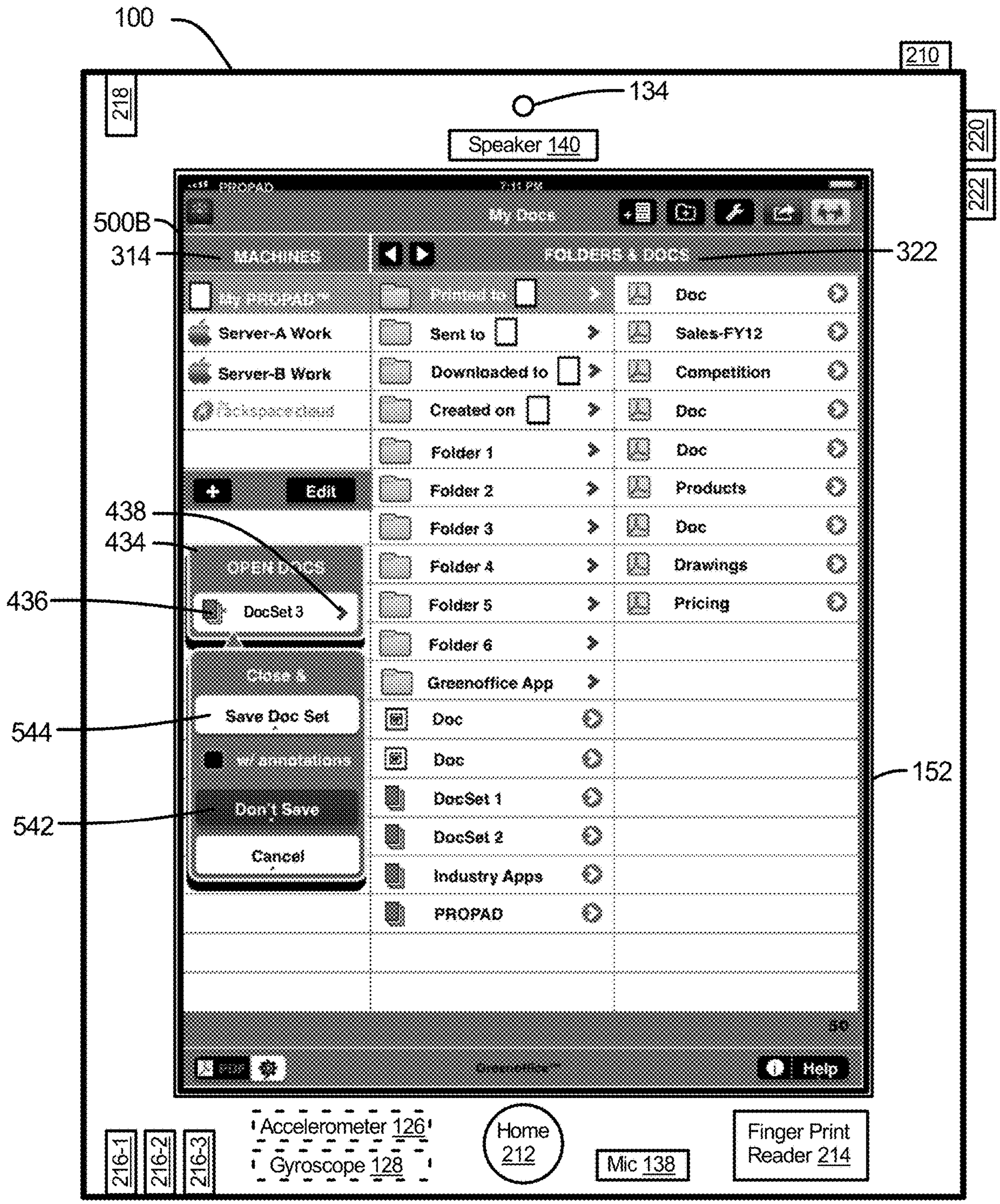
Figure 5C:
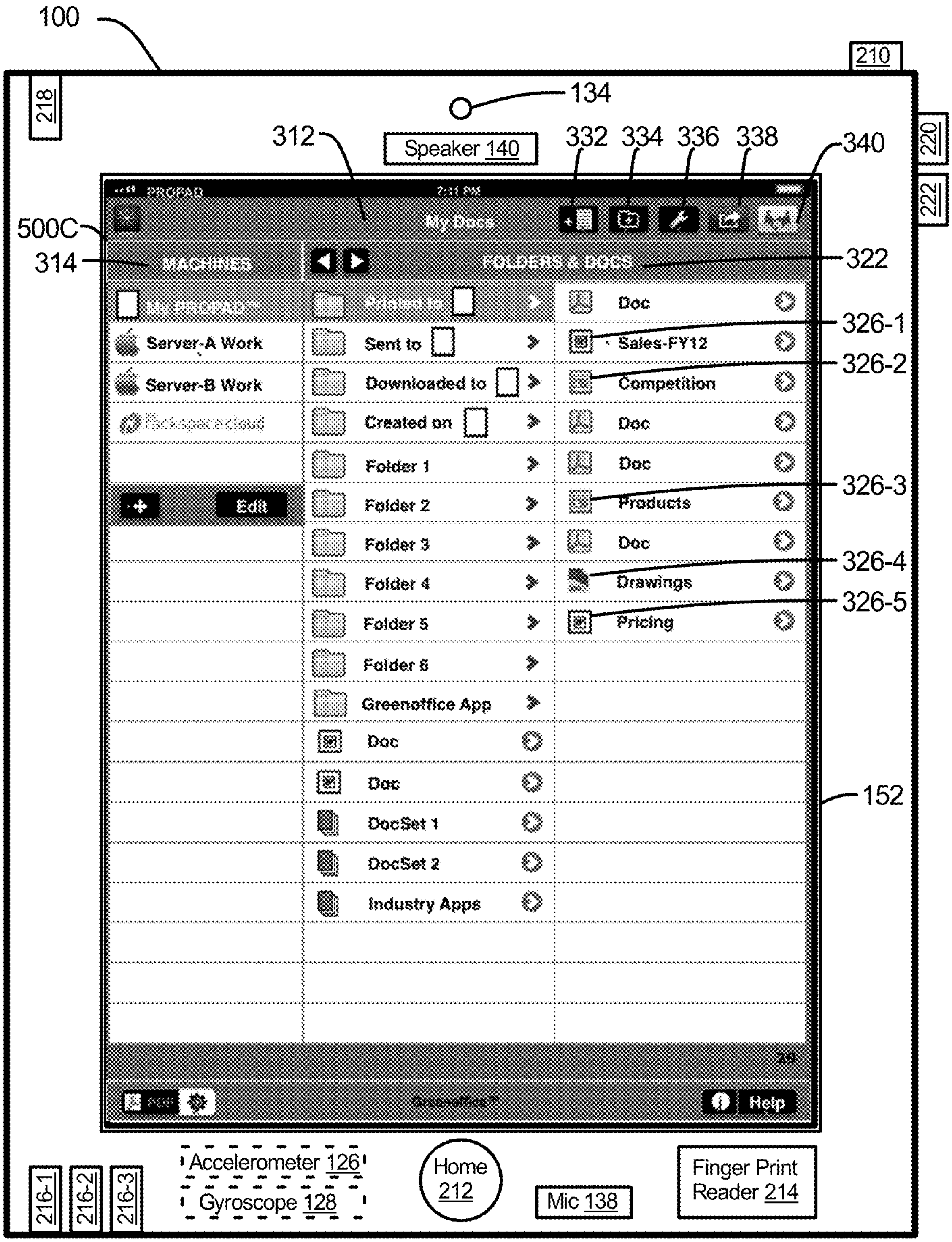
Figure 5D:
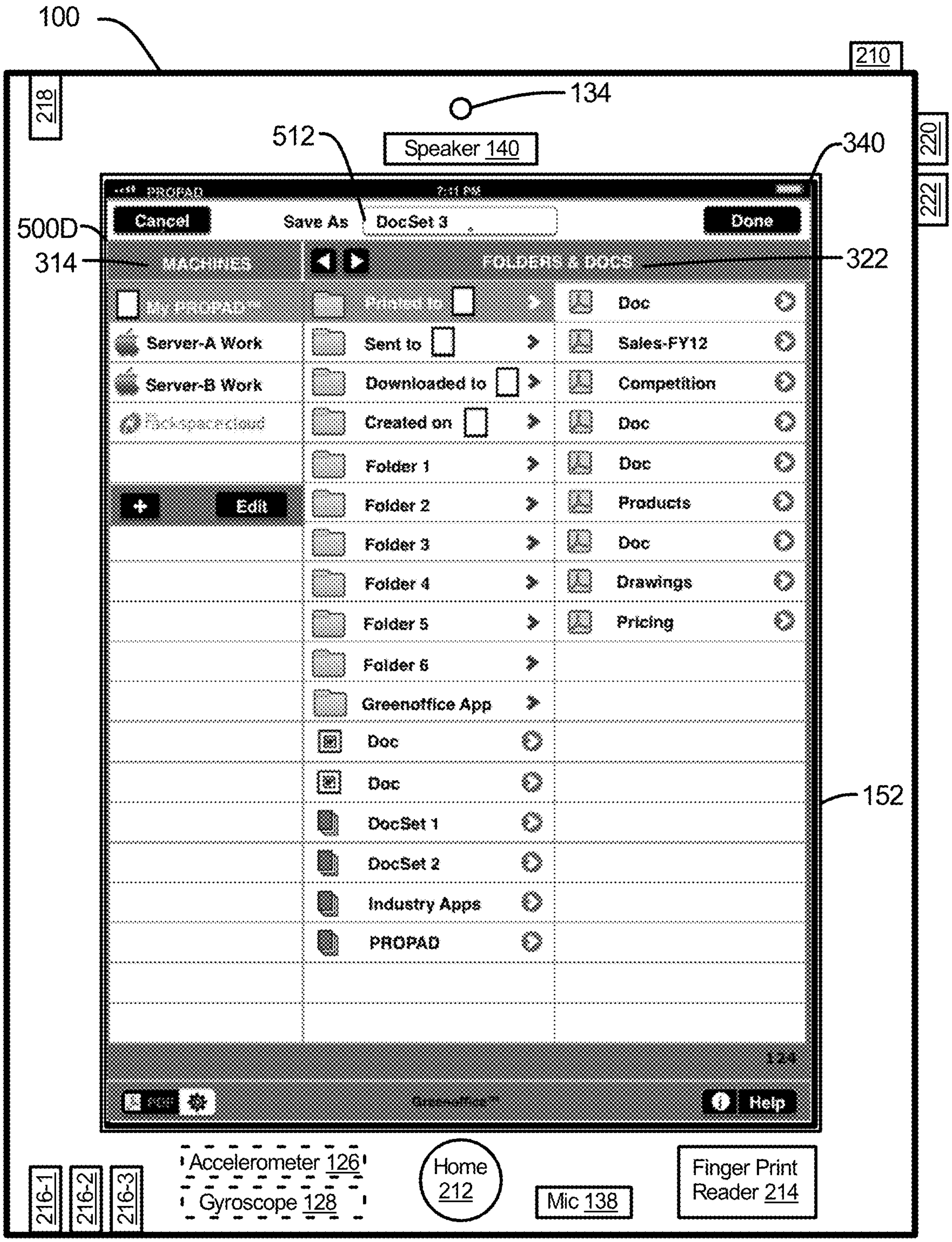
Figure 5E:
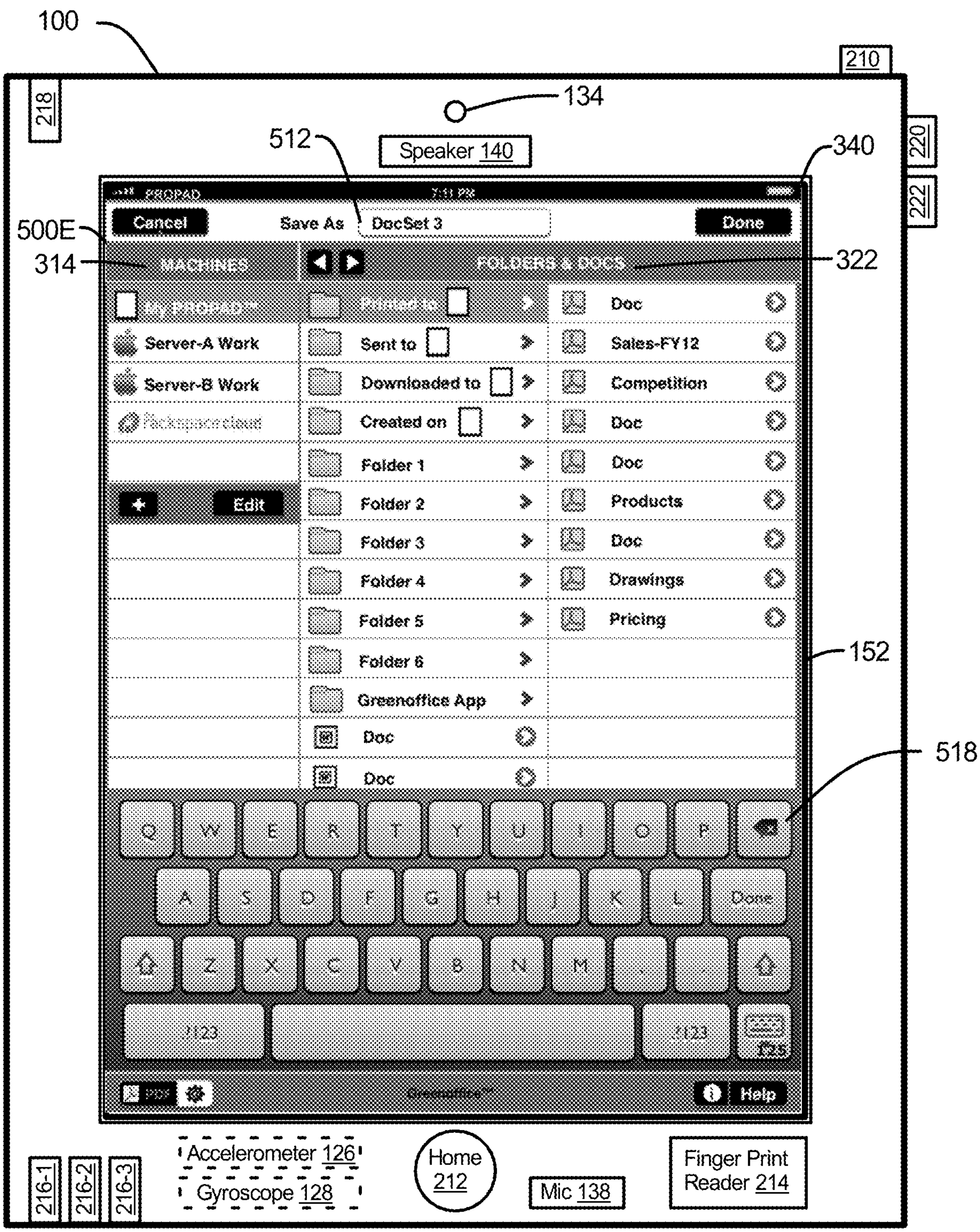
Figure 5F:
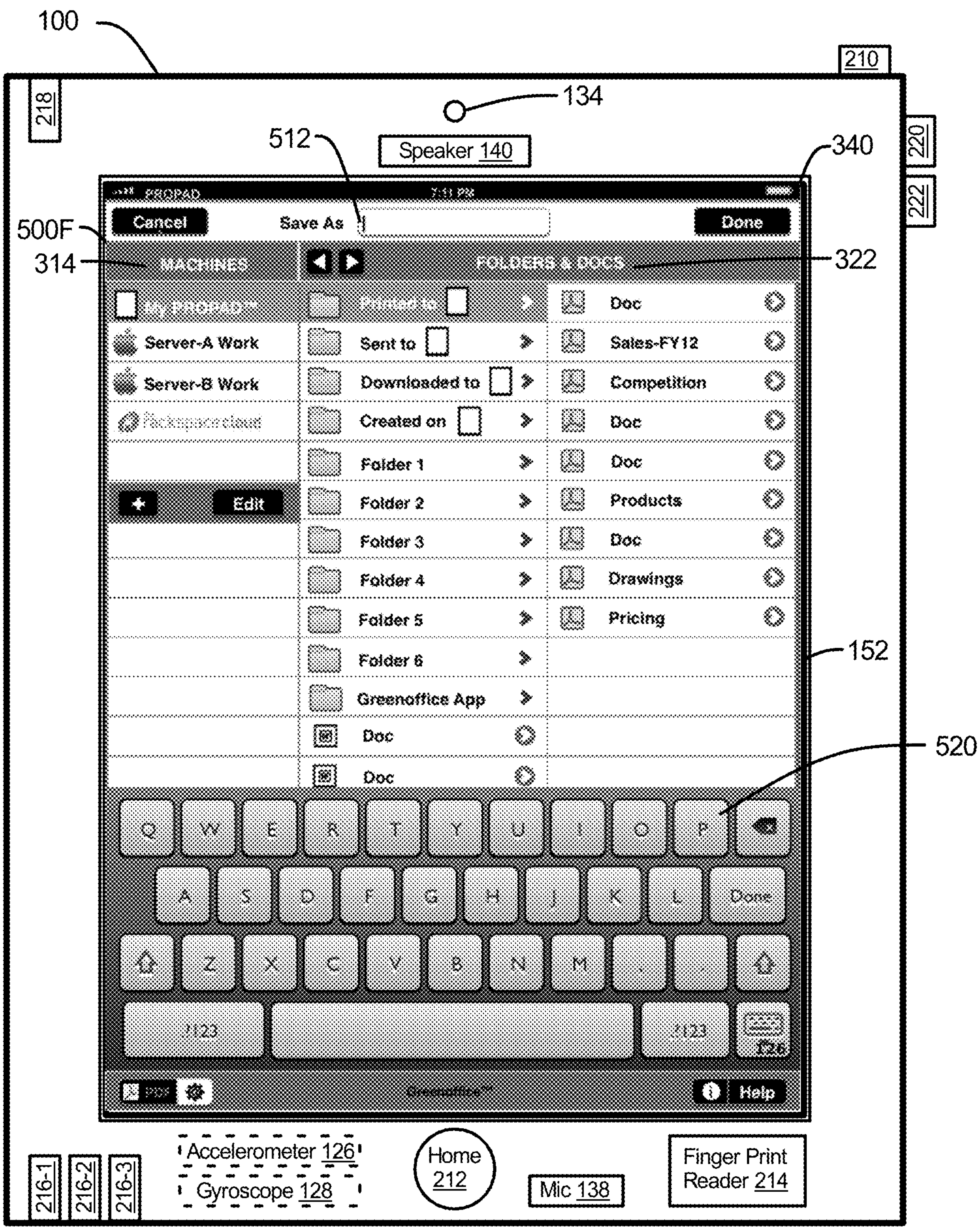
Figure 5G:
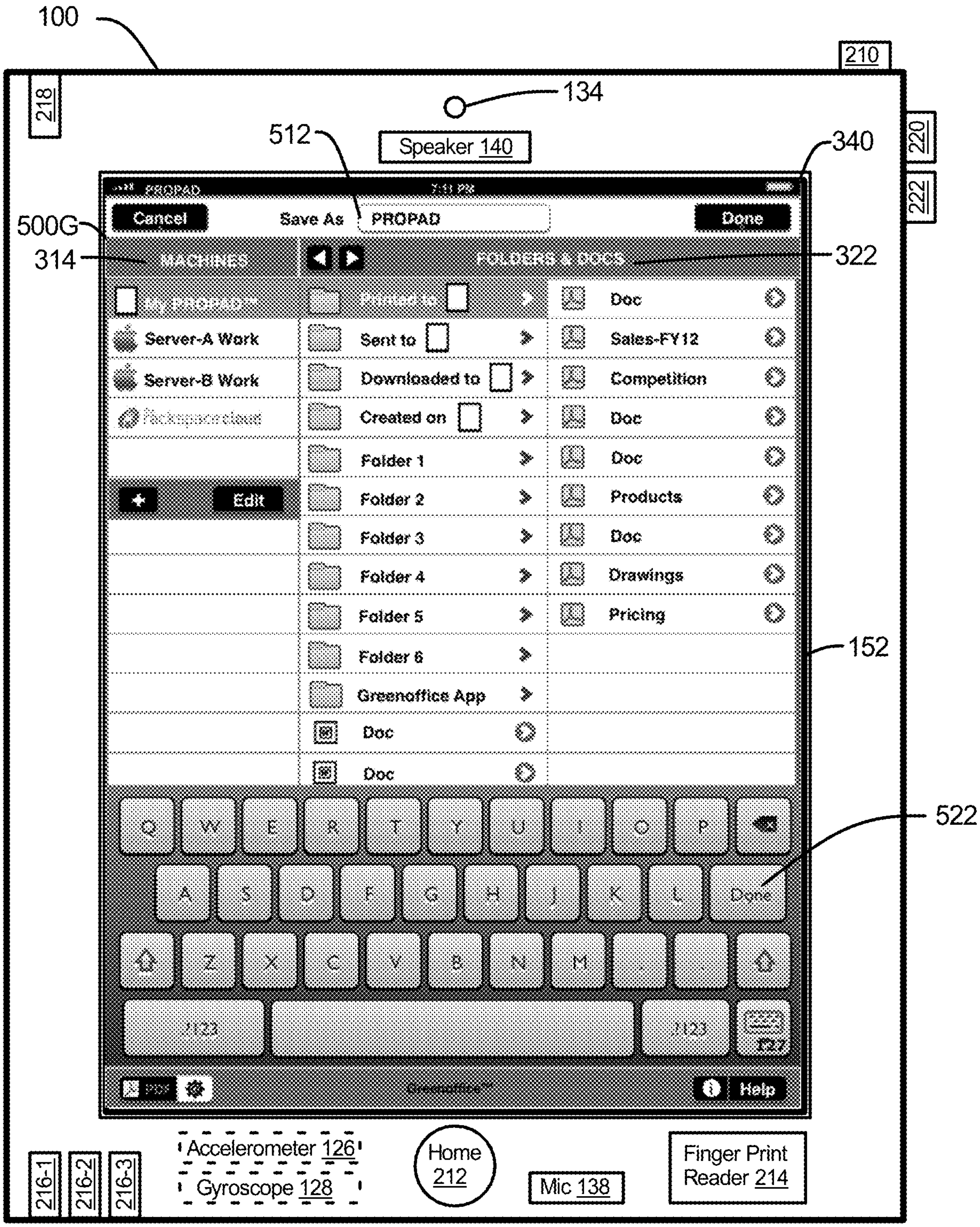
Figure 5H:
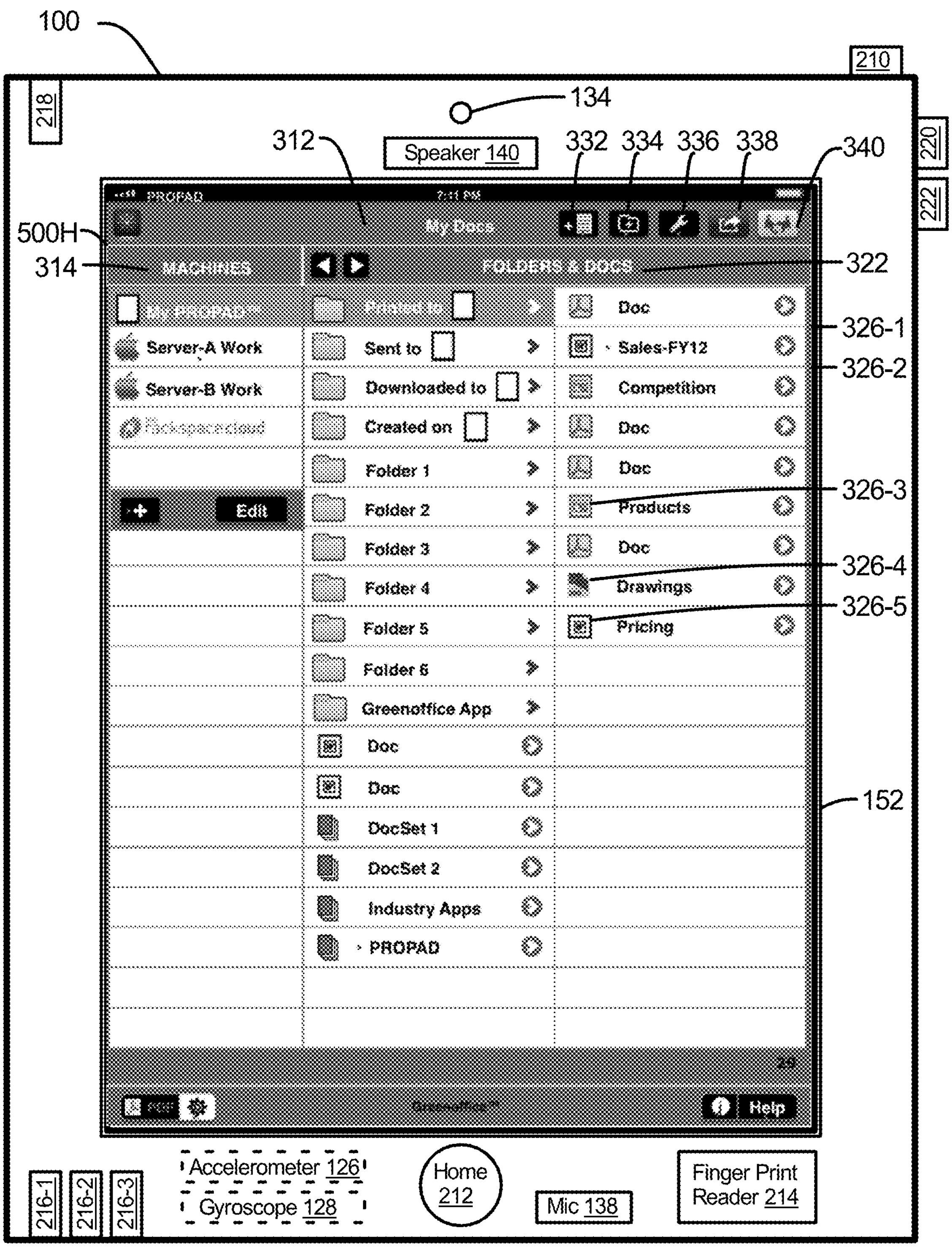
Figure 5I:
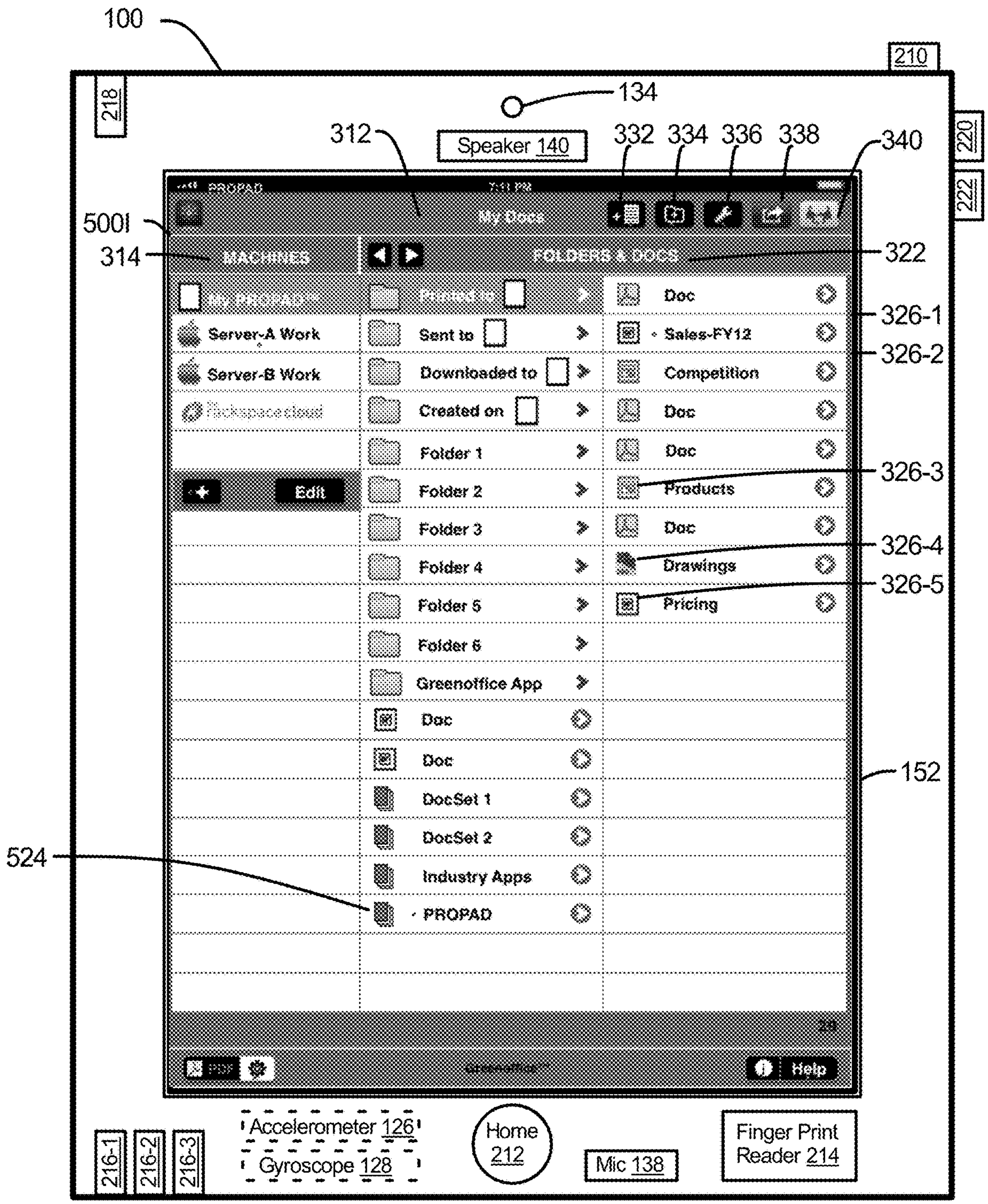
Figure 5J:
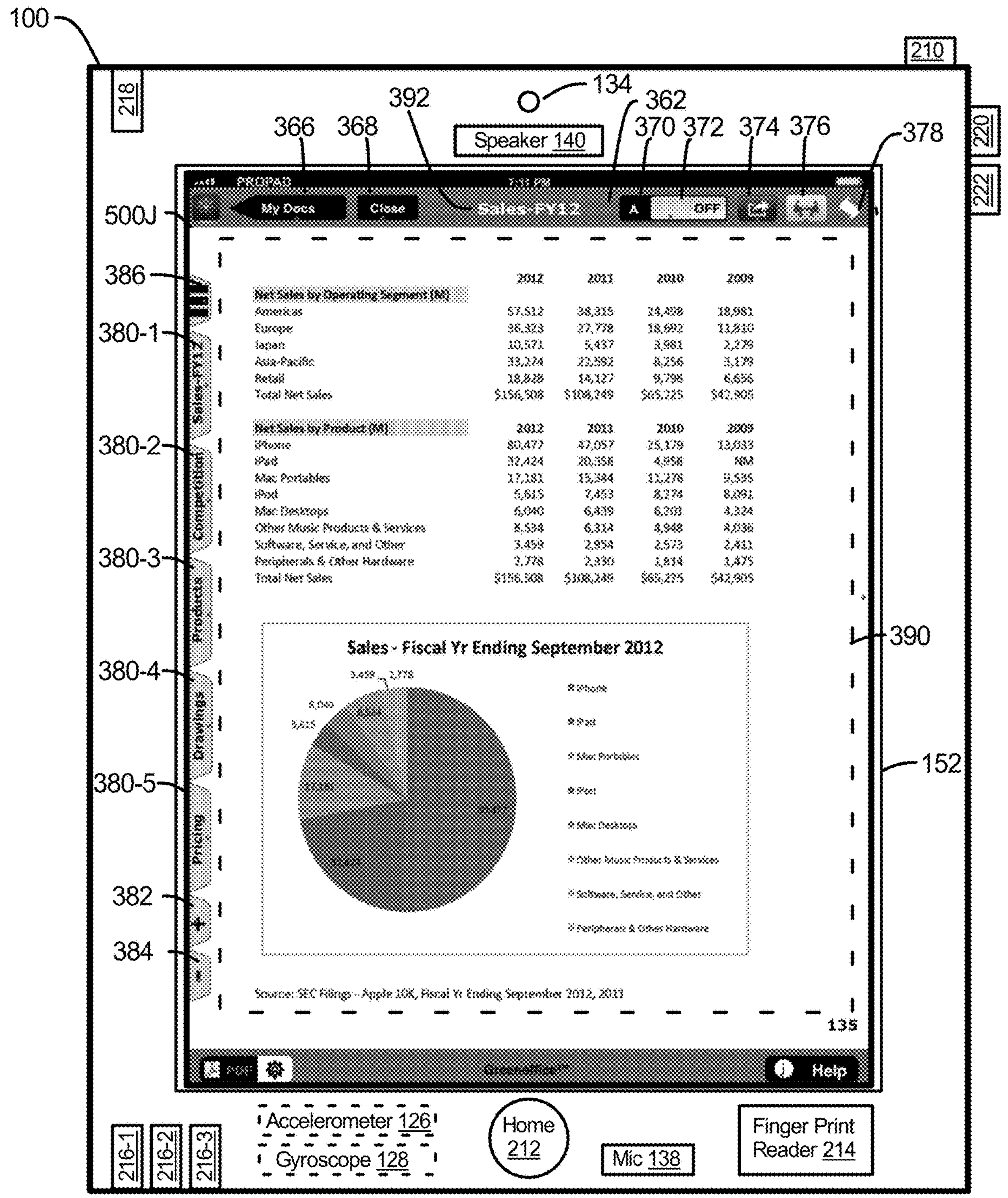
Figure 5K:
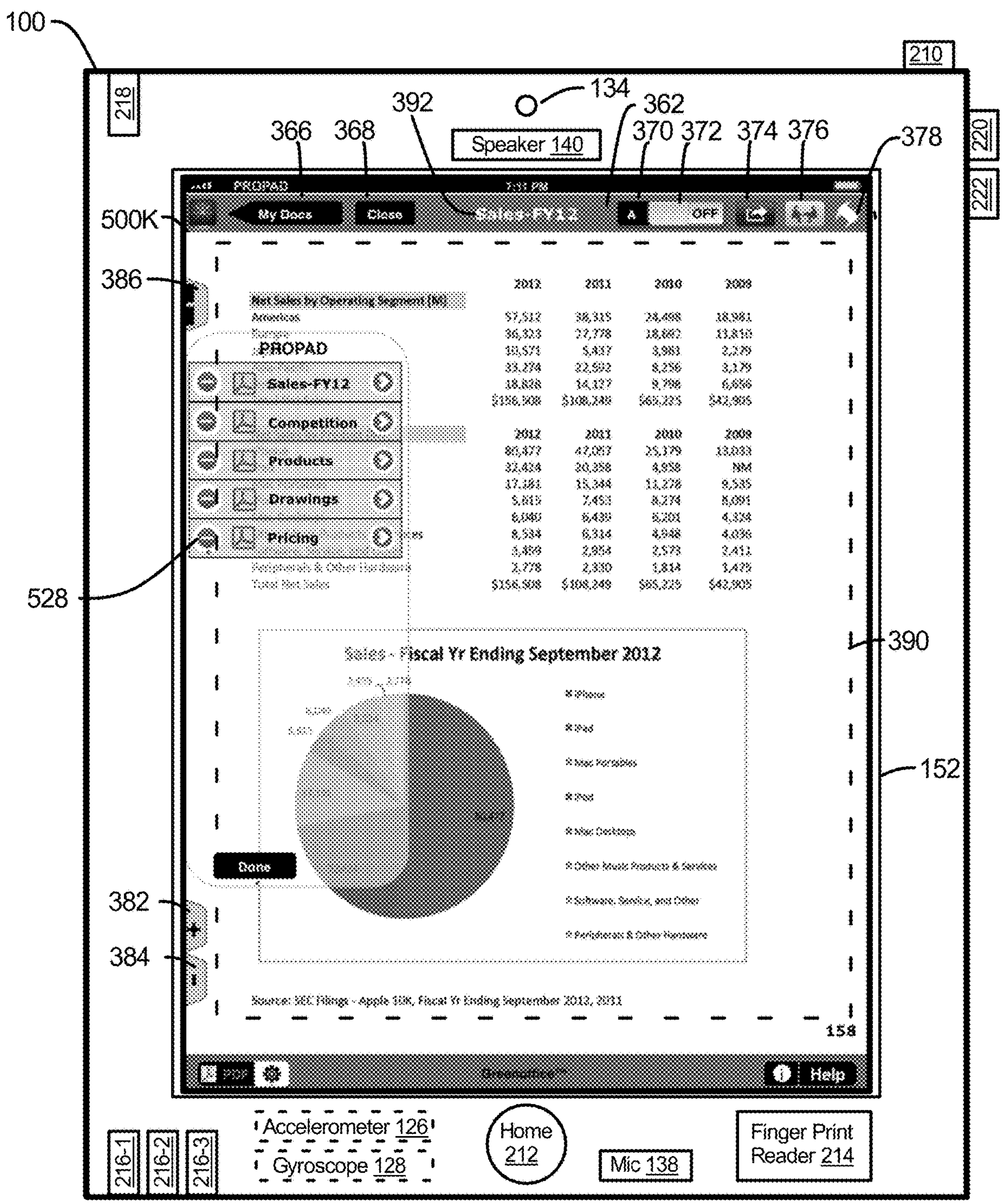
Figure 5L:
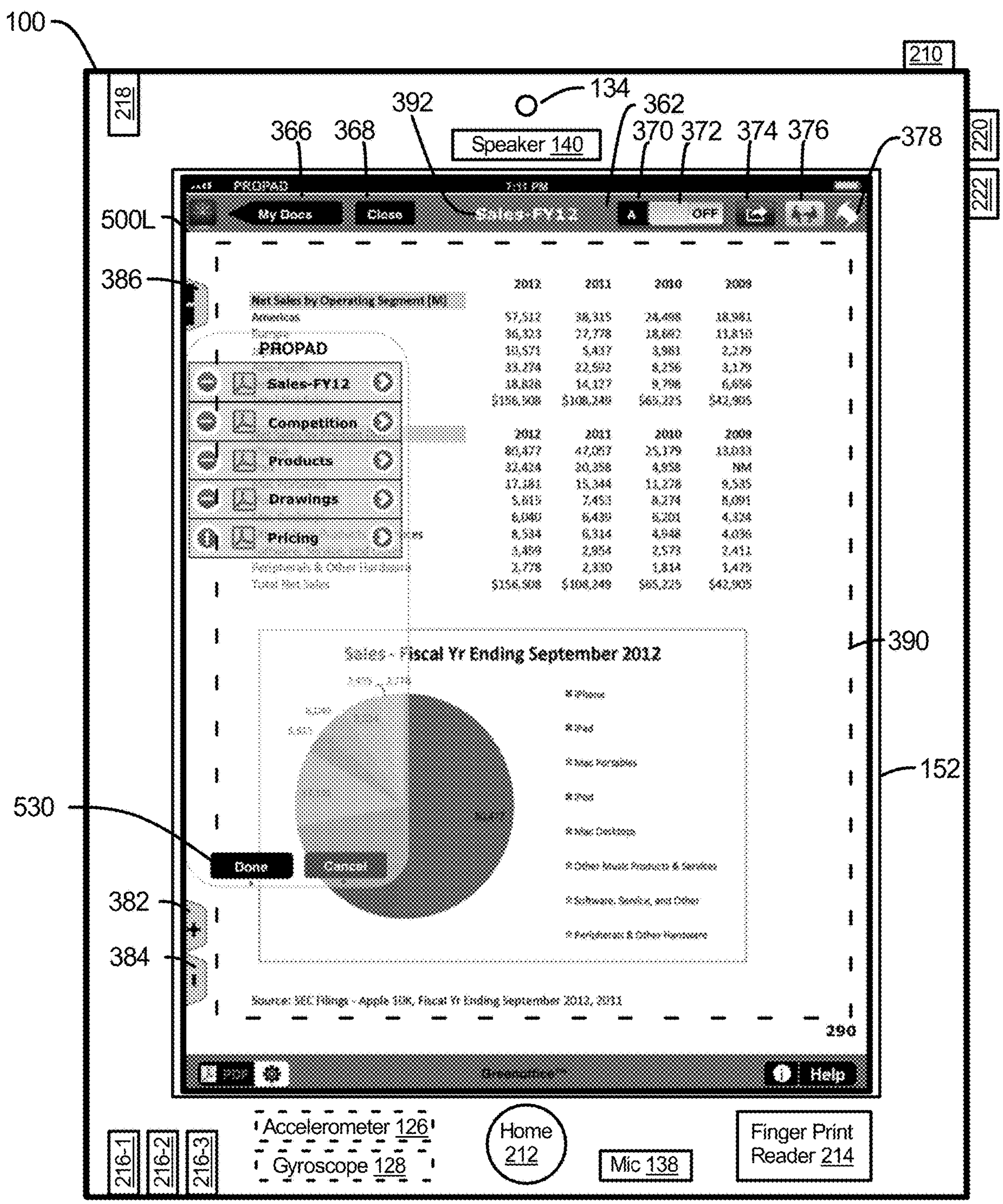
Figure 5M:
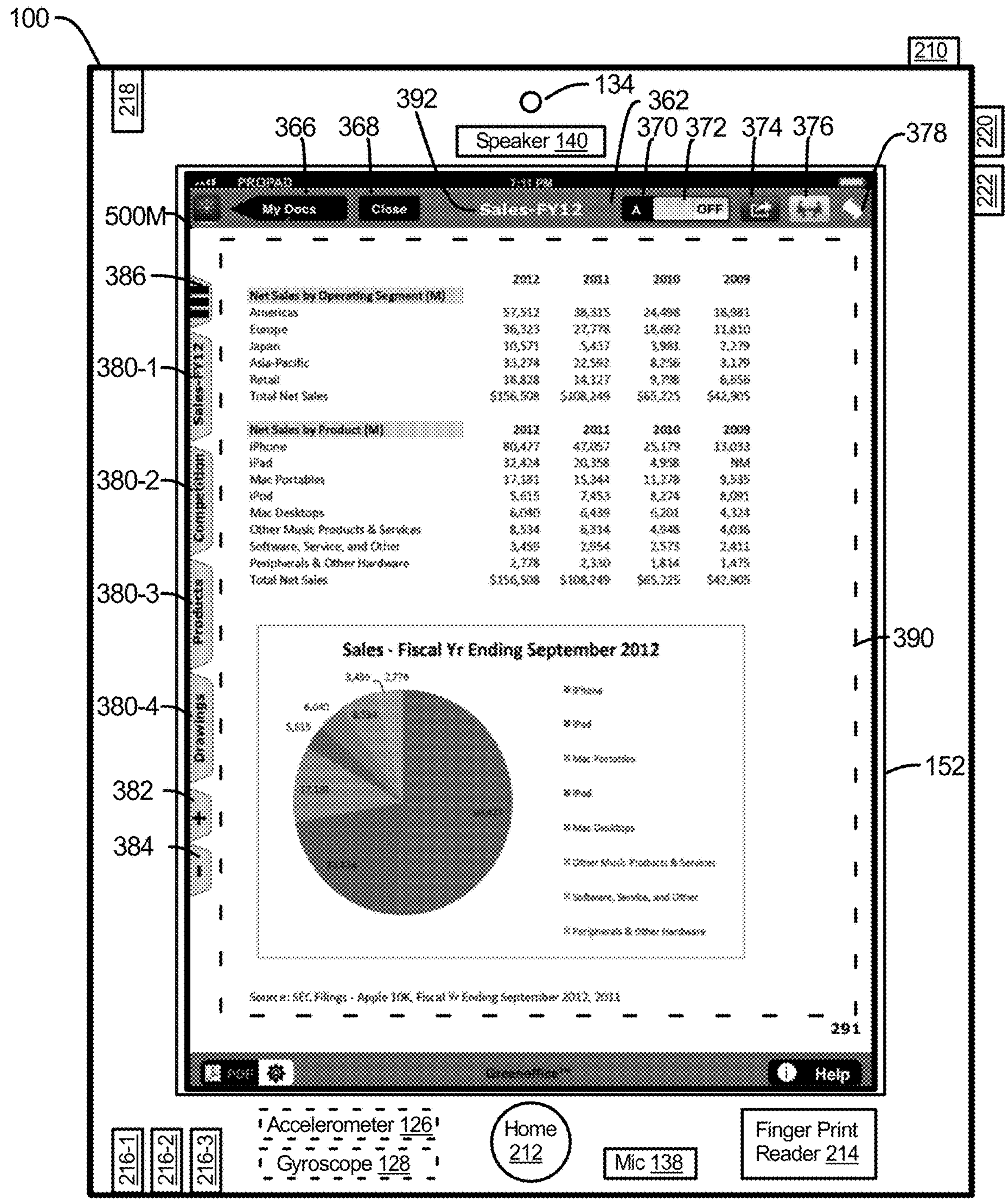
Figure 5N:
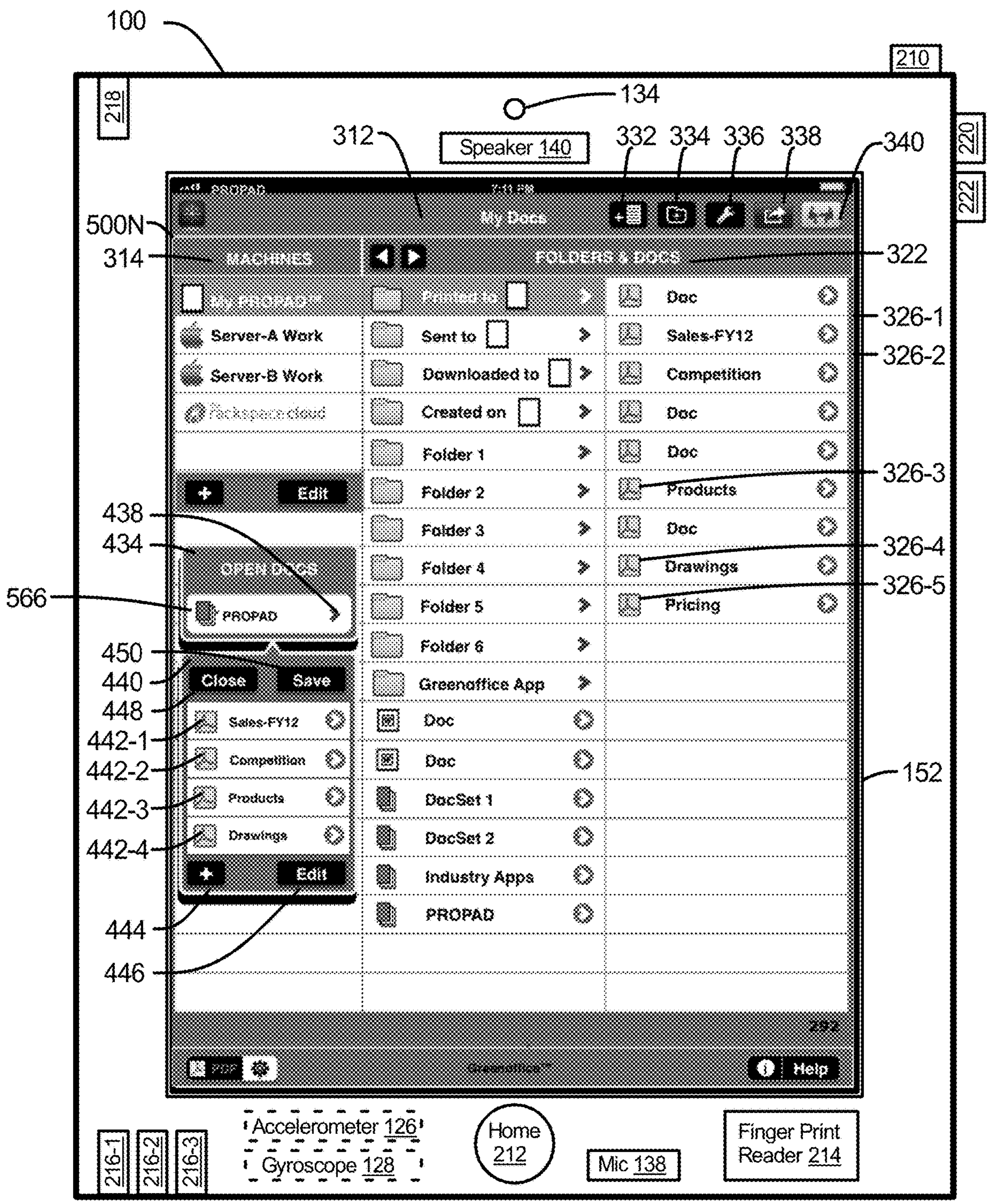

FIGS. 5A-5N illustrate exemplary user interfaces for saving a doc set and viewing a doc set in accordance with some embodiments. In a work environment, the user may wish to read and study a group of documents. These documents may comprise key documents supporting the development of a new product as in the example shown in FIG. 4. The documents may be the multitude of references to support the work of an attorney in a litigation matter. The documents may be the multitude of documents to which a building inspector will refer when making an inspection in the course of building construction. The documents may comprise financial, product, and management information for each company in mutual fund manager's equities portfolio. In some cases, once the worker has selected through careful consideration the information that must be reviewed, and made a decision based upon that information, the worker may not need to review that information again at a later date. In many other cases, the worker may wish to review or work with those docs again, the next day, the next week, the next month, or at some other time in the future. The exemplary UI designs and the methods disclosed herein provide a means to substantially increase worker productivity in either case. First, the UI design and methods enable the worker to efficiently navigate among and read from a large number of documents of different types and stored either locally or remotely on a sever. Second, the UI design and methods enable the worker to conveniently save links to that set of items comprising docs and/or doc sets as a set of items (a "Doc Set") that can be quickly accessed with a single selection.

When a group of items comprising docs and doc sets is selected by the user in the My Docs screen for viewing in the View Docs screen, then a temporary file is created with a system assigned doc set name. In the example of FIG. 5B, this system assigned doc set name is "DocSet 3". This temporary file contains the link (file alias) for each doc and doc set in the group, the tab label name for each doc and doc set in the group (the default is the doc name or doc set name), the displayed tab order, the last displayed tab style, the last displayed doc set, and the last displayed page position for each doc in the set. If the group of items is closed, and the group of items has not been previously saved as a doc set, and the user chooses don't save, then the file containing the information elements listed in the previous paragraph is discarded.

The sequence comprising FIGS. 5A-5C illustrate the case for closing and not saving. In FIG. 5A, UI 500A is shown. The user can select "Close" icon 368. The device then displays UI 500B (FIG. 5B). This UI is similar to UI 400A (FIG. 4A) except that the device displays "OPEN DOCS" header 434, and "DocSet 3" icon 436 displayed thereunder. Also shown is "Save Doc Set" icon 544 and "Don't Save" icon 542. When the user selects "Don't Save" icon 542, the device does not save any changes to the set of docs previously viewed in UI 500A (FIG. 5A). UI 500C (FIG. 5C) is then displayed. If the group of docs was not previously saved as a doc set, and the user selects "Don't Save" icon 542, then the file containing the links for each doc and doc set in the group of items viewed, and other associated information regarding tab label names, tab order, and last displayed page position for each doc, is discarded as outlined above.

The sequence comprising FIGS. 5A, 5B, and 5D to 5H illustrate the case of closing and saving the set of items under the doc set name PROPAD. In this case, in UI 500B (FIG. 5B), the user selects "Save Doc Set" icon 544. The device displays UI 500D (FIG. 5D) and "Save As" icon 512, where doc set name "DocSet 3" is displayed. However, the user can also create a user-defined name by selecting "Save As" icon 512. The device then displays UI 500E (FIG. 5E) with a keyboard. The user can remove the name "DocSet 3" by repeatedly selecting backspace key 518. The user can then use the keyboard to enter a new name by selecting alphanumeric keys 520 (FIG. 5F). Once the new name is entered, the user can complete the save process by selecting "Done" key 522 (FIG. 5G). The result is UI 500H (FIG. 5H) where the new doc set is displayed with the name "PROPAD".

The sequence comprising FIGS. 5I and 5J illustrates the user selecting the doc set name PROPAD in My Docs and viewing the doc set in View Docs. In UI 500I (FIG. 5I) the user selects "PROPAD" icon 524. The device displays UI 500J (FIG. 5J) showing tab icons 380-1 to 380-5 which are linked to the docs in the doc set named "PROPAD" and also displaying the doc linked to tab icon 380-1.

The worker may not only wish to add items to a set of docs, but also may wish to remove items from a set of docs. In this case, the device detects the selection of one or more items to be removed, and then removes the links to those items from the doc set. The case of removing an item from a set of docs is illustrated in the sequence comprising FIGS. 5J-5N. In this example, the single item named "Pricing" is removed from the doc set called "PROPAD". In UI 500J (FIG. 5J), the user selects remove item(s) icon 384. The device displays UI 500K (FIG. 5K) where the docs in doc set "PROPAD" are listed beside remove icons. The user selects remove icon 528 and the device displays UI 500L (FIG. SL). The user selects "Done" icon 530 to complete the removal. Following removal, the device displays UI 500M (FIG. 5M) where the tab corresponding to the removed item is no longer displayed. When the user selects "My Docs" icon 366, the device displays UI 500N (FIG. 5N) with the "PROPAD" icon representing the open doc set. In UI 500N we see that the set now only contains 4 items. We also see that the doc originally selected (326-5) remains displayed in UI 500N, as the removal of an item from a doc set only removes the link to the item and not the item itself. In a similar manner, adding an item to a doc set only adds a link to the item and not the item itself.

Figure 6A:
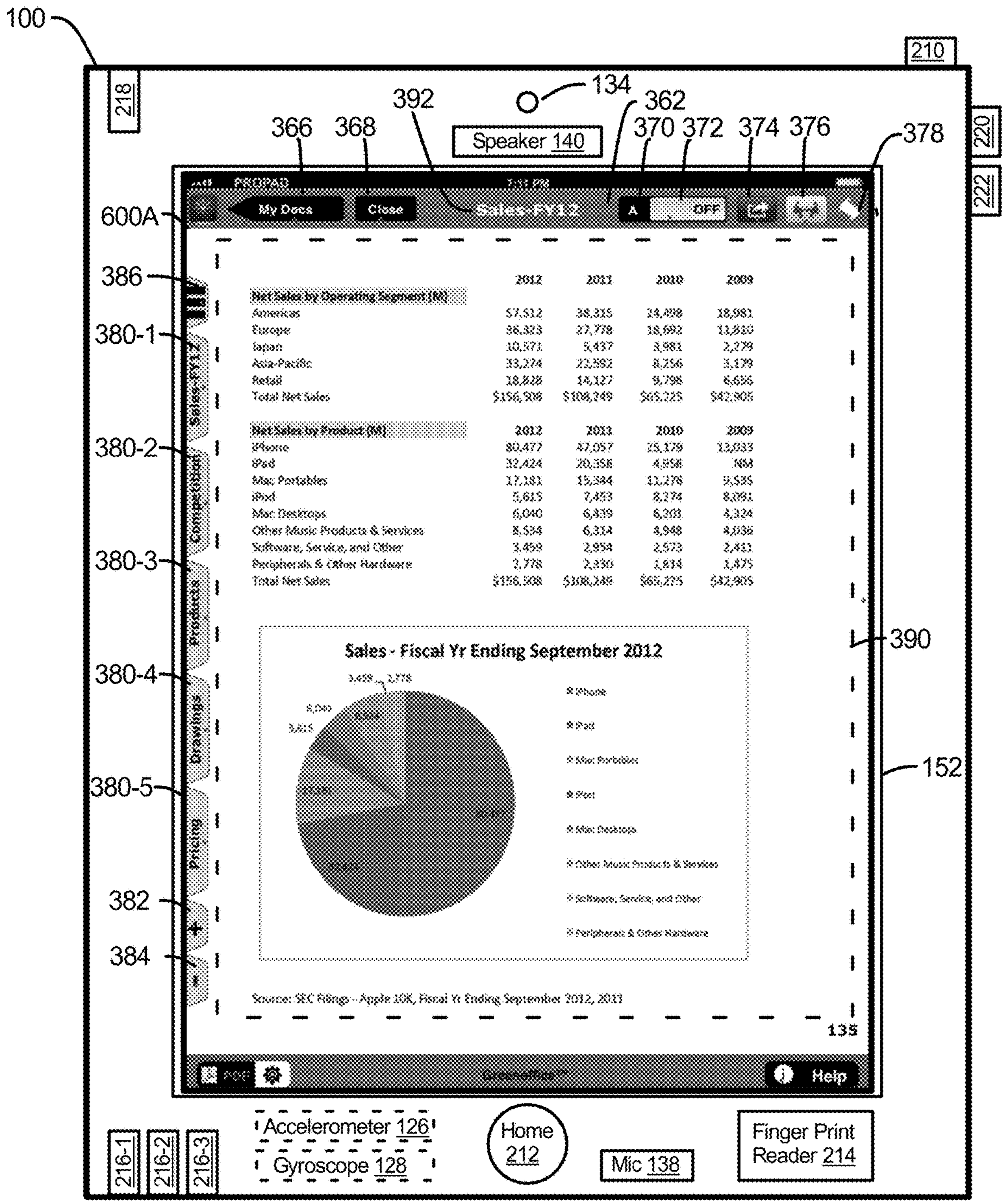
FIGS. 6A-6N illustrate exemplary user interfaces for working with docs and/or doc sets where a doc set may comprise both docs and doc sets in accordance with some embodiments.
Figure 6B:
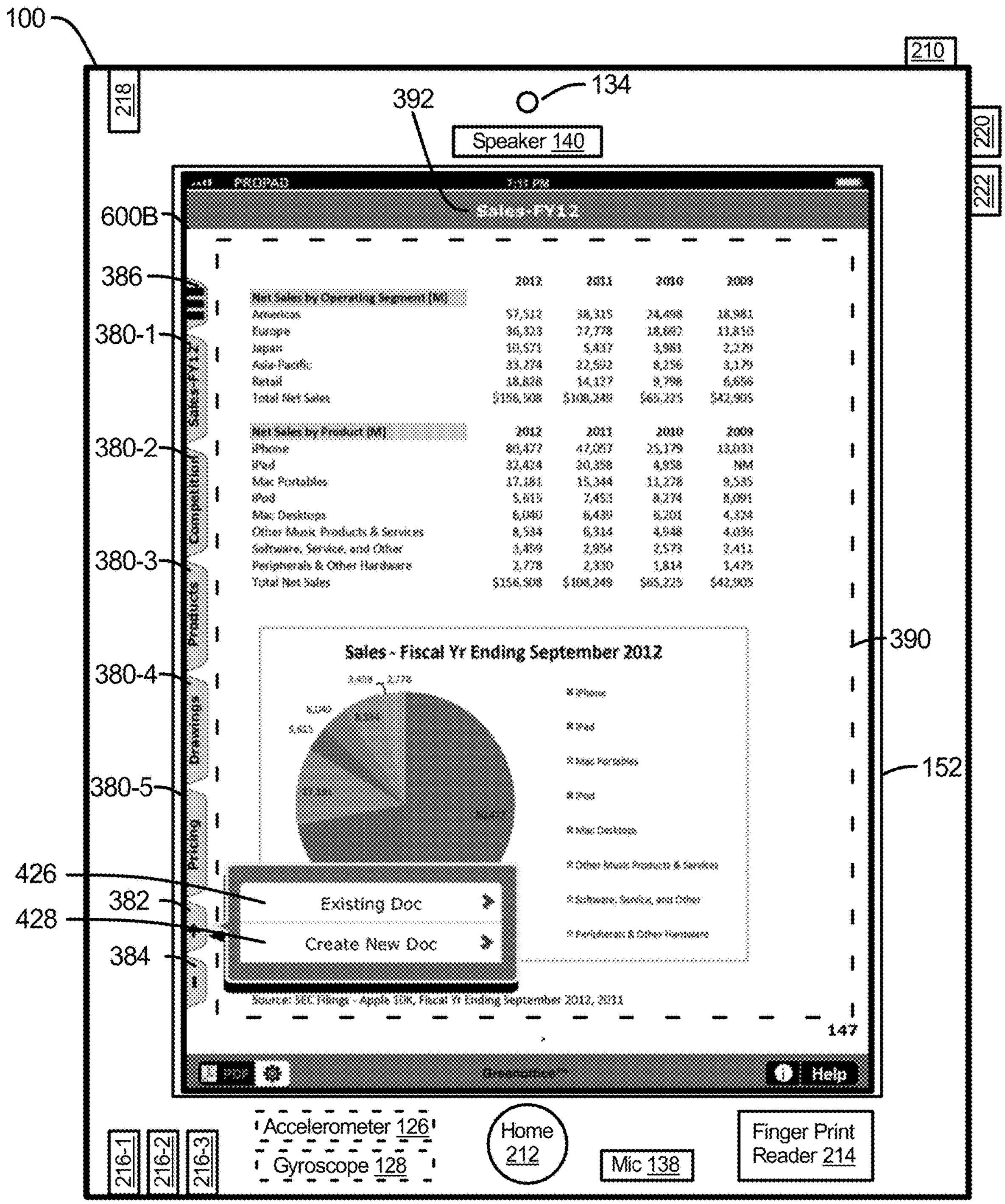
Figure 6C:
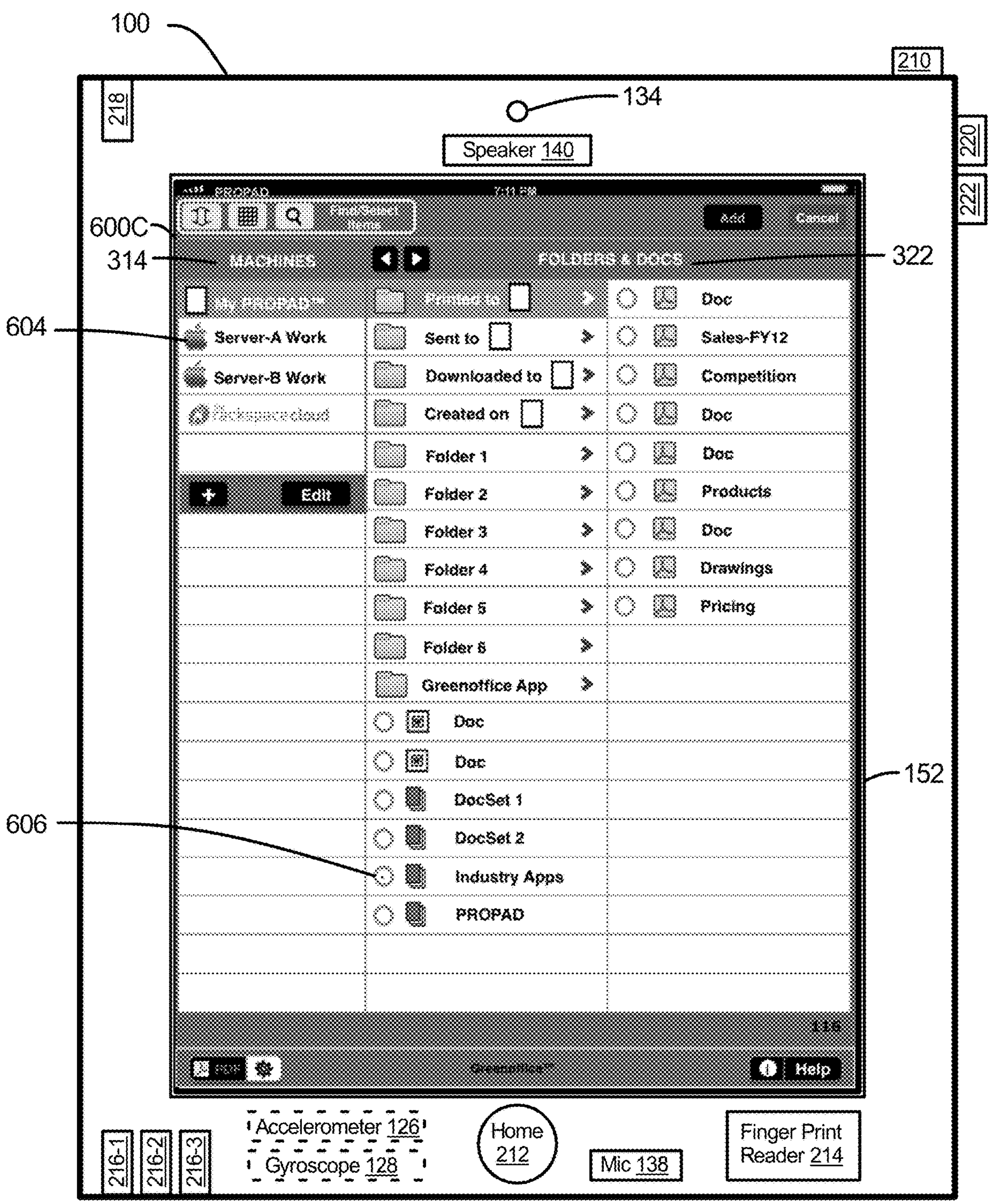
Figure 6D:
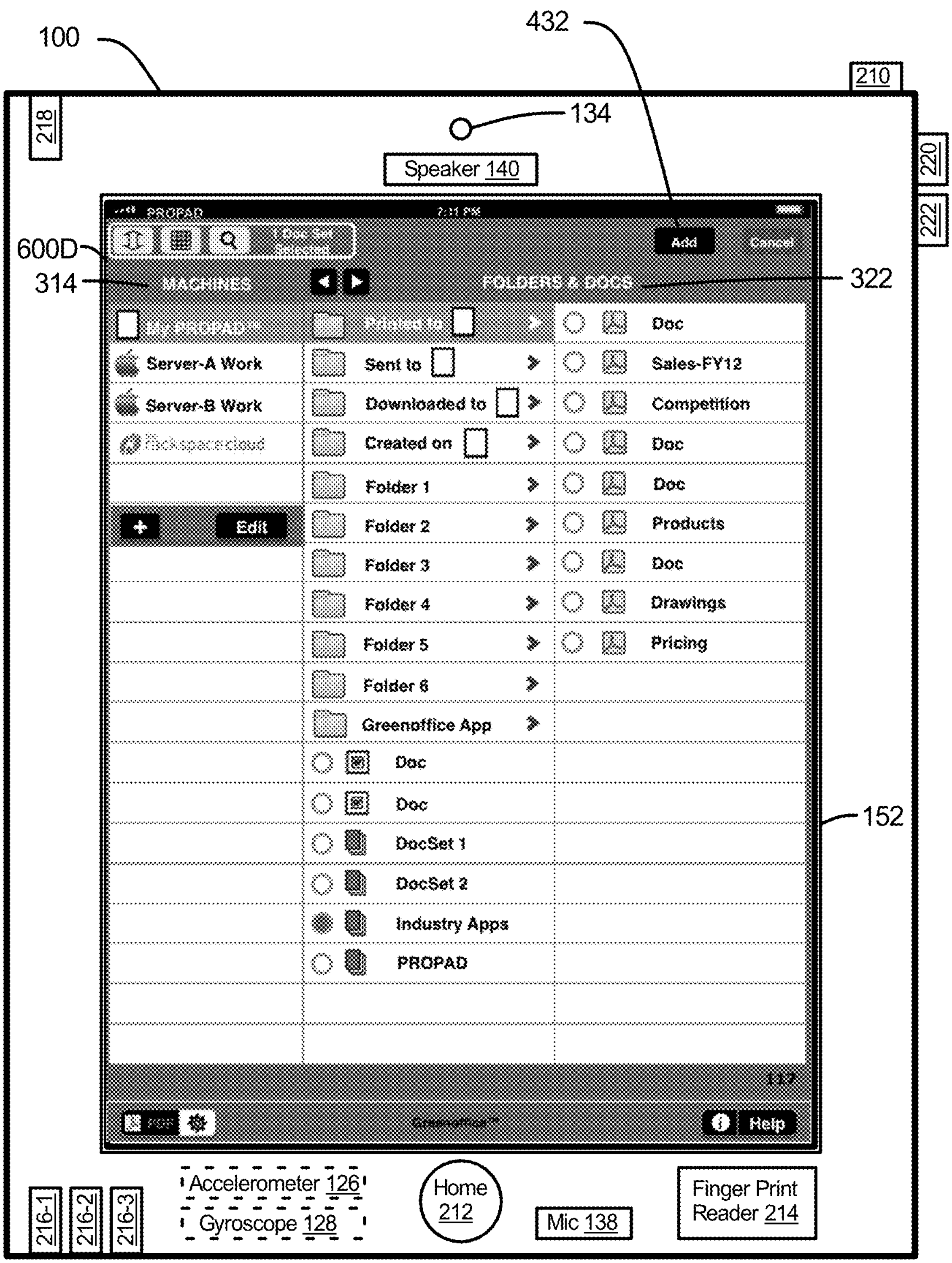
Figure 6E:
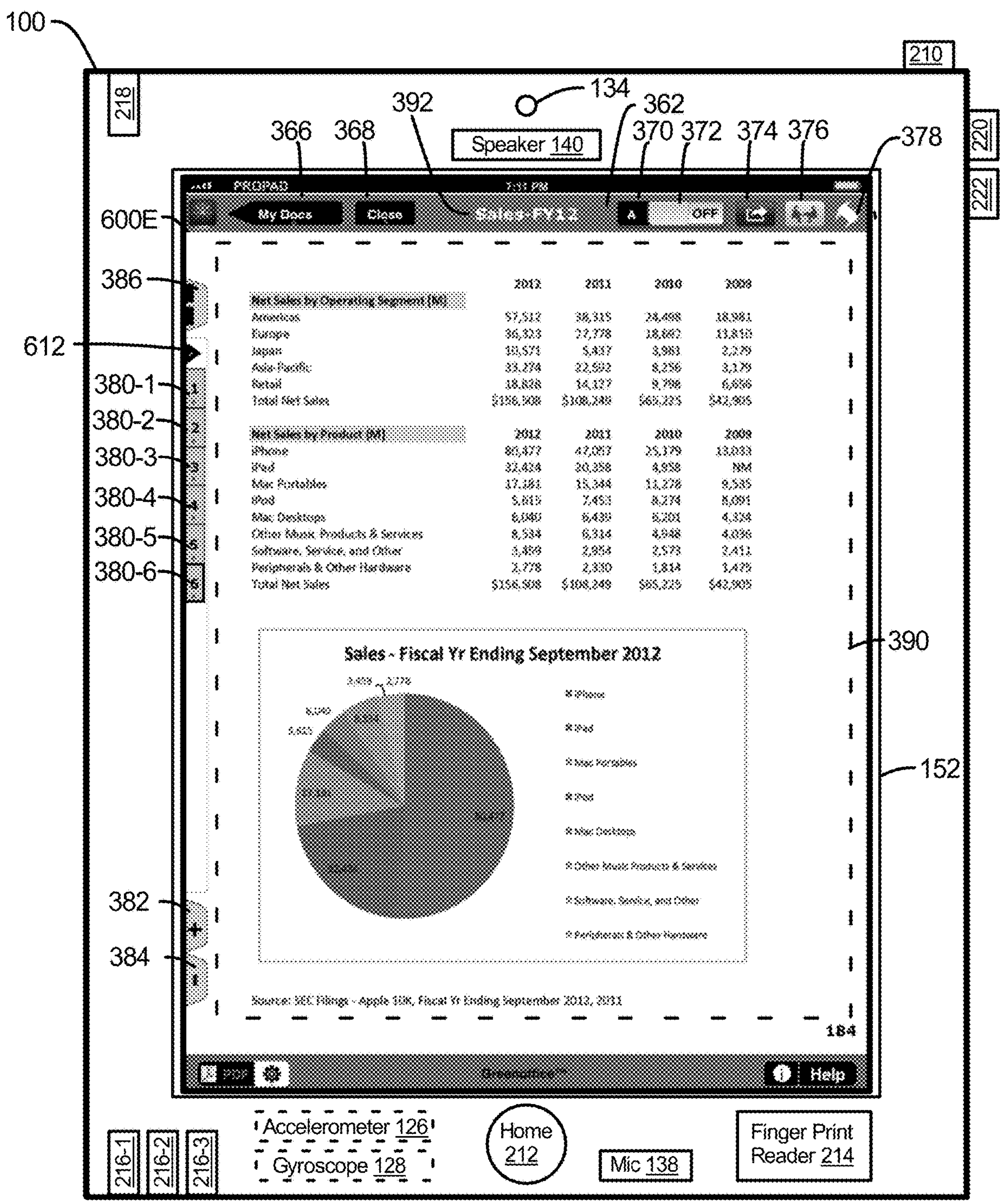
Figure 6F:
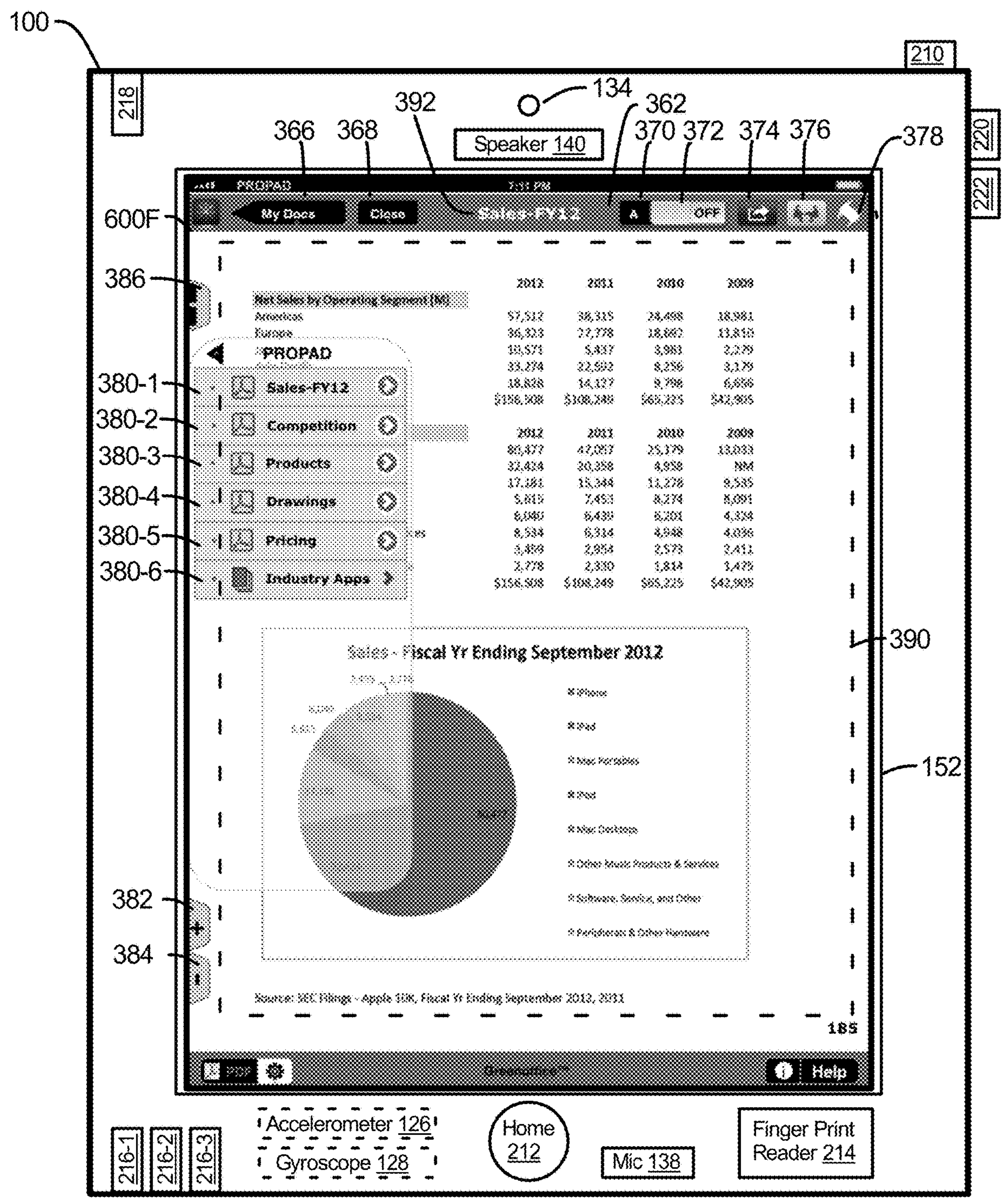
Figure 6G:
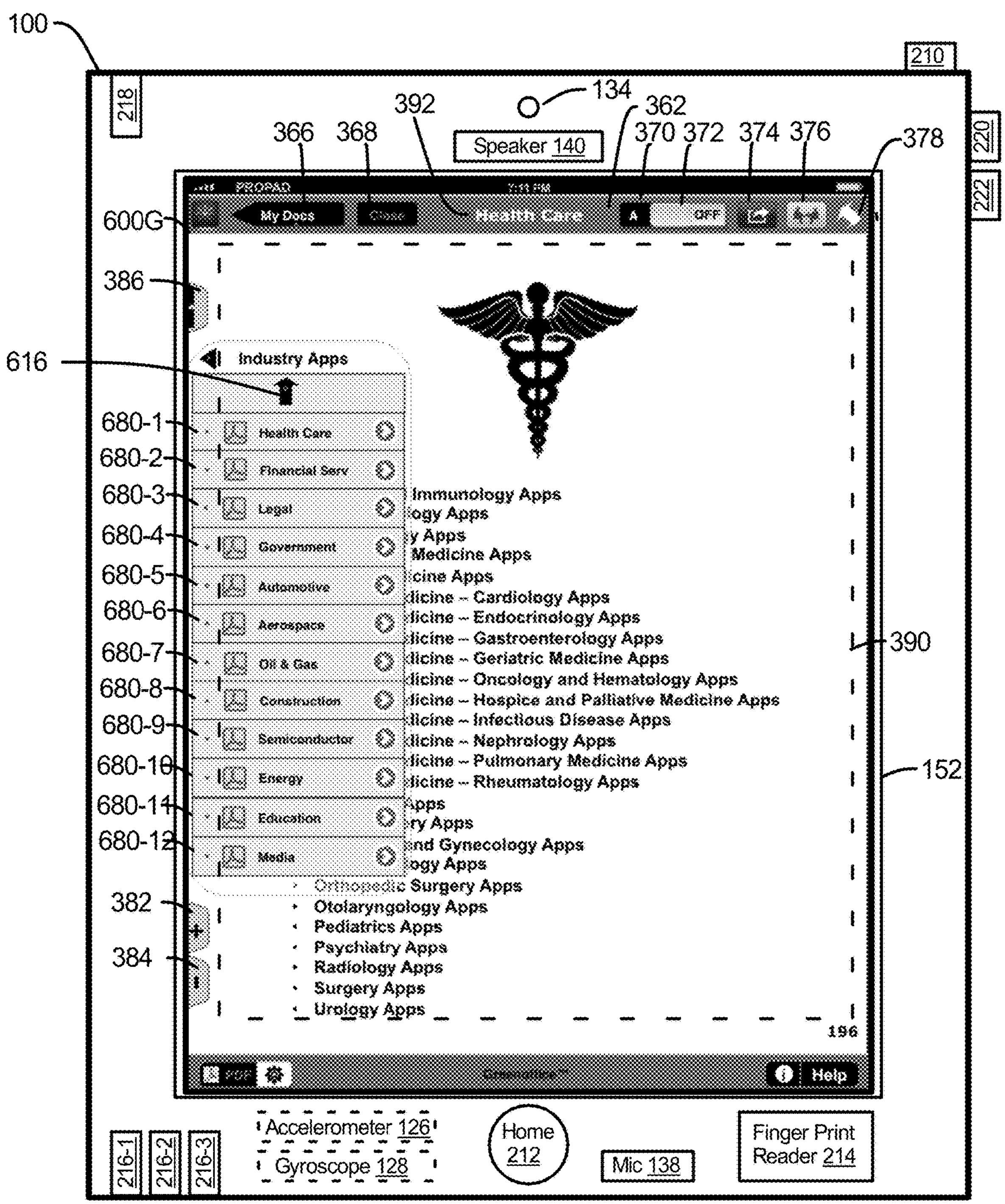
Figure 6H:
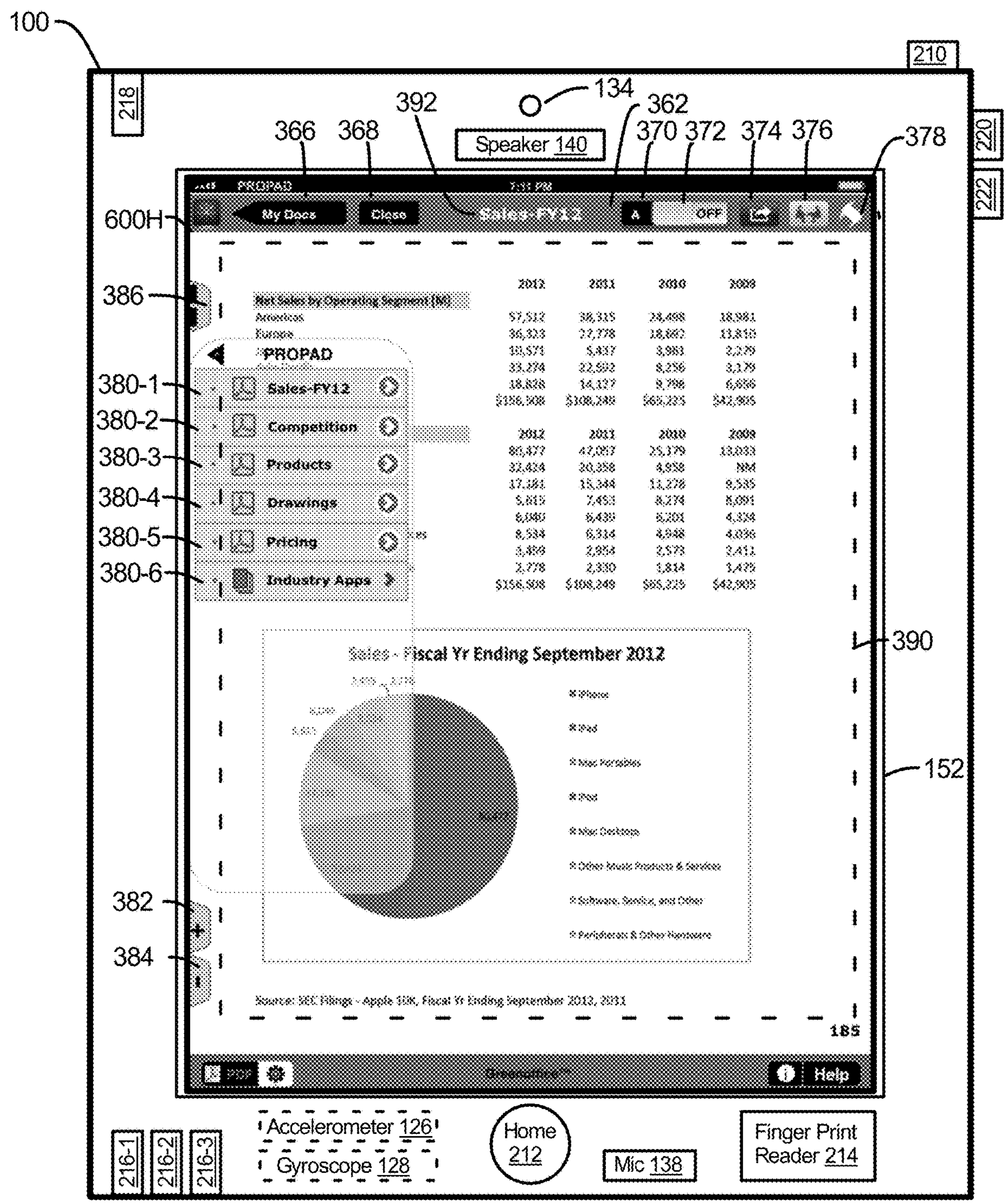
Figure 6I:
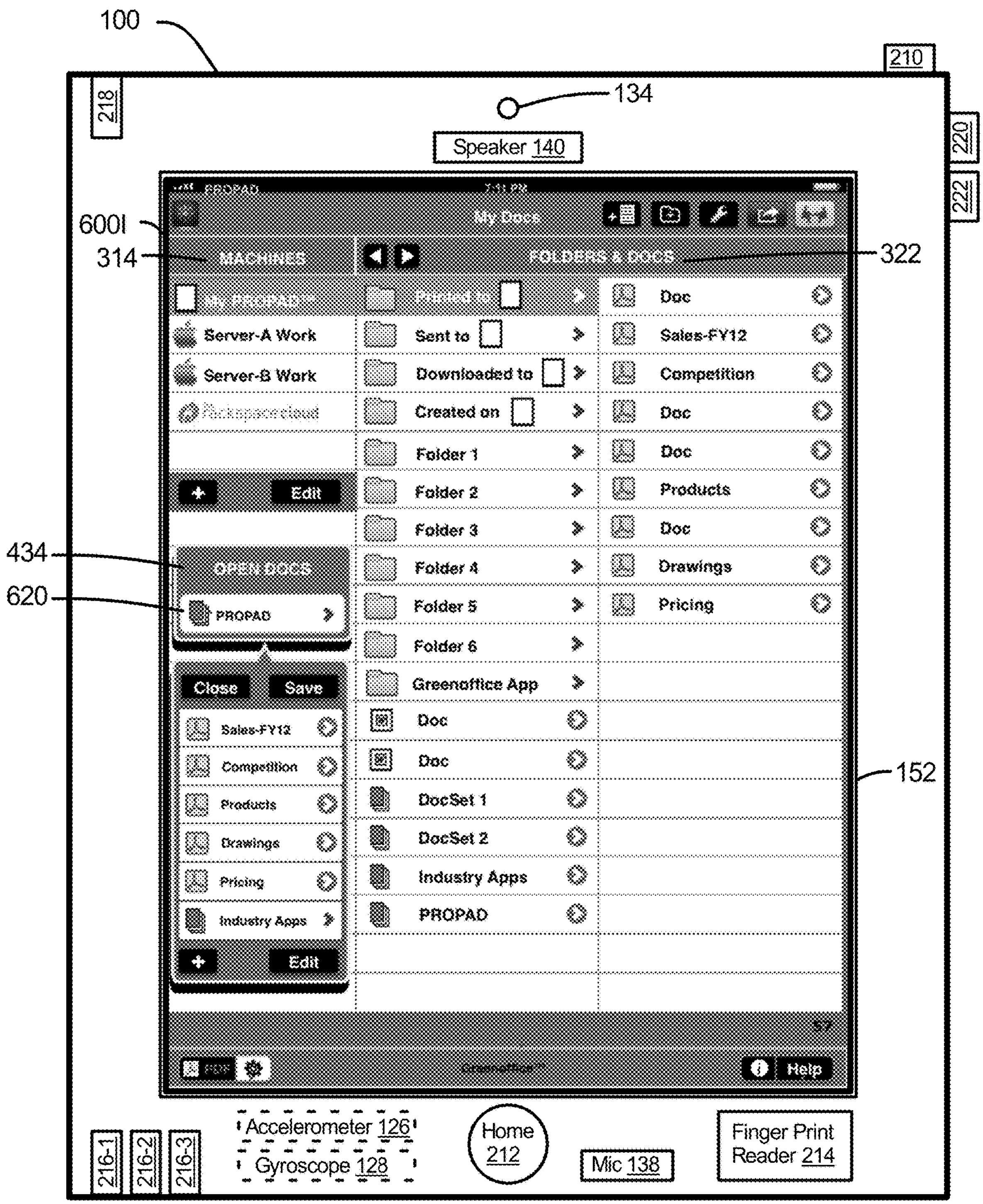
Figure 6J:
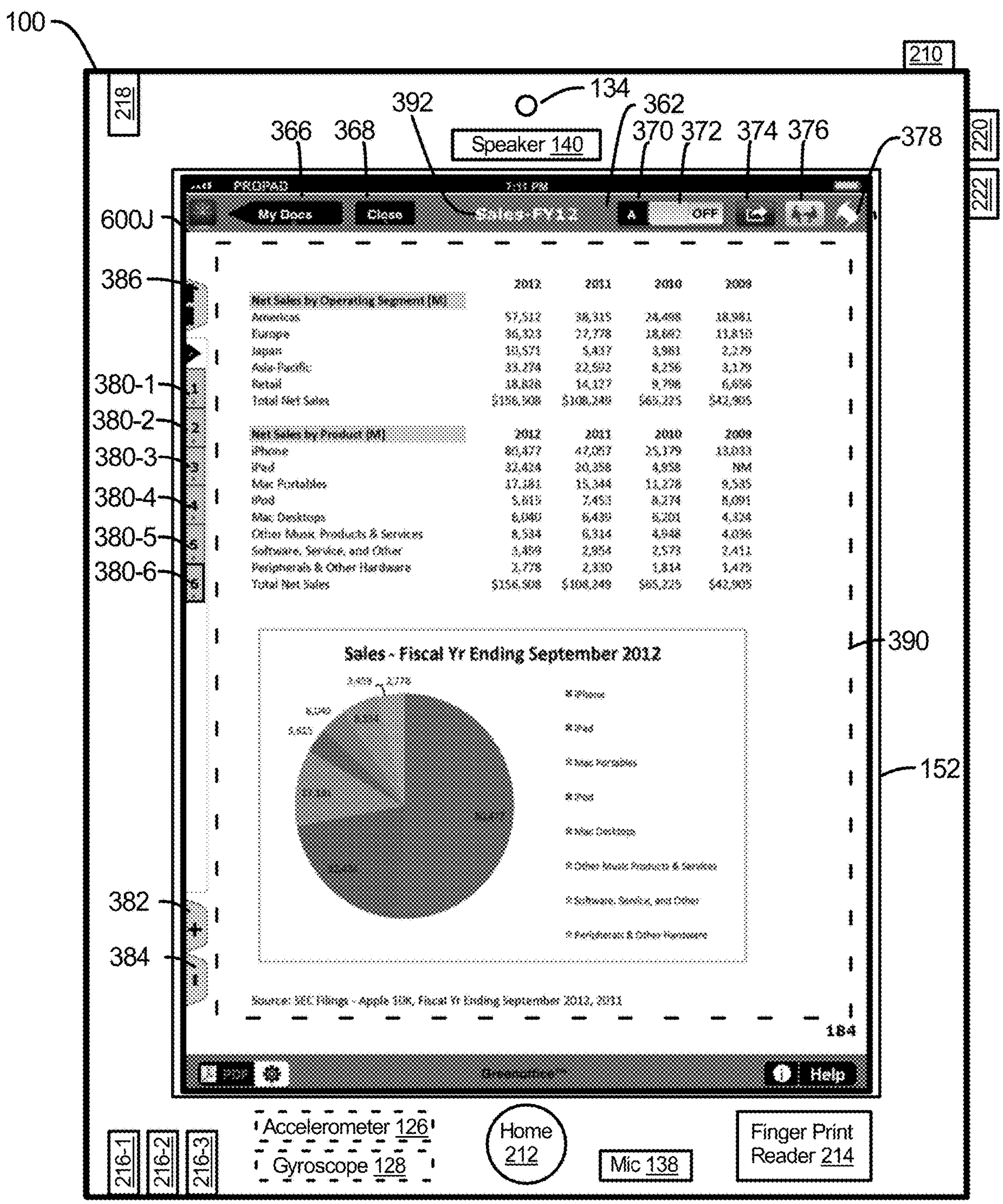
Figure 6K:
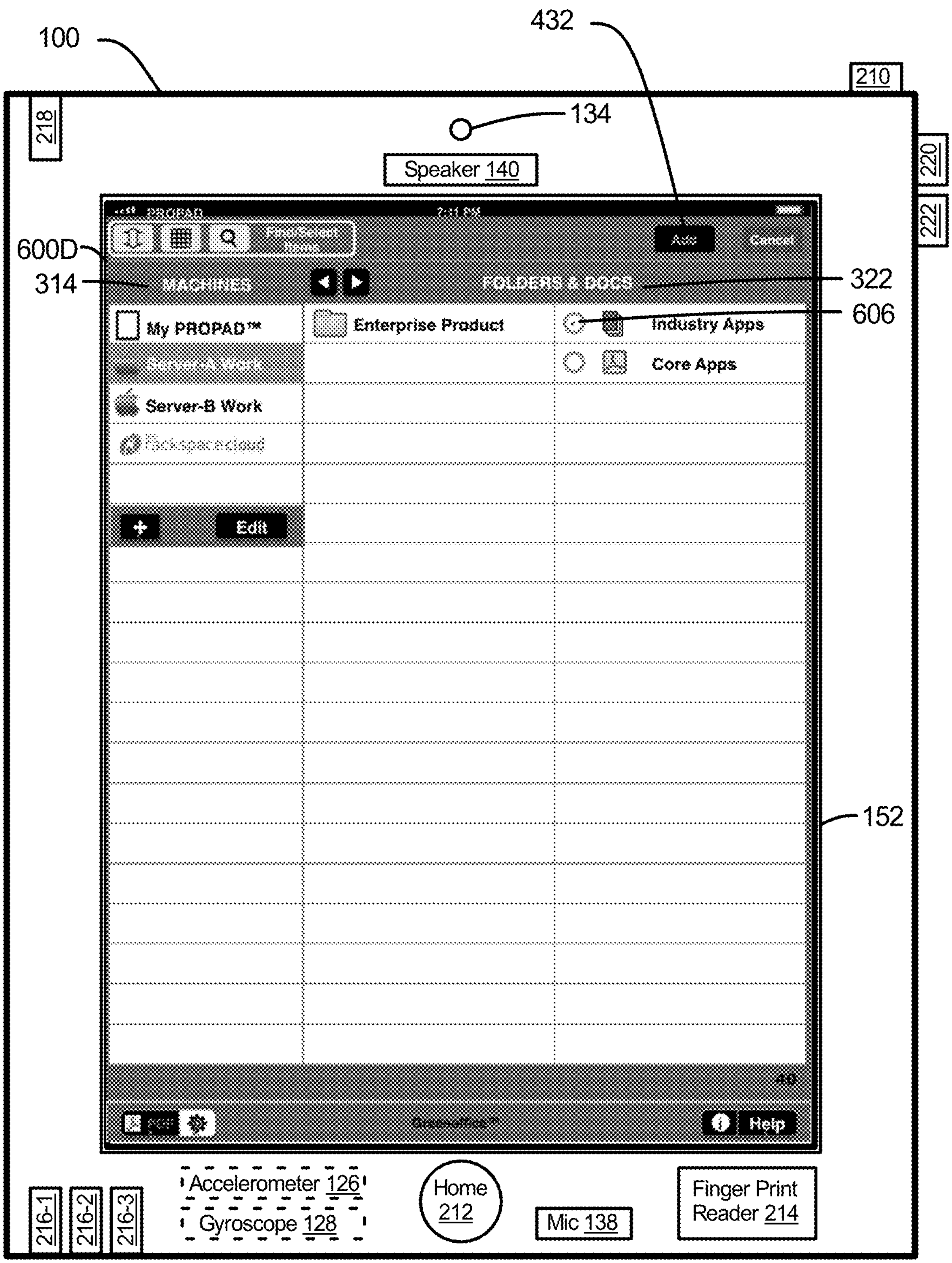
Figure 6L:
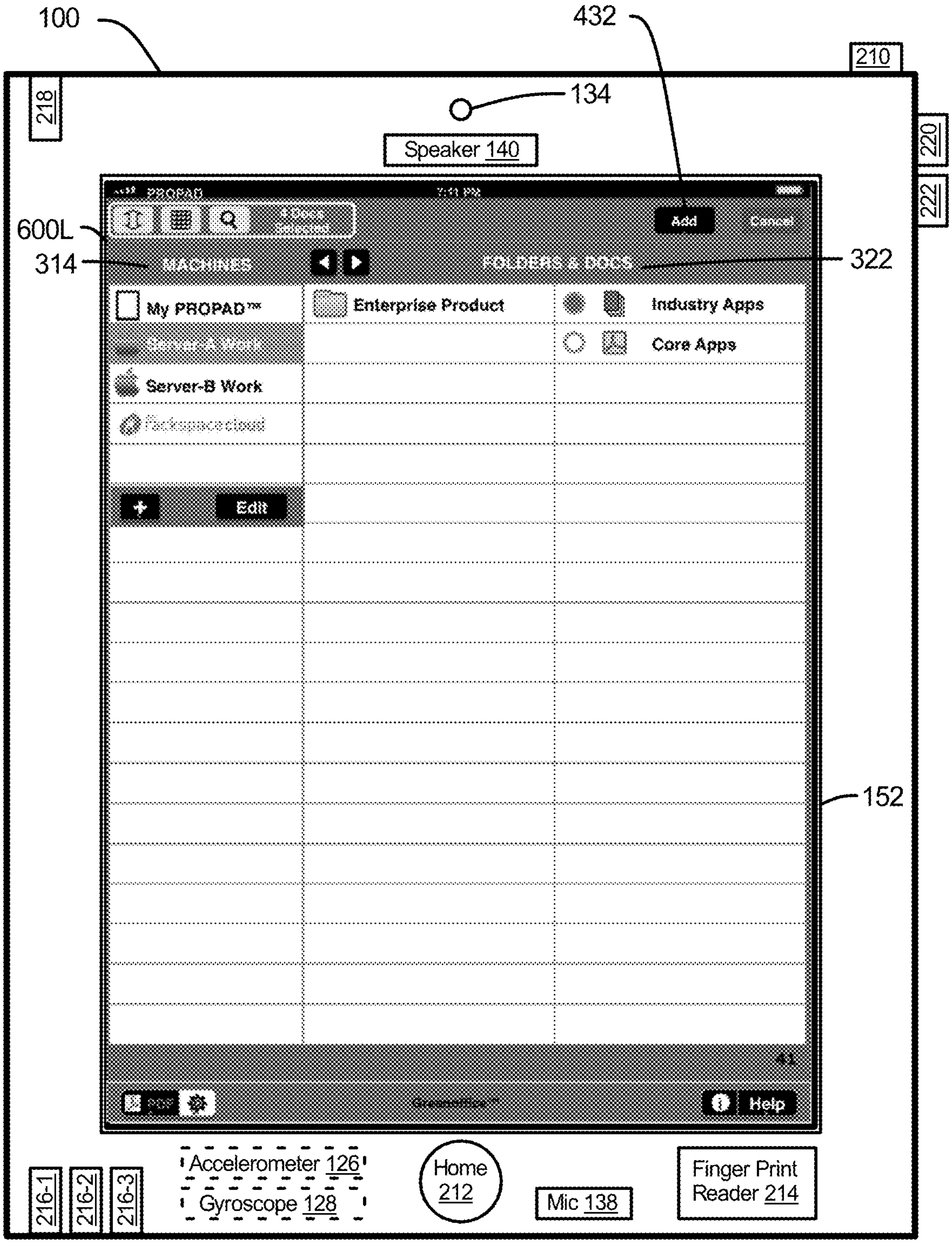
Figure 6M:
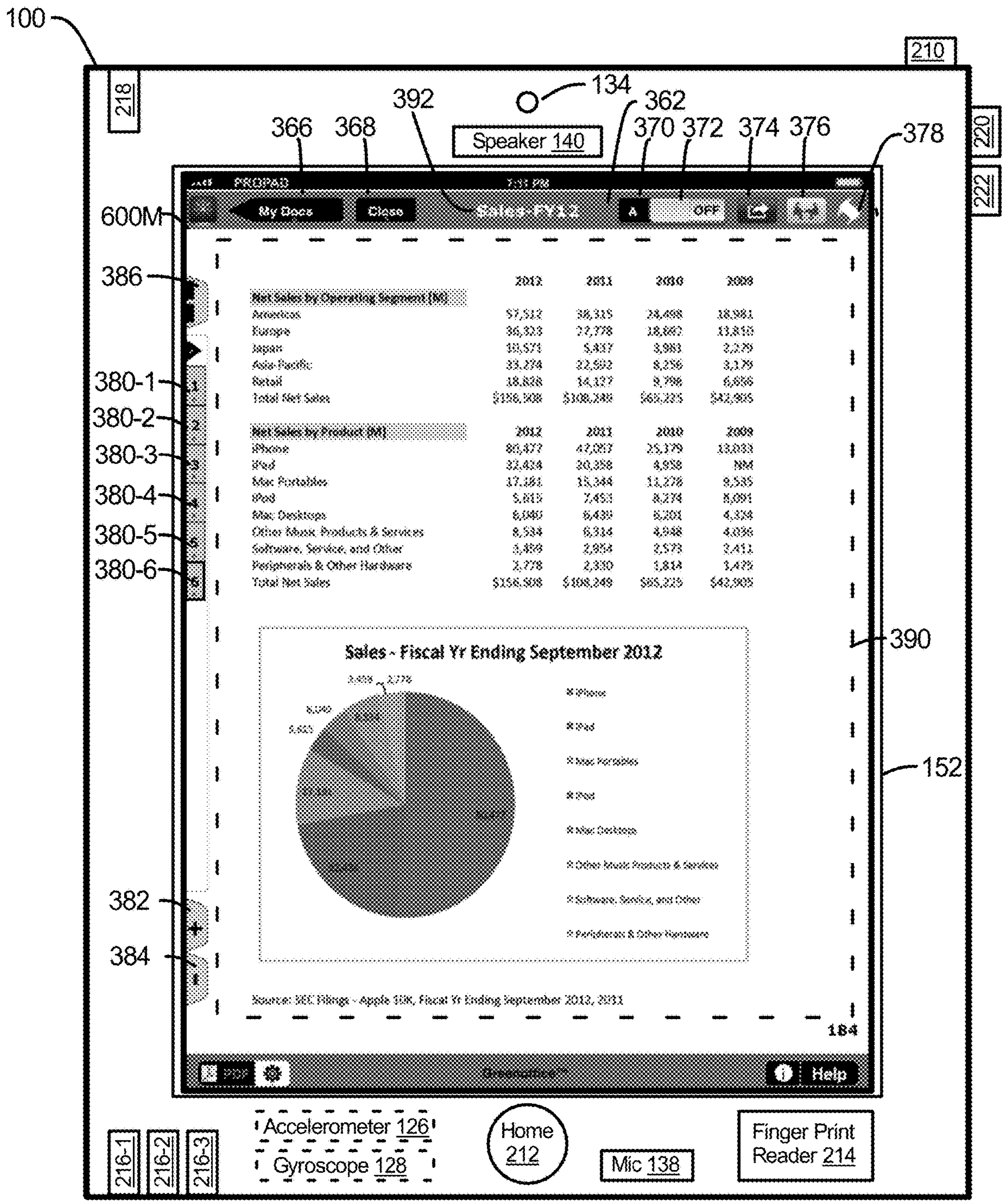
Figure 6N:
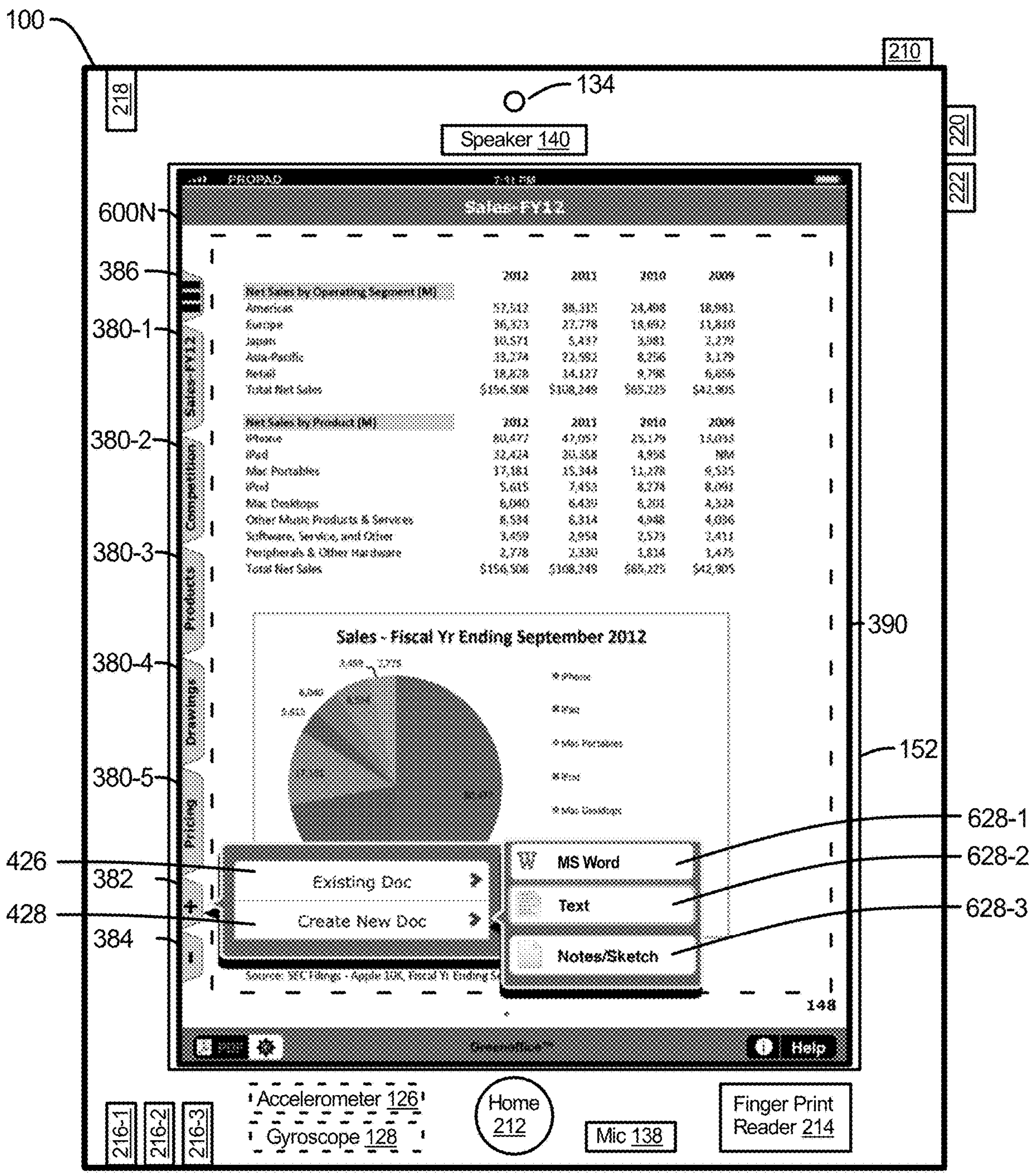

FIGS. 6A-6N illustrate exemplary user interfaces for working with docs and/or doc sets where a doc set may comprise both docs and doc sets in accordance with some embodiments. Doc sets may comprise both docs and doc sets. This enables the user to create a hierarchical tree structure that comprises a top-level or root doc set that may contain lower-level or subordinate doc sets. Subordinate doc sets could in turn also contain further subordinate doc sets. A doc set containing a subordinate doc set could be referred to as the parent doc set and the subordinate doc set could be referred to as the child doc set. For example, in this discussion of FIGS. 6A-6N, we add a subordinate doc set named "Industry Apps" to a root doc set named "PROPAD".

The worker will often work with a large group of documents that can be most conveniently read and reviewed and organized when some of the docs in that group can be grouped into subgroups. We can illustrate this use case, and other aspects of the UI and methods, with the example presented in FIGS. 6A-6J. In the sequence comprising FIGS. 6A-6E, the user has opened a doc set comprising 5 docs linked to tab icons 380-1 to 380-5 as shown in UI 600 A (FIG. 6A). The user selects add items icon 382 in UI 600A (FIG. 6A). In UI 600B (FIG. 6B) the device displays "Existing Doc" icon 426 and "Create New Doc" icon 428. The user selects "Existing Doc" icon 426 and the device displays UI 600C (FIG. 6C). In UI 600C the device enables the user to select one or more items to add. The user selects item 606. This item is a doc set named "Industry Apps". The user selects "Add" icon 432 in UI 600D (FIG. 6D). The device displays UI 600E (FIG. 6E). The tabs are displayed by the device in compact list style. There are now 6 tab icons (380-1 to 380-6). Tab icon 380-6 is distinct from the other 5 tab icons as this tab links to a doc set rather than a single doc. The user then selects expand tab icon 612 in UI 600E (FIG. 6E). The device then displays UI 600F (FIG. 6F), where the tabs have been displayed by the device in expanded list style as a semitransparent overlay. The name of each item in the doc set, and the fact that the item linked to tab icon 380-6 is a doc set named "Industry Apps", are clearly shown. The user then selects tab icon 380-6 linked to the doc set named "Industry Apps" in UI 600F. The device then displays UI 600G (FIG. 6G) with a list of 12 tab icons. Each tab icon is linked to one of the 12 items in the doc set named "Industry Apps". The device also displays the first item in the set—a doc named "Health Care". The user may then view any item in the doc set named "Industry Apps" by tapping the tab for that item. In UI 600G, the user taps up icon 616, and device displays the parent doc set in UI 600H (FIG. 6H). In UI 600H the user selects "My Docs" icon 366. The device then displays UI 600I (FIG. 6I). Under the "OPEN DOCS" header icon 434, the device displays icon 620 linked to the open doc set named "PROPAD". Also listed are the 5 docs and one doc set named "Industry Apps" that are now contained in this doc set. The user then selects icon 620 for the open doc set named "PROPAD" and the device displays the UI 600J (FIG. 6J). In this example, the tabs are displayed in compact list format.

A user may wish to add an item to a doc set where the item is stored on a server. This use case is illustrated in FIGS. 6A-6C and 6K-6M. The user begins as in the prior example with an open doc set containing 5 docs linked to tab icons 380-1 to 380-5 in UI 600A (FIG. 6A). The user selects add items icon 382 in UI 600A, the device displays UI 600B (FIG. 6B), and the user selects "Existing Doc" icon 426. The device displays UI 600C (FIG. 6C) and the user selects "Sever A—Work" icon 604 to add a link to an item stored on that sever. The device displays UI 600K (FIG. 6K) and enables the user to select one or more items. The user selects icon 606 linked to the item named "Industry Apps". (The same name is used as in the prior example to enable screen shots to be reused). The device displays UI 600L (FIG. 6L), which shows the item "Industry Apps" as having been selected, and the user selects "Add" icon 432. The device then displays UI 600M (FIG. 6M). The device displays 6 tab icons (380-1 to 380-6). Each tab is linked to an item in the doc set. Each of the first 5 tabs is linked to a single doc and the sixth tab is linked to the doc set named "Industry Apps". In this example the tabs are displayed in compact list style.

A user may wish to add an item where the item is a created new doc, rather than an existing doc. This use case is illustrated in FIGS. 6A and 6N. In FIG. 6A the user has opened a doc set comprising 5 docs linked to tab icons 380-1 to 380-5 as shown in UI 600A. The user selects add items icon 382 in UI 600A. The device then displays UI 600N (FIG. 6N) showing "Existing Doc" icon 426 and "Create New Doc" icon 428. The user selects "Create New Doc" icon 428, and the device displays available applications in which the new doc can be created. In this example, three applications are shown, represented by "MS Word" icon 628-1, "Text" icon 628-2, and "Notes/Sketch" icon 628-3. These applications are representative only, as many other applications may be available.

Figure 7A:
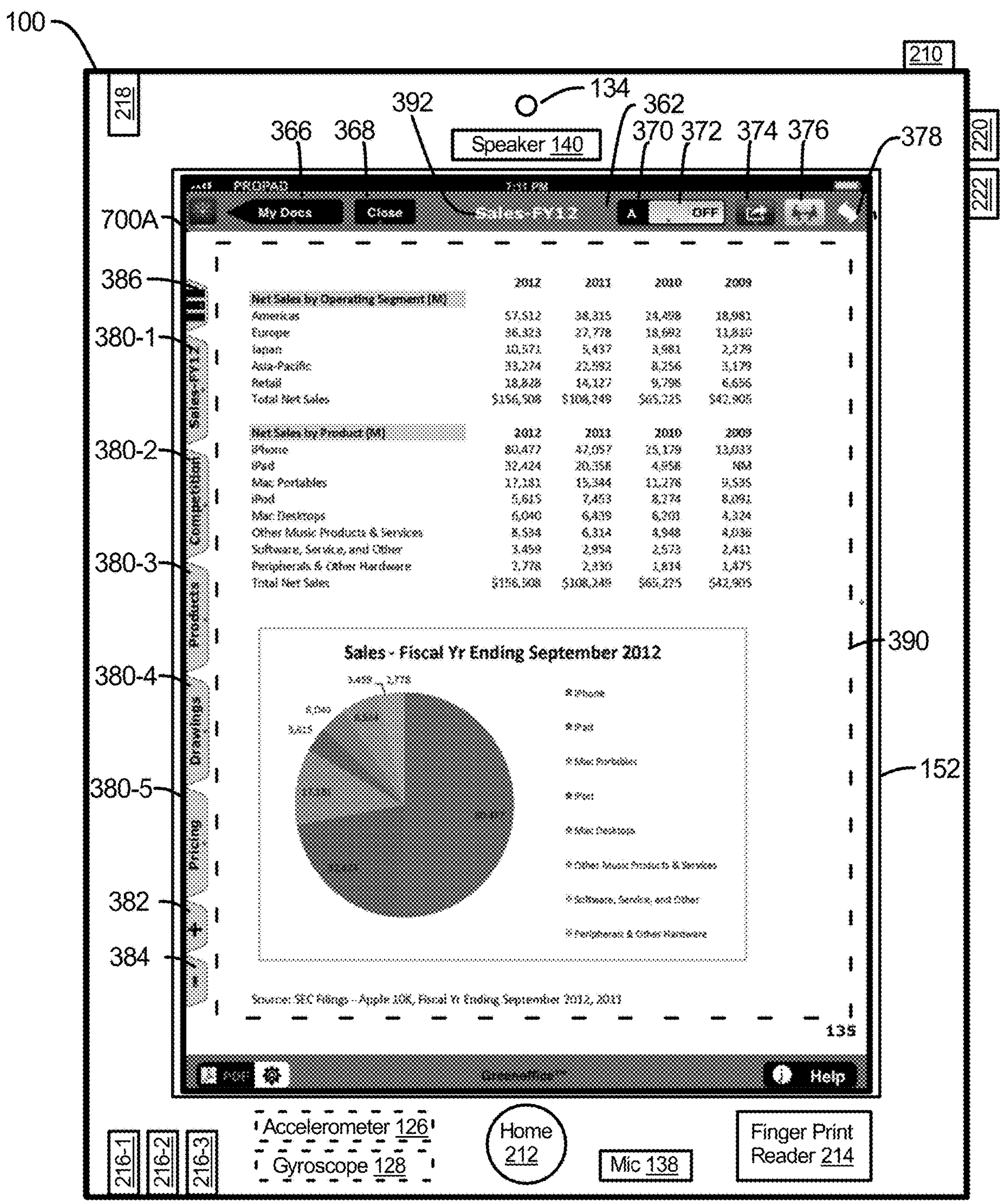
FIGS. 7A-7F illustrate exemplary user interfaces for annotating electronic documents in accordance with some embodiments.
Figure 7B:
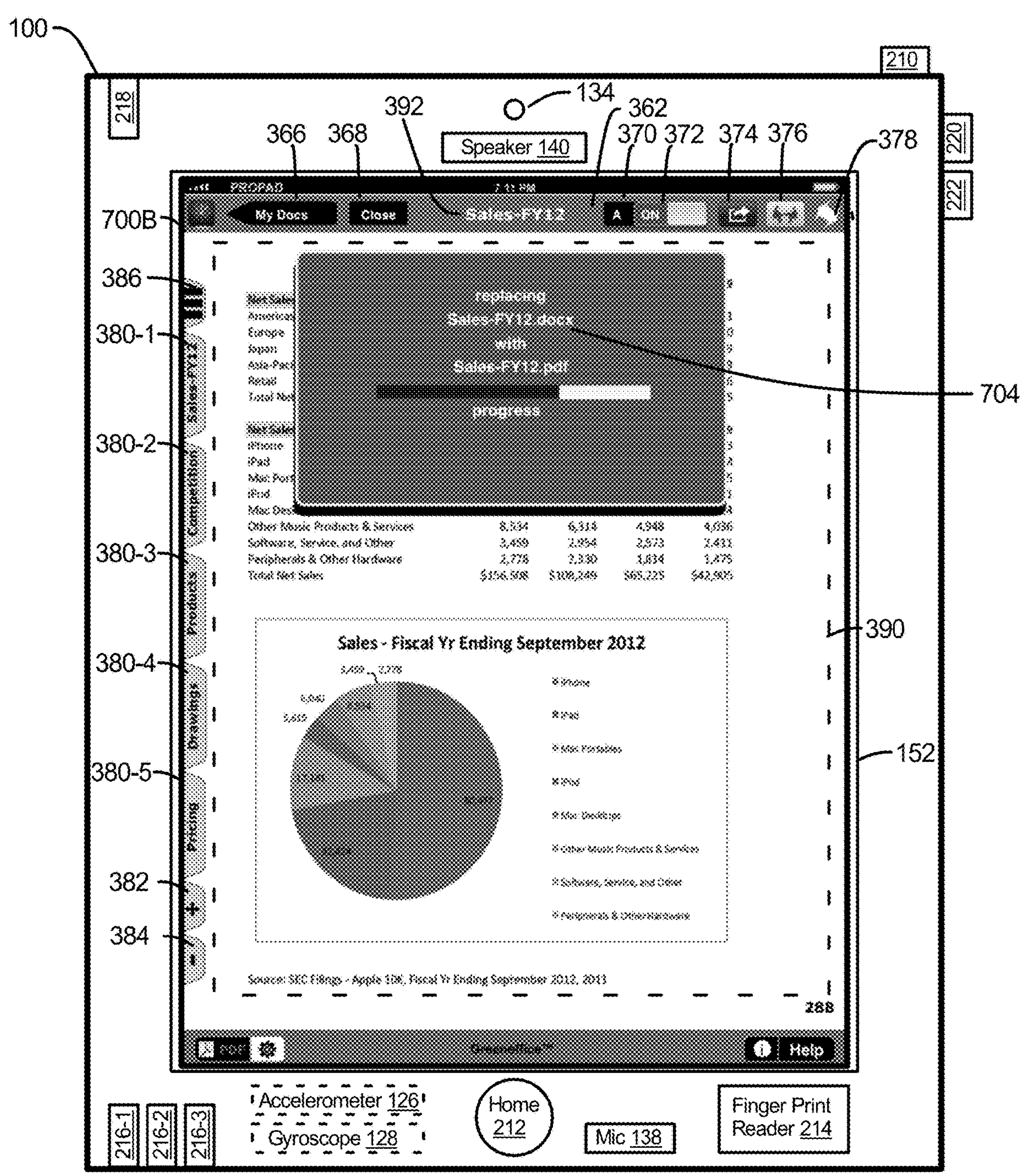
Figure 7C:
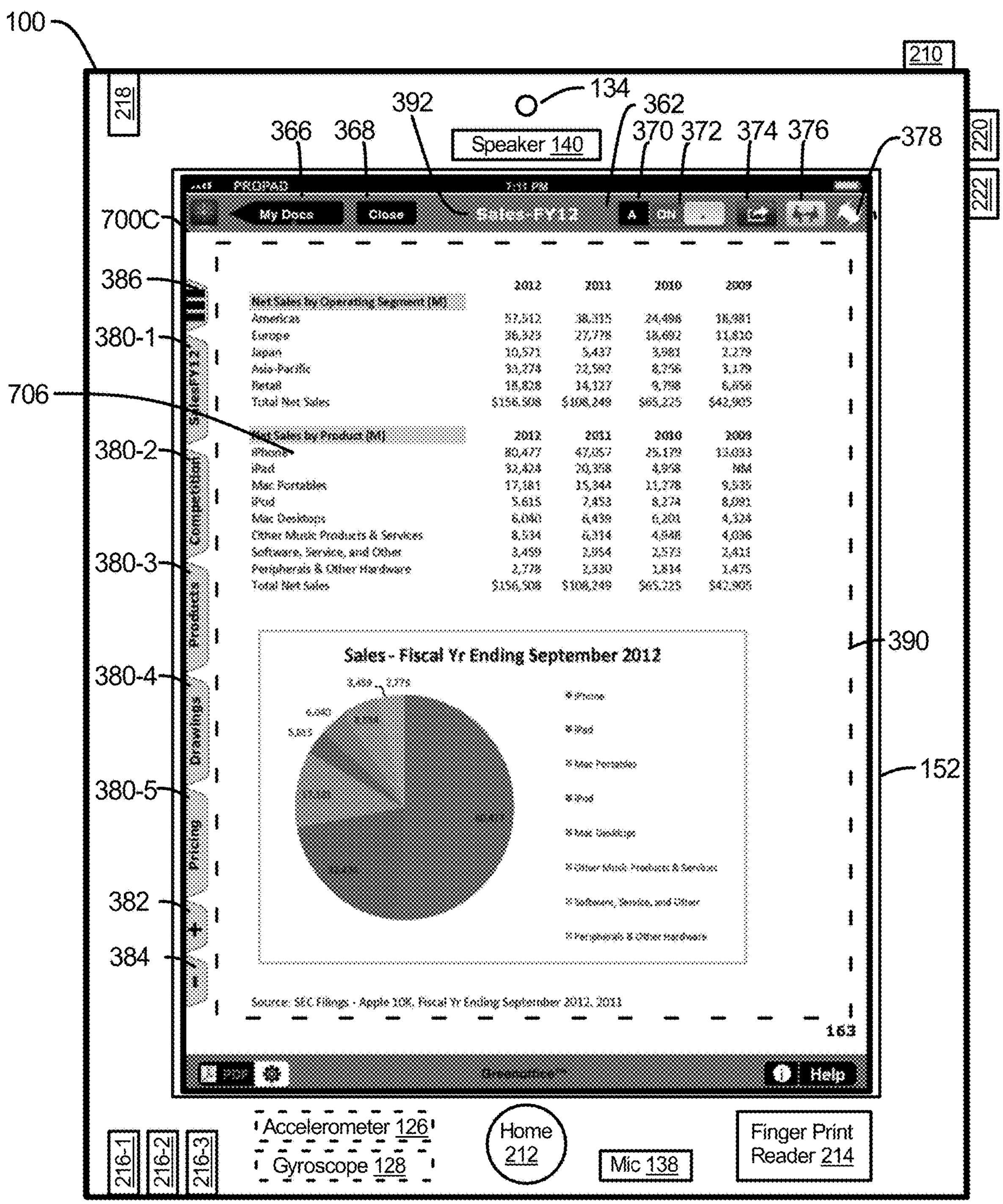
Figure 7D:
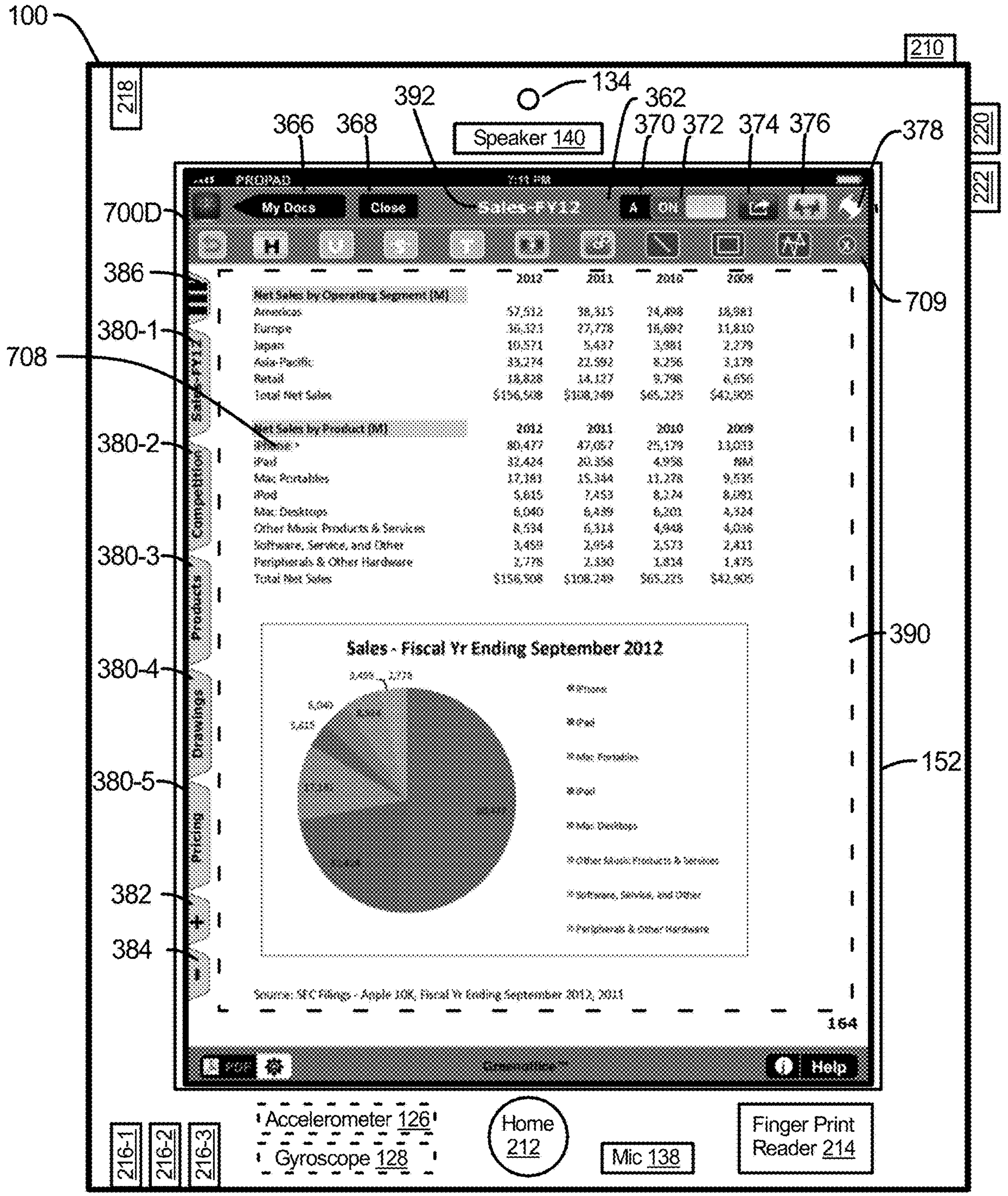
Figure 7E:
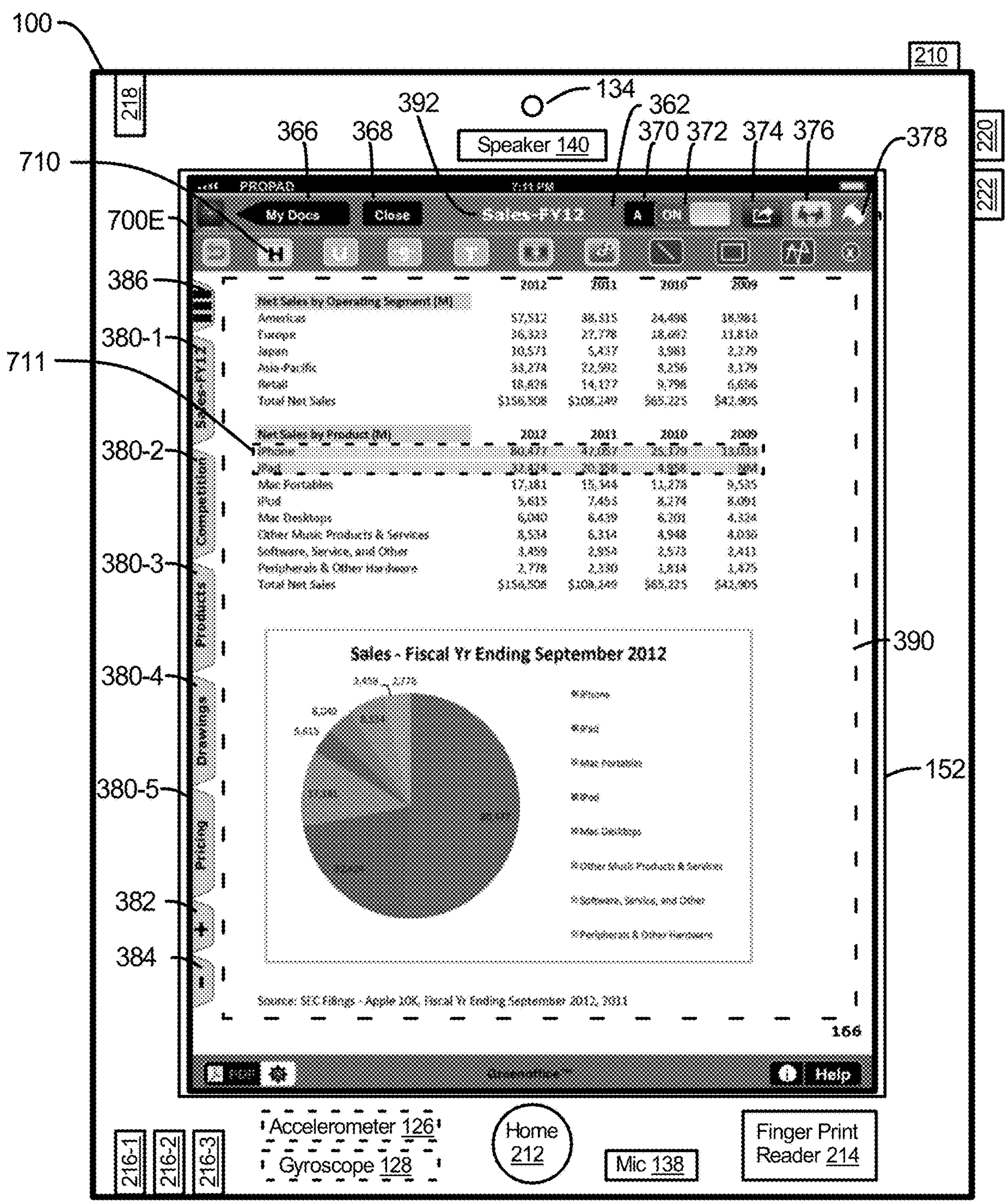
Figure 7F:
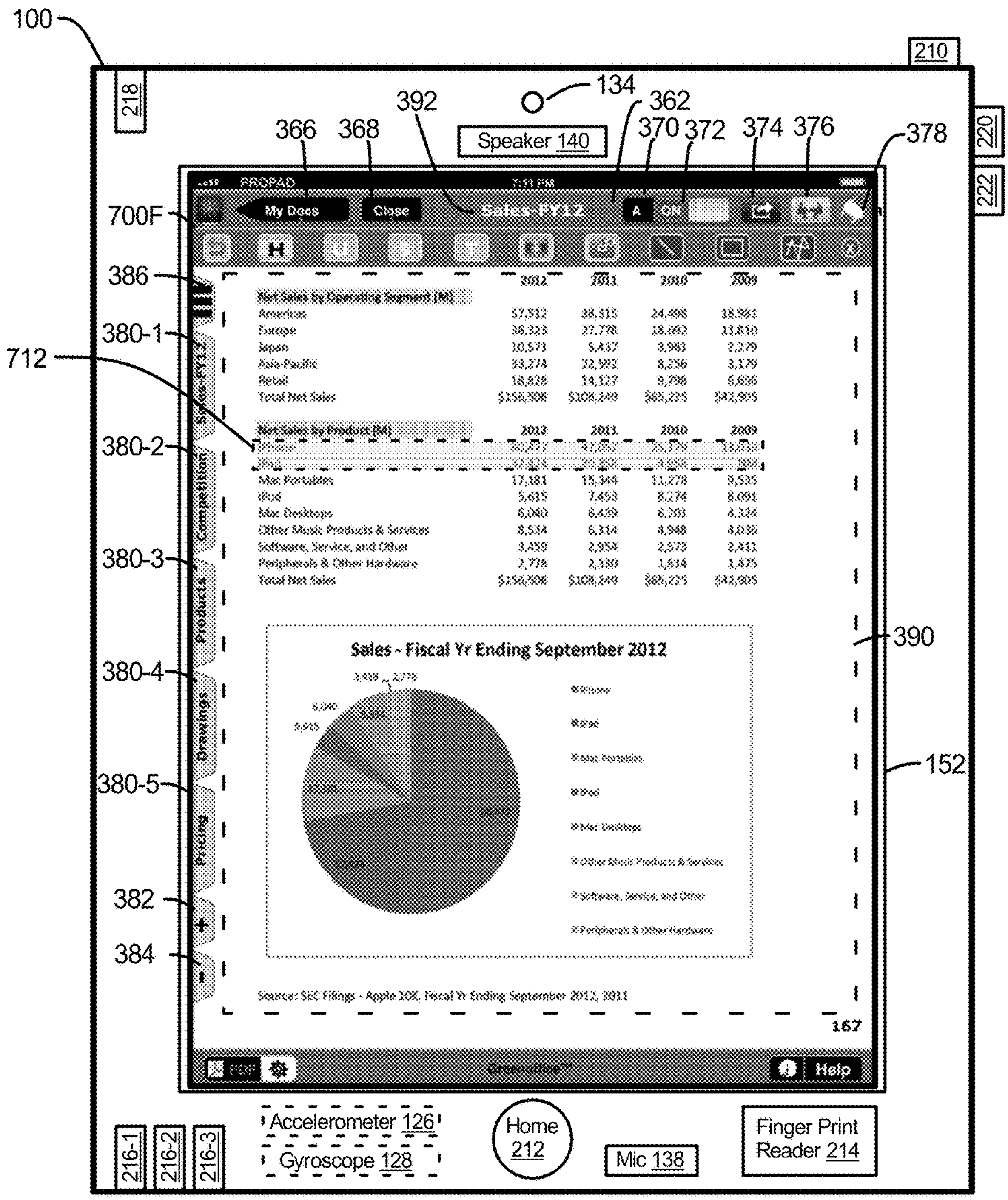

FIGS. 7A-7F illustrate exemplary user interfaces for annotating electronic documents in accordance with some embodiments. The worker will often wish to write while reading by annotating a doc. We can illustrate the application of the methods and UI to this use case with the example presented in FIGS. 7A-7F. In FIG. 7A the sequence begins with the user having opened a set of docs and having selected tab icon 380-1 to display the doc named "Sales FY-12". The device displays UI 700A (FIG. 7A). The user selects the annotation-enable-switch icon 372, and the device displays "ON", as shown in UI 700B (FIG. 7B). The device detects that the selected doc is not a PDF doc and displays UI 700B while creating a PDF doc to replace the doc "Sales-FY12.docx" with the PDF doc "Sales-FY12.pdf". The device links the tab named "Sales-FY12" to that PDF doc so that the doc can be conveniently annotated using a standard PDF file format. The device then displays UI 700C (FIG. 7C) with annotation enabled. The user then selects the text at location 706. The device then displays UI 700D (FIG. 7D) with selection location 708 shown and launches annotation toolbar 709. The user then extends the text selection to include two lines of text using an industry standard select-and-swipe motion from the top left corner of the selection area to the bottom right corner of the selection area. The device then displays UI 700E (FIG. 7E) with the extended selection area shown. The user then selects highlight-text-tool icon 710 on the annotation toolbar. The device displays UI 700F (FIG. 7F) with the selected text 712 highlighted. In those instances where the user wishes to use an annotation tool, such as a tool for drawing freehand lines, the user may select annotation-toolbar-launch icon 370 to launch the annotation toolbar in lieu of selecting the text to launch the toolbar. If a doc is annotated, then those annotations may be saved in a copy of the doc so that the user may retain the un-annotated original. Annotations to a doc can be saved even if a doc set, which may have been linked to the doc as a member of that doc set, is not saved.

FIGS. 8A-8I illustrate exemplary user interfaces for discussing electronic documents in real time with a colleague in accordance with some embodiments. The worker may wish to discuss a set of documents with a colleague. We can illustrate application of the methods and UI to this use case with the example presented in FIG. 8A-8I. In FIG. 8A, the sequence begins with the user (in this example named Phil Simms) having opened a set of docs and having selected tab icon 380-1 to display the doc named "Sales FY-12". The device displays UI 800A. The user selects discuss icon 376. The device displays UI 800B (FIG. 8B). The user selects "DocTalk" icon 804. The device displays UI 800C (FIG. 8C). The user selects "Jill Irving" icon 806. The device displays UI 800D (FIG. 8D), showing invitation bar 808 stating the invitation to Jill Irving to DocTalk. UI 800E (FIG. 8E) shows a UI on a similar device 100 belonging to Jill Irving, showing invitation bar 810 stating the invitation from Phil Simms to Jill Irving to DocTalk. Jill Irving accepts the invitation by selecting "Accept" icon 812. The device launches DocTalk toolbar/navigation bar 814 as shown in UI 800F (FIG. 8F). Returning to device 100 belonging to Phil Simms, the device has displayed UI 800G (FIG. 8G), which also now shows DocTalk toolbar/navigation bar 814. DocTalk toolbar/navigation bar 814 may include DocTalk start icon 818, and three icons that enable Phil to select the features that he is "Ready to Share". These sharing icons are "My Screen" icon 820 (which enables Jill to see Phil's screen in this example), "Navigation" icon 822 (which enables Jill to navigate on Phil's screen in this example), and "Annotation" icon 824 (which enables Jill to annotate on Phil's screen in this example). Each of the sharing icons incorporates an indicator that indicates if sharing of that feature has been selected. The UI also displays discussion-control toolbar 816 at the bottom of the UI that enables either user to end the session or to send an invitation to FaceTalk. Phil selects "My Screen" icon 820, "Navigation" icon 822, and "Annotation" icon 824, and then selects start icon 818 on Toolbar 814. After Phil has selected start icon 818, the device displays UI 800H (FIG. 8H). The indicator incorporated in "My Screen" icon 820 indicates that Phil is sharing his screen. The indicators incorporated in "Navigation" icon 822, and "Annotation" icon 824 also show that Phil is sharing both annotation and navigation with Jill. FIG. 8I shows the UI 800I on Jill's similar device 100 showing that the UI has displayed the same set of docs displayed on Phil's screen. The indicator incorporated in "PS's Screen" icon 828 indicates that Phil Simms (PS) is sharing his screen with Jill. The indicators incorporated in "Navigation" icon 822, and "Annotation" icon 824 also show that Phil is sharing both annotation and navigation with Jill.

FIGS. 9A-9C is a flow diagram illustrating a process for working with electronic documents in accordance with some embodiments. FIGS. 4A-4P, FIGS. 5A-5N, and FIGS. 6A-6N illustrate exemplary user interfaces for use in implementing the methods presented in the flow diagram shown in FIGS. 9A-9C. The flow diagram connects across the three pages.

FIGS. 10A-10C is a flow diagram illustrating a process for working with electronic documents that includes a method for treating the first item in a doc set in accordance with some embodiments. FIGS. 4A-4P, FIGS. 5A-5N, and FIGS. 6A-6N illustrate exemplary user interfaces for use in implementing the methods presented in the flow diagram shown FIGS. 10A-10C. The flow diagram connects across the three pages.

Figure 11A:
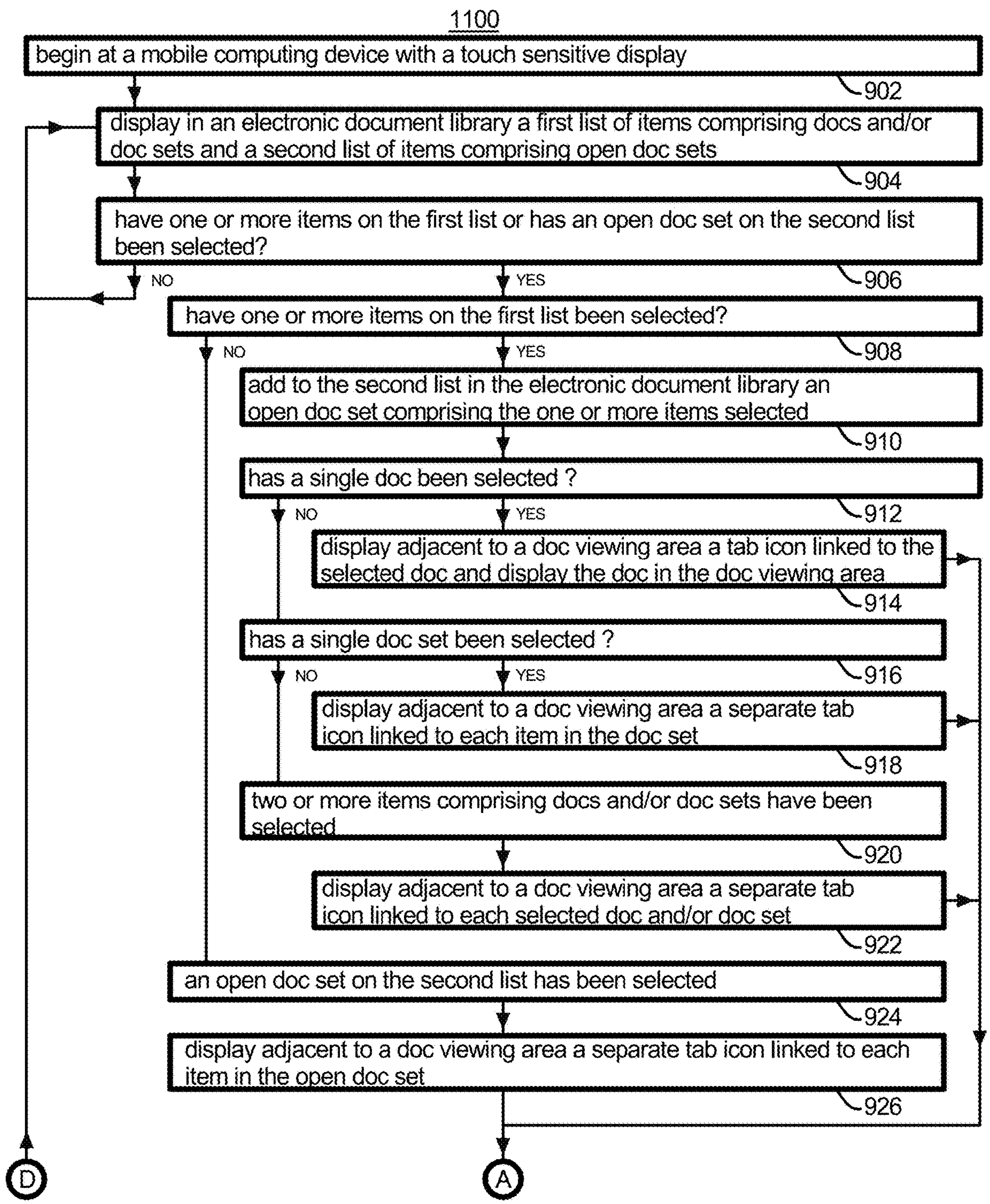
FIGS. 11A-11C is a flow diagram illustrating a process for working with electronic documents that includes methods for annotating a doc in a doc set in accordance with some embodiments.
Figure 11B:
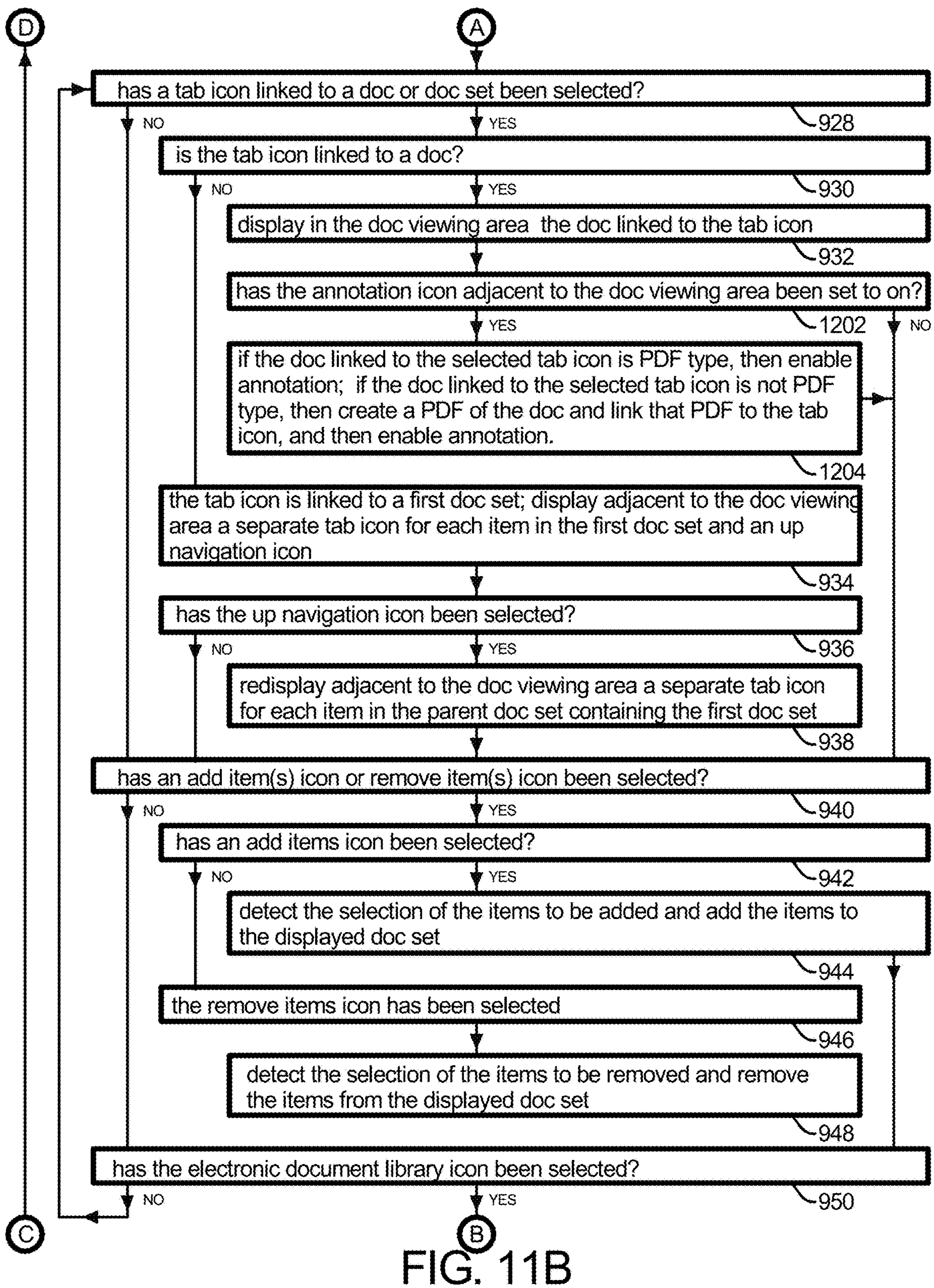
Figure 11C:
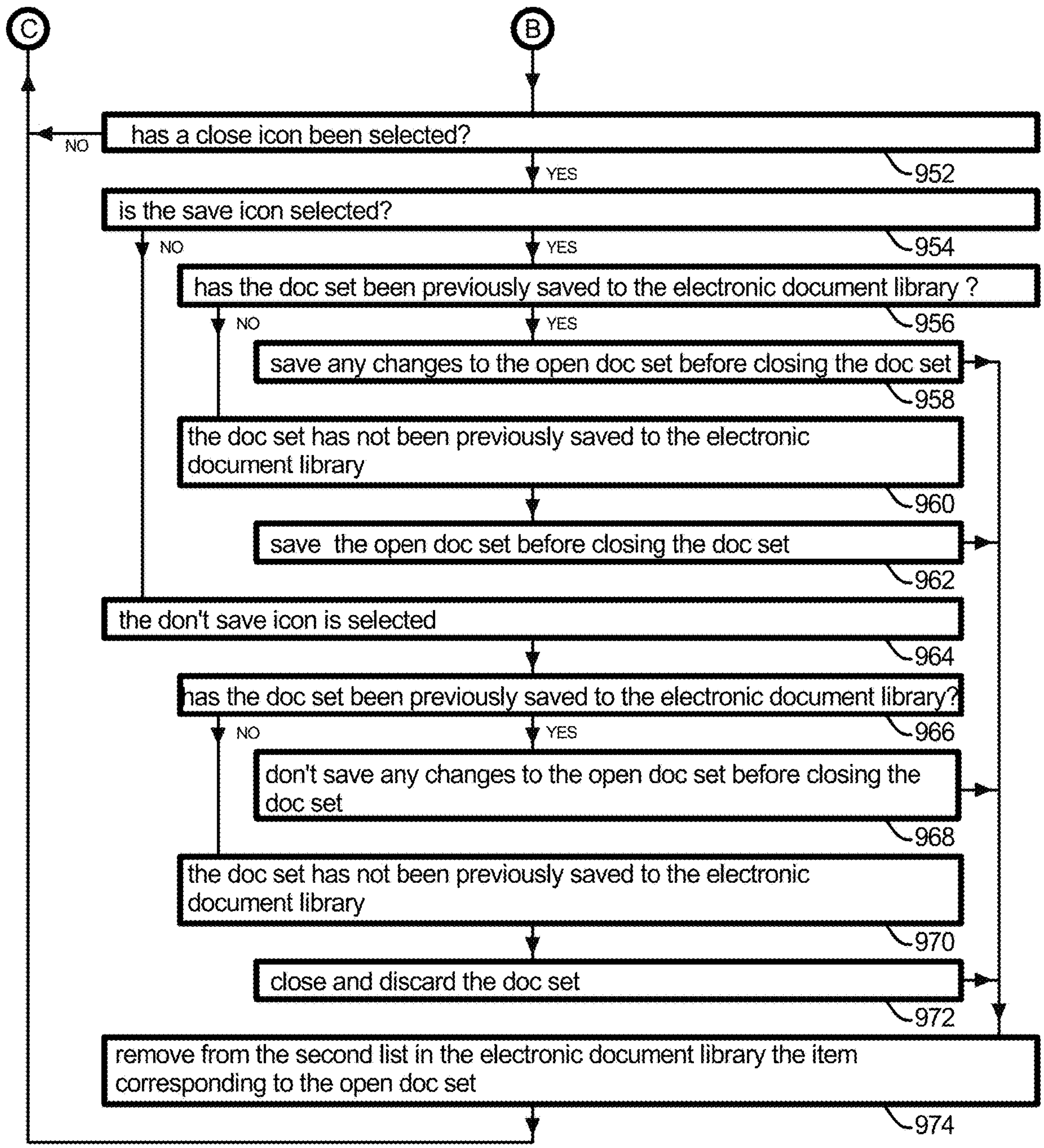
Figure 12A:
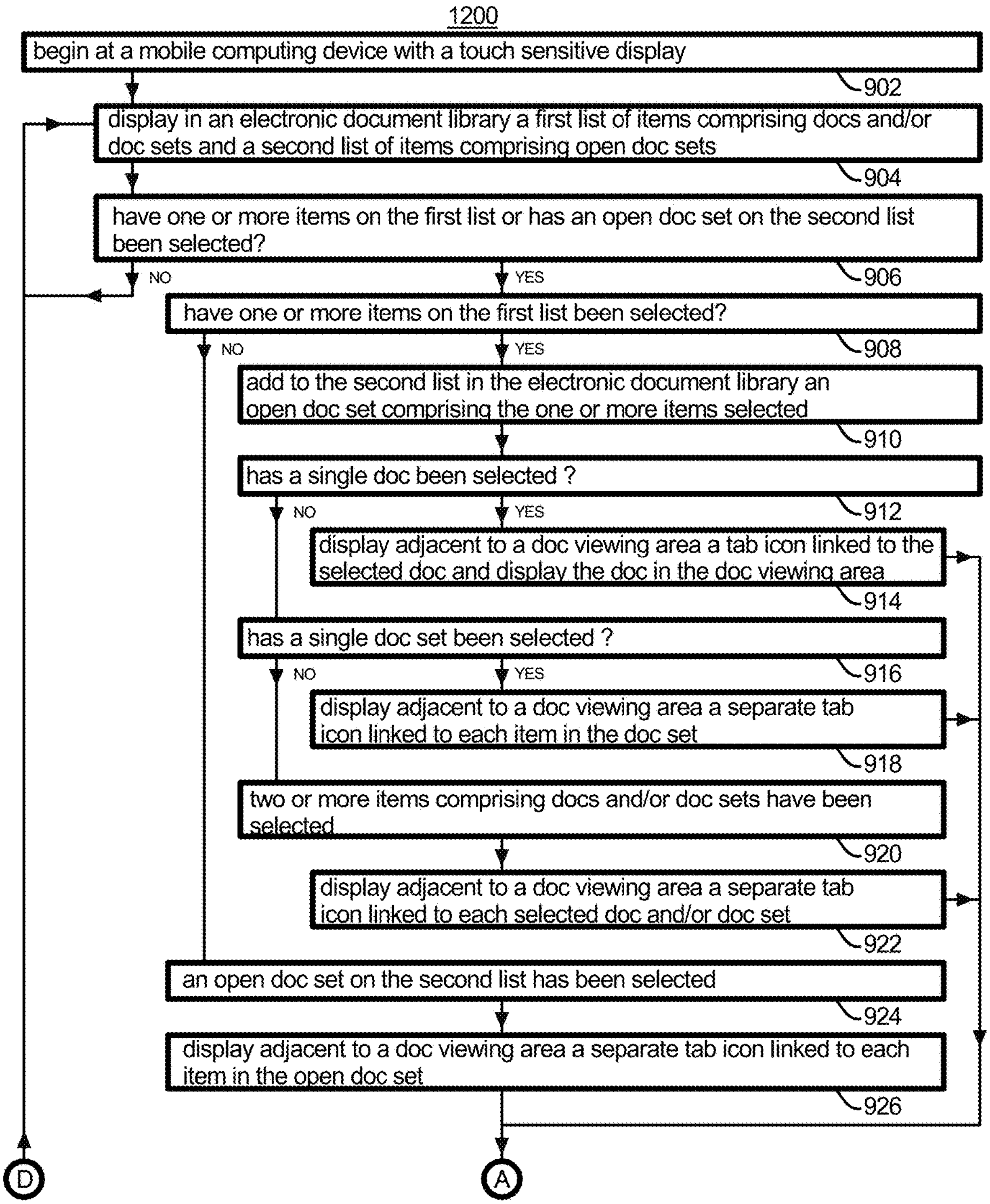
FIGS. 12A-12D is a flow diagram illustrating a process for working with electronic documents that includes methods for discussing a doc in a doc set in accordance with some embodiments.
Figure 12B:
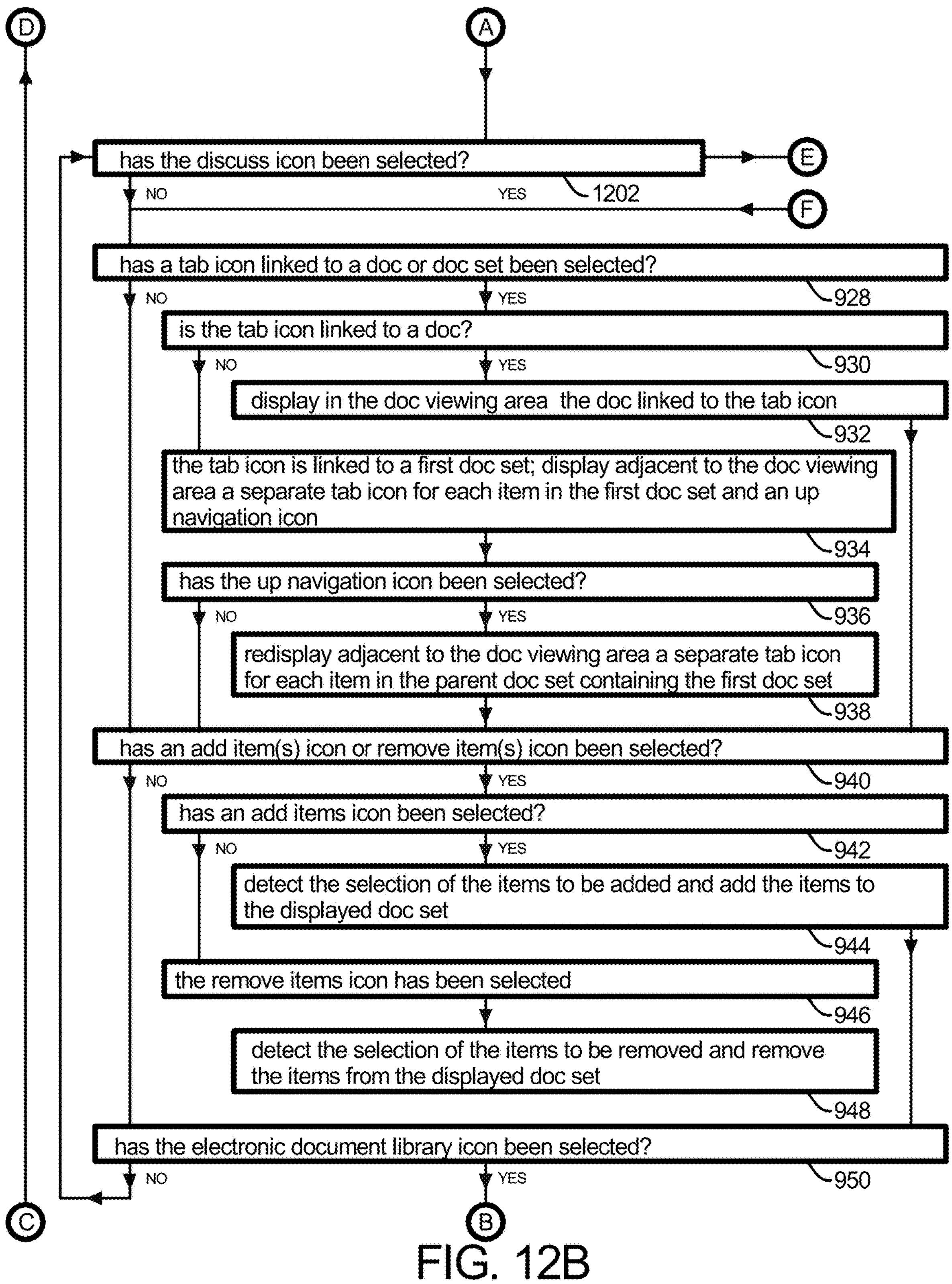
Figure 12C:
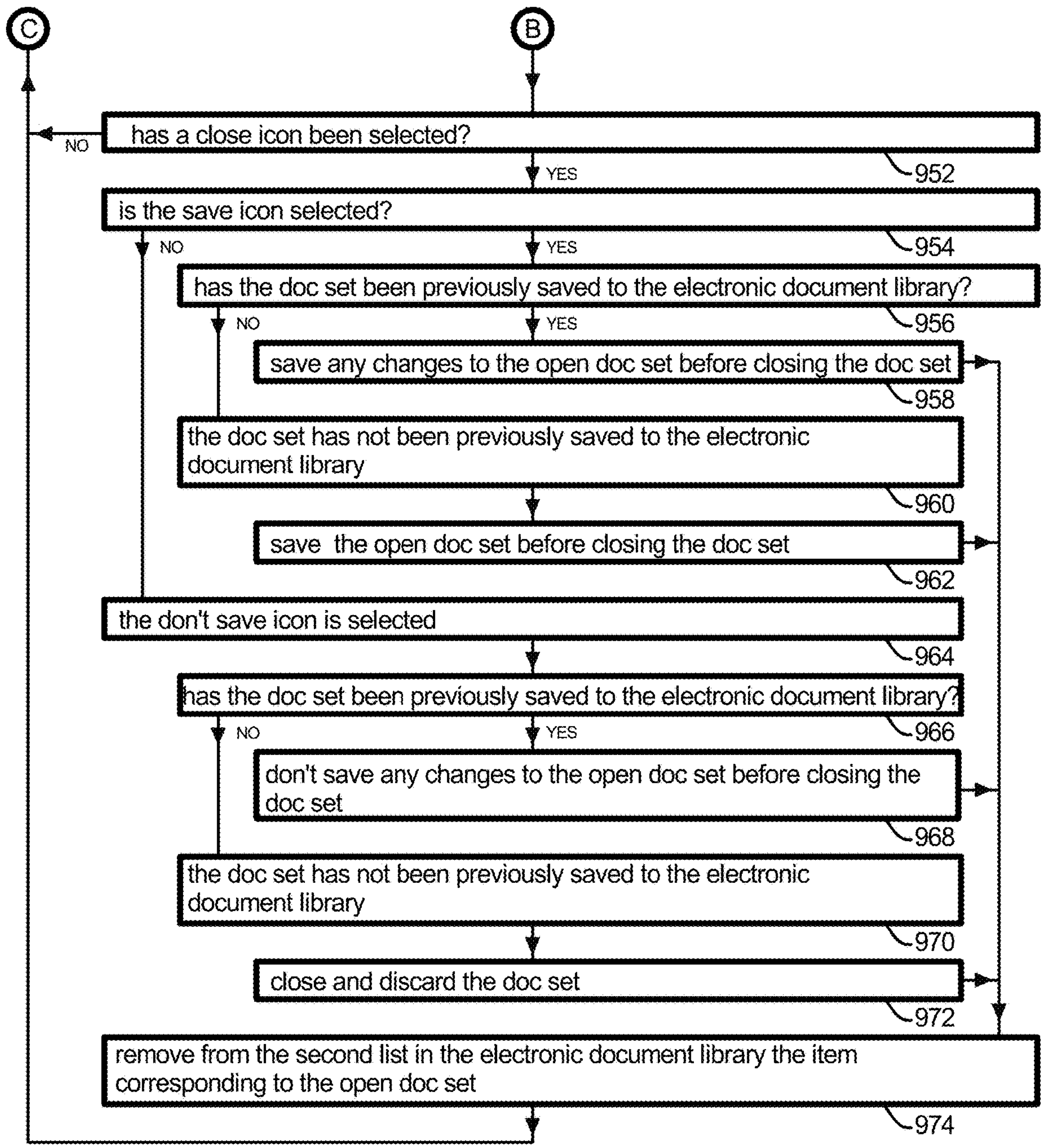
Figure 12D:
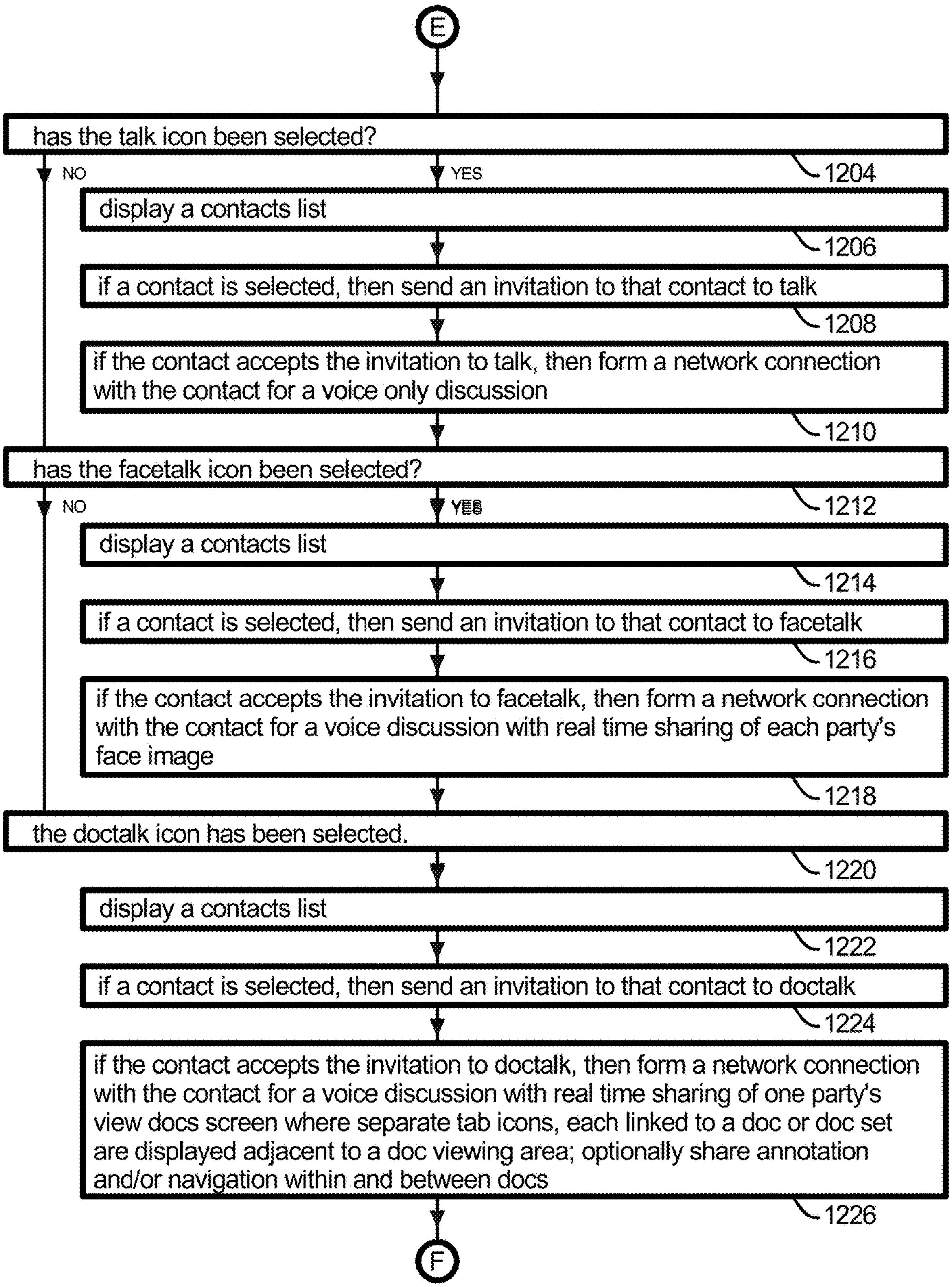
Figure 13A:
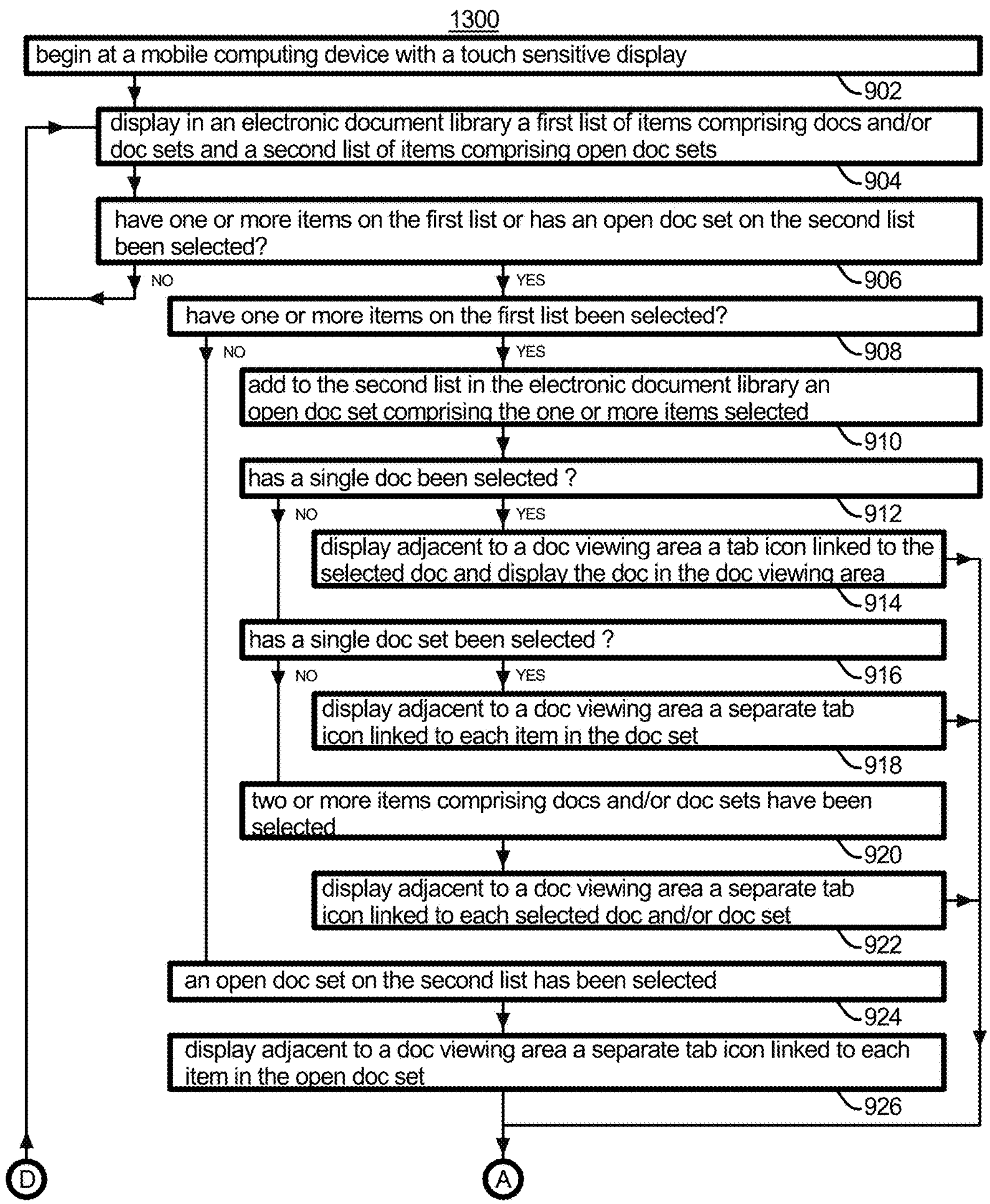
FIGS. 13A-13D is a flow diagram illustrating a process for working with electronic documents that includes methods for creating a new doc and adding that doc to a doc set in accordance with some embodiments.
Figure 13B:
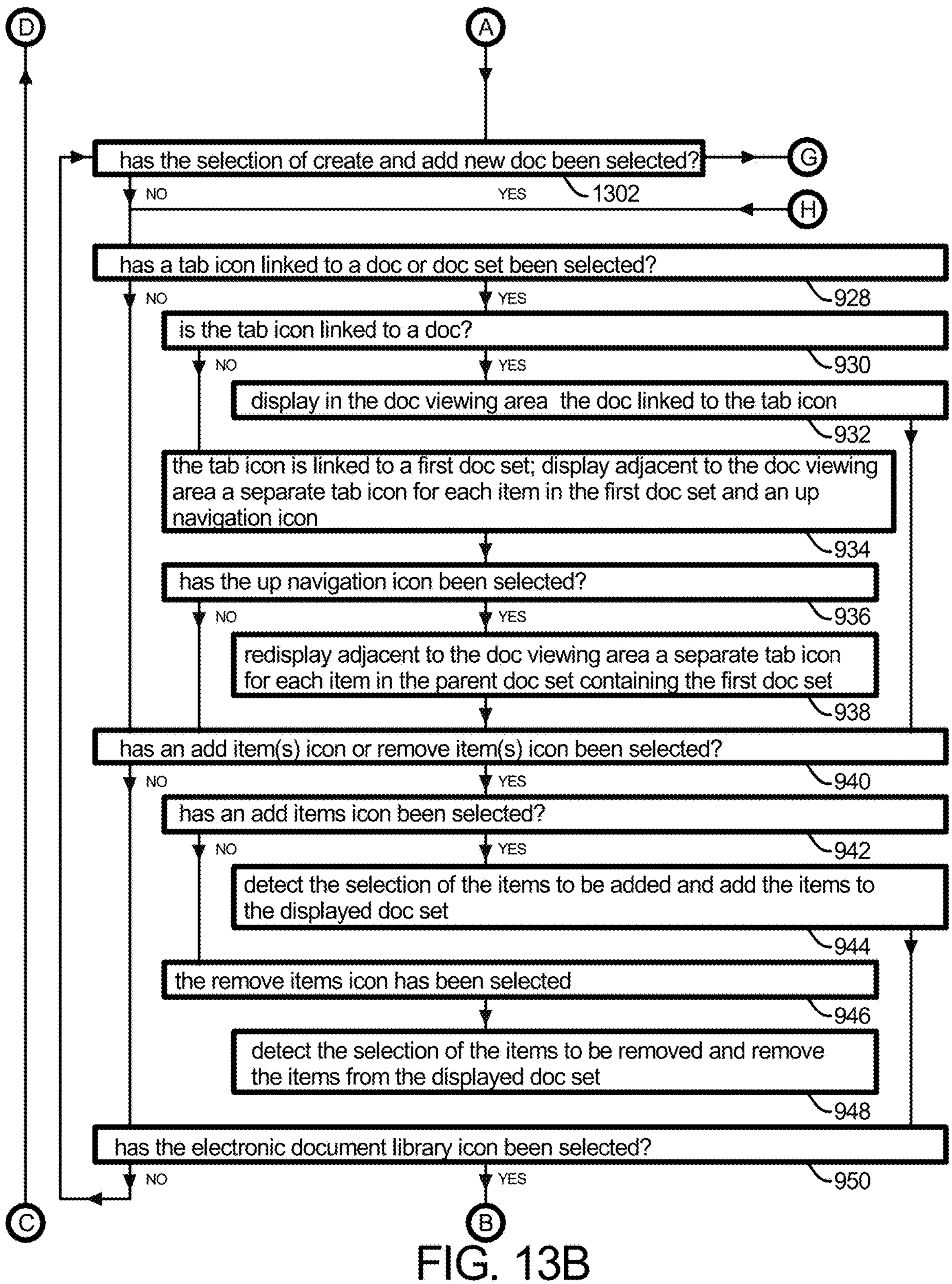
Figure 13C:
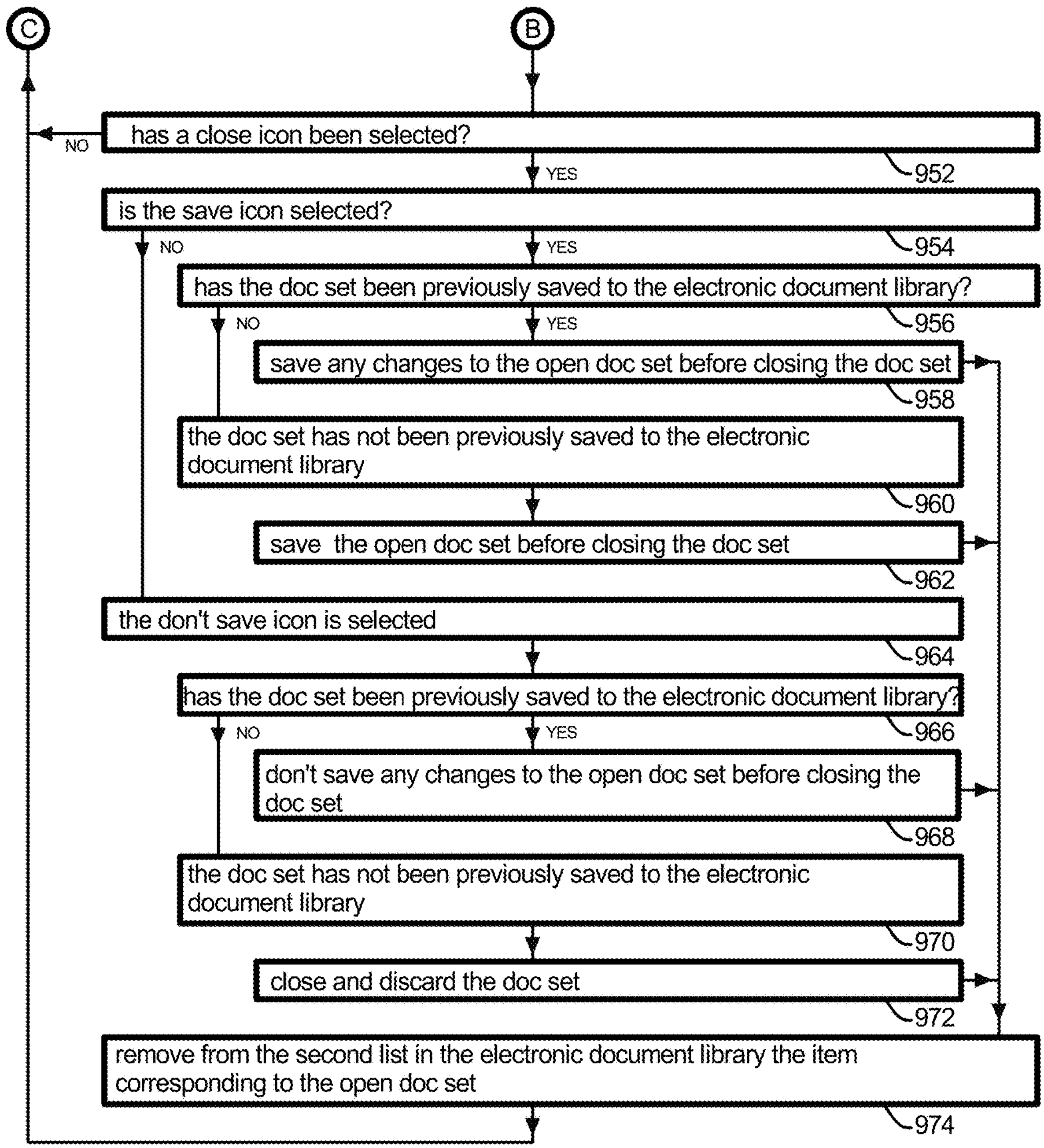
Figure 13D:
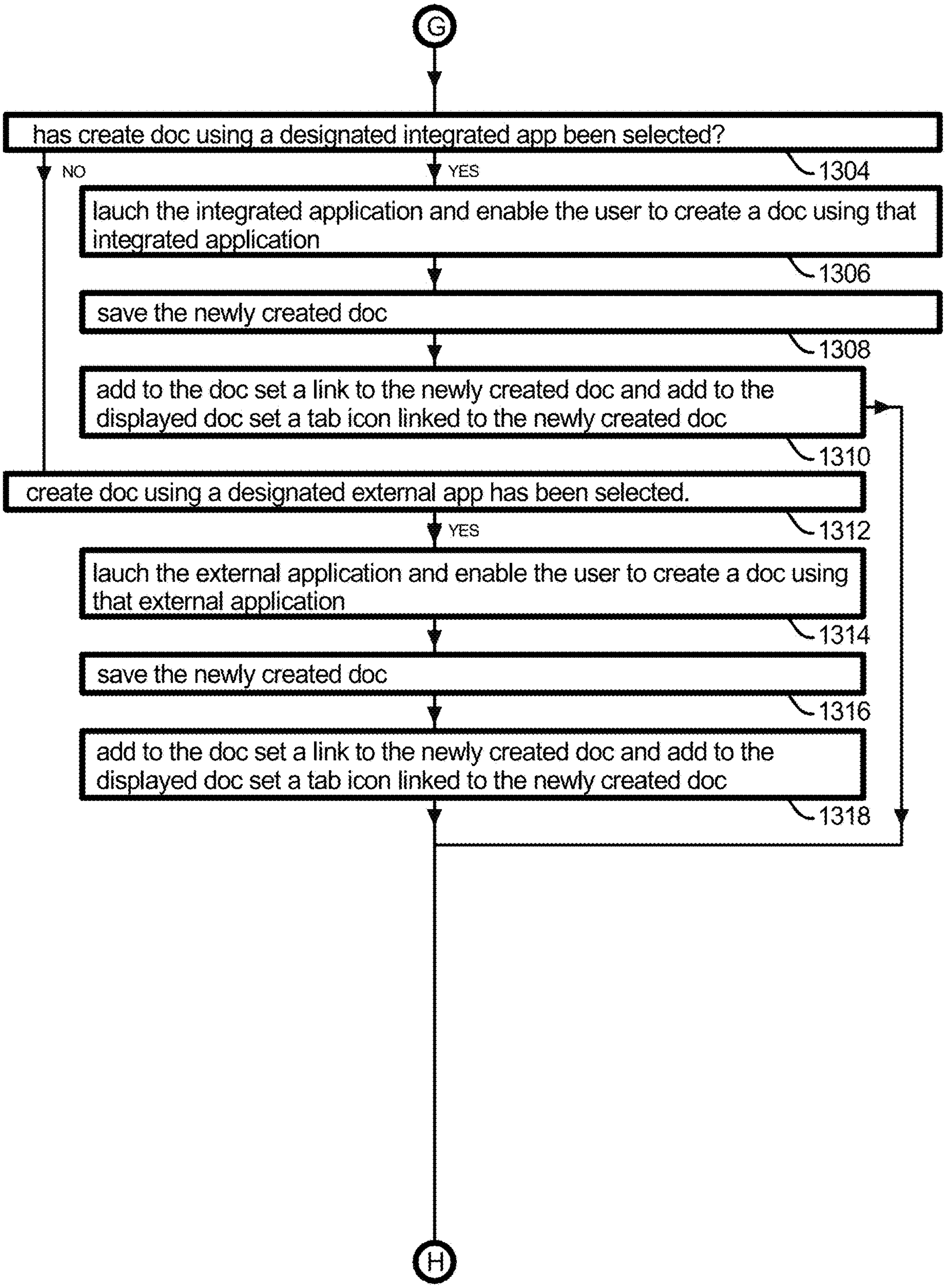

FIGS. 11A-11C is a flow diagram illustrating a process for working with electronic documents that includes a method for annotating a doc in a doc set in accordance with some embodiments. FIGS. 4A-4P, FIGS. 5A-5N, FIGS. 6A-6N, and FIGS. 7A-7F illustrate exemplary user interfaces for use in implementing the methods presented in the flow diagram shown in FIGS. 11A-11C. The flow diagram connects across the three pages.

FIGS. 12A-12D is a flow diagram illustrating a process for working with electronic documents that includes a method for discussing a doc in a doc set in accordance with some embodiments. FIGS. 4A-4P, FIGS. 5A-5N, FIGS. 6A-6N, and FIGS. 7A-7F, and FIGS. 8A-8I illustrate exemplary user interfaces for use in implementing the methods presented in the flow diagram shown in FIGS. 12A-12D. The flow diagram connects across the four pages. The section of the flow diagram on FIG. 12D connects to a section of the flow diagram on FIG. 12B.

FIGS. 13A-13D is a flow diagram illustrating a process for working with electronic documents that includes a method for creating a new doc and adding that doc to a doc set in accordance with some embodiments. FIGS. 4A-4P, FIGS. 5A-5N, and FIGS. 6A-6N illustrate exemplary user interfaces for use in implementing the methods presented in the flow diagram of FIGS. 13A-13D. The flow diagram connects across the four pages. The section of the flow diagram on FIG. 13D connects to a section of the flow diagram on FIG. 13B.

Figure 14A:
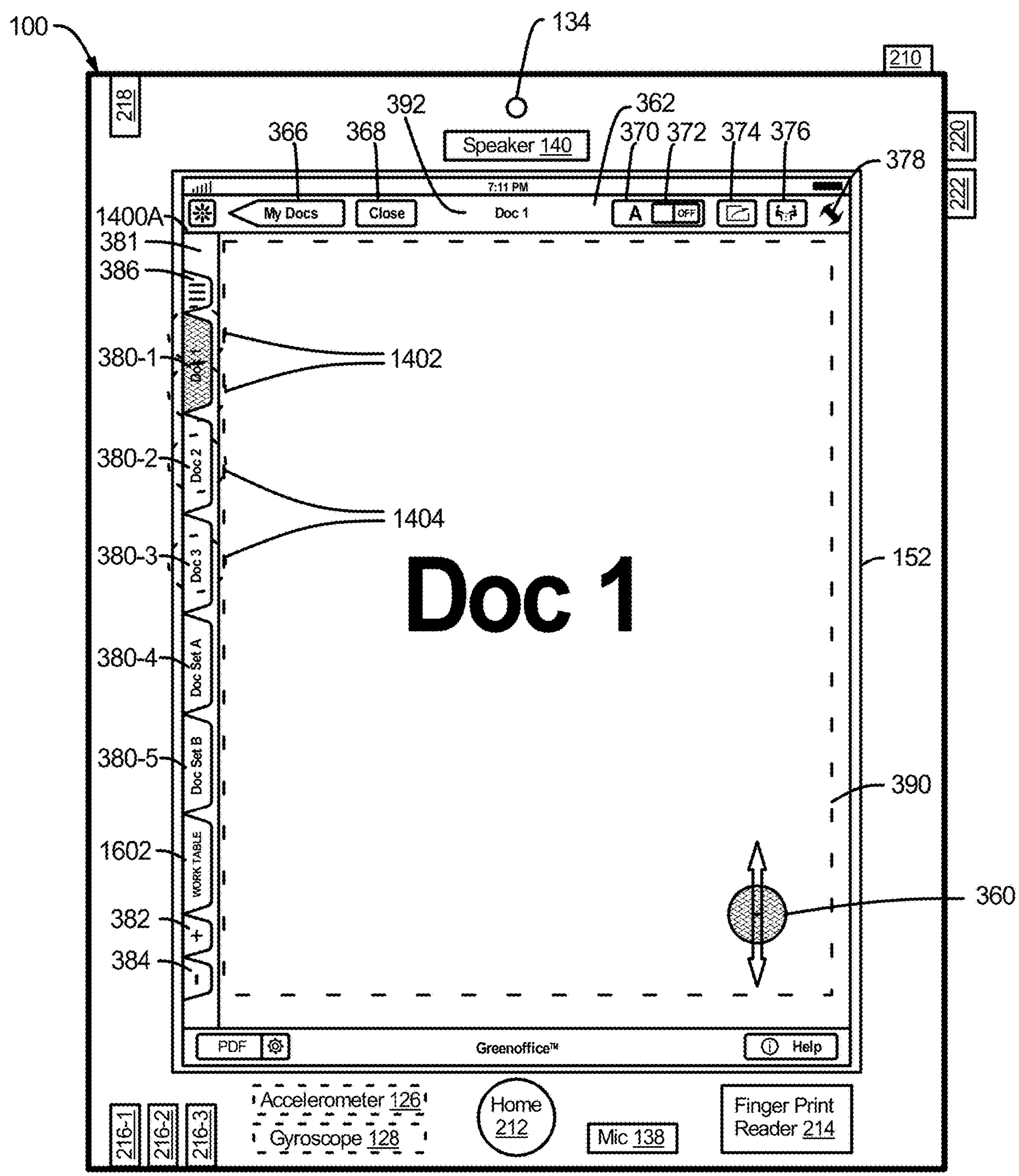
FIGS. 14A-14C illustrate exemplary user interfaces and methods for initiating split-screen viewing of docs using gestures on a touch-sensitive display in accordance with some embodiments.
Figure 14B:
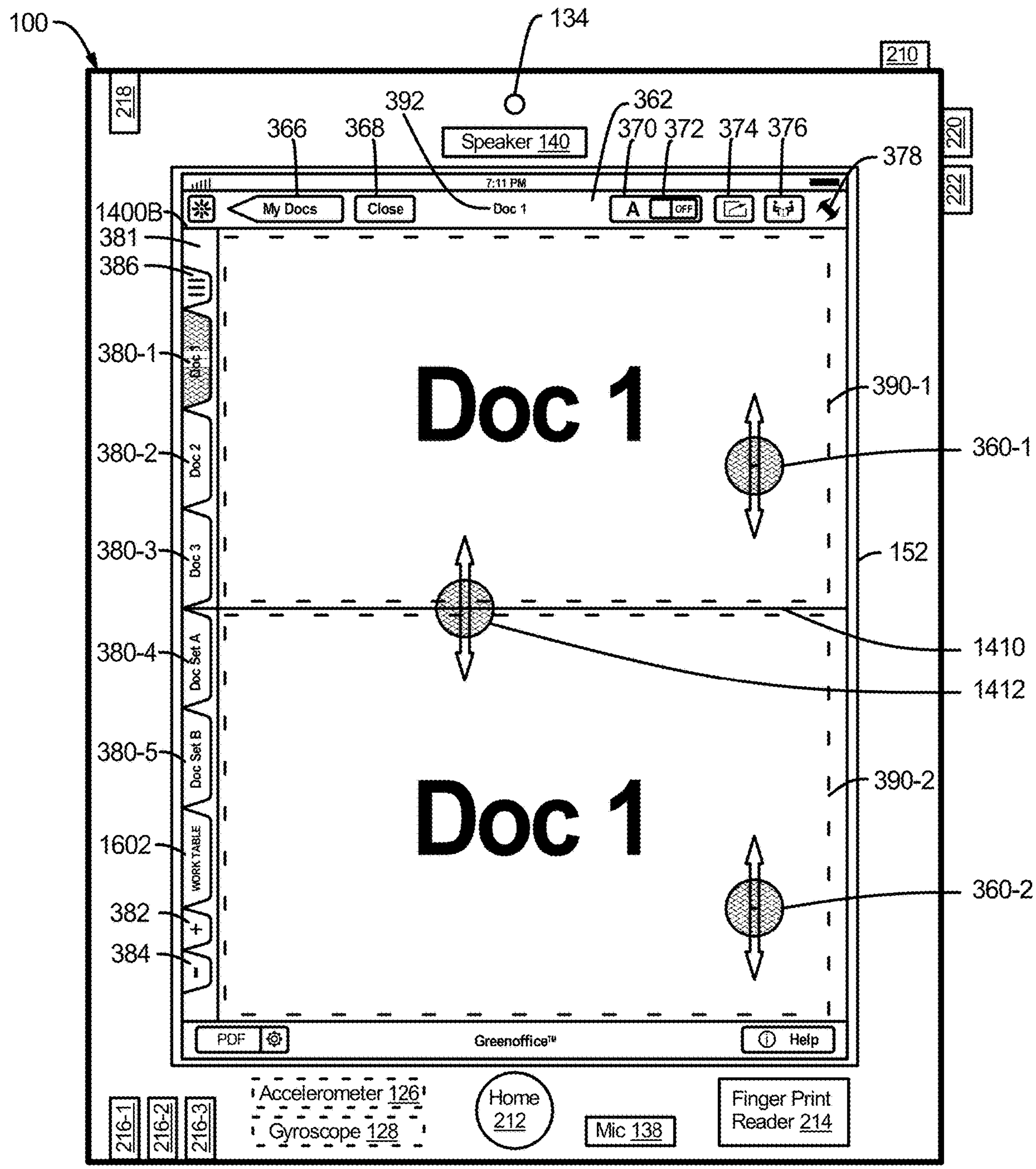
Figure 14C:
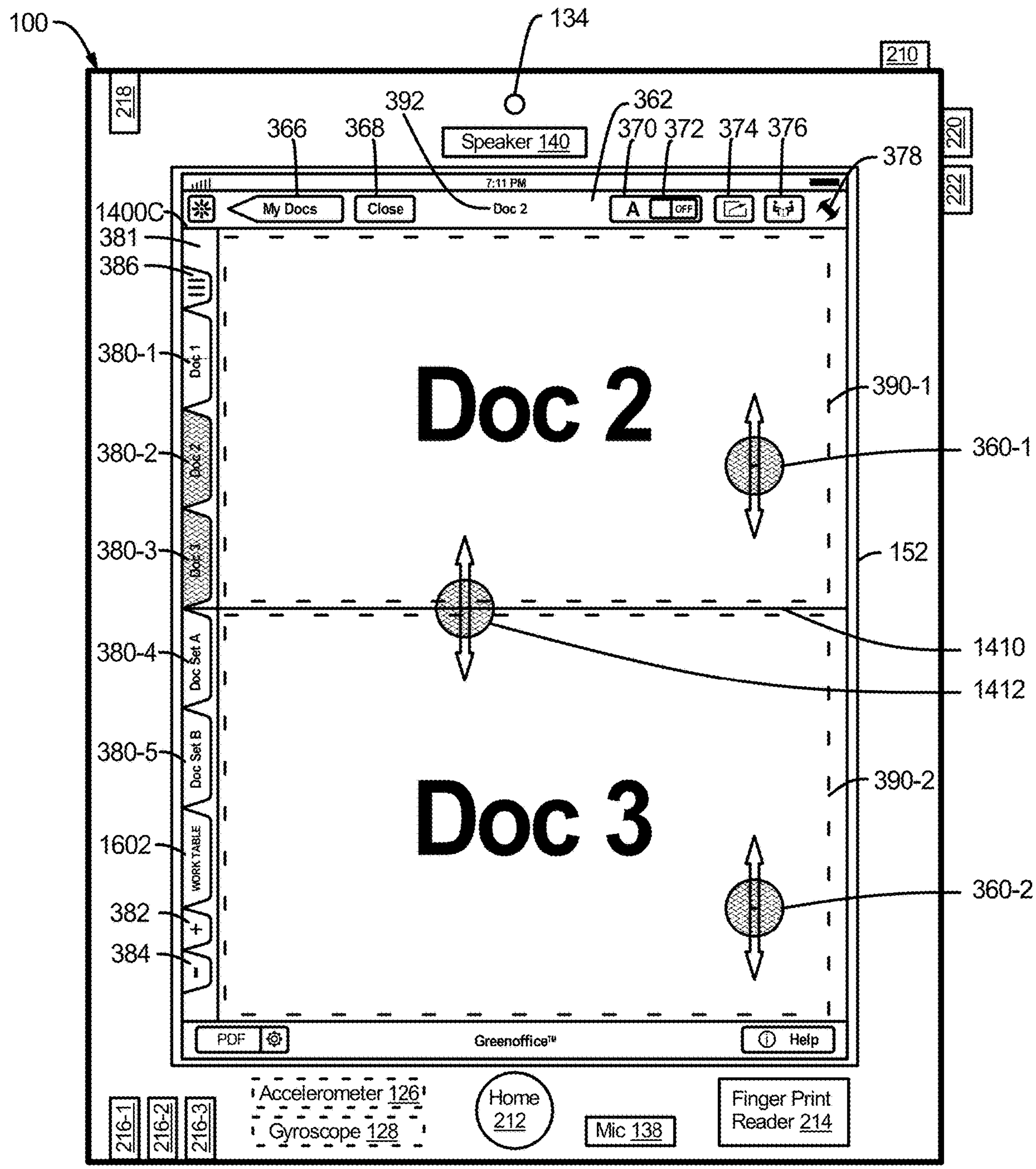

FIGS. 14A-14C illustrate exemplary user interfaces and methods for initiating split-screen viewing of docs using gestures on a touch-sensitive display in accordance with some embodiments.

A user will often find it useful to initiate a split screen view of a document to enable the user to read from two different locations within the same document. In addition, a user will often find it useful to initiate a split screen view to enable the user to read from two different documents. An exemplary user interface and method for initiating split screen viewing of docs using gestures on a touch sensitive display in accordance with some embodiments is illustrated in FIGS. 14A-14C. The device displays UI 1400A (FIG. 14A) with tab 380-1 linked to Doc 1, tab 380-2 linked to Doc 2, tab 380-3 linked to Doc 3, tab 380-4 linked to Doc Set A, tab 380-5 linked to Doc Set B.

In a first example starting from UI 1400A, a user may perform a two-finger tap gesture 1402 on tab 380-1 linked to Doc 1 to initiate a split screen view of Doc 1 as illustrated in FIG. 14A. The device displays UI 1400B (FIG. 14B) with Doc 1 displayed in split screen view with separate display regions 390-1 and 390-2. The device also displays tab 380-1 with two separate shaded regions to show that Doc 1 is being displayed in split screen view as illustrated in FIG. 14B. The user may then may scroll to a first desired location within the Doc 1 for viewing in display region 390-1 using an up or down slide finger gesture 1406. The user may scroll to a second desired location within the Doc 1 for viewing in display region 390-2 using an up or down slide finger gesture 1408. The user may adjust the position of split screen dividing line 1410 using a slide finger gesture 1412 on split screen dividing line 1410 to adjust the relative sizes of the display regions 390-1 and 390-2 to best support the needs of the user for a particular task.

The user may navigate to view another doc or doc set by performing a one-finger tap on the tab linked to that item. The user may then return to the split screen view of Doc 1 by performing a one-finger tap gesture on tab 380-1 linked to Doc 1. The user may exit from the split screen view of Doc 1 by performing a two-finger tap gesture 1402 on tab 380-1. The user may exit from the split screen view of Doc 1 and open a new split screen view of a new doc by performing a two-finger tap gesture on the tab icon linked to that new doc.

In a second example starting from UI 1400A, a user may perform a simultaneous tap gesture 1404 on tab 380-2 linked to Doc 2 and tab 380-3 linked to Doc 3 to initiate a split screen view of Doc 2 and Doc 3 as illustrated in FIG. 14A. The device displays UI 1400C (FIG. 14C) with Doc 2 and Doc 3 displayed in split screen view with Doc 2 displayed in region 390-1 and Doc 3 displayed in region 390-2. The device displays both tab 380-2 and tab 380-3 with shaded regions to show that Doc 2 and Doc 3 are being displayed in split screen view as illustrated in FIG. 14C. The user may then may scroll to a desired location within the Doc 2 for viewing in display region 390-1 using an up or down slide finger gesture 1406. The user may scroll to a desired location within the Doc 3 for viewing in display region 390-2 using an up or down slide finger gesture 1408. The user may adjust the position of split screen dividing line 1410 using an up or down slide finger gesture 1412 on split screen dividing line 1410 to adjust the relative sizes of the display regions 390-1 and 390-2 to best support the needs of the user for a particular task. In another embodiment, the user not only may change the vertical position of the split screen dividing line 1410 by moving the dividing line using a one finger slide or drag gesture on dividing line 1410, but also may also change the orientation and position of the split screen dividing line from horizontal to vertical, or any position in between, using a two finger rotation gesture or a drag gesture on dividing line 1410.

The user may navigate to view another doc or doc set by performing a one-finger tap on the tab linked to that item. The user may then return to the split screen view of Doc 2 and Doc 3 by performing a one-finger tap gesture on tab 380-2 or tab 380-3. The user may exit from the split screen view of Doc 2 and Doc 3 by performing a simultaneous tap gesture 1404 on tab 380-2 and tab 380-3. The user may exit from the split screen view of Doc 2 and Doc 3 and open a new split screen view of a new doc by performing a two-finger tap gesture on the tab icon linked to that new doc.

In another example embodiment, the user not only may change the vertical position of the split screen dividing line 1410 by moving the dividing line using a one finger slide or drag gesture on dividing line 1410, but also may also change the orientation and position of the split screen dividing line from horizontal to vertical, or any position in between, using a two finger rotation gesture or a drag gesture on dividing line 1410.

Figure 15A:
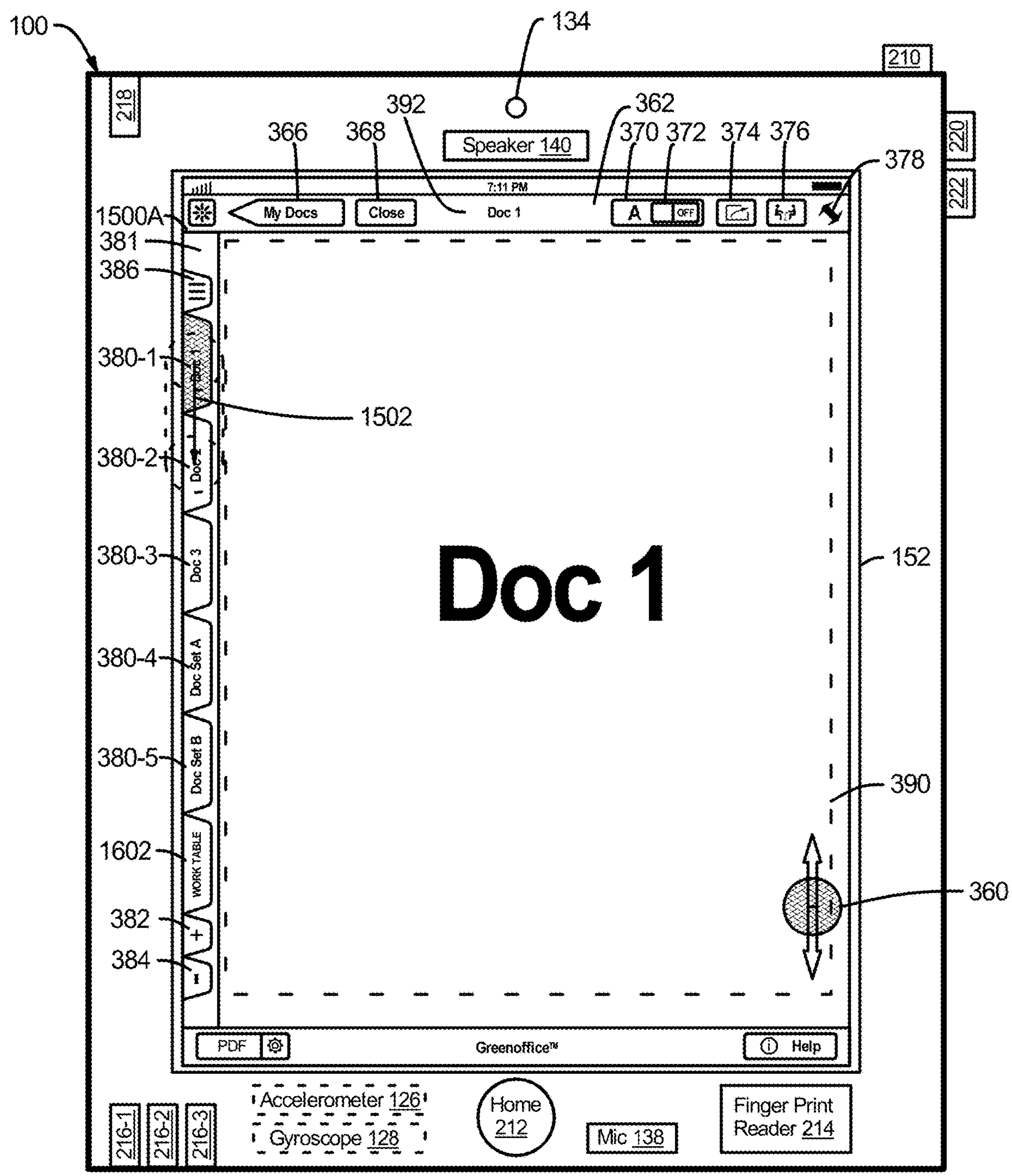
FIGS. 15A-15C illustrate exemplary user interfaces and methods for moving docs into doc sets using gestures on a touch-sensitive display in accordance with some embodiments.
Figure 15B:
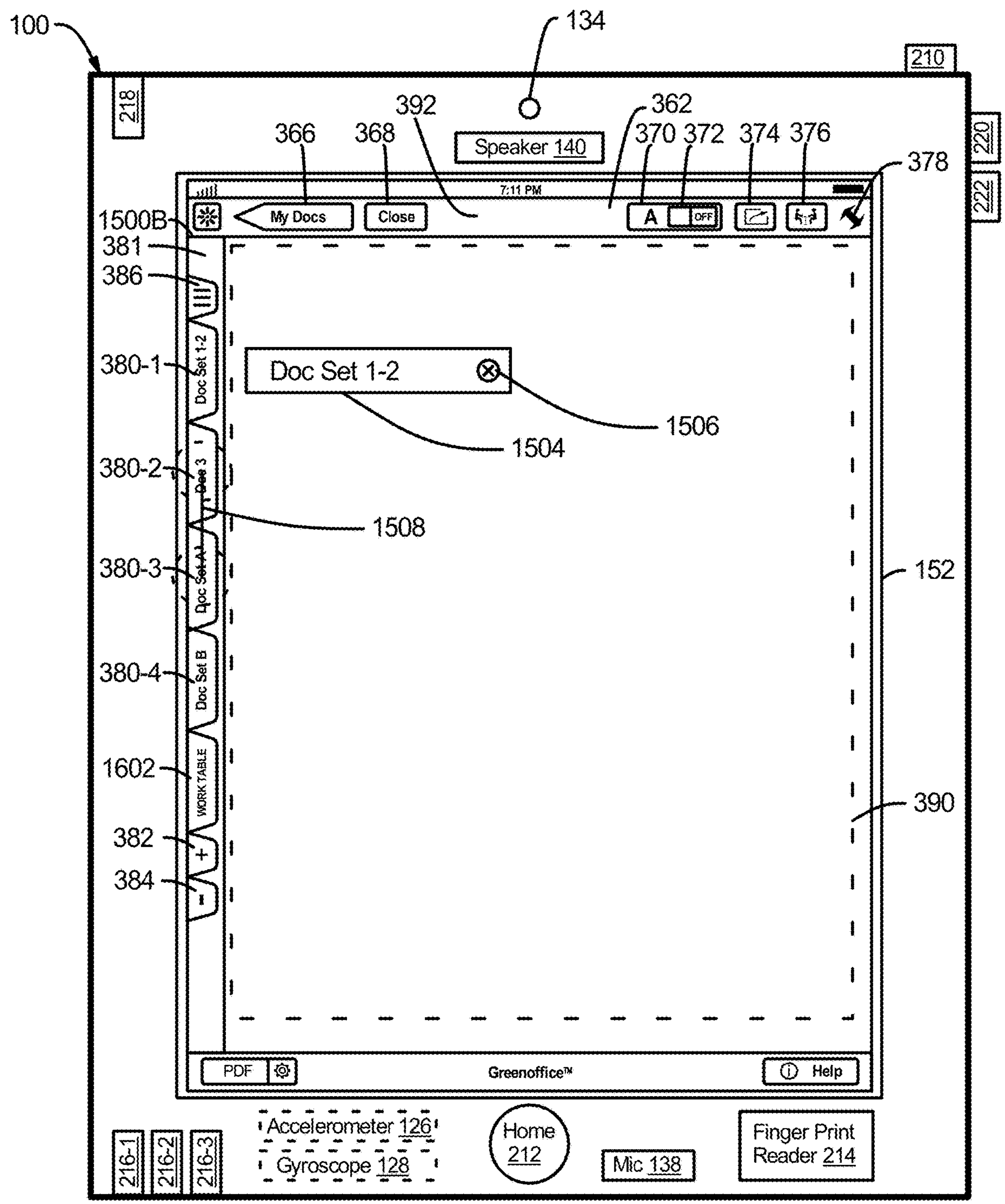
Figure 15C:
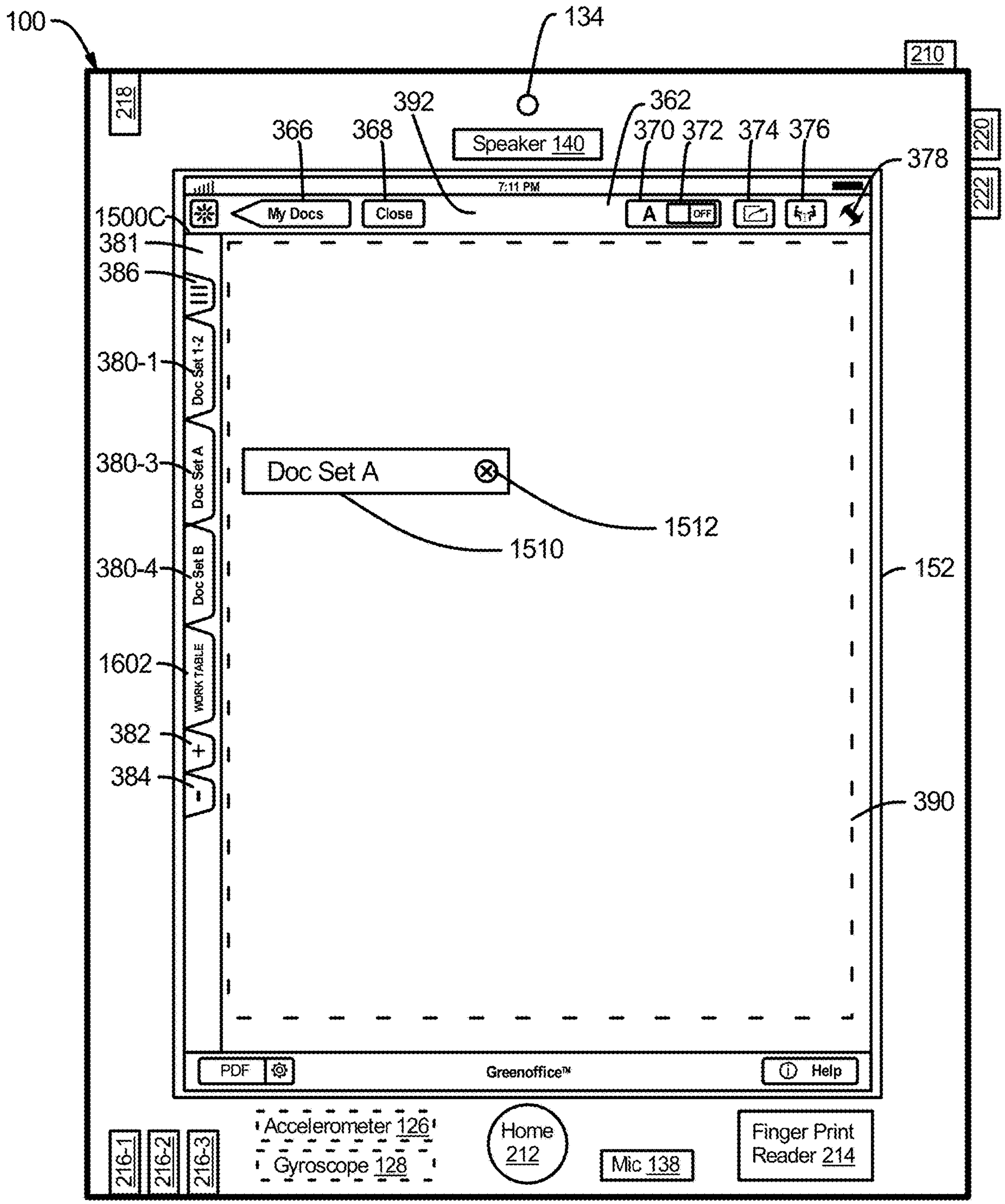

FIGS. 15A-15C illustrate exemplary user interfaces and methods for moving docs into doc sets using gestures on a touch-sensitive display in accordance with some embodiments. A user will often find it useful to move items into doc sets directly from the View Docs UI using items (docs and doc sets) previously selected for viewing in the View Docs UI. A user may wish to move two or more items into a new doc set and specify the name for the doc set. Alternatively, a user may wish to move one or more items into an existing doc set. The user may wish to keep that existing doc set name, or change the name of that existing doc set. An exemplary user interface and methods for moving docs into doc sets using gestures on a touch-sensitive display in accordance with some embodiments is illustrated in FIGS. 15A-15C. The device displays UI 1500A (FIG. 15A) with tab 380-1 linked to Doc 1, tab 380-2 linked to Doc 2, tab 380-3 linked to Doc 3, tab 380-4 linked to Doc Set A, tab 380-5 linked to Doc Set B.

In a first example starting from UI 1500A, a user may perform a slide (drag) gesture 1502 from tab 380-1 linked to Doc 1 to tab 380-2 linked to Doc 2 to move Doc 1 and Doc 2 into a new doc set as illustrated in FIG. 15A. The device displays UI 1500B (FIG. 15B) with tab 380-1 linked to new DocSet 1-2 containing Doc 1 and Doc 2, tab 380-2 linked to Doc 3, tab 380-3 linked to Doc Set A, and tab 380-4 linked to Doc Set B. The device also displays the system assigned doc set name Doc Set 1-2 in item name box 1506 to enable the user to enter a user-preferred name for the doc set. It the user wishes to keep the system assigned name, the user performs a one-finger tap gesture at any location within content region 390 that is not on item name box 1506 to hide item name box 1506. The user may enter a new name by performing a tap gesture on close icon 1508 to remove the existing name and launch keyboard 510 (not shown) for entering a new name. The user may move additional items into this new doc set using a similar slide finger gesture starting from the tab icon linked to that item and ending at the tab icon 380-1.

In a second example starting from UI 1500A, a user may perform a slide (drag) gesture 1504 from tab 380-3 linked to Doc 3 to tab 380-4 linked to Doc Set A to move Doc 3 into existing doc set Doc Set A as illustrated in FIG. 15A. The device displays UI 1500C (FIG. 15C) with tab 380-1 linked to Doc 1, tab 380-2 linked to Doc 2, tab 380-3 linked to Doc Set A with new item Doc 3 included, and tab 380-4 linked to Doc Set B. The device also displays the current doc set "Doc Set A" in item name box 1510 to enable the user to change the name for that existing doc set. It the user wishes to keep the current name, the user performs a one-finger tap gesture at any location within content region 390 that is not on item name box 1510 to hide item name box 1510. The user may enter a new name by performing a tap gesture on close icon 1512 to remove the existing name and launch keyboard 510 (not shown) for entering a new name. The user may move additional items into that existing doc set using a similar slide finger gesture starting from the tab icon linked to that item and ending at the tab icon 380-3.

Exemplary graphical user interfaces and methods for working with docs and doc sets using a virtual worktable are illustrated in FIGS. 16A-16F, 17A-17L, and 18A-18H as outlined below. We begin with an introduction to some example tasks that may be conveniently and efficiently completed using a virtual worktable.

To better serve a particular task, a user may find it useful to change the way items are organized for viewing in the View Docs UI. For example, a user may decide that an item should be moved from the set of items for viewing in the View Docs UI to a virtual worktable. A user may move an item to the virtual worktable for a host of reasons. In one example, an item may be moved because the item is of secondary importance to the task at hand. In another example an item may be moved because the item is of undetermined importance to the task at hand. The worktable is always accessible no matter what tab has been selected within the doc set hierarchical tree structure. Accordingly, in another example, a user may move one or more items to the worktable to enable access to that item with a single tap from any level within the hierarchy. In another example, a user may move items to the worktable to facilitate organizing those items in a new way. This includes, but is not limited to, enabling a user to divide a doc set into two doc sets, removing an item from one doc set and adding that item to another doc set, and forming a new doc set. This also includes enabling a user to move items from one level of the hierarchical tree structure to another level of the hierarchy.

These needs, and many other similar needs, can be served using the worktable. Some examples are presented in FIGS. 16A-16F, FIGS. 17A-17L, and FIGS. 18A-18H.

FIGS. 16A-16F illustrate exemplary user interfaces and methods for working with docs and doc sets using a virtual worktable in accordance with some embodiments. A user may move an item from the set of items for viewing in the View Docs UI to a virtual worktable. In one example, starting from UI 1600A (FIG. 16A), a user may perform a slide gesture 1604 from tab 380-2 linked to Doc 2 to tab 1602 linked to worktable 1606. The device displays UI 1600B (FIG. 16B) showing worktable 1606, icon 1608 linked to Doc 2, and tab 380-1 no longer linked to Doc 2. UI 1600B (FIG. 16B) includes worktable toolbar 1620 located at the top of the UI, item tab bar 381 comprising tab 380-1 linked to Doc 1, tab 380-2 linked to Doc 3, tab 380-3 linked to Doc Set A, tab 380-4 linked to Doc Set B, and tab 1602 linked to worktable 1606. Since tab 380-5 is no longer linked to an item, it is not displayed in UI 1600B. The item Doc 2 once linked to a tab icon on the item tab bar is now liked to an icon on worktable 1606. Worktable toolbar 1620 includes screen-brightness-control icon 364, single-window-view icon 1622, left/right split-window-view icon 1623, top/bottom split-window-view icon 1624, make-new-doc-set icon 1626, add-item(s)-from-My-Docs icon 1628, undo icon 1630, and edit icon 1632. The UI for worktable 1606 also includes "Back" navigation icon 1607-1 and "Forward" navigation icon 1607-2. The user may select these icons to navigate back and forward between the recent views of worktable 1606.

Figure 16A:
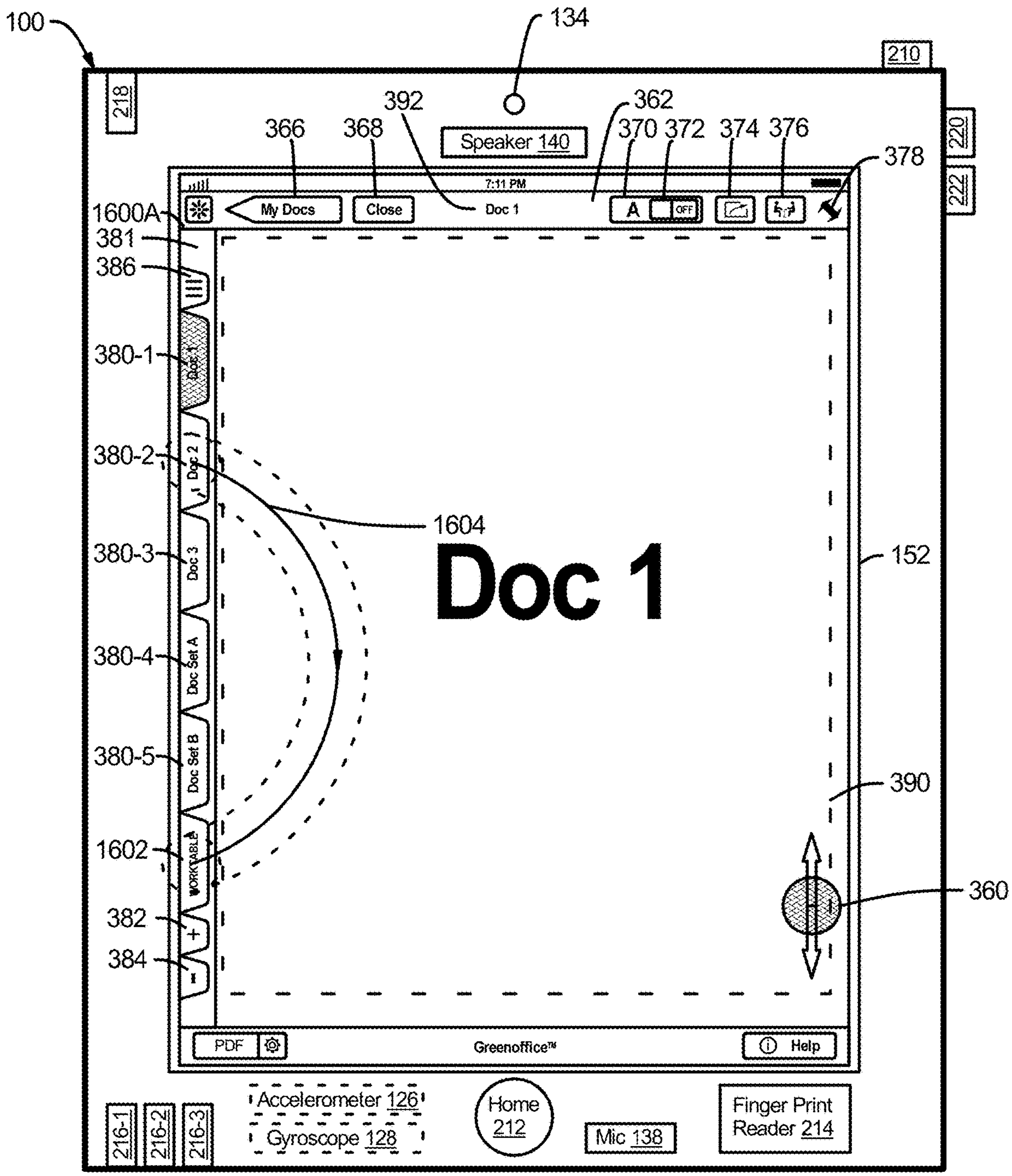
FIGS. 16A-16F illustrate exemplary user interfaces and methods for working with docs and doc sets using a virtual worktable in accordance with some embodiments.
Figure 16B:
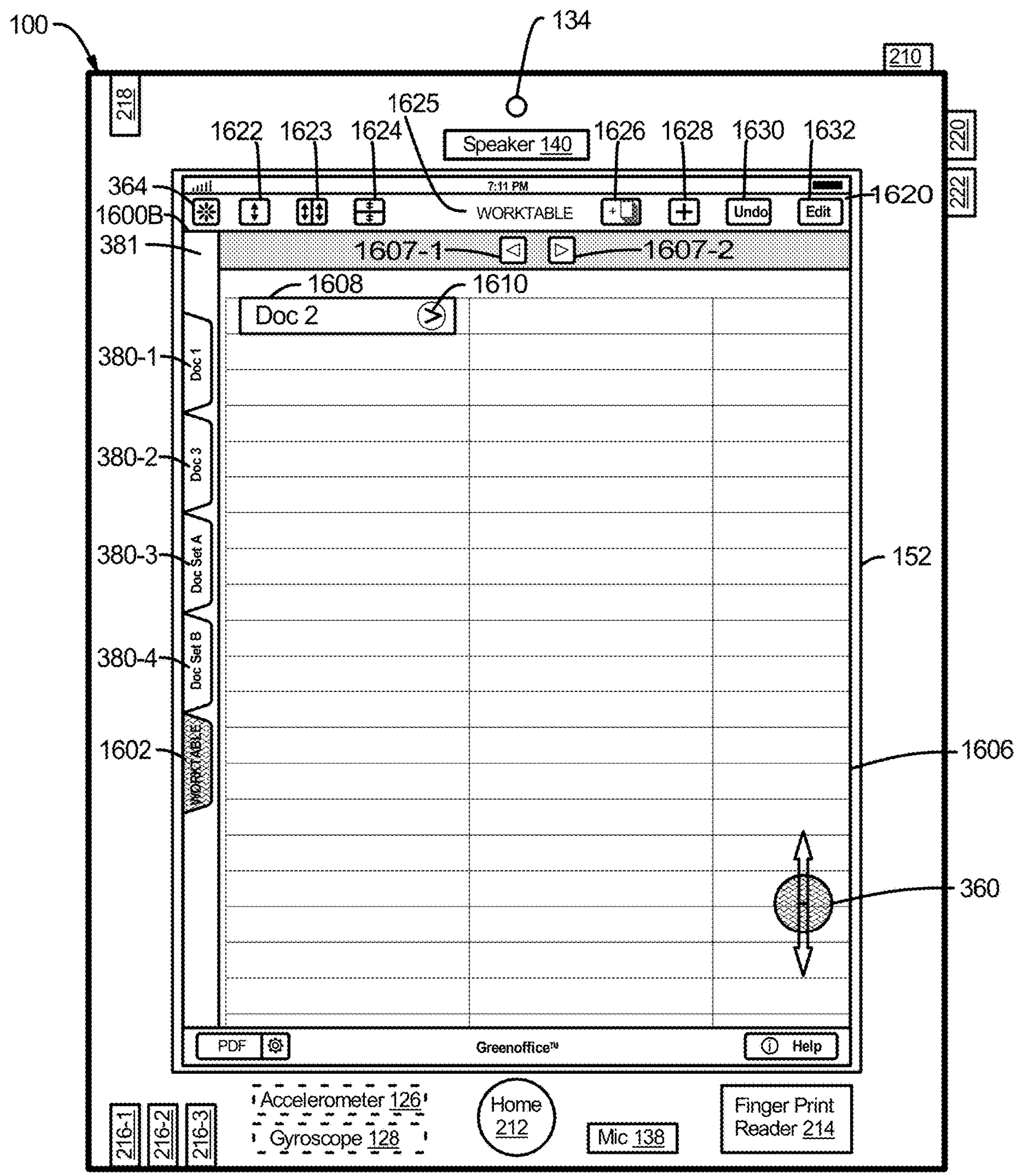
Figure 16C:
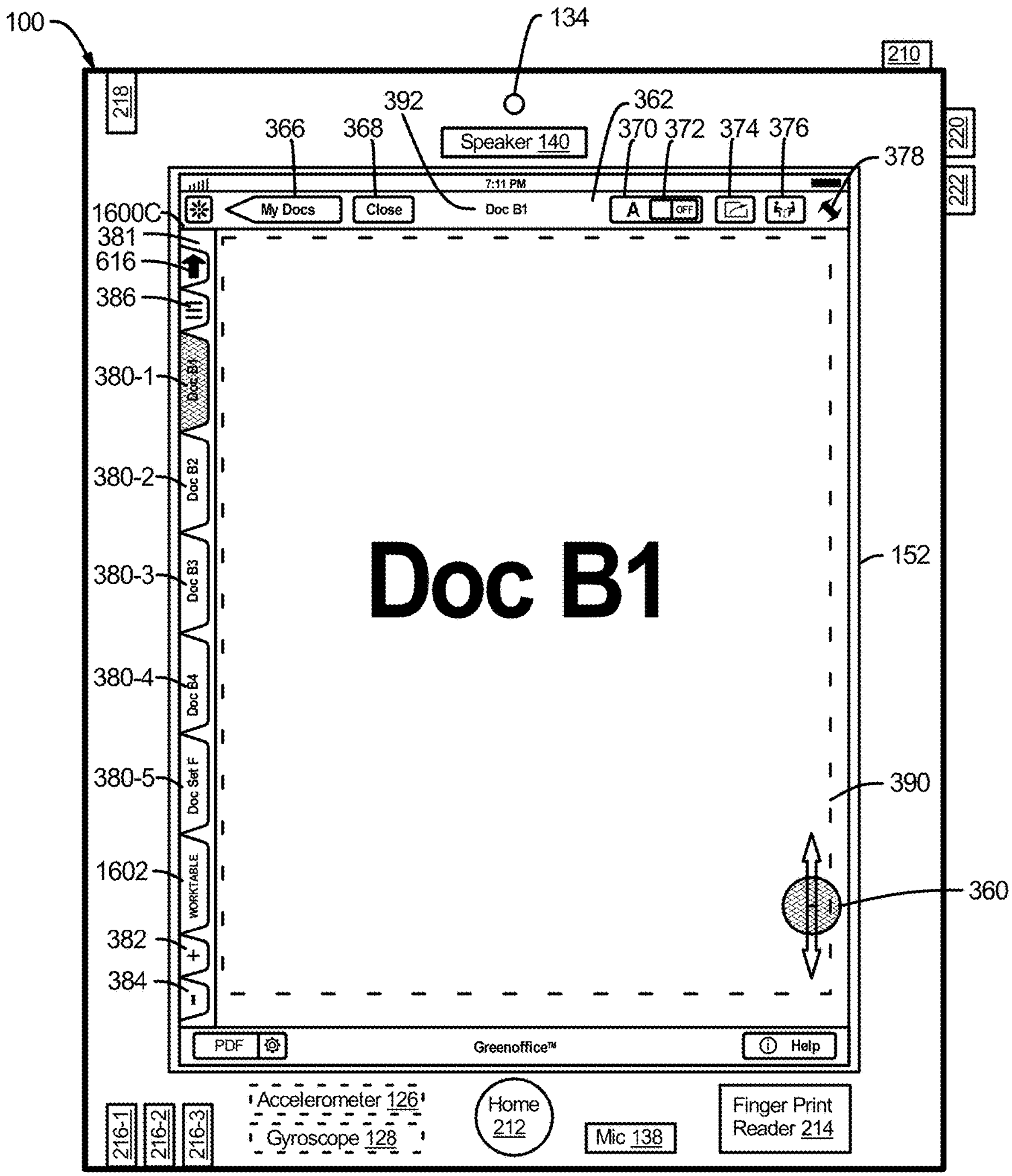

Docs or doc sets moved to the worktable are always accessible to the user with a single tap from the View Docs UI. This can be illustrated by the following example: If the user selects tab icon 380-4 linked to Doc Set B in UI 1600B, then the device displays UI 1600C (FIG. 16C), with tab 380-1 linked to Doc B1, tab 380-2 linked to Doc B2, tab 380-3 linked to Doc B3, tab 380-4 linked to Doc B4, tab 380-5 linked to Doc Set F, and tab 1602 linked to worktable 1606. Since the first tab 380-1 is linked to a doc, the device also displays that doc (Doc B1) in UI 1600C (FIG. 16C). We see that the items placed on the worktable are accessible from both UI 1600A and UI 1600C. In contrast, items contained in Doc Set B are accessible from UI 1600C, but items contained in Doc Set A are not accessible from UI 1600C. To access the items contained in Doc Set A, the user may select up icon 616 in UI 1600C. The device then displays UI 1600A from which the user may select Doc Set A to access the items in Doc Set A.

Starting from UI 1600C the user may then select worktable tab 1602 in UI 1600C (FIG. 16C). The device displays UI 1600D (FIG. 16D) showing worktable 1606. We see that worktable tab 1602 may be accessed from any location within the tree of documents in a doc set. The UI 1600 D not only displays worktable 1606, but also displays item tab bar 381 with tab 380-1 linked to Doc B1, tab 380-2 linked to Doc B2, tab 380-3 linked to Doc B3, tab 380-4 linked to Doc B4, tab 380-5 linked to Doc Set F, and tab 1602 linked to worktable 1606. UI 1600D also includes up icon 616. The user may then change from viewing the items on worktable 1606 to viewing a doc or doc set in view docs by simply selecting the tab linked to that item.

Figure 16D:
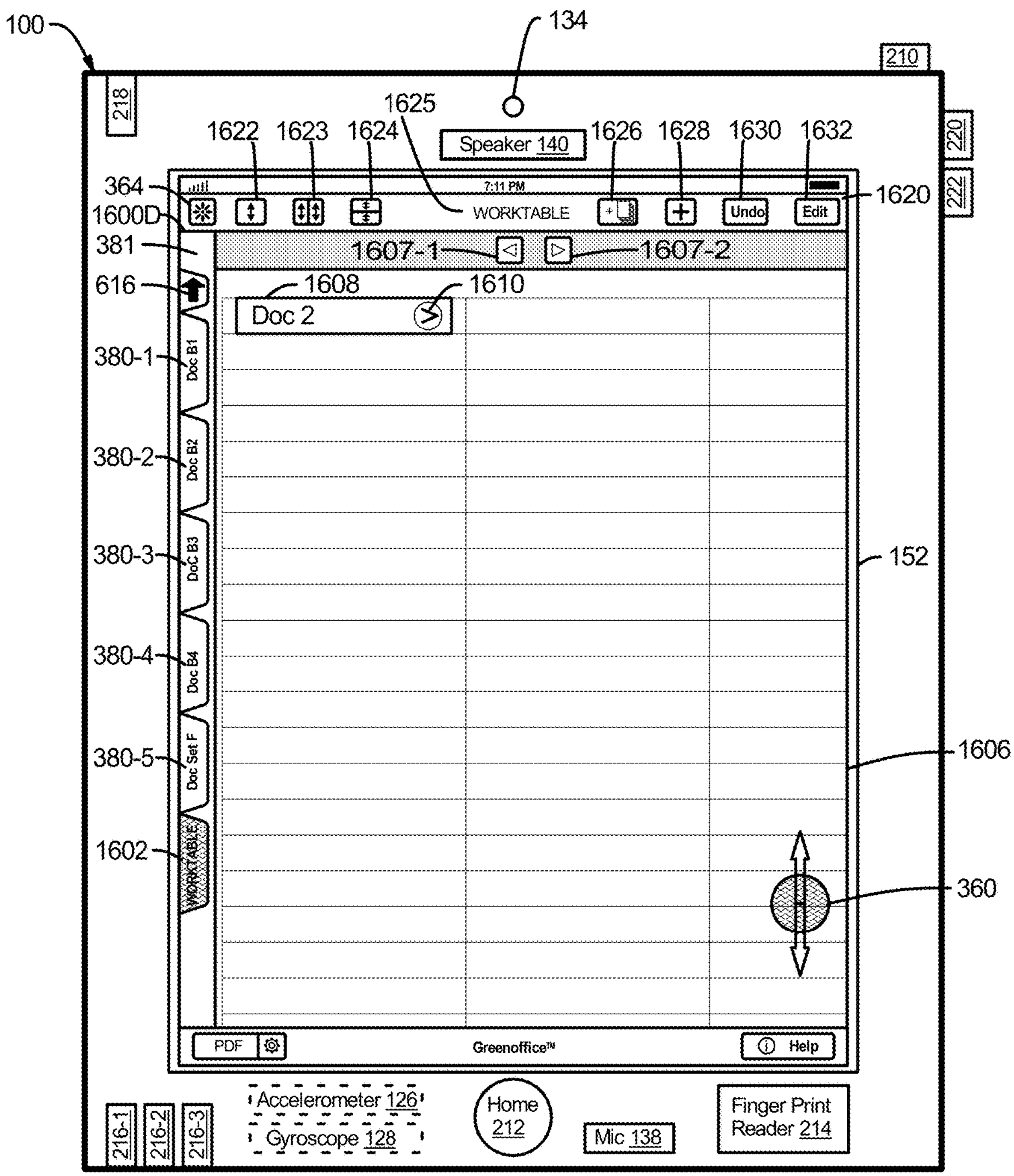
Figure 16E:
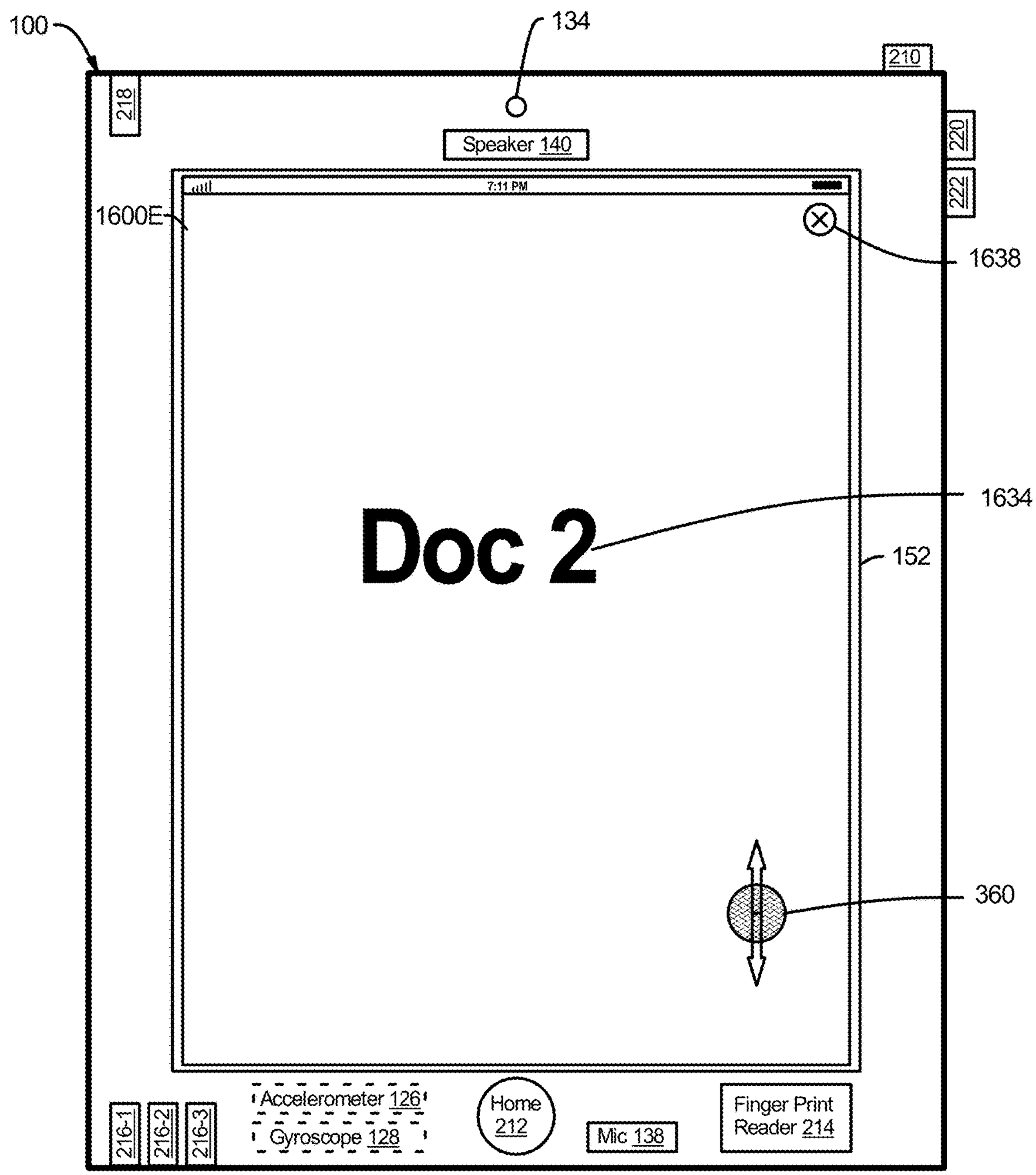
Figure 16F:
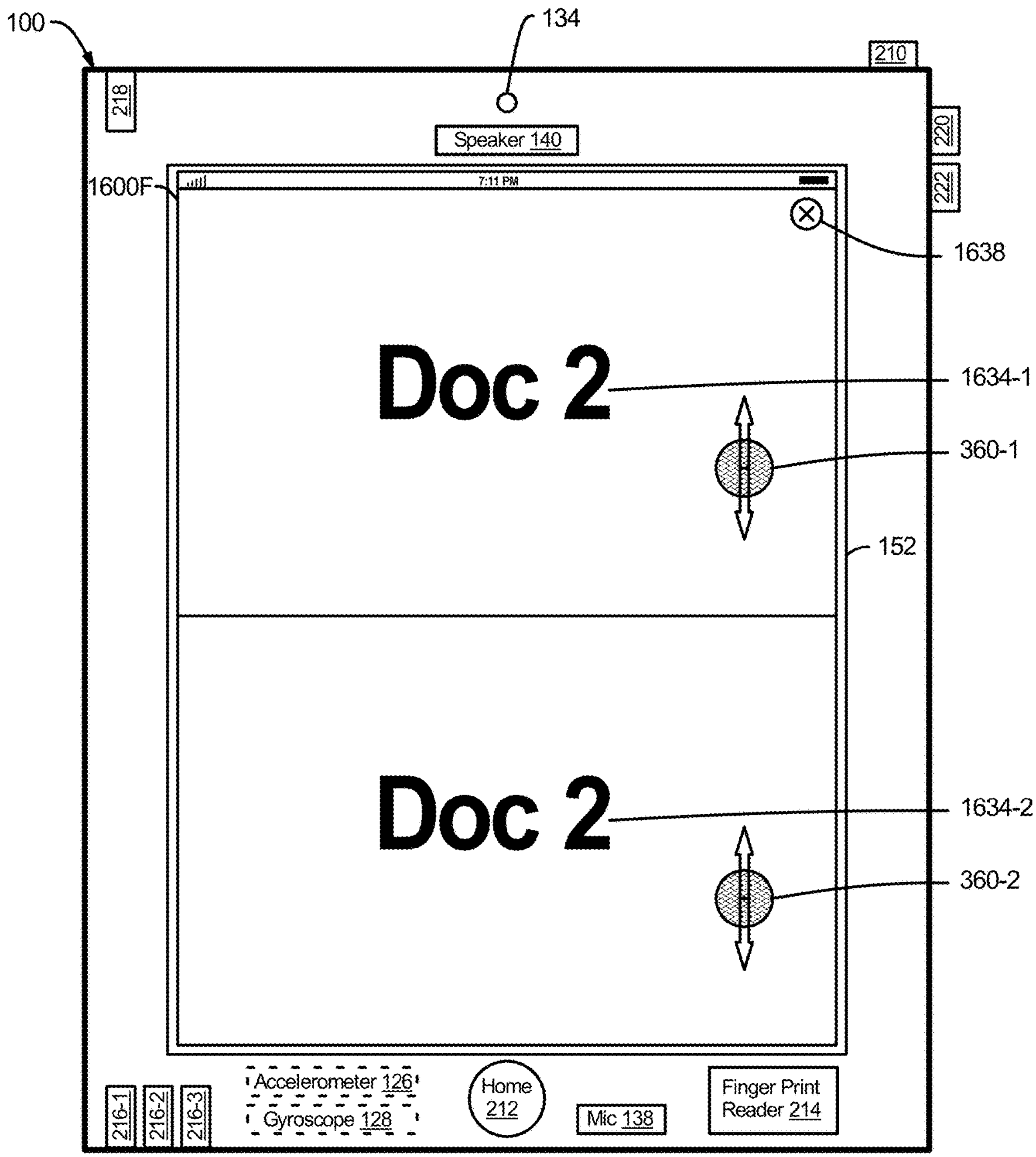

The user may conveniently display in full screen mode the contents of a doc that has been placed on the worktable by tapping the icon linked to that doc. The user has several options for viewing docs directly from the worktable that may be illustrated by example. In a first example, the user may view any doc on worktable 1606 by selecting that icon with a single tap. Starting from UI 1600D (FIG. 16D), the user may view Doc 2 by selecting icon 1608 linked to Doc 2. The device displays UI 1600E (FIG. 16E) with Doc 2 shown in full screen view 1634. The user may scroll within Doc 2 using a standard page scroll sliding finger gesture 360. The user may close the view of Doc 2 and return to viewing worktable 1606 by selecting close icon 1638. The device then displays UI 1600D (FIG. 6D). In a second example, the user may view any doc on worktable 1606 in split-screen view by selecting that icon with a two-finger tap. Starting from UI 1600D (FIG. 16D), the user may view Doc 2 in split-screen view by selecting with a two-finger tap icon 1608 linked to Doc 2. The device displays UI 1600F (FIG. 16F) with Doc 2 shown in split-screen view 1634-1 and 1634-2. The user may scroll within Doc 2 to a first location within Doc 2 using a standard page scroll sliding finger gesture 360-1 and the user may scroll to a second location within Doc 2 using a standard page scroll sliding finger gesture 360-2. The user may close the split-screen view of Doc 2 by selecting close icon 1638. The device then displays UI 1600D (FIG. 16D). Accordingly, the user may not only view in split-screen mode a doc linked to a doc tab using a two finger tap gesture on the doc tab as illustrated in FIGS. 14A-14C, but may also view in split-screen mode a doc linked to a doc icon on the worktable by using a two-finger tap gesture on the doc icon as illustrated in FIGS. 16D-16F. The user may view in split-screen mode a first doc linked to a first tab and a second doc linked to a second tab by selecting the two tabs on the item tab bar simultaneously as illustrated in FIGS. 14A-14C. Similarly, the user may also view in split-screen mode a first doc linked to a first doc icon and a second doc linked to a second doc icon by selecting the two doc icons on the worktable simultaneously.

FIGS. 17A-17L illustrate exemplary user interfaces and methods for working with docs and doc sets using a virtual worktable in accordance with some embodiments. A user may use the virtual worktable to divide a single doc set into two doc sets using drag gestures. One example is illustrated in the sequence FIGS. 17A-17L. Starting from UI 1700A (FIG. 17A), a user may perform a slide (drag) gesture 1702 from tab 380-3 linked to Doc Set A to tab 1602 linked to worktable 1606. The device displays UI 1700B (FIG. 17B) showing worktable 1606, icon 1704 positioned on worktable 1606 and linked to Doc Set A, and tab 380-3 no longer linked to Doc Set A. The device also displays icon 1608 linked to Doc 2 positioned on worktable 1606. In this exemplary embodiment, the item most recently added to worktable 1606 is listed nearest to the top edge of worktable 1606. In preparation for removing some of the items from Doc Set A and placing those items in a new doc set, the user may select make-new-doc-set icon 1626. The device displays UI 1700C (FIG. 17C) showing worktable 1606 with icon 1706 linked to New Doc Set 1 added. The user may select icon 1704 linked to Doc Set A to display the items in Doc Set A. The device displays UI 1700D (FIG. 17D) with icon 1704 linked to Doc Set A highlighted to show that icon 1704 has been selected. Since Doc Set A has been selected, UI 1700D (FIG. 17D) displays in the next column to the right, a separate icon linked to each item in Doc Set A. UI 1700D displays icon 1704-1 linked to Doc A1, icon 1704-2 linked to Doc A2, icon 1704-3 linked to Doc Set E, icon 1704-4 linked to Doc A4, icon 1704-5 linked to Doc A5, icon 1704-6 linked to Doc A6, and icon 1704-7 linked to Doc A7. The user may then move items from Doc Set A to New Doc Set 1. The user may perform a first drag gesture 1708-1 from icon 1704-7 linked to Doc A7, to icon 1706 linked to New Doc Set 1. The user may perform a second drag gesture 1708-2 from icon 1704-6 linked to Doc A6, to icon 1706 linked to New Doc Set 1. The user may perform a third drag gesture 1708-3 from icon 1704-5 linked to Doc A6, to icon 1706 linked to New Doc Set 1. The user may perform a fourth drag gesture 1708-4 from icon 1704-4 linked to Doc A4, to icon 1706 linked to New Doc Set 1. The device updates the displayed UI at the completion of each drag gesture. After the completion of the fourth drag gesture, the device displays UI 1700E (FIG. 17E) with icon 1704 linked to Doc Set A highlighted to show that icon 1704 is selected. UI 1700E (FIG. 17E) also displays in the next column to the right, an icon linked to each item remaining in Doc Set A. In this example, UI 1700E (FIG. 17E) displays icon 1704-1 linked to Doc A1, icon 1704-2 linked to Doc A2, and icon 1704-3 linked to Doc Set E. UI 1700E (FIG. 17E) also displays tab 380-1 linked to Doc 1, tab 380-2 linked to Doc 3, tab 380-3 linked to Doc Set B, and tab 1602 linked to worktable 1606.

Figure 17A:
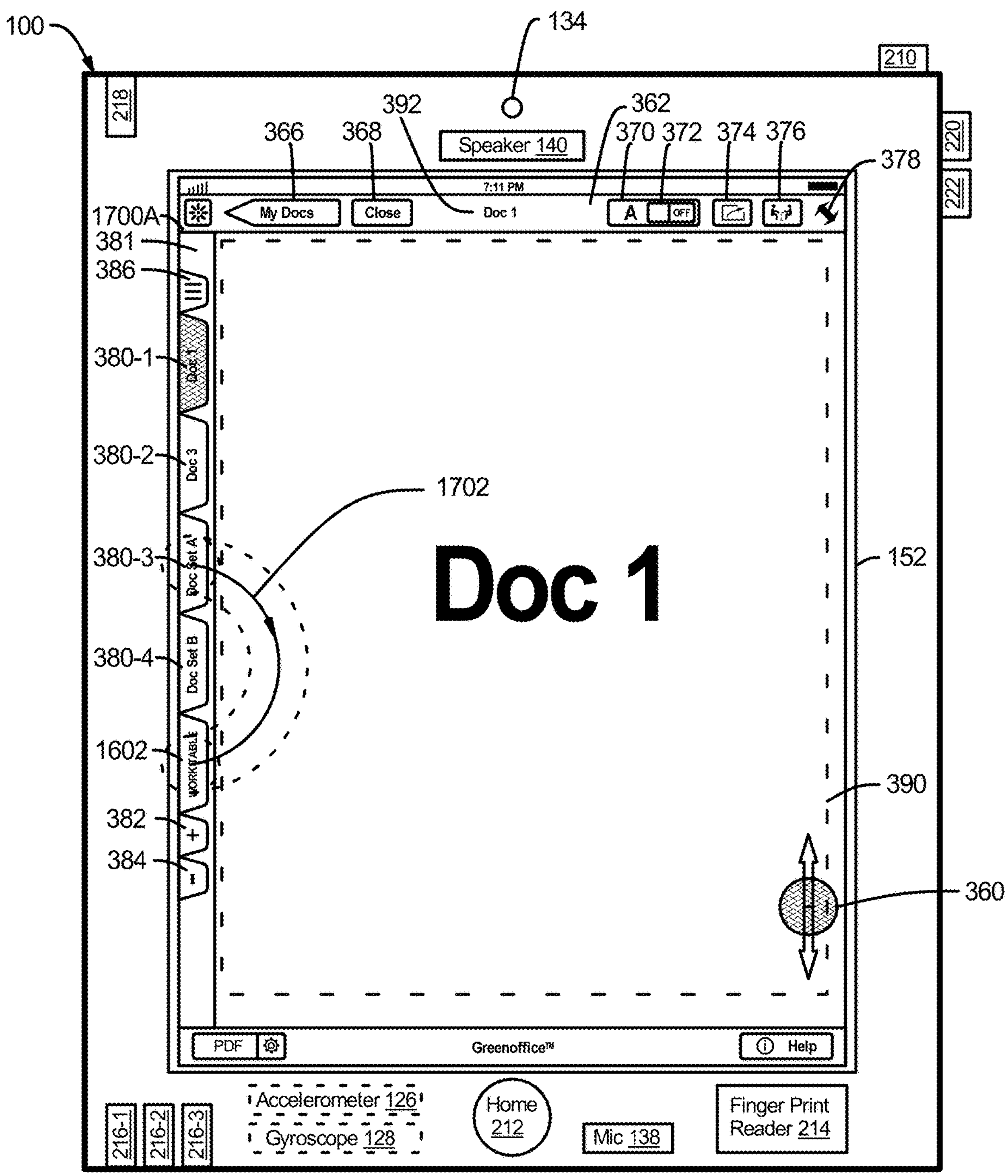
FIGS. 17A-17L illustrate exemplary user interfaces and methods for working with docs and doc sets using a virtual worktable in accordance with some embodiments.
Figure 17B:
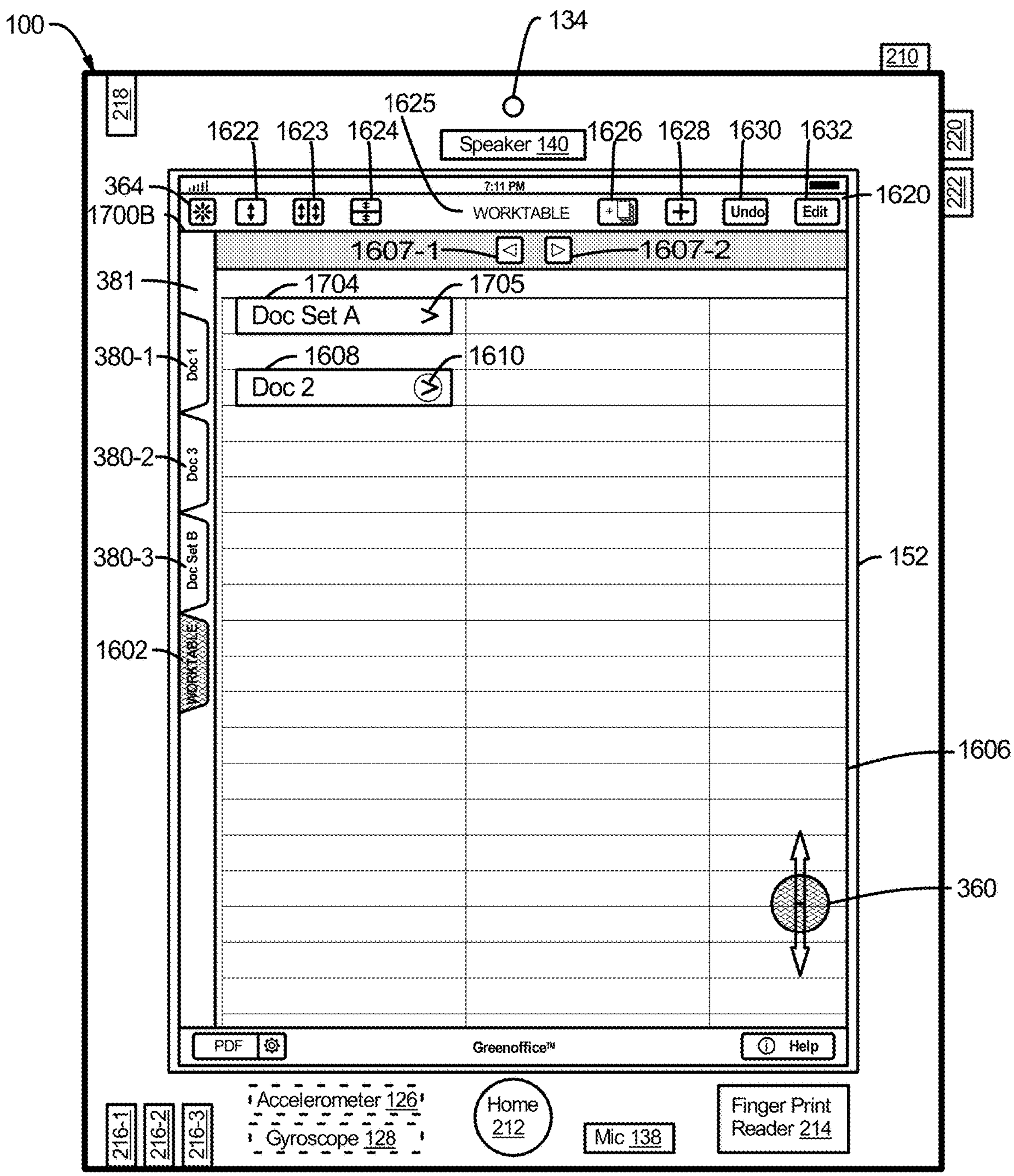
Figure 17C:
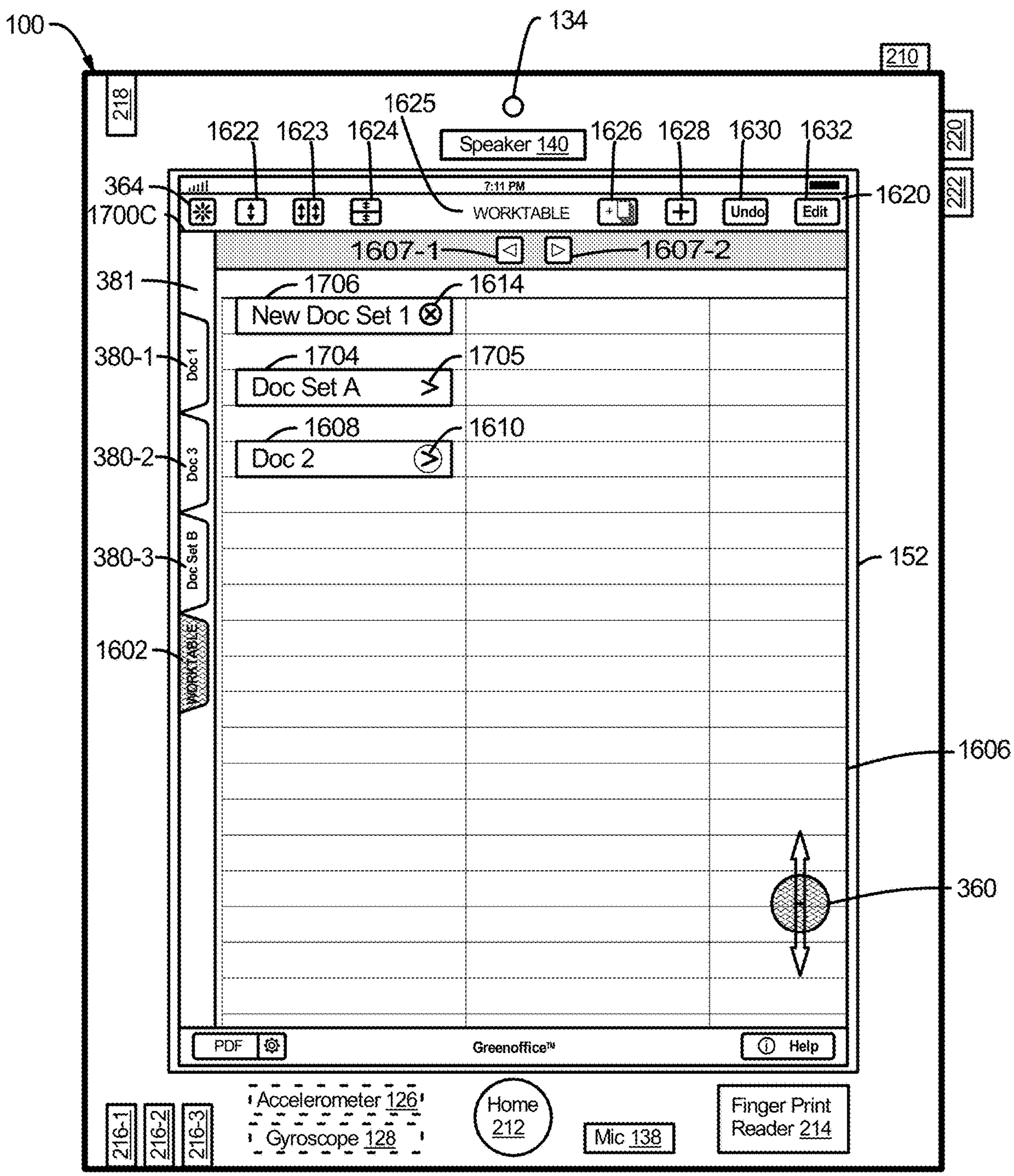
Figure 17D:
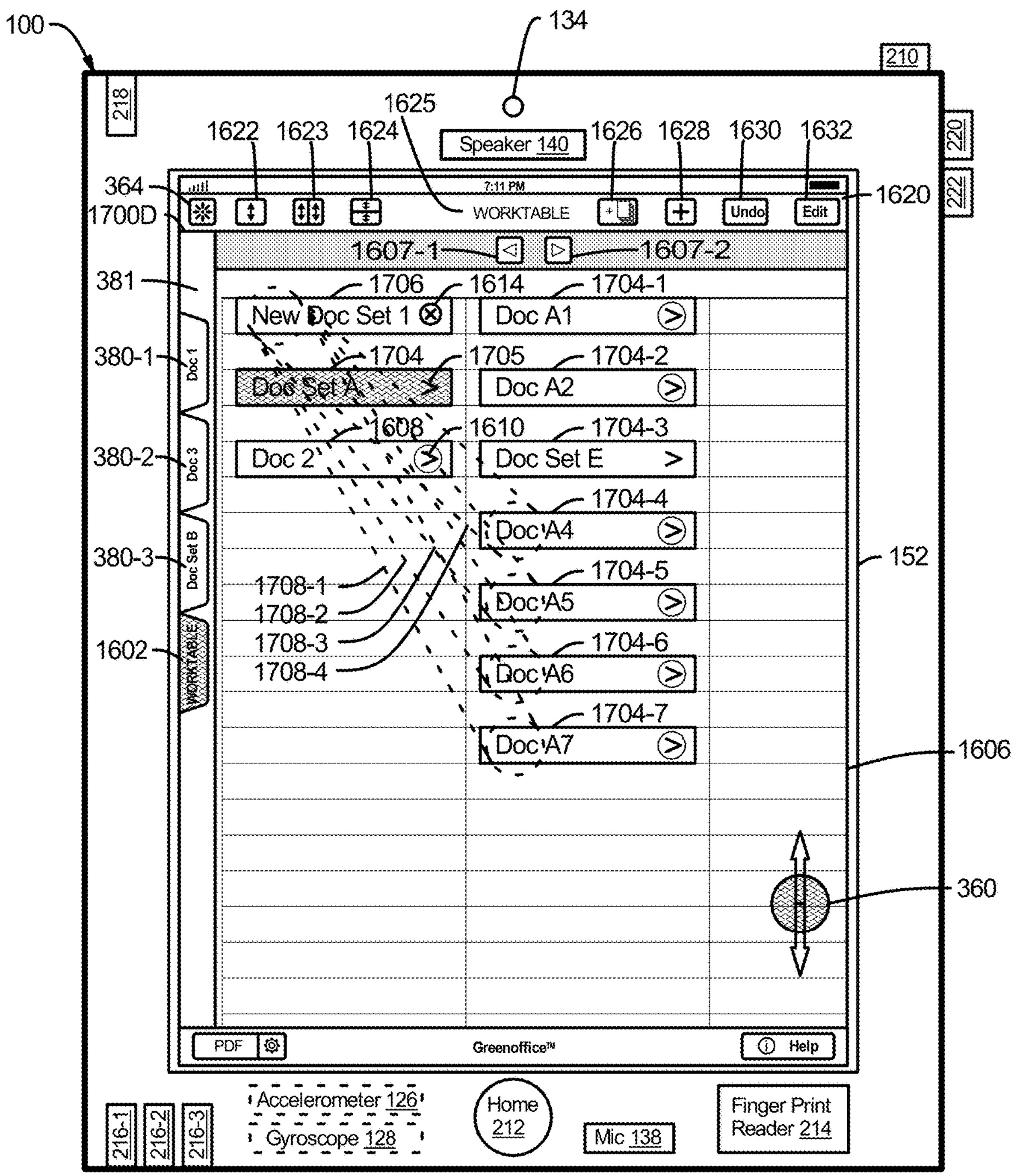
Figure 17E:
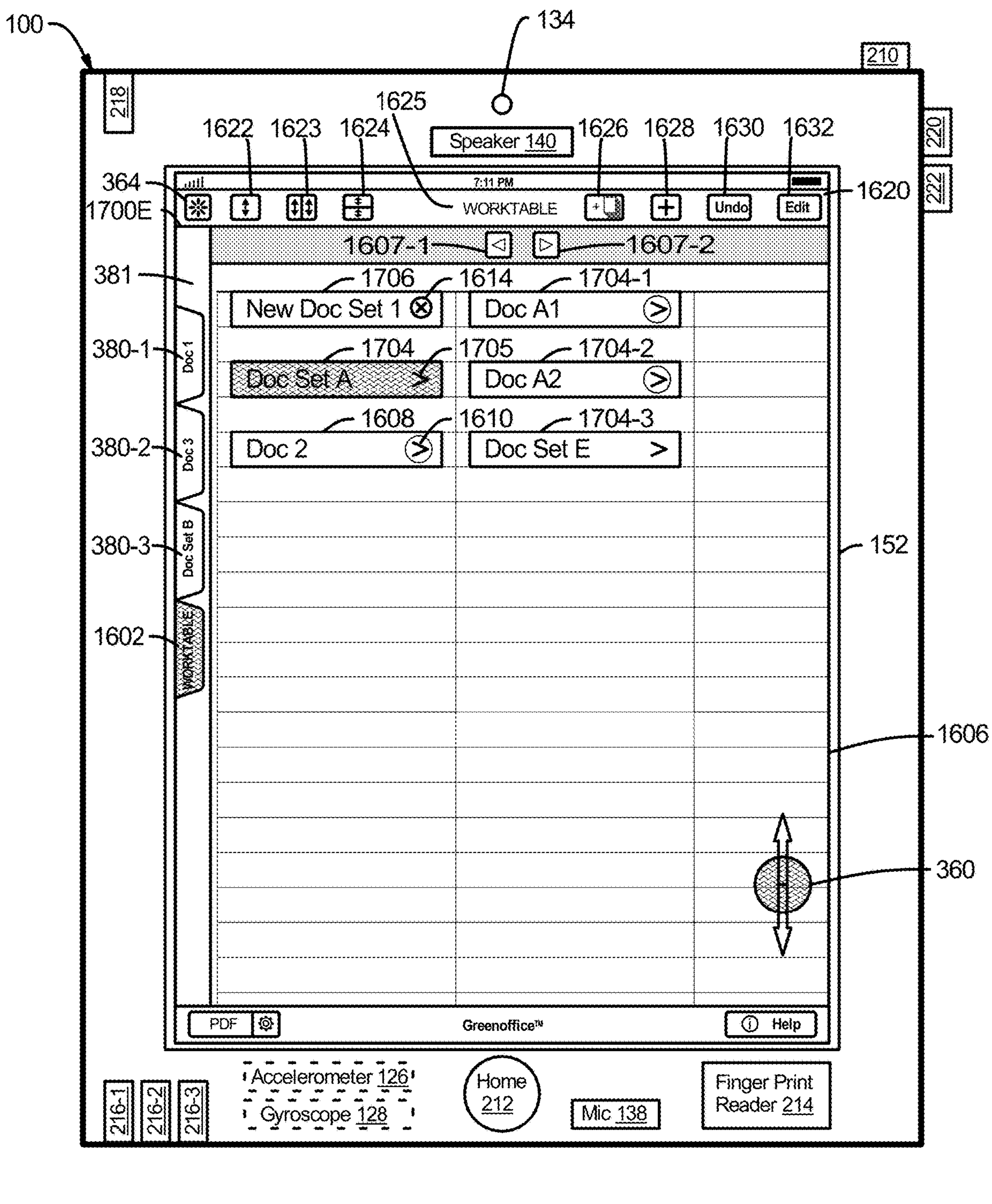
Figure 17F:
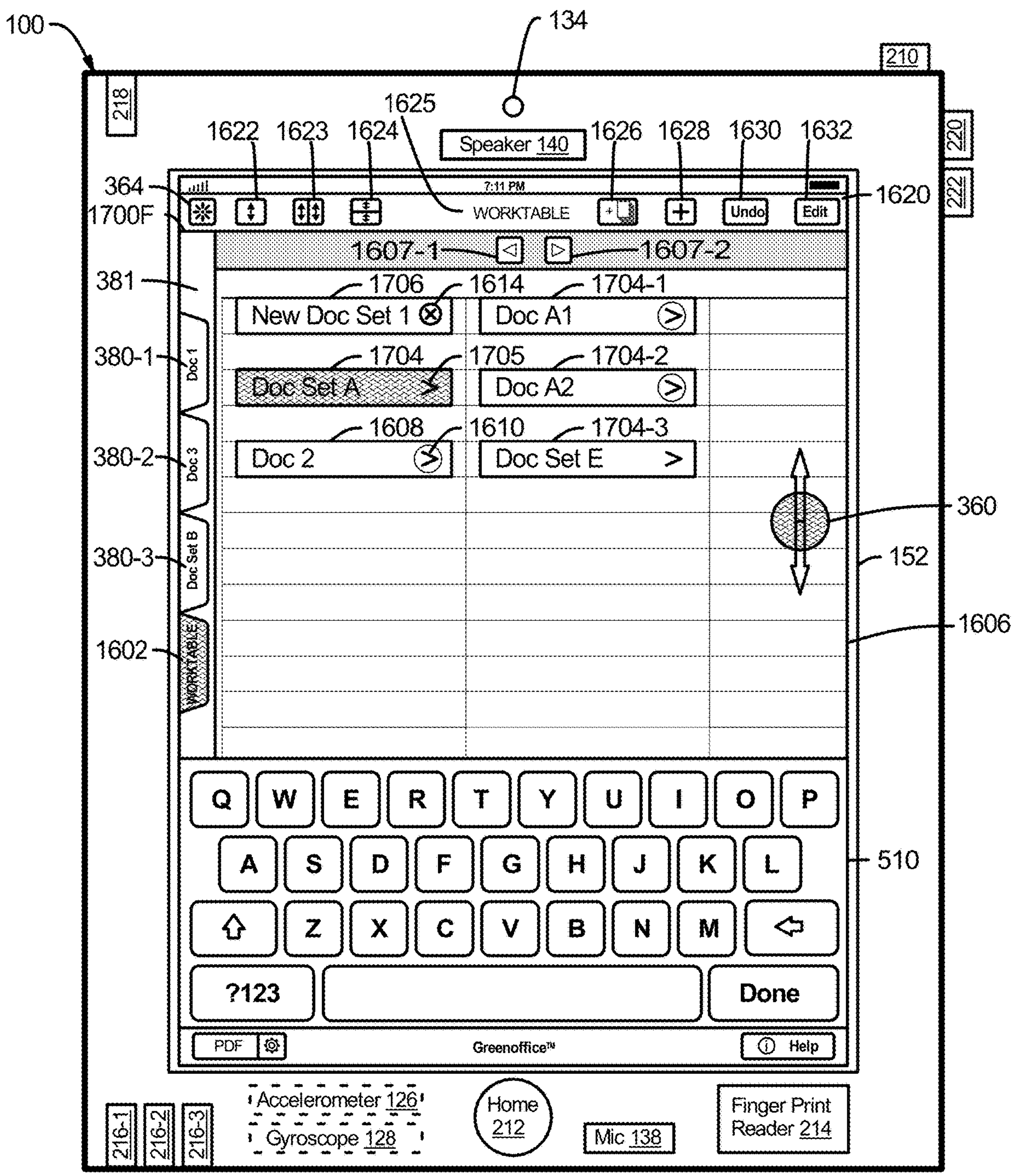
Figure 17G:
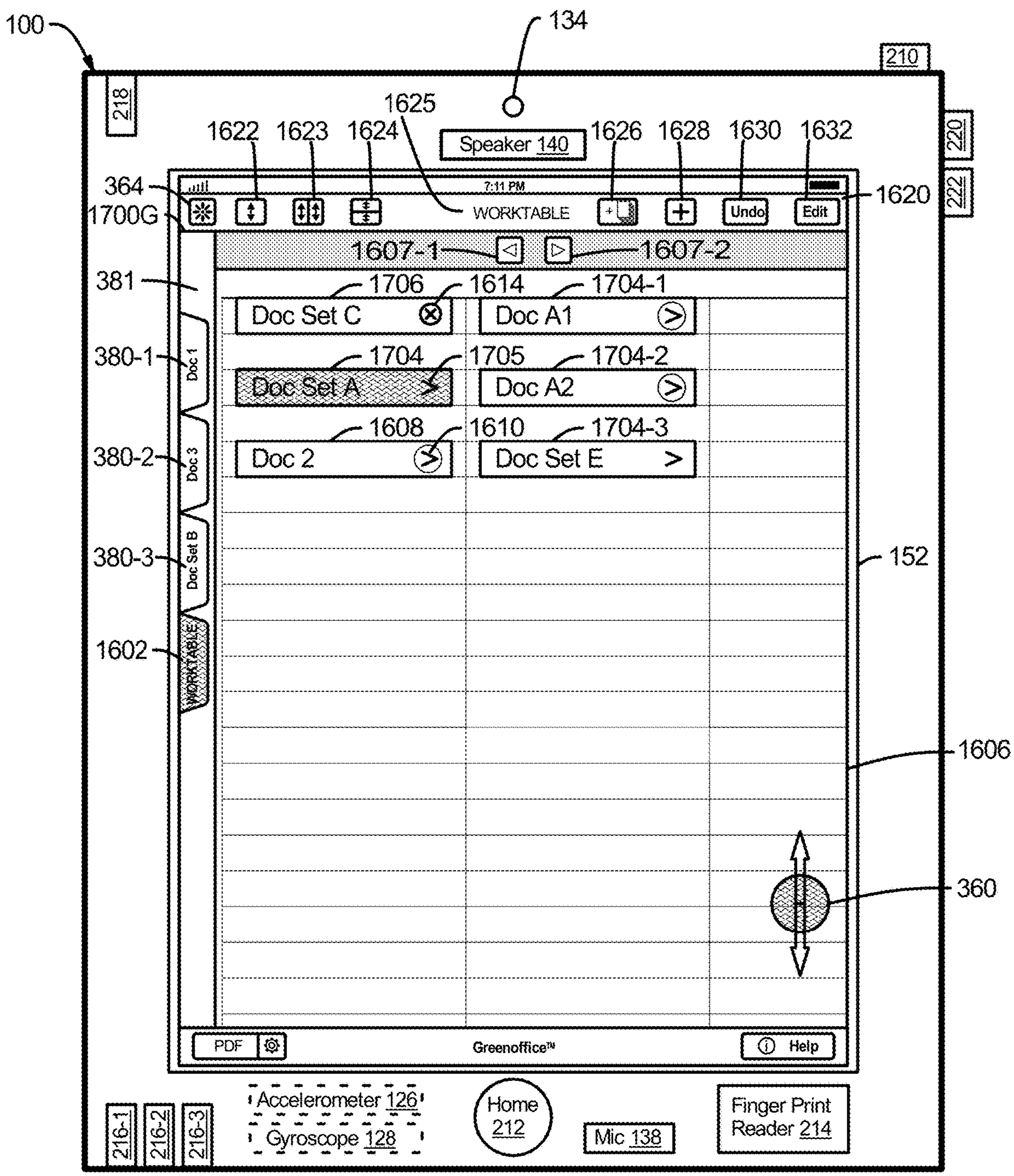
Figure 17H:
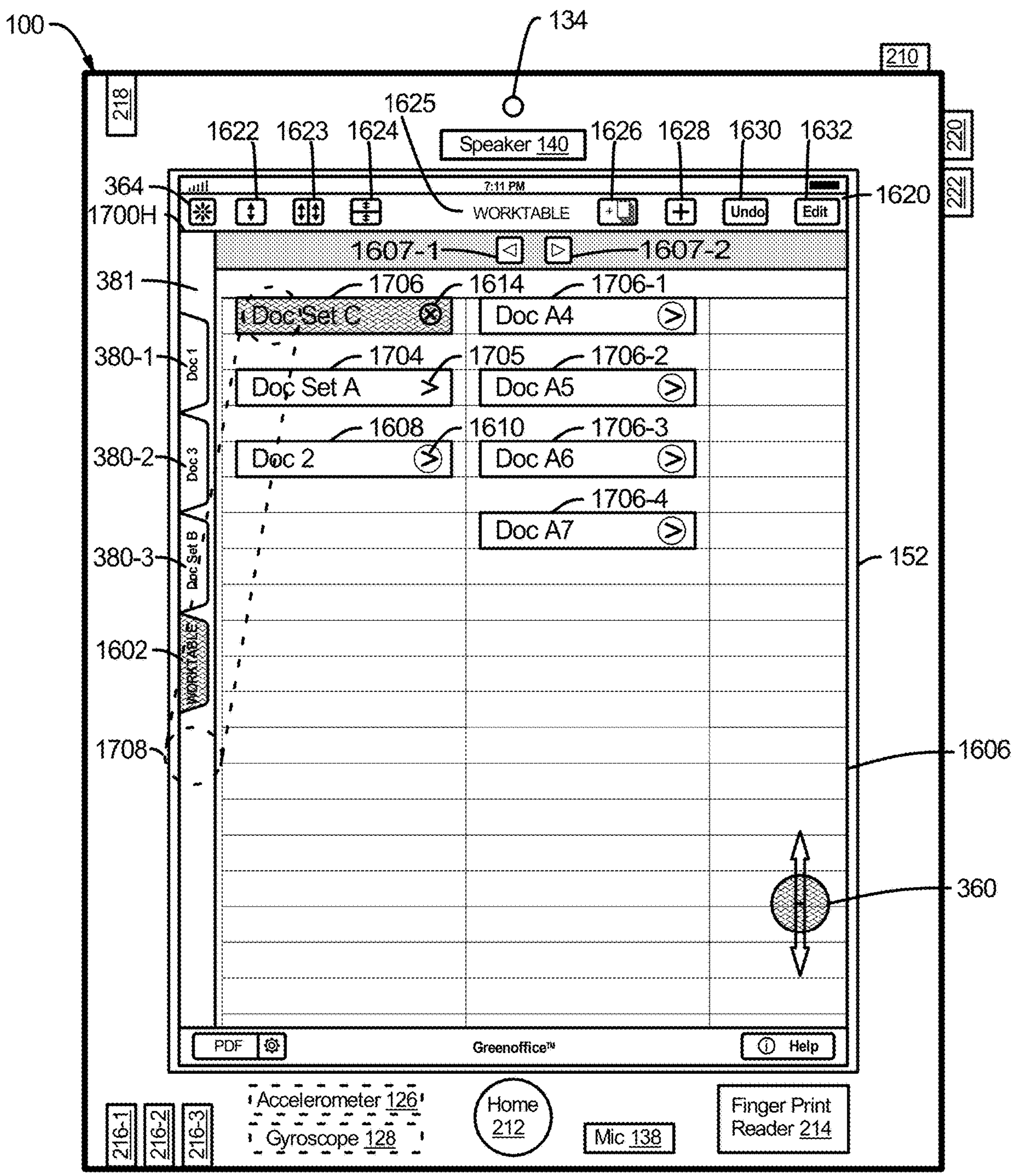
Figure 17I:
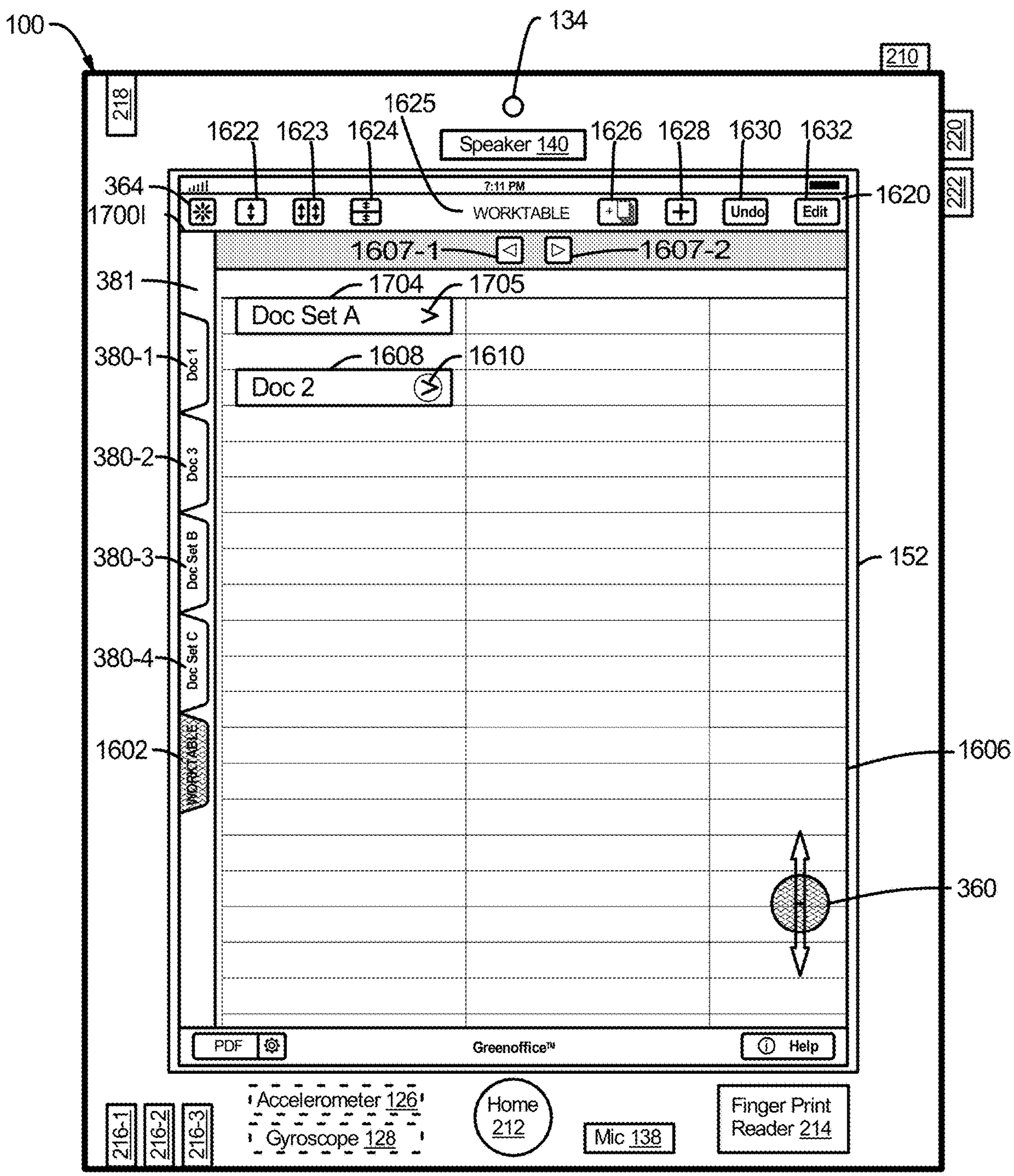
Figure 17J:
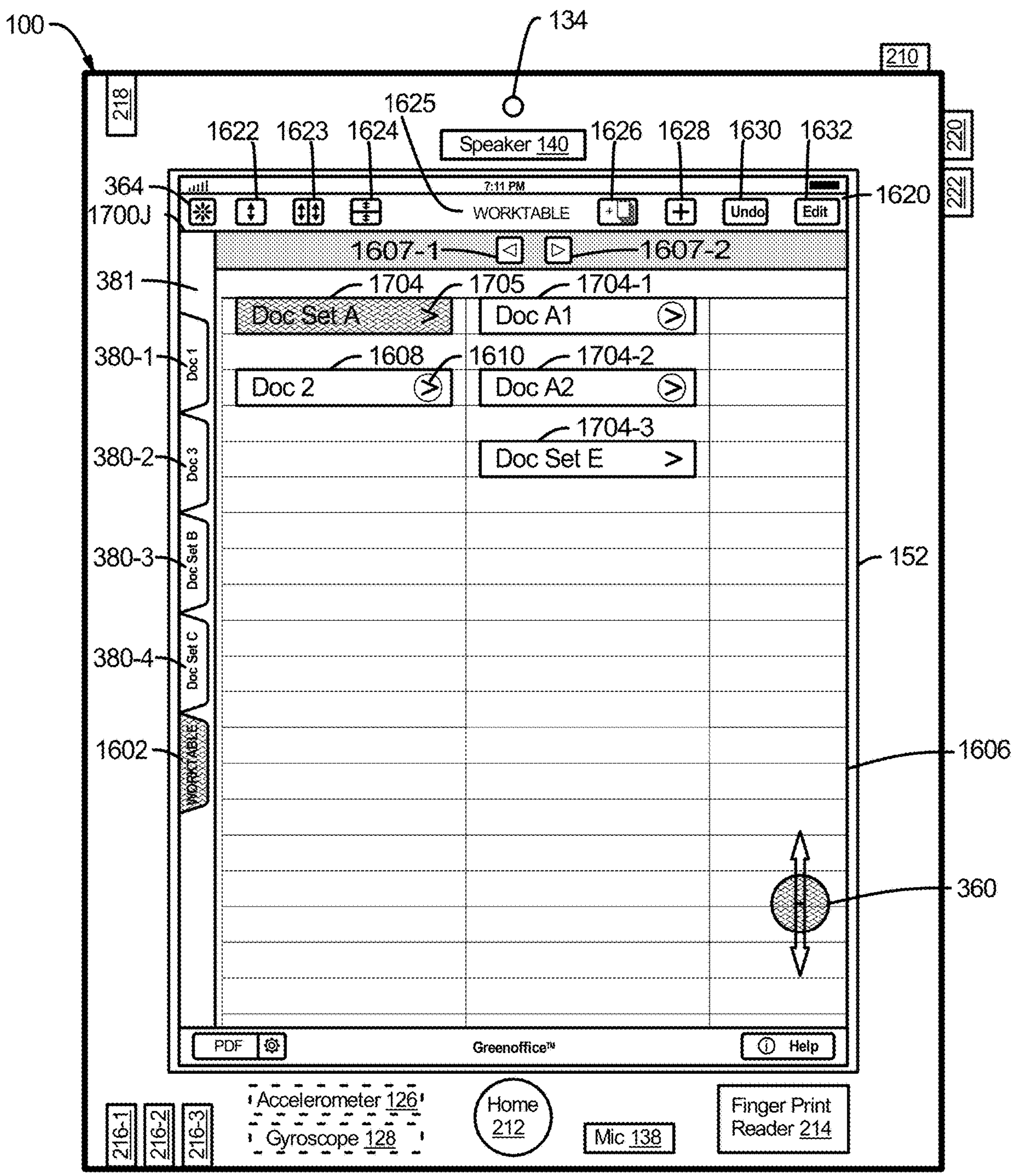
Figure 17K:
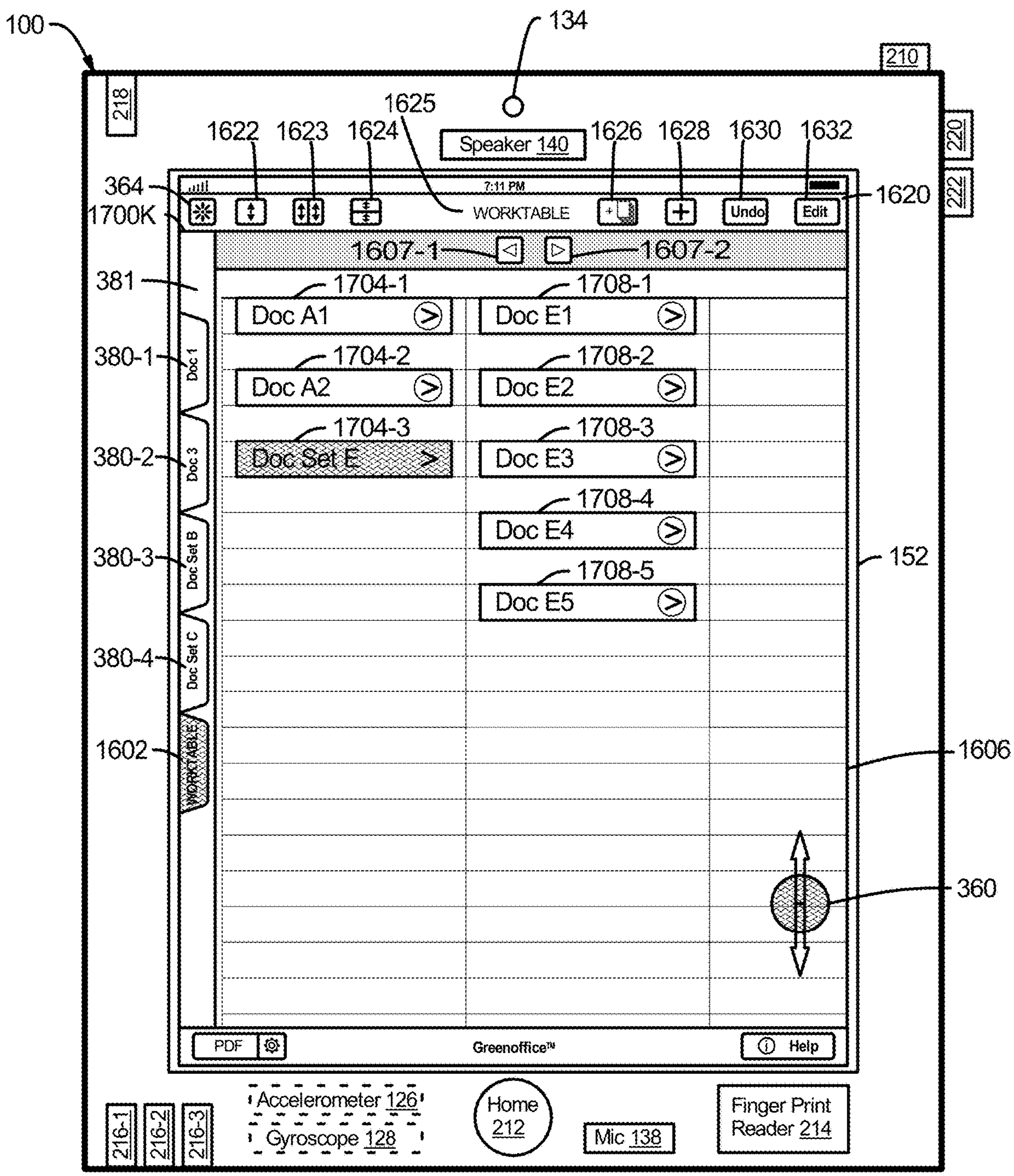
Figure 17L:
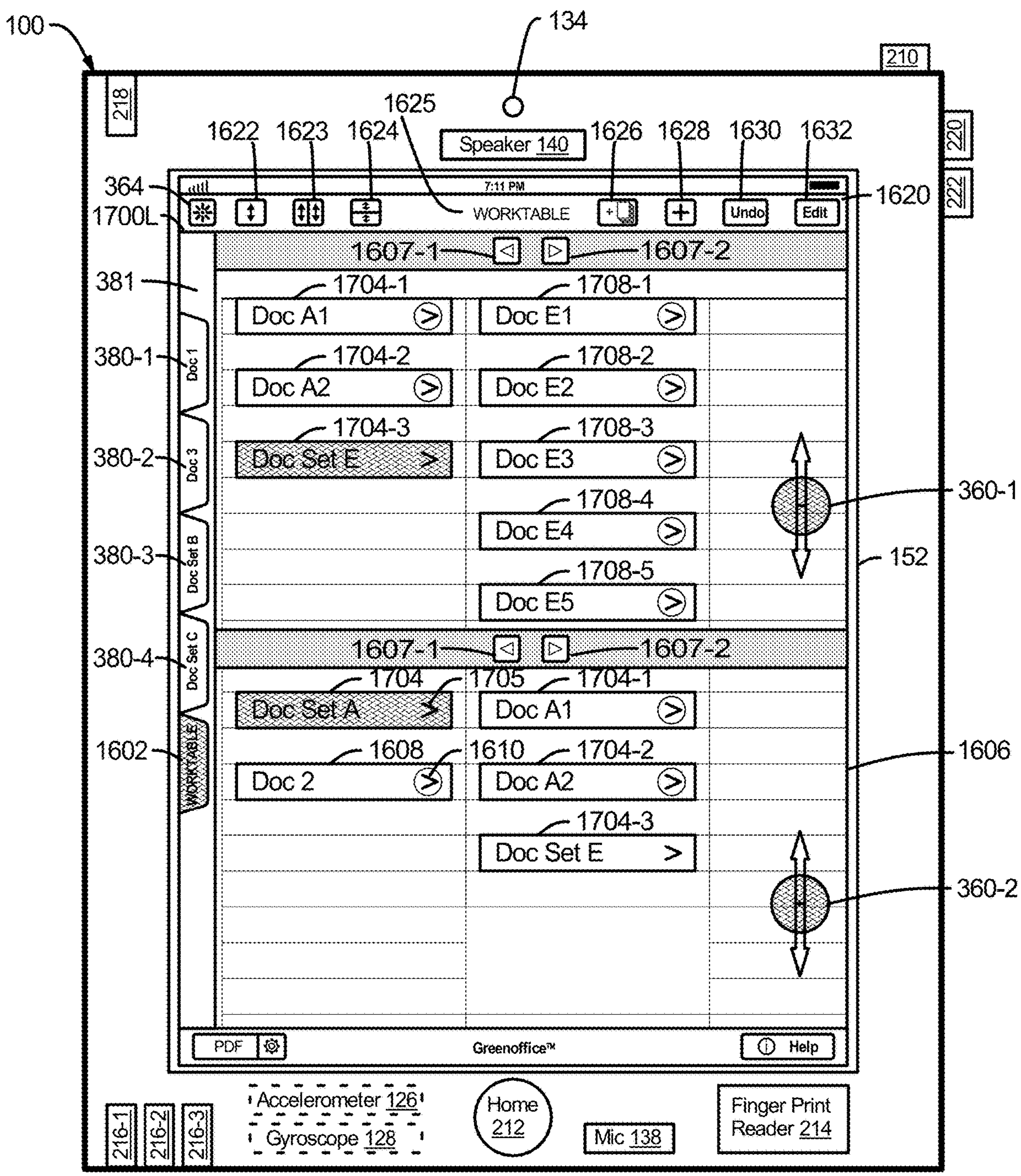
Figure 18A:
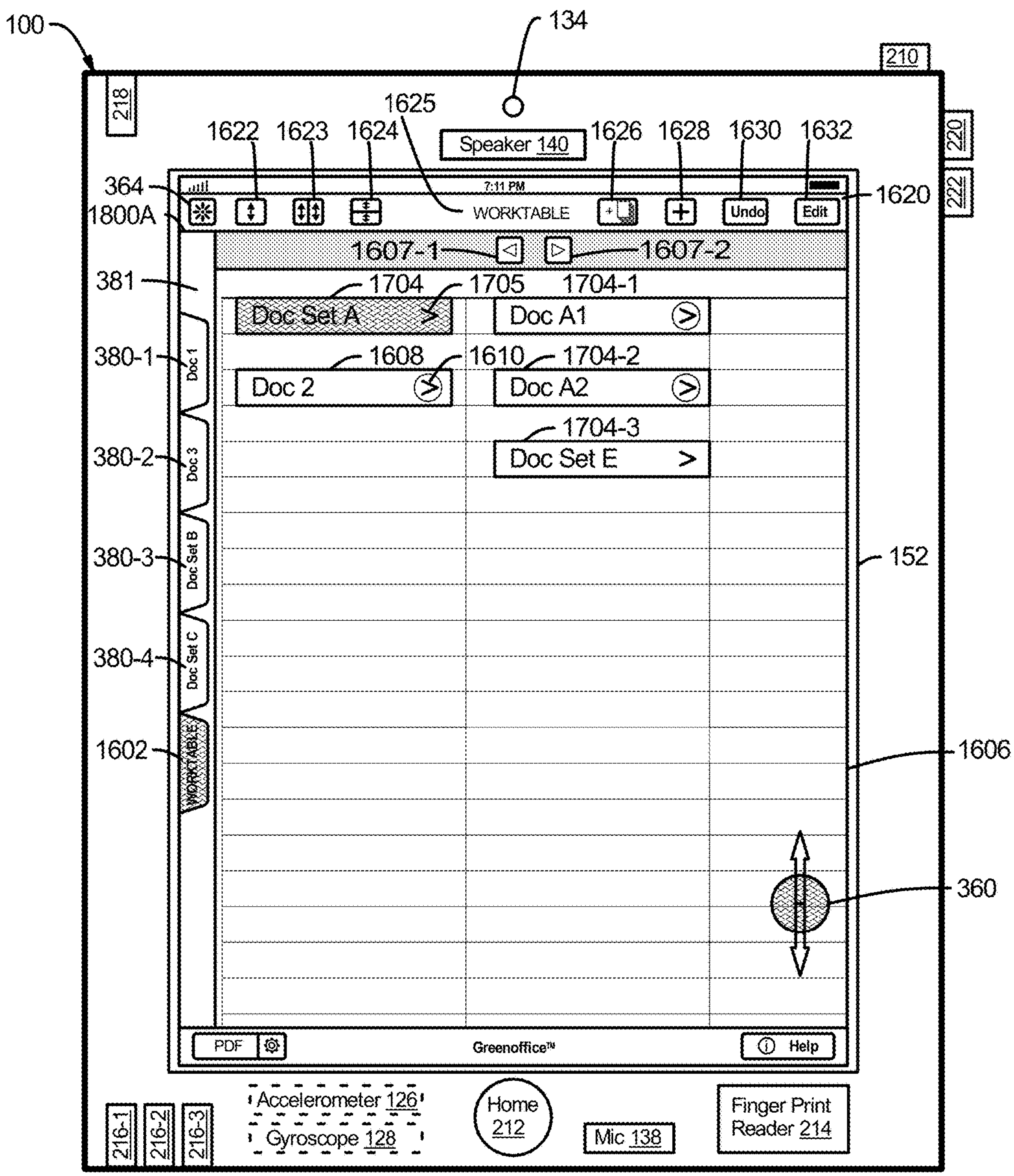
FIGS. 18A-18H illustrate exemplary user interfaces and methods for working with docs and doc sets using a virtual worktable in accordance with some embodiments.
Figure 18B:
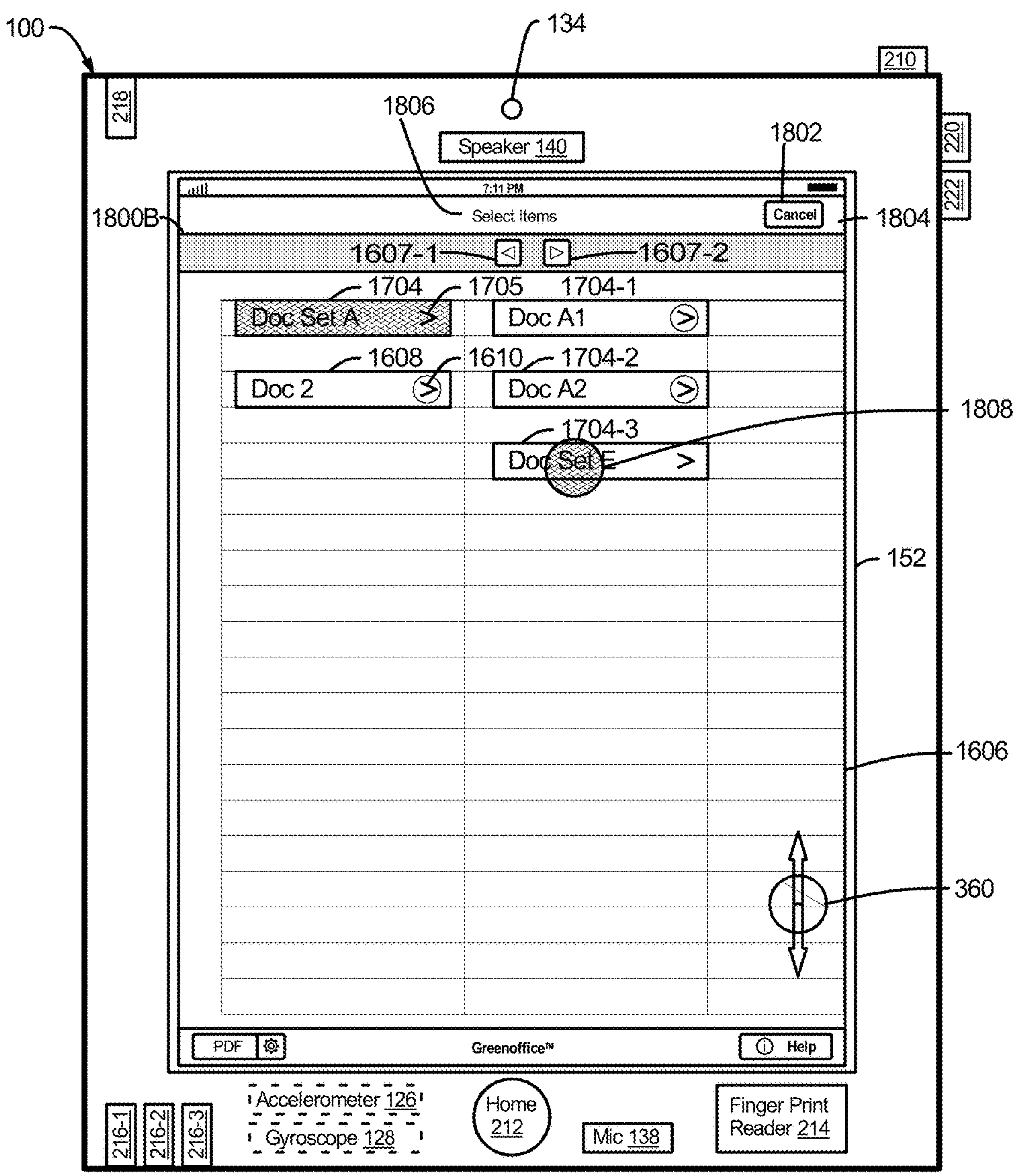
Figure 18C:
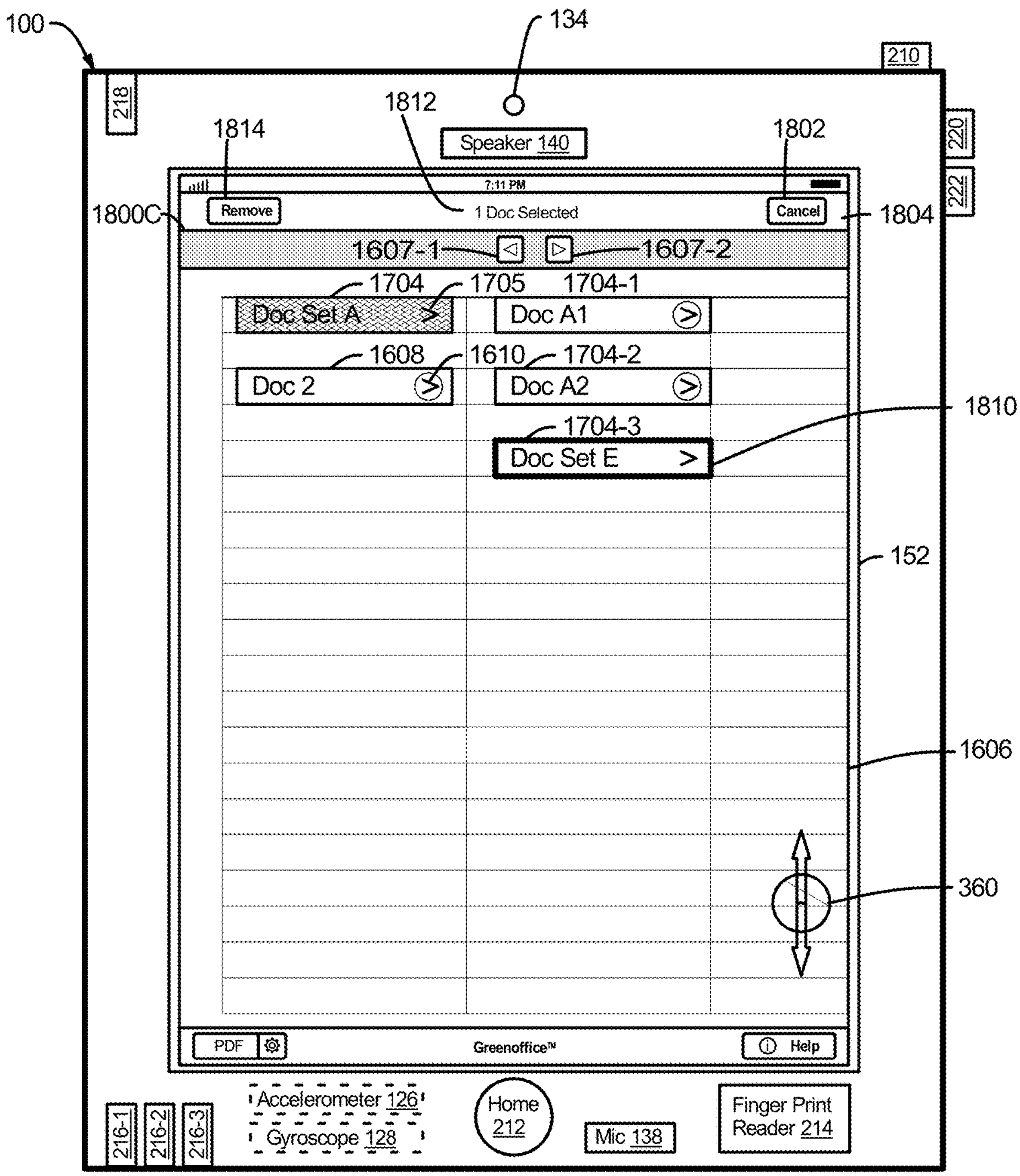
Figure 18D:
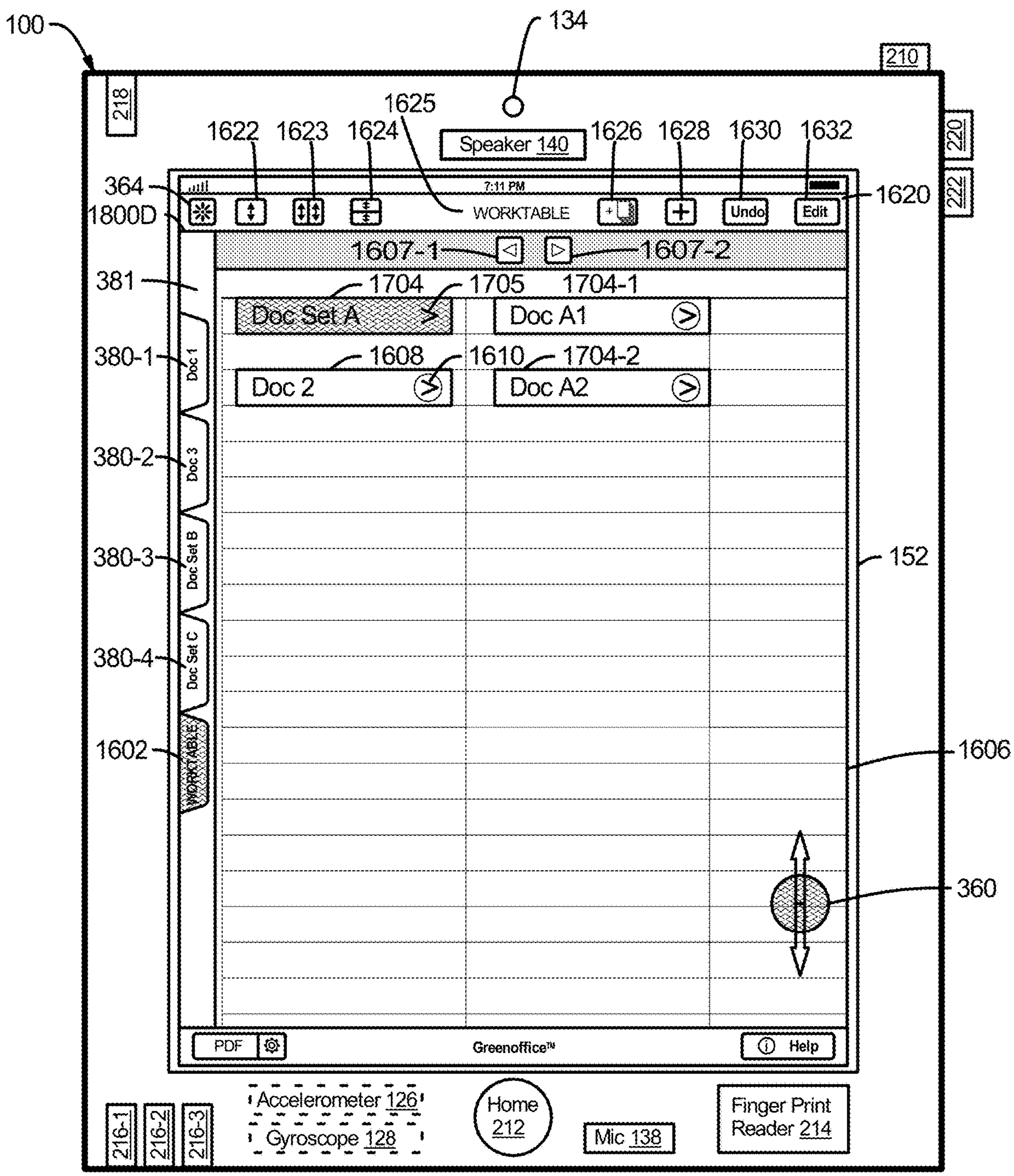
Figure 18E:
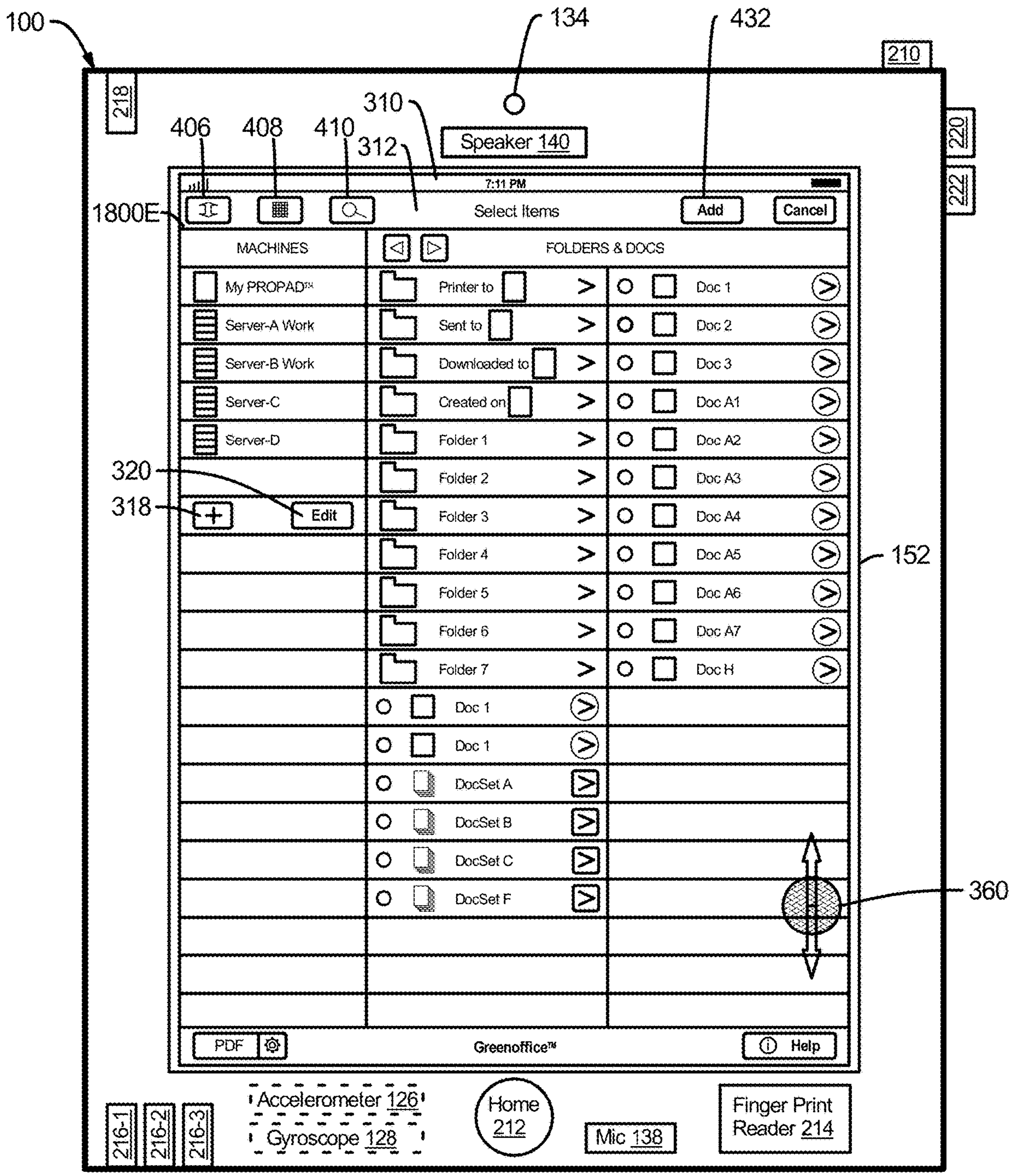
Figure 18F:
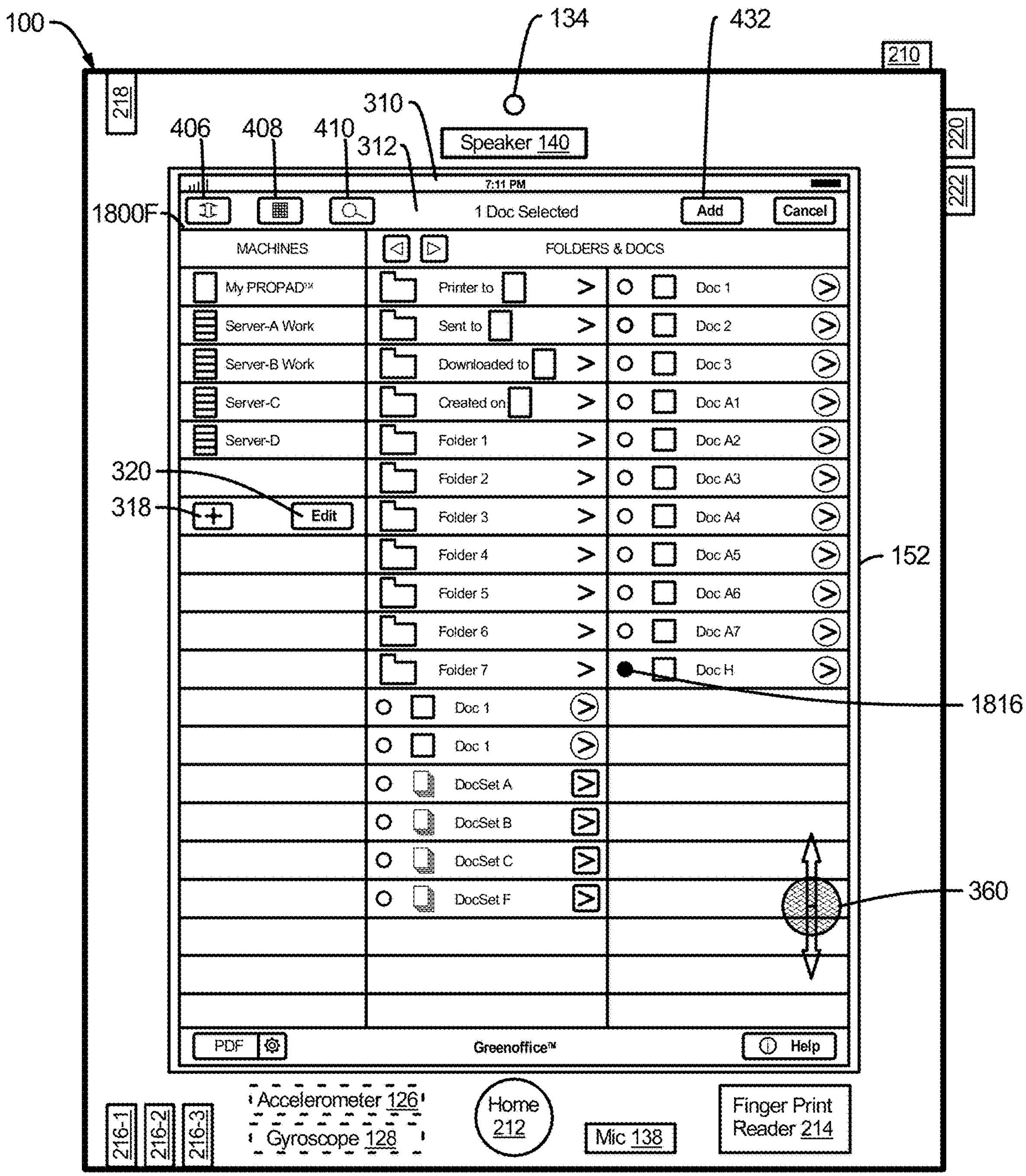
Figure 18G:
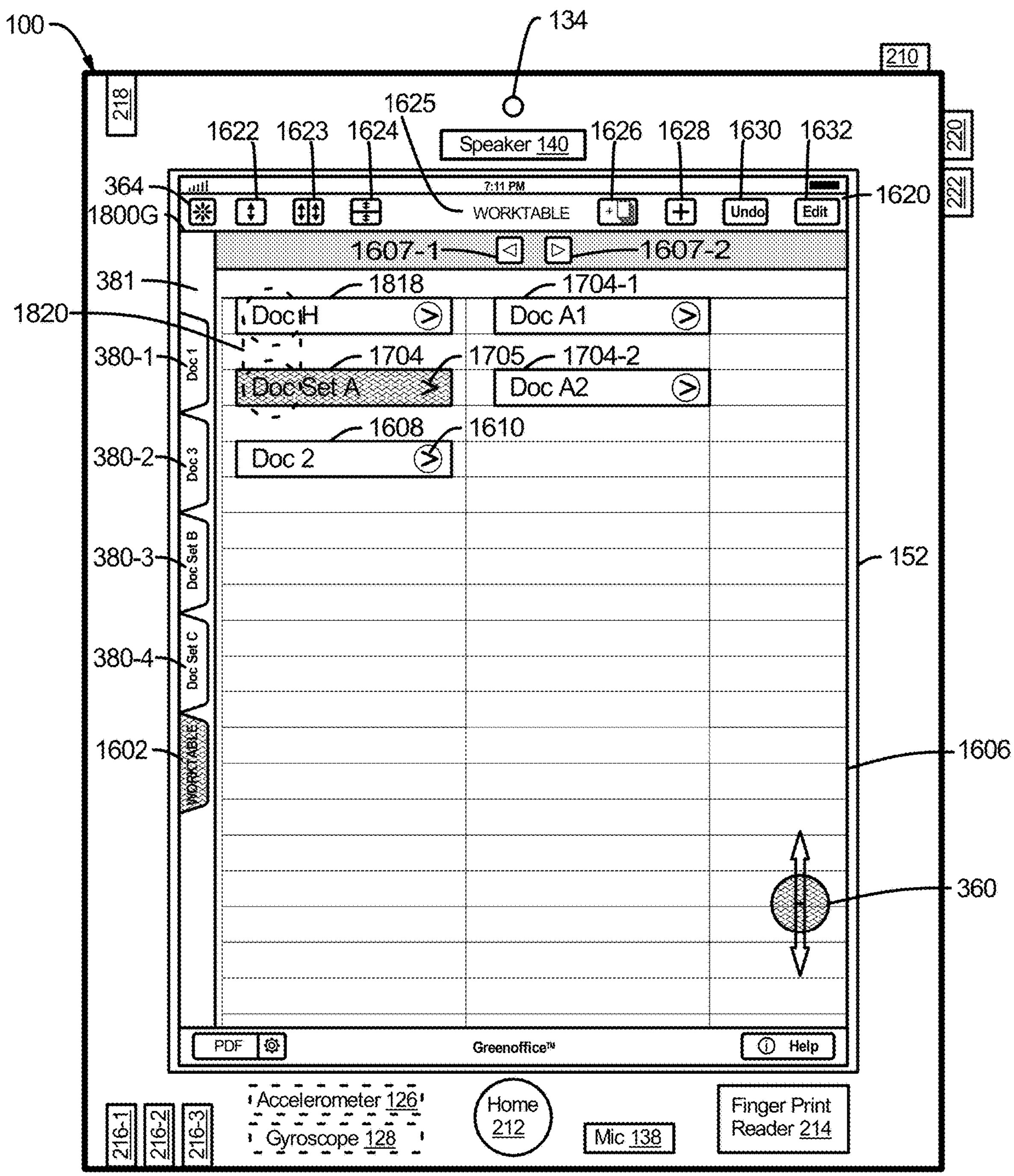
Figure 18H:
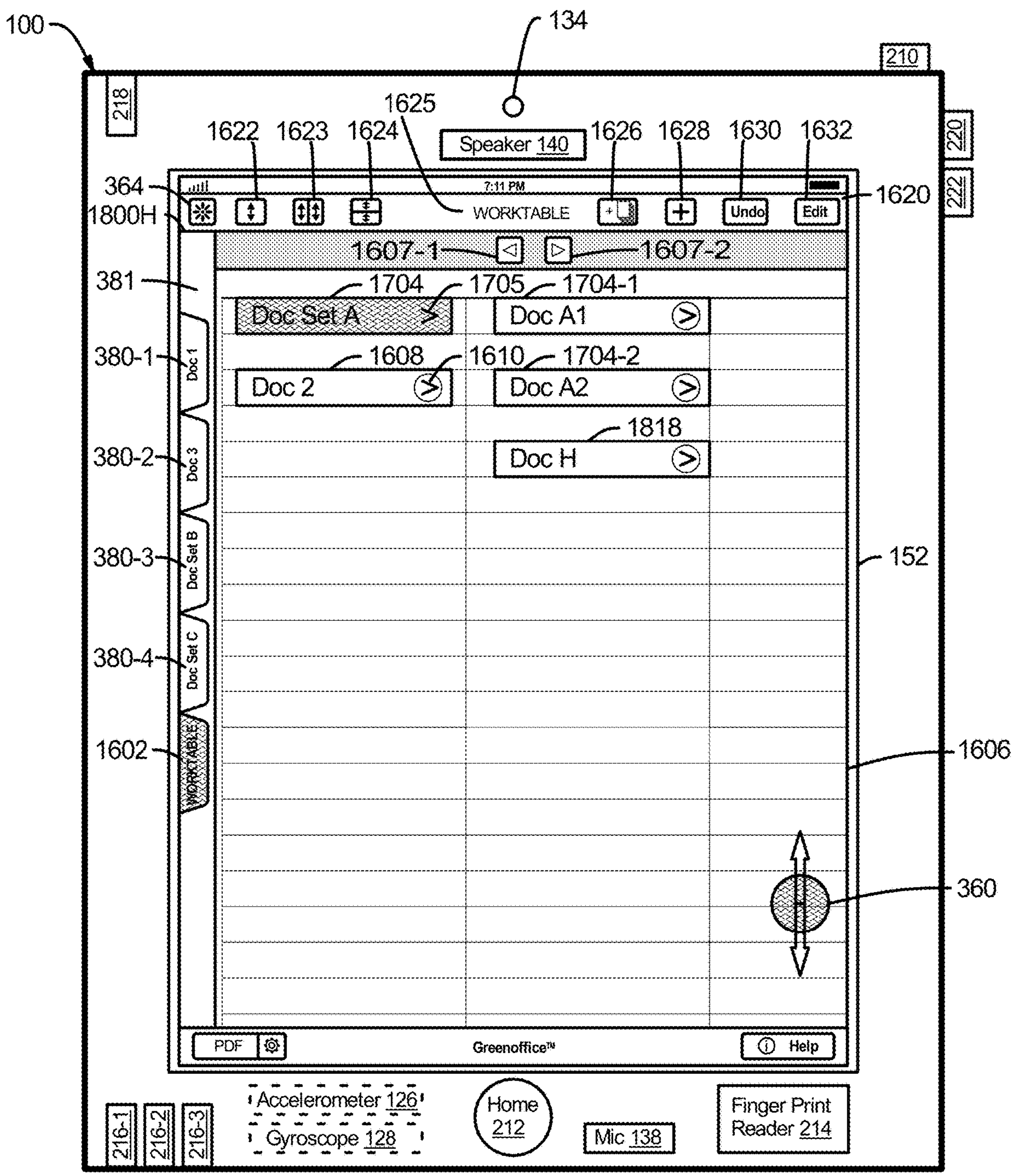
Figure 19A:
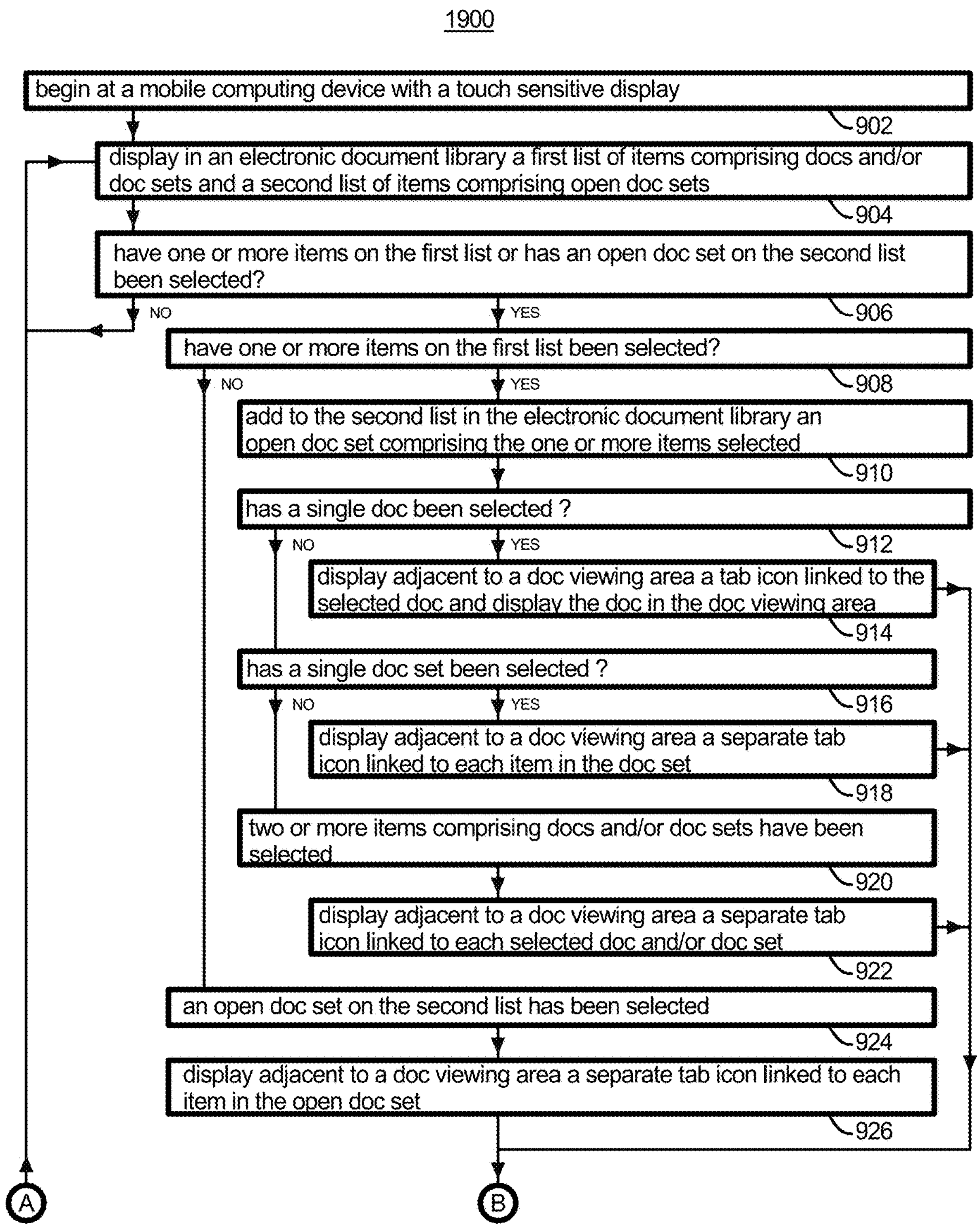
FIGS. 19A-19D is a flow diagram illustrating a process for working with electronic documents that includes methods for using gestures on a touch-sensitive display in accordance with some embodiments.
Figure 19B:
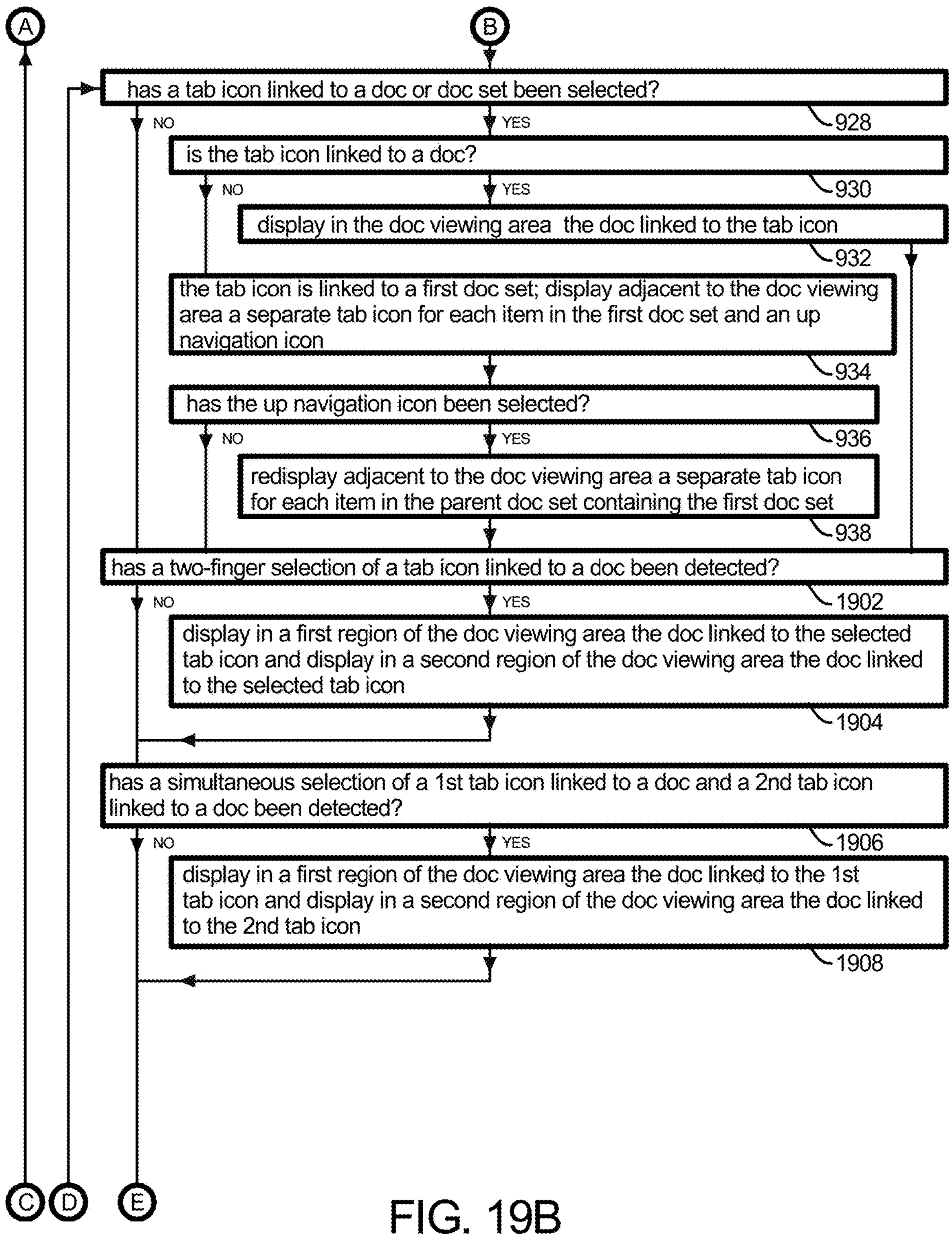
Figure 19C:
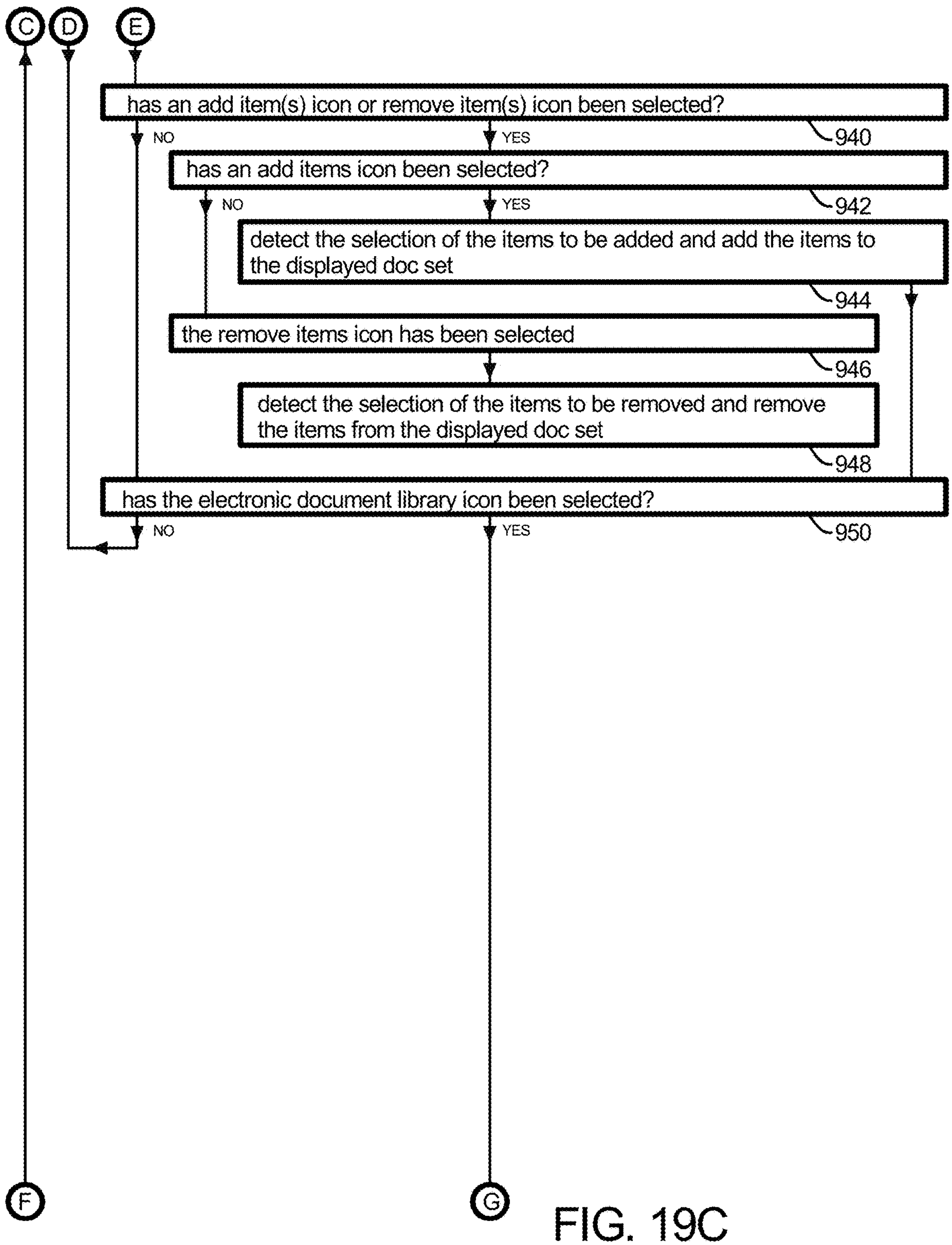
Figure 19D:
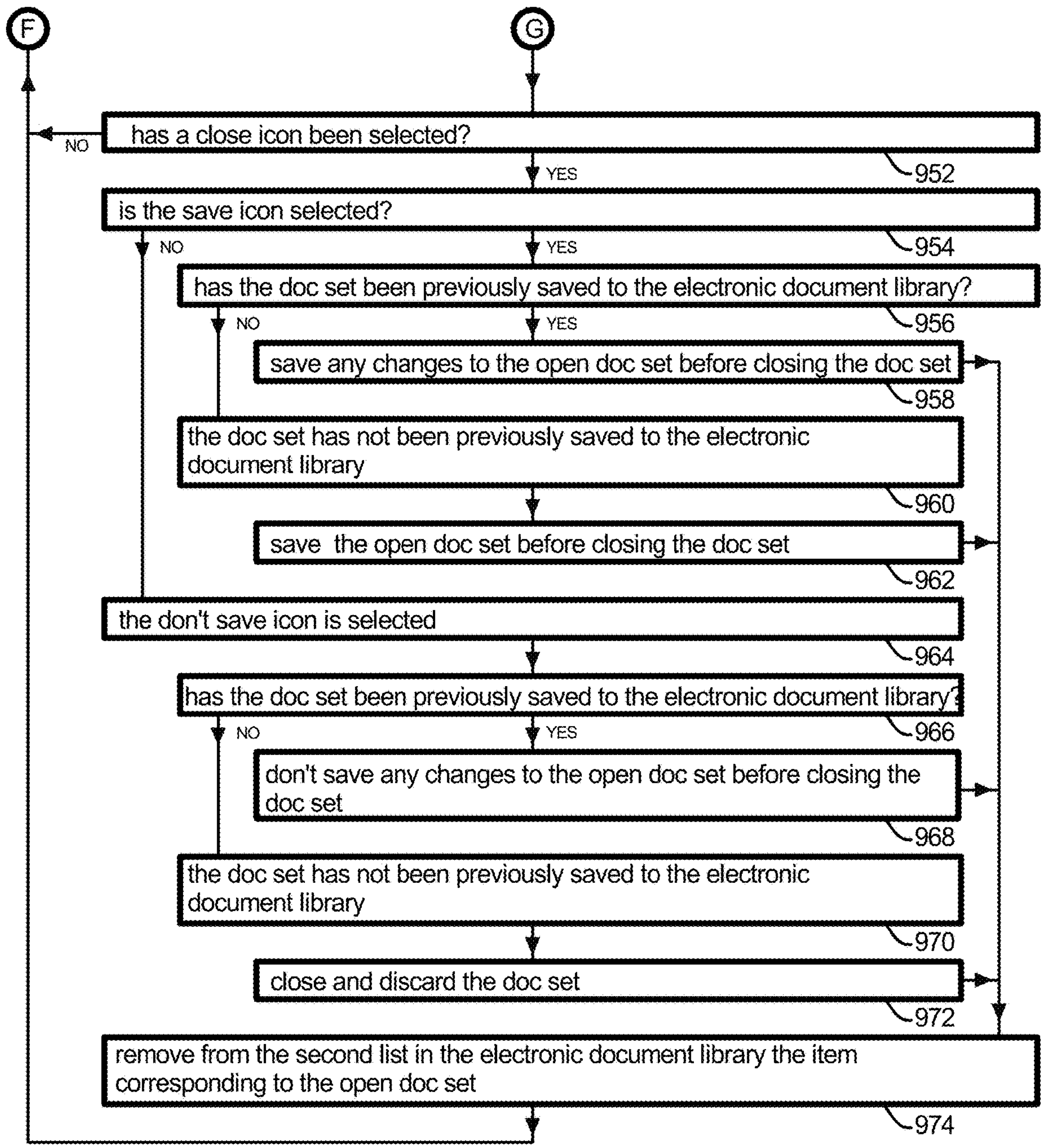
Figure 20A:
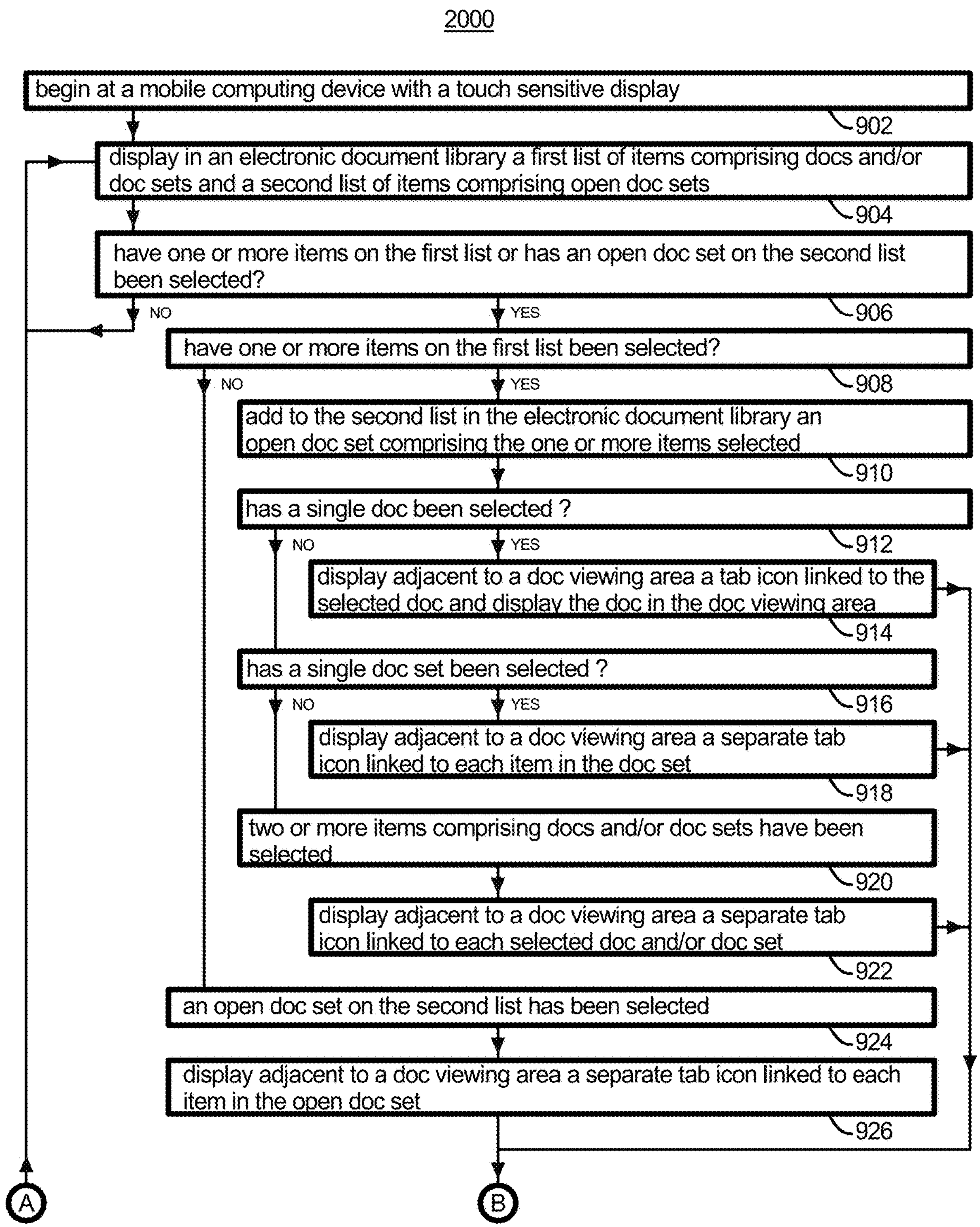
FIGS. 20A-20D is a flow diagram illustrating a process for working with electronic documents that includes methods for using gestures on a touch-sensitive display in accordance with some embodiments.
Figure 20B:
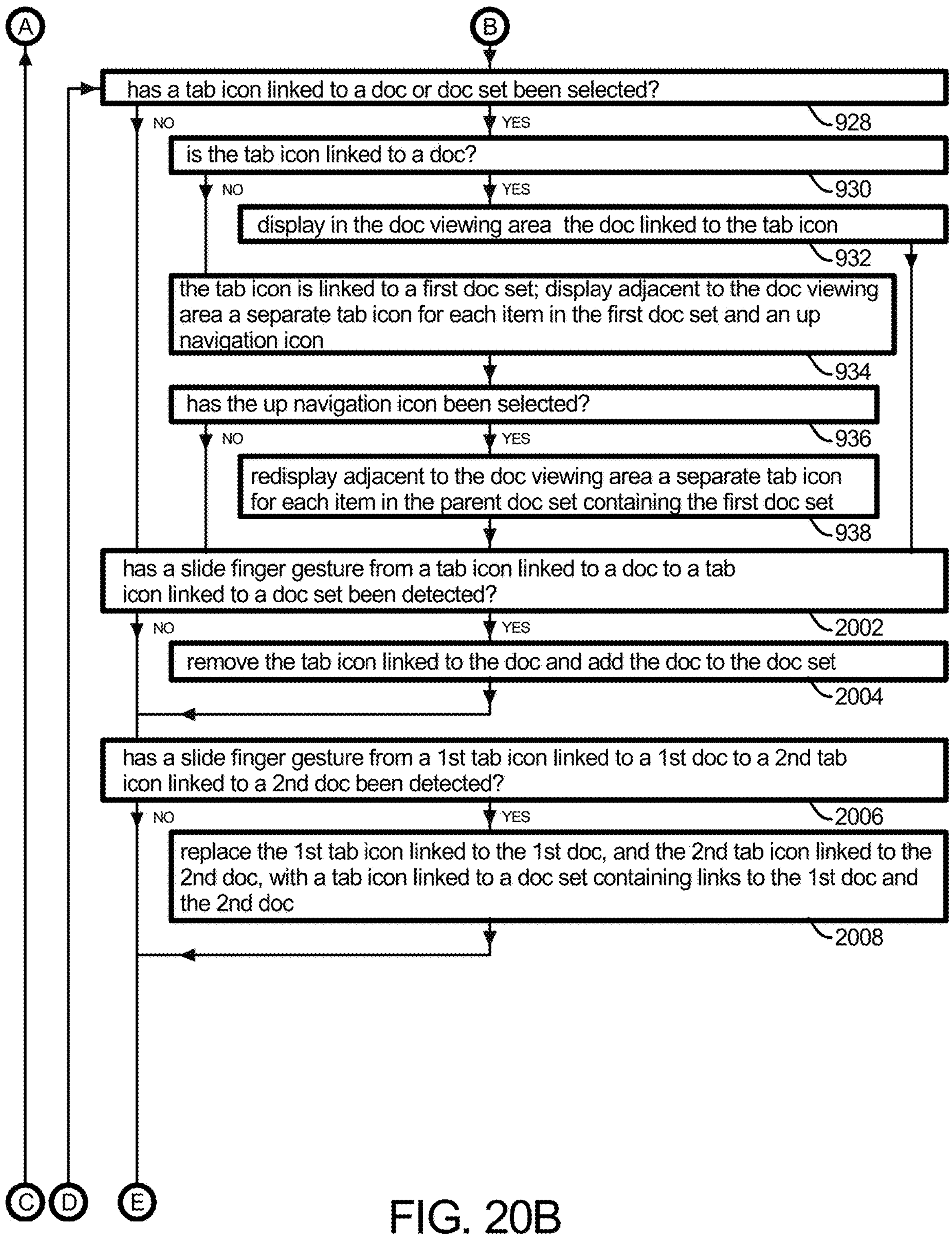
Figure 20C:
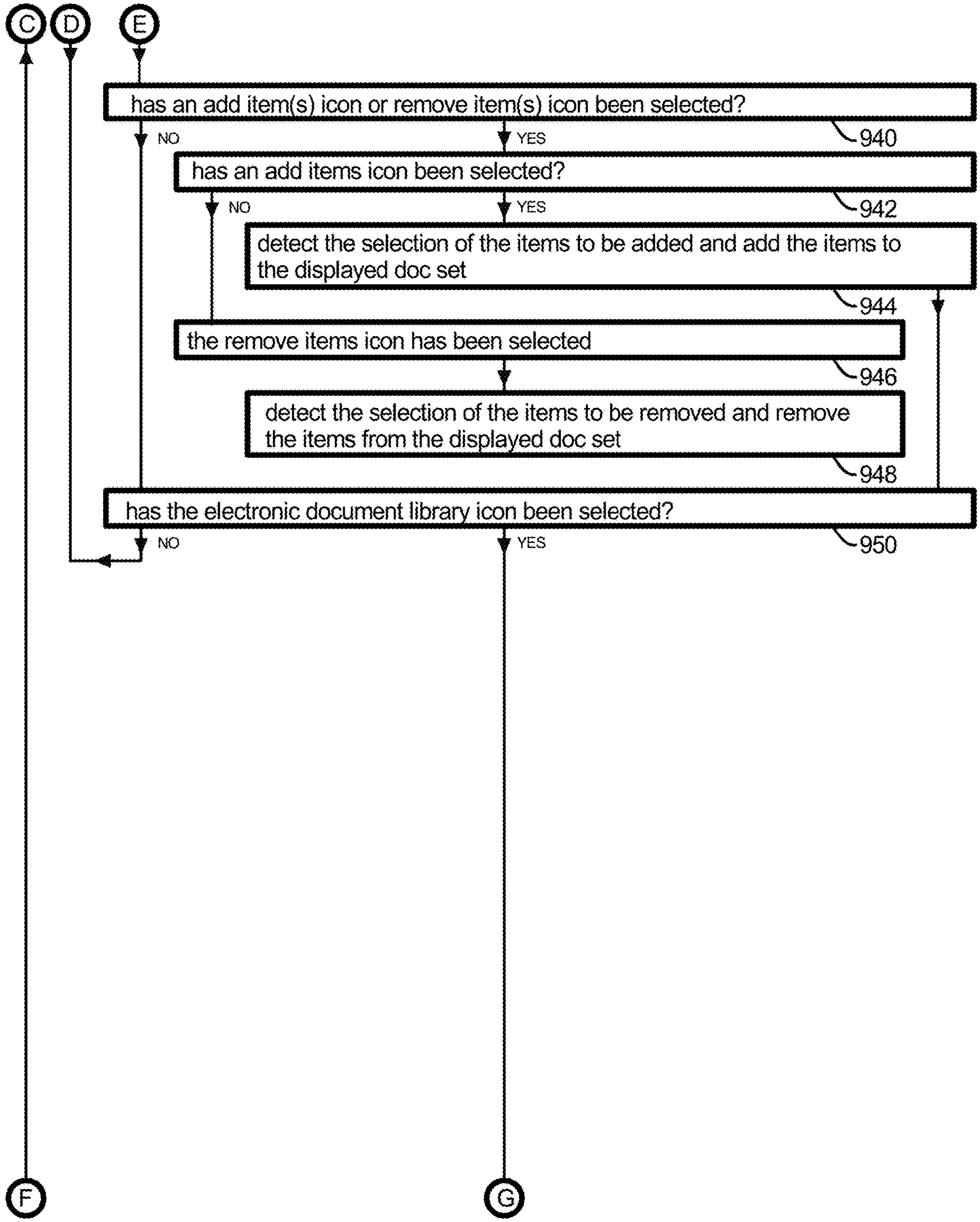
Figure 20D:
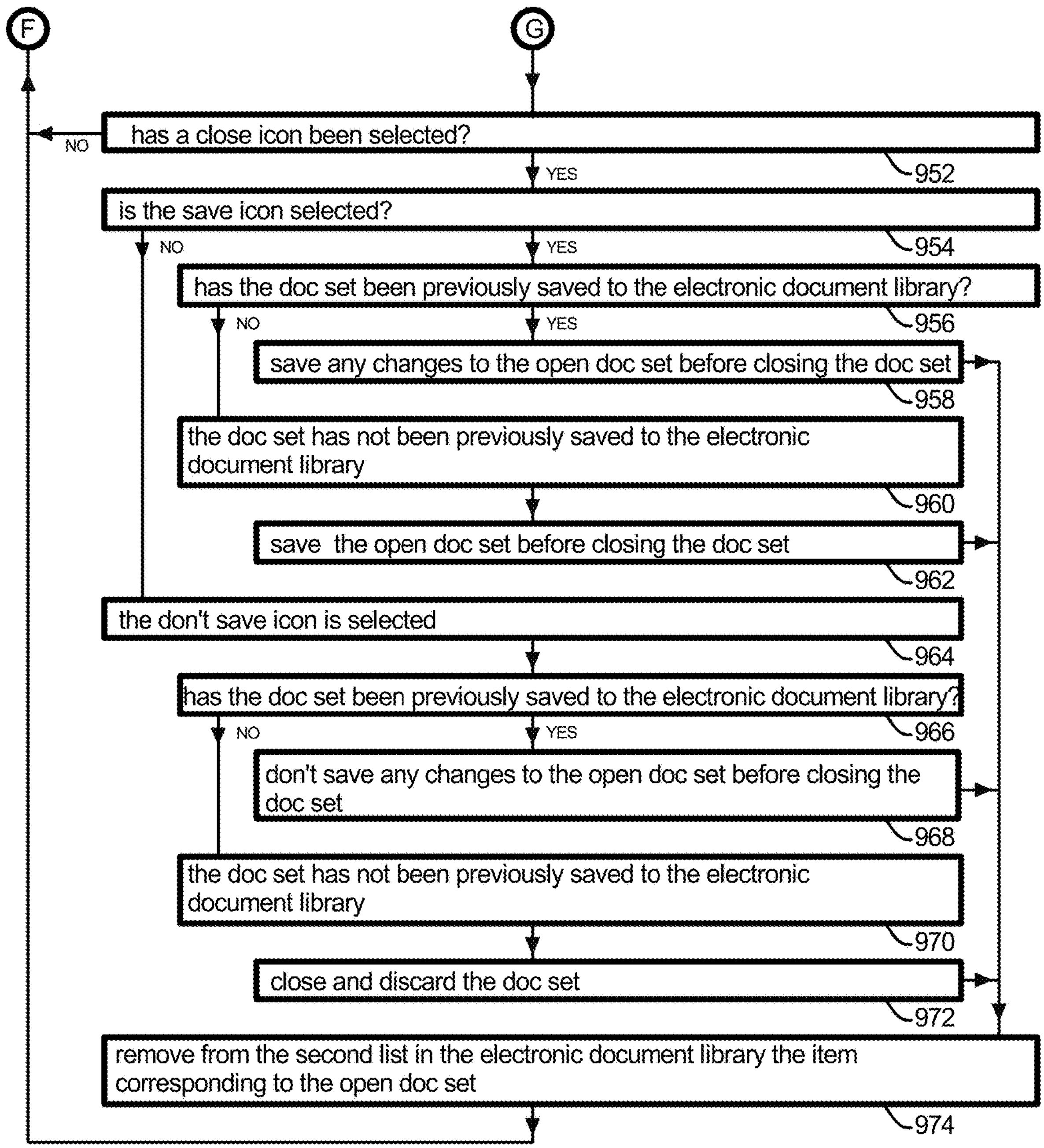
Figure 21A:
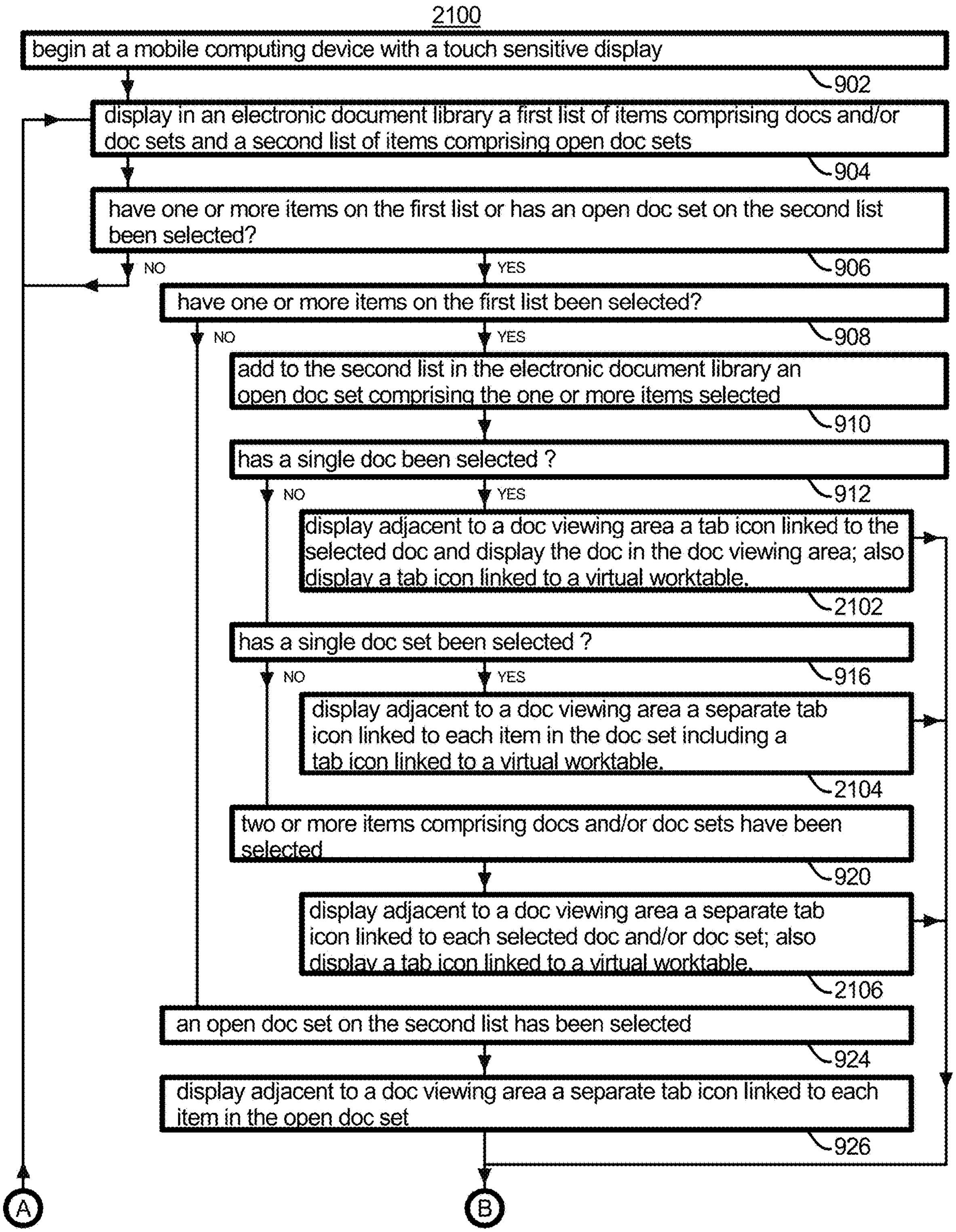
FIGS. 21A-21D is a flow diagram illustrating a process for working with electronic documents that includes methods for using a virtual worktable in accordance with some embodiments.
Figure 21B:
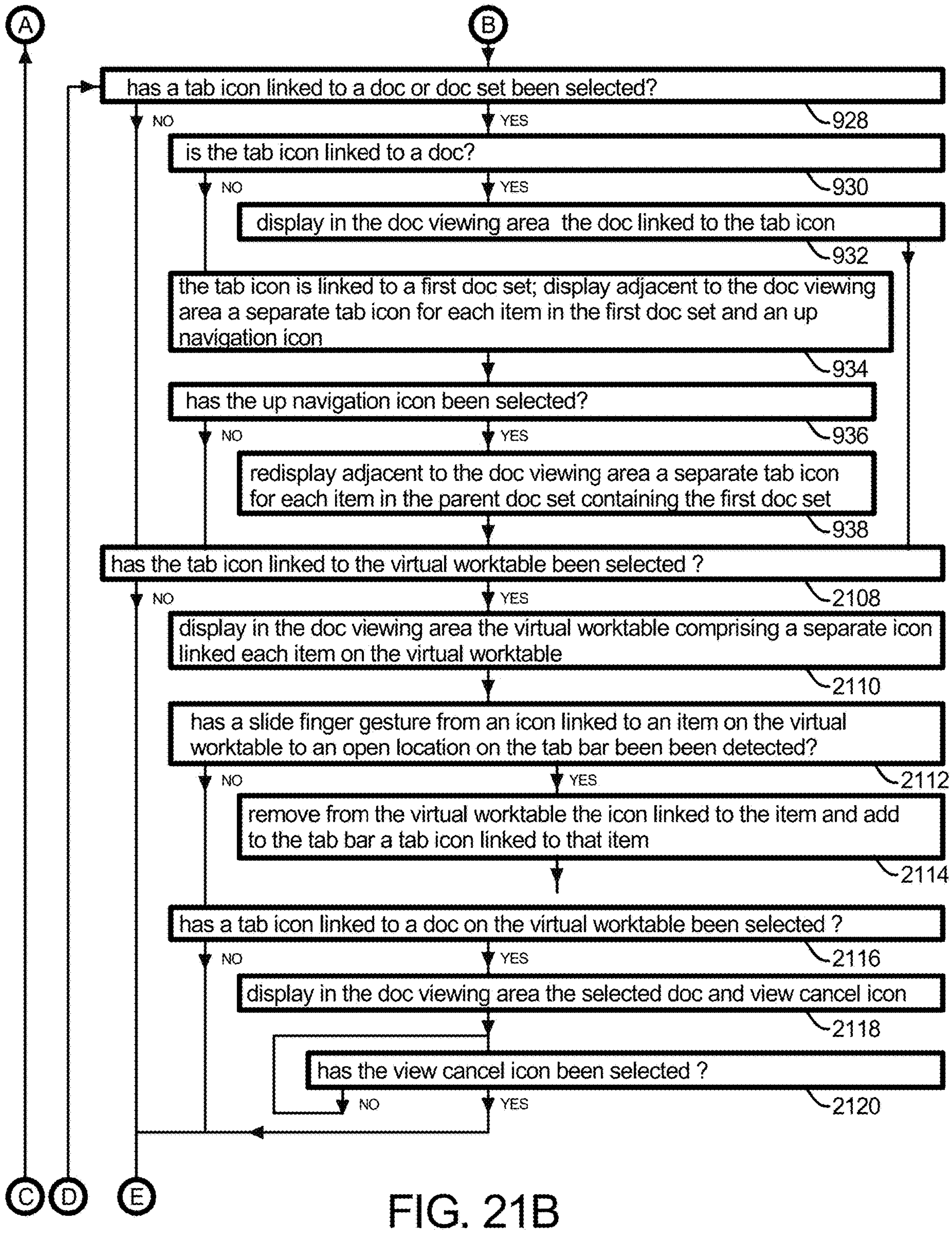
Figure 21C:
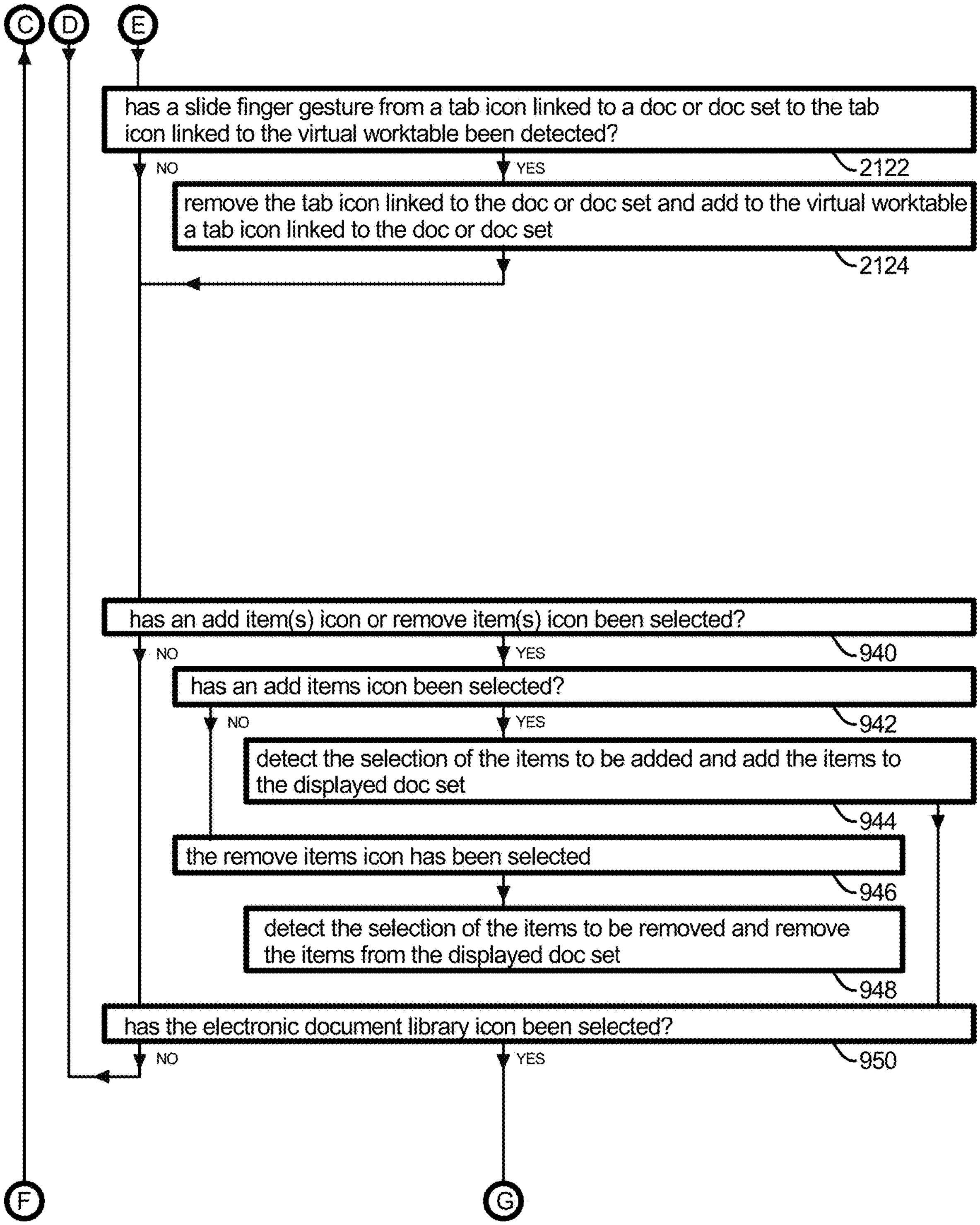
Figure 21D:
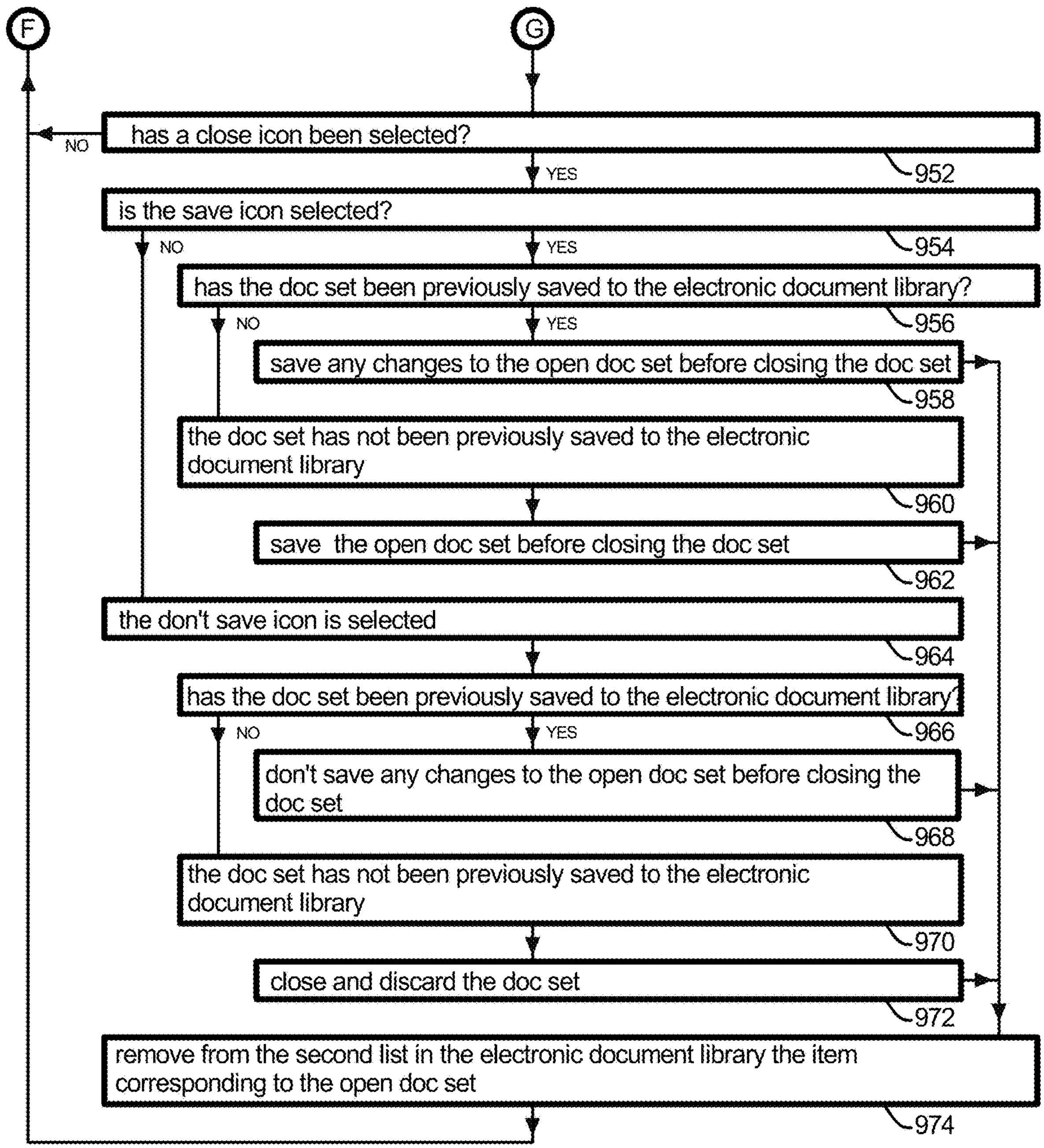

The user may then rename New Doc Set 1 by selecting delete name icon 1614 in UI 1700E. The device displays UI 1700F (FIG. 17F) with keyboard 510 displayed. The user may then use keyboard 510 to enter a user chosen doc set name. Once the user enters the new name and selects "Done" on the keyboard, the device displays UI 1700G (FIG. 17G). In this example, the user has entered the name "Doc Set C" as shown on icon 1706. Doc Set C now contains the four items that were dragged from doc set A into the new doc set. The user may display the items contained in Doc Set C by selecting icon 1706 linked to Doc Set C. The device displays UI 1700H (FIG. 17H) with icon 1706 linked to Doc Set C highlighted to show that icon 1706 has been selected. Since Doc Set C has been selected, UI 1700H (FIG. 17H) displays in the next column to the right, a separate icon linked to each item in Doc Set C. UI 1700H displays icon 1706-1 linked to Doc A4, icon 1706-2 linked to Doc A5, icon 1706-3 linked to Doc A6, and icon 1706-4 linked to Doc A7. The user may then drag one or more items from the worktable to item tab bar 381. For example, a user may drag icon 1706 linked to Doc Set C from worktable 1606 to an open location at the bottom of item tab bar 381 as illustrated in UI 1700H (FIG. 17H). The device displays UI 1700I (FIG. 17I) with new tab icon 380-4 linked to Doc Set C and icon 1706 previously linked to Doc Set C removed from worktable 1606. UI 1700I (FIG. 17I) displays the items that remain on worktable 1606. These items are icon 1704 linked to Doc Set A and icon 1608 linked to Doc 2. The user may select icon 1704 linked to Doc Set A. The device displays UI 1700J (FIG. 17J) with a separate icon linked to each item in Doc Set A displayed in a list in the second column on worktable 1606. The device may also highlight icon 1704 linked to Doc Set A as illustrated in FIG. 17J to indicate to the user that the second column is a list of items contained in Doc Set A. Beginning at UI 1700J (FIG. 17J), the user may select icon 1704-3 linked to Doc Set E (which is a member of Doc Set A). The device displays UI 1700K (FIG. 17K) with a separate icon linked to each item in Doc Set E displayed in a list in the third column on worktable 1606. Only the second and third columns of items on worktable 1606 are visible in FIG. 17K as the first column has been scrolled left by the device. The device may also highlight icon 1704-3 linked to Doc Set E as illustrated in FIG. 17K to indicate to the user that the second column is a list of items contained in the Doc Set E. The user may go back to view the previous view of items on worktable 1606 shown in UI 1700J (FIG. 17J) by selecting back navigation icon 1607-1 in UI 1700K (FIG. 17K).

The user may wish to display worktable 1606 in two separate scrollable windows to facilitate dragging an item from one location in the tree of items to another location. In a first example, the user may select icon 1623 on worktable toolbar 1620 to display the worktable in two windows, one on the left and one on the right. In a second example, illustrated in FIGS. 17K-17L, the user may select icon 1624 on worktable toolbar 1620 to display the worktable in two windows, one on the top and one on the bottom. The device displays UI 1700L (FIG. 17L) with worktable 1606 displayed in two separate scrollable windows as illustrated. In the top window, the user has selected icon 1704-3 linked to Doc Set E to display the items in Doc Set E. In the bottom window, the user has selected back navigation icon 1607-1 to navigate back to the window with icon 1704 linked to Doc Set A selected to display the items in Doc Set A. The user may scroll in the top window using a slide gesture 360-1 and in the bottom window using a slide gesture 360-2 to bring any item into view.

FIGS. 18A-18H illustrate exemplary user interfaces and methods for working with docs and doc sets using a virtual worktable in accordance with some embodiments. A user may remove an item from worktable 1606. In a first example, a user may wish to remove an item once the user determines that the item is no longer of interest to the work at hand. In a second example, a user may remove an item from a doc set that has been placed on worktable 1606. This second example is illustrated in the sequence FIGS. 18A-18D. Beginning at UI 1800A (FIG. 18A) a user may remove items from worktable 1606 by selecting "Edit" icon 1632. The device displays UI 1800B (FIG. 18B) with the "Select Items" message 1806 displayed on edit toolbar 1804. The user many then select one or more items by tapping the icon for that item. After each item is selected, the displayed UI is updated. In this example the user has performed a tap gesture 1808 to selected the one item Doc Set E in Doc Set A. The device displays UI 1800C (FIG. 18C) with the selected item 1810 marked as selected. The device displays the "1 Doc Selected" message 1812 on edit toolbar 1804. The device also displays the "Remove" icon 1814. Once the user has selected all the items for removal from worktable 1606 (Doc Set E in this example), the user may select "Remove" icon 1814. The device then displays UI 1800D (FIG. 18D), where icon 1704-3 linked to Doc Set E has been removed from Doc Set A.

A user may add an item to worktable 1606. In a first use case, a user may add an item to worktable 1606 by dragging a doc tab icon or doc set tab icon to worktable tab 1602. Examples of this use case were discussed in reference to FIGS. 16A-16F and FIGS. 17A-17L. In a second use case, user may add an item to worktable 1606 by selecting that item from the My Docs UI. A user may wish to add an item directly to the worktable, rather than adding the item as a new tab in the View Doc UI, to most efficiently support the work at hand. In a first example, the user may wish to add one or more reference docs to worktable 1606 since docs on worktable 1606 can be readily accessed with a single finger tap from any level of the tree of docs and doc sets displayed in the My Docs UI. In a second example, a user may have a doc set on worktable 1606 to which the user would like to add a doc or doc set. This second example is illustrated in the sequence FIGS. 18D-18H. Beginning at UI 1800D (FIG. 18D) a user may add items from the My Docs UI directly to worktable 1606 by selecting "+" icon 1628. The device displays My Docs UI 1800E (FIG. 18E) with the "Select Items" message displayed on add items toolbar 433. The user many then select one or more items. In this example UI the user does this by tapping the selection target next each item. After each item is selected, the displayed UI is updated. In this example the user has performed a tap gesture on the selection target next to the item "Doc H". The device displays UI 1800F (FIG. 18F) with the selection target 1816 next to the item Doc H marked as selected. The device also displays the "1 Doc Selected" message on add items toolbar 433. The device also displays "Add" icon 432. Once the user has selected all the items to be added to worktable 1606 (Doc H in this example), the user may select "Add" icon 432. The device then displays UI 1800G (FIG. 18G), where icon 1818 linked to Doc H has been added to worktable 1606. In this example, icon 1704 linked to Doc Set A, and icon 1608 linked to Doc 2 is also displayed in UI 1800G (FIG. 18G) as these items had been previously moved to worktable 1606. The user may then add Doc H to Doc set A by dragging icon 1818 linked to Doc H to icon 1704 linked to Doc Set A. The device then displays UI 1800H (FIG. 18H) with Doc H included in Doc Set A. In this example in UI 1800G, icon 1704 linked to Doc Set A to which the user wished to drag icon 1818 linked to Doc H could be viewed without scrolling up or down the page. However, with more items on the worktable, the items may not appear on the same page of worktable 1606. In this case the user may drag icon 1808 linked the Doc H down the screen to a position near the lower boundary. In response to detecting this gesture, the device will then slowly scroll up the page. Once icon 1704 linked to Doc Set A scrolls into view, the user may drag icon 1808 to icon 1704 to complete the step of adding the item Doc H to the item Doc Set A using worktable 1606.

The exemplary user interfaces and methods for working with docs and doc sets using a virtual worktable discussed in reference to FIGS. 16A-16F, FIGS. 17A-17L, and FIGS. 18A-18H offer a number of features and benefits including the following:

The worktable is a doc set consisting of one or more docs and/or one or more doc sets.

The worktable may be saved as an item in the top level doc set with which the user is working, so that it can be accessed by the user the next day, the next week, the next month, the next year, or at any time in the future, when the user wishes to resume work related to a client, project, design, analysis, problem, opportunity, or plan.

The worktable is accessible from the View Docs UI via the worktable tab at any time and from any level within the tree of items within a doc set.

The user may navigate from viewing an item linked to a first tab, to viewing items on the worktable, and back to viewing an item linked to a second tab, all with a single tap.

The worktable supports a user's natural way of working with docs to enable a user to be more efficient and effective.

The worktable contains links to a relatively small number of docs when compared to the number of docs listed in the My Docs UI. The worktable provides a space for a user to place links to docs with which a user wishes to work for a particular project or purpose. Items may be added or removed from the worktable by the user in the course of work. Items that the user deems to be no longer useful or relevant to the work at hand, may be removed from the worktable. Those items that are removed may be added again from the My Docs UI as the removal of the link to the doc or doc set does not remove the original docs.

FIGS. 19A-19D is a flow diagram illustrating a process for working with electronic documents using gestures on a touch-sensitive display in accordance with some embodiments. FIGS. 4A-4P, FIGS. 5A-5N, FIGS. 6A-6N, and FIGS. 14A-14C illustrate exemplary user interfaces for use in implementing the methods presented in the flow diagram of FIGS. 19A-19D. The flow diagram connects across the four pages.

FIGS. 20A-20D is a flow diagram illustrating a process for working with electronic documents using gestures on a touch-sensitive display in accordance with some embodiments. FIGS. 4A-4P, FIGS. 5A-5N, FIGS. 6A-6N, and FIGS. 15A-15C illustrate exemplary user interfaces for use in implementing the methods presented in the flow diagram of FIGS. 20A-20D. The flow diagram connects across the four pages.

FIGS. 21A-21D is a flow diagram illustrating a process for working with electronic documents using a virtual worktable in accordance with some embodiments. FIGS. 4A-4P, FIGS. 5A-5N, FIGS. 6A-6N, and FIGS. 16A-16F, FIGS. 17A-17L, and FIGS. 18A-18H illustrate exemplary user interfaces for use in implementing the methods presented in the flow diagram of FIGS. 21A-21D. The flow diagram connects across the four pages.

FIGS. 22A-22D illustrate exemplary user interfaces and methods for working with docs and doc sets within the My Docs UI in accordance with some embodiments.

Figure 22A:
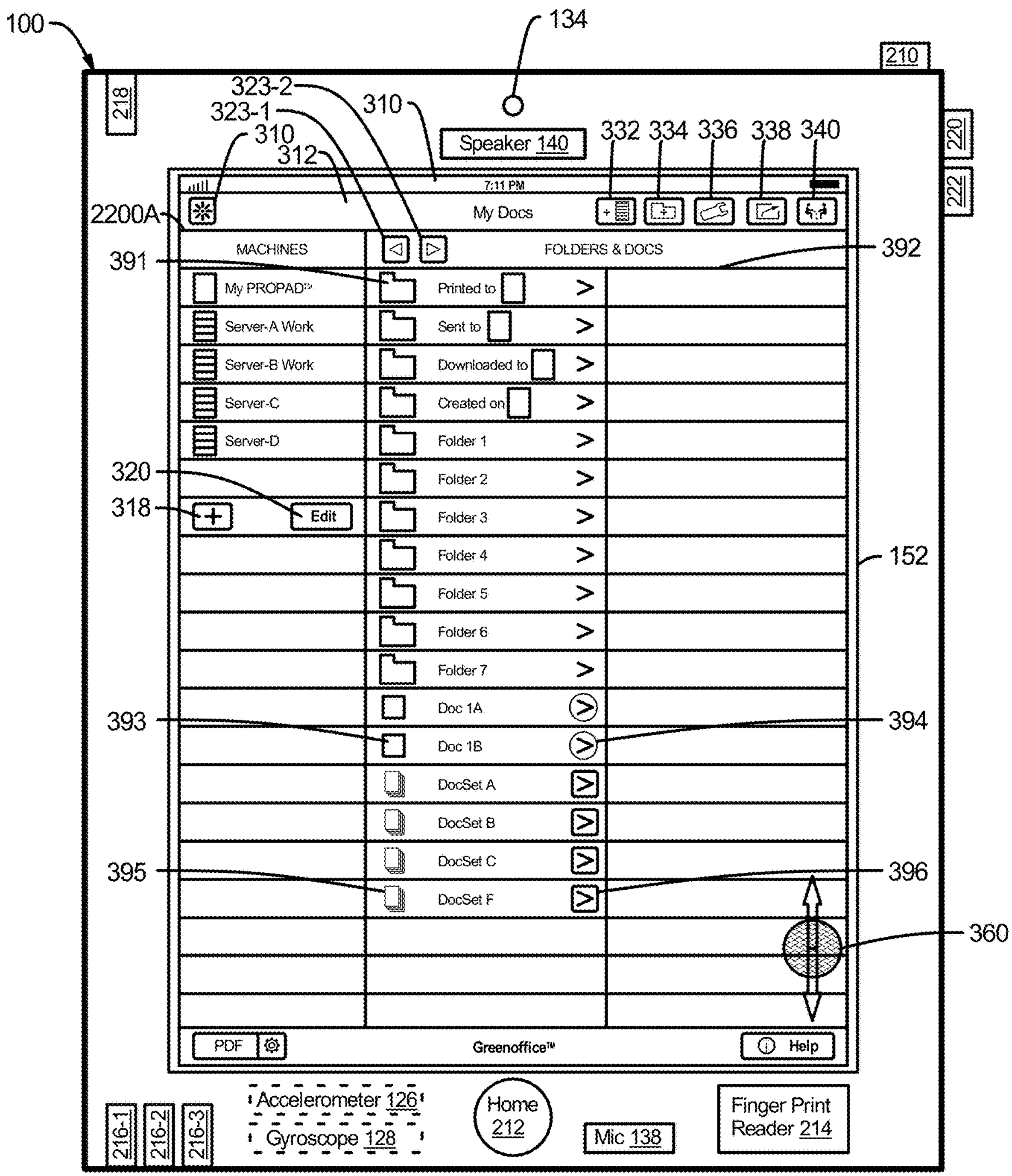
FIGS. 22A-22D illustrate exemplary user interfaces and methods for working with docs and doc sets within the My Docs UI in accordance with some embodiments.
Figure 22B:
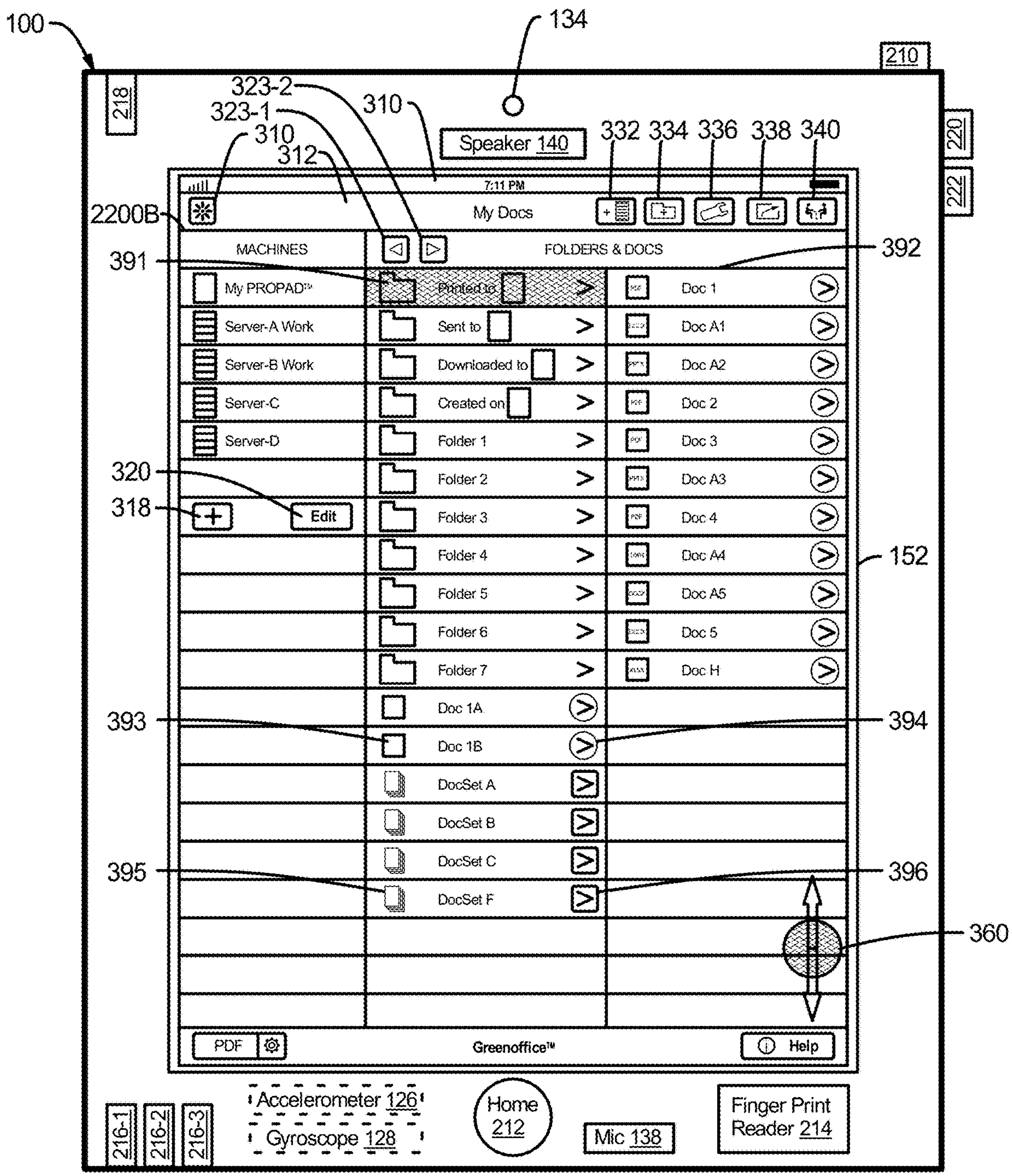

The user may select items that may include docs and/or doc sets in the My Docs UI for viewing in the View Docs UI as has been discussed with reference to FIGS. 3A-3B and FIGS. 4A-4P. The user may also view items in the My Docs UI to view additional information about those items while remaining in the My Docs UI. This is demonstrated in the sequence FIG. 22A-22D. We can begin at UI 2200A (FIG. 22A) with an exemplary My Docs UI. We show a list of folders, docs, and doc sets in the first column in the section labeled "FOLDERS AND DOCS". The user may select "Printed to" folder 391 in UI 2200A. The device displays UI 2200B (FIG. 22B) with the items contained in "Printed to" folder 391 displayed in a list in the second column in the section labeled "FOLDERS AND DOCS". The device may also highlight the selected "Printed to" folder 391 as illustrated in FIG. 22B to indicate to the user that the second column is a list of items contained in the highlighted folder. If the user selects "Doc 1B" icon 393 in UI 2200A, then the device will display Doc 1B and a tab icon linked to Doc 1B in the View Docs UI. (The selection of a single doc in the My Docs UI has previously been discussed with reference to FIGS. 4K-4L.) If the user selects ">" icon 394 for Doc 1B in UI 2200A, then the device will display additional information about Doc 1B. The additional information may include the doc name with file extension, the file type, the file creation date, and the date last saved. The additional information may include links to related files. For example, if the doc is a PDF type that has been created from another doc type, a docx file or xlsx file for example, then a link to the original file may be included to enable the user to edit the file. If the PDF is annotated, then a link to the un-annotated file may be included. Additional displayed information may also include meta data for the doc such as author, organization, keywords, and confidential classification. If the user selects "DocSet F" icon 395 in UI 2200A, then the device will display a separate tab icon linked to each item in Doc Set F in the View Docs UI. If the first item in Doc Set F is a doc, then the device may also display that doc in the View Docs UI. (The selection of a doc set in the My Docs UI with a single tap has previously been discussed with reference to FIGS. 5I-5J) If the user selects ">" icon 396 for Doc Set F, then the device will display UI 2200C (FIG. 22C) with the items contained in Doc Set F displayed in a list in the second column in the section labeled "FOLDERS AND DOCS".

Figure 22C:
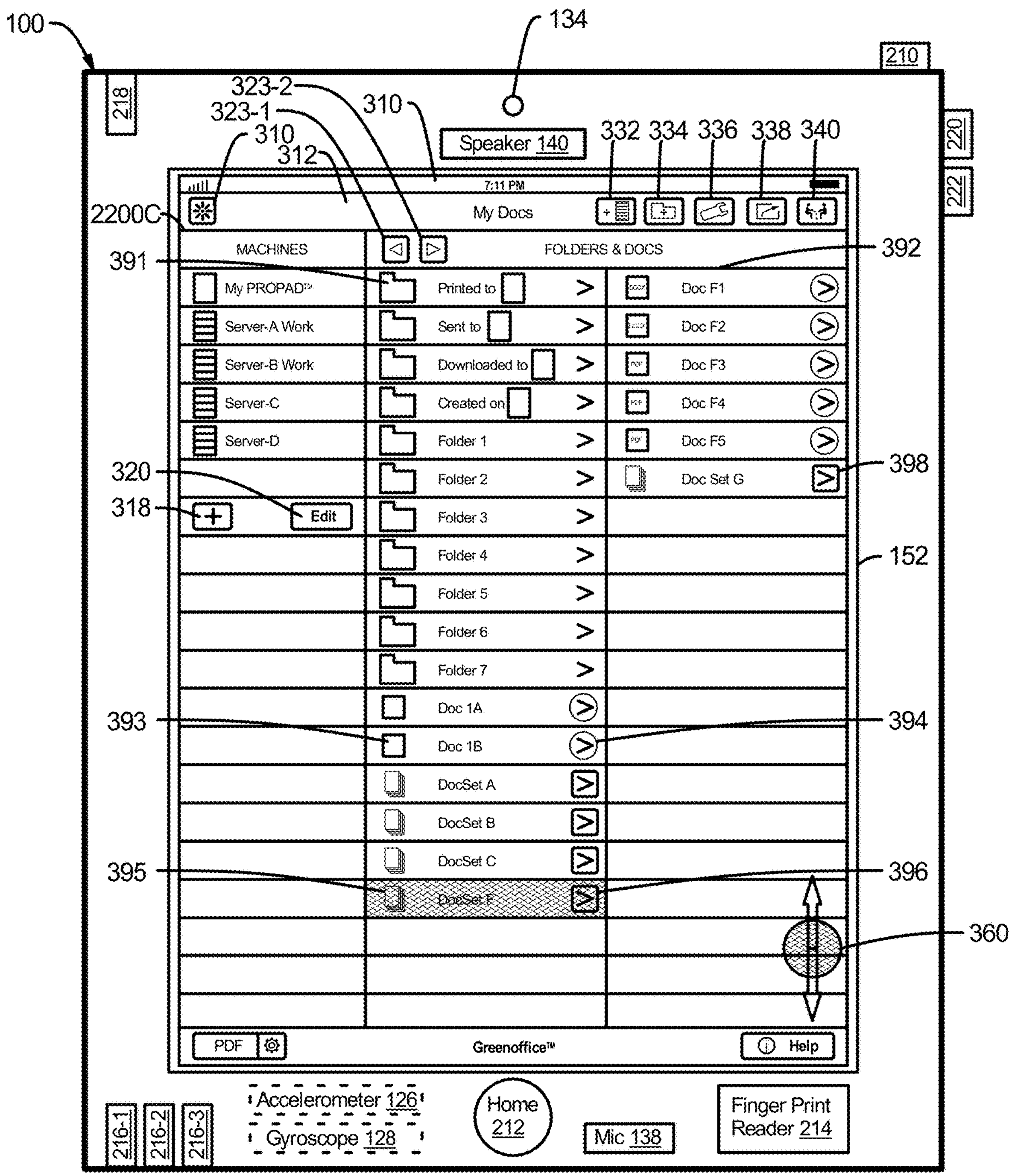
Figure 22D:
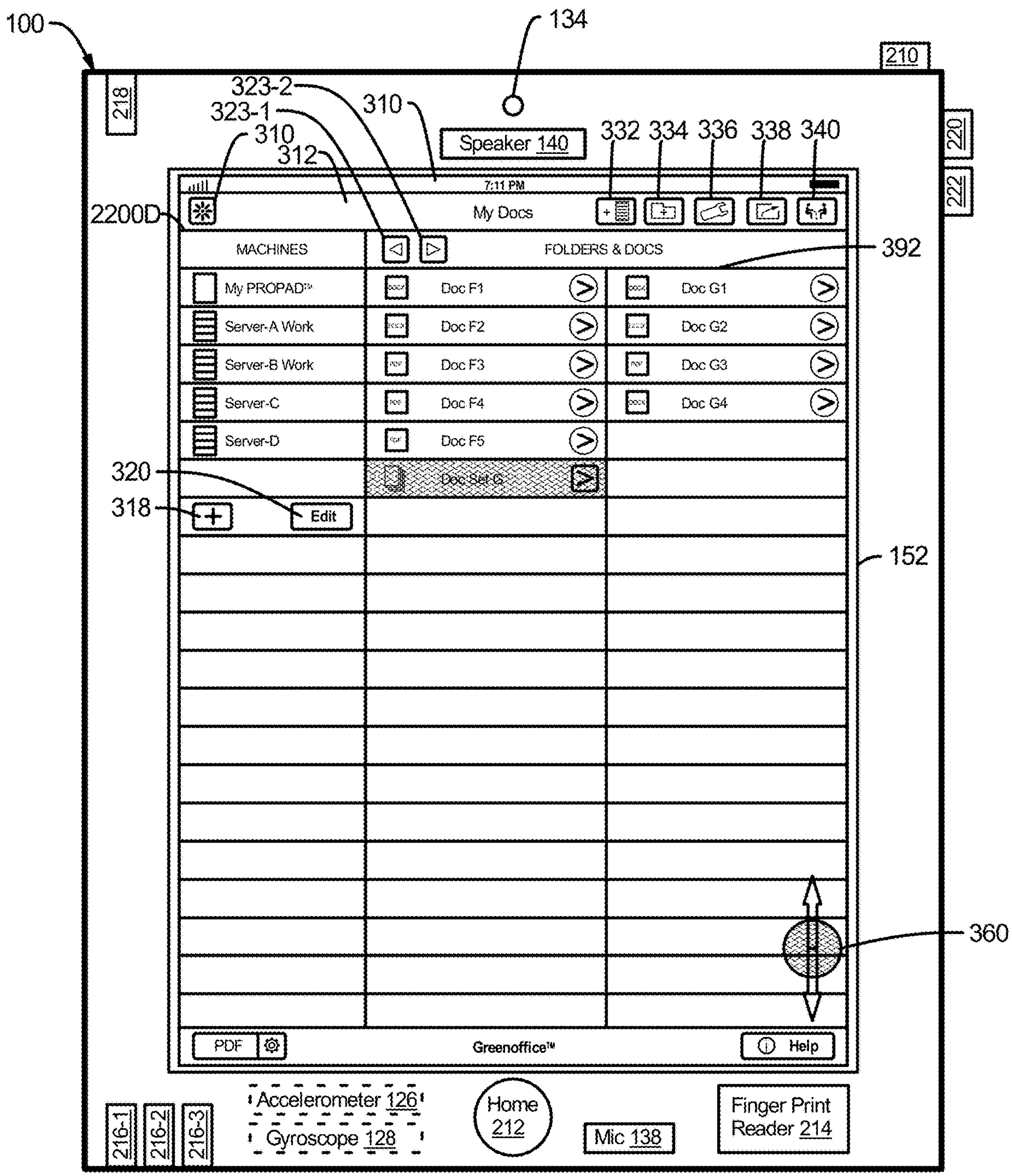

The device may also highlight the selected doc set Doc Set F as illustrated in FIG. 22C to indicate to the user that the second column is a list of items contained in Doc Set F. If the user selects ">" icon 398 for Doc Set G (which is a member of Doc Set F), then the device will display UI 2200D (FIG. 22D) with the items contained in Doc Set G displayed in a list in the second column in the section labeled "FOLDERS AND DOCS". The device may also highlight the selected doc set Doc Set G as illustrated in FIG. 22D to indicate to the user that the second column is a list of items contained in Doc Set G. The user may use back icon 323-1 and forward icon 323-2 to navigate back and forward between the recent views in the My Docs UI. For example: If the user selects back icon 323-1 in UI 2200D (FIG. 22D), then the device will display UI 2200C (FIG. 22C). If the user selects back icon 323-1 in UI 2200C (FIG. 22C), then the device will display UI 2200B (FIG. 22B). If the user selects back icon 323-1 in UI 2200B (FIG. 22B), then the device will display UI 2200A (FIG. 22A).

Figure 23A:
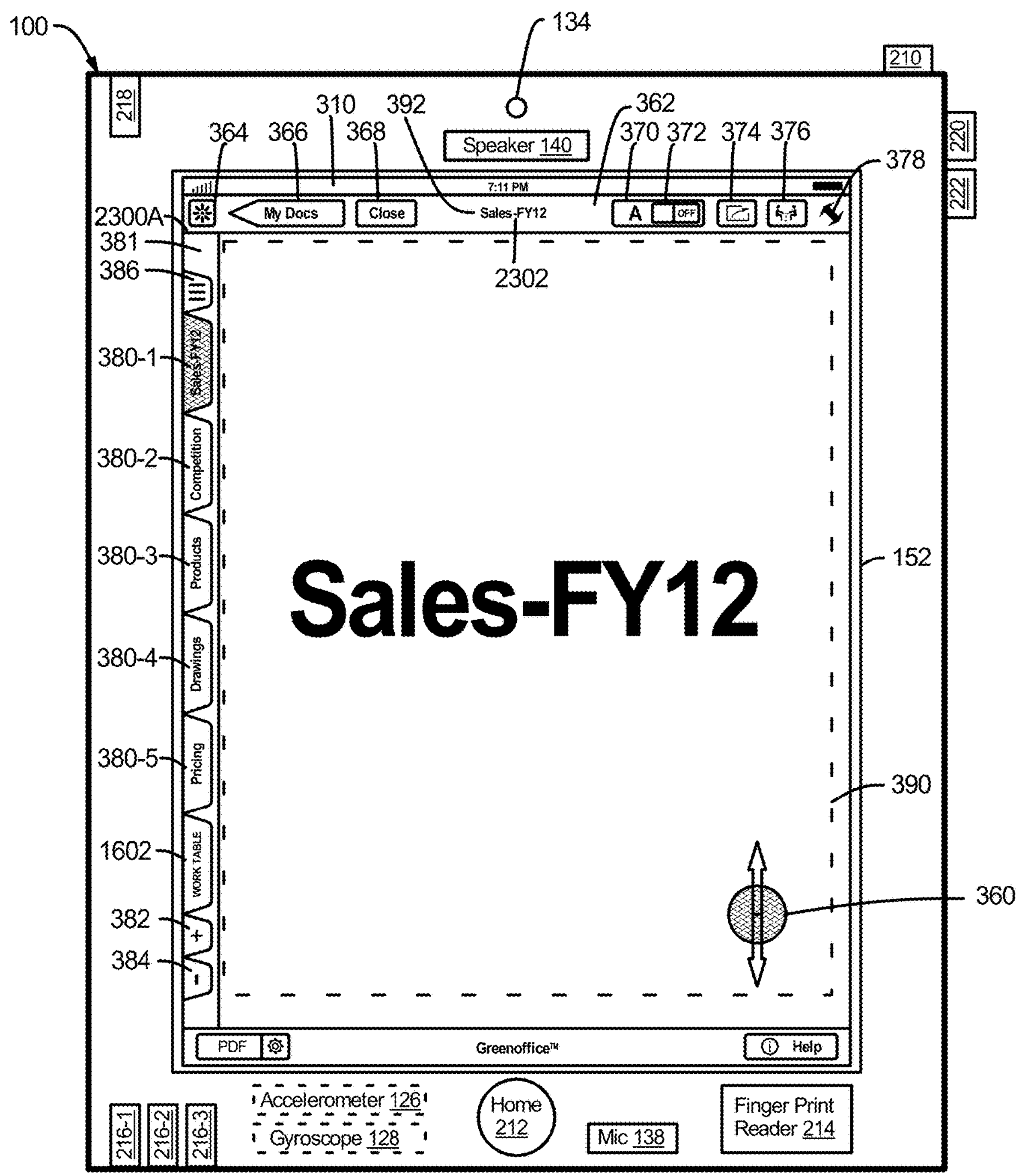
FIGS. 23A-23E illustrate exemplary user interfaces and methods for working with docs and doc sets within the View Docs UI in accordance with some embodiments.
Figure 23B:
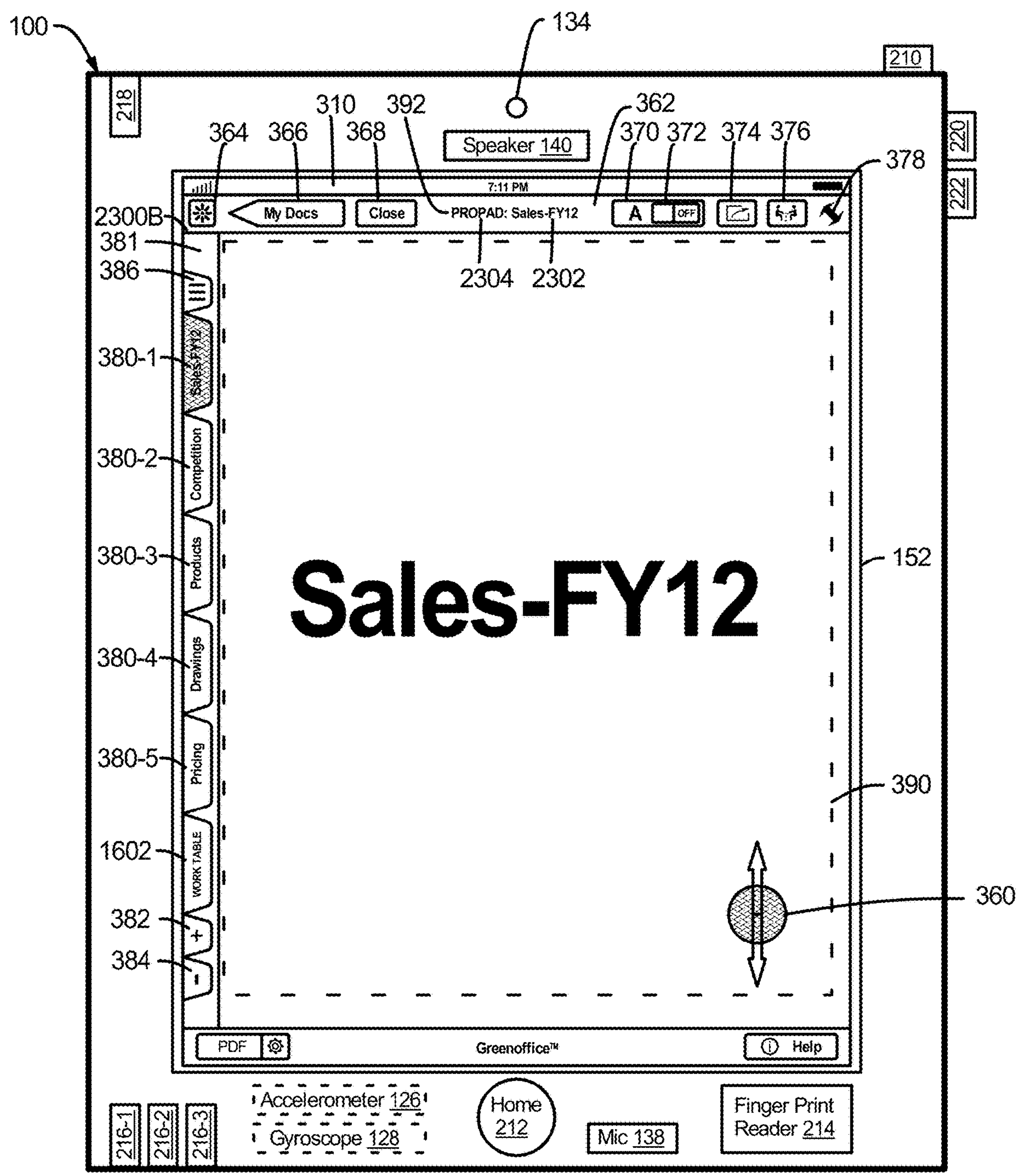
Figure 23C:
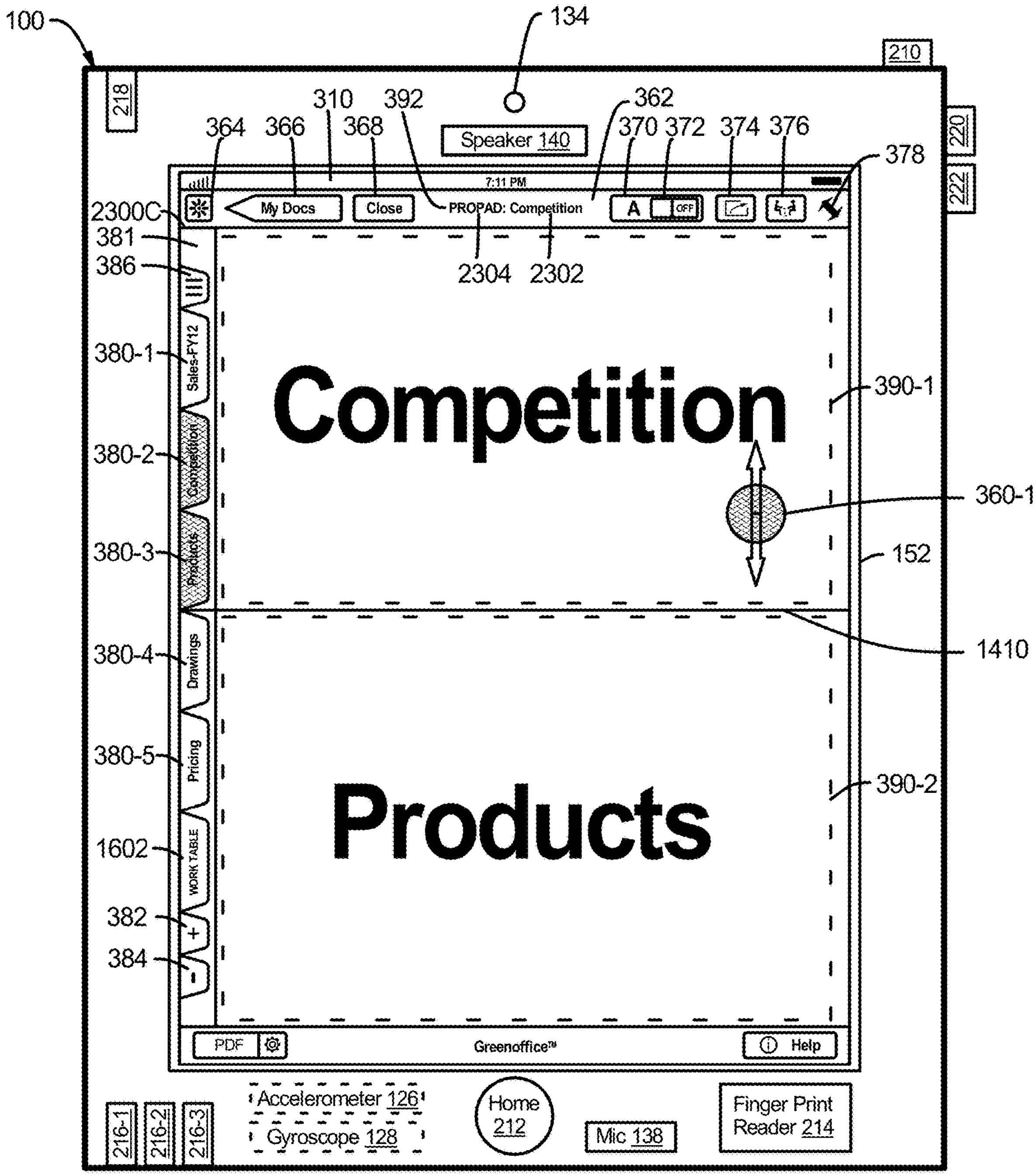
Figure 23D:
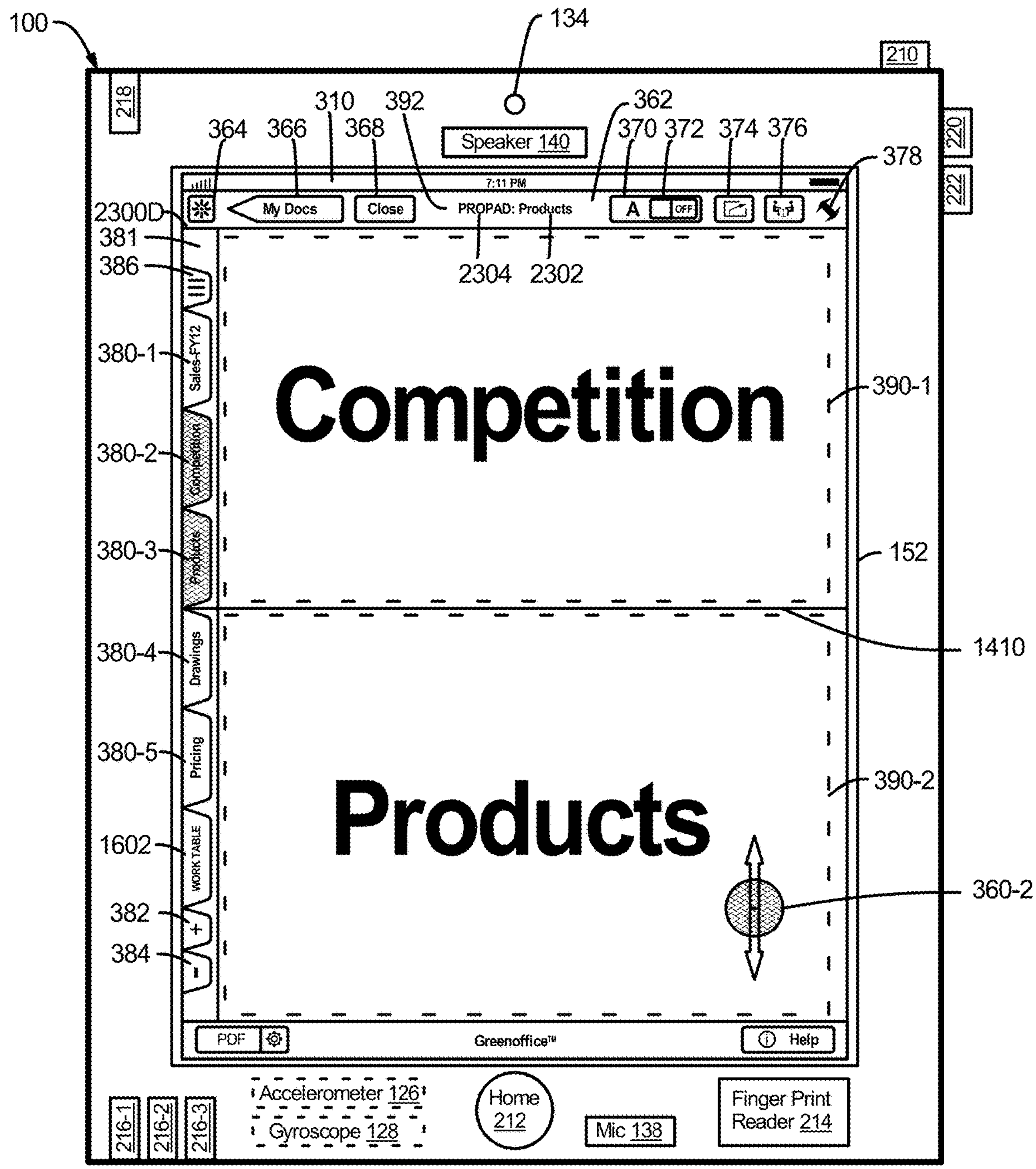
Figure 23E:
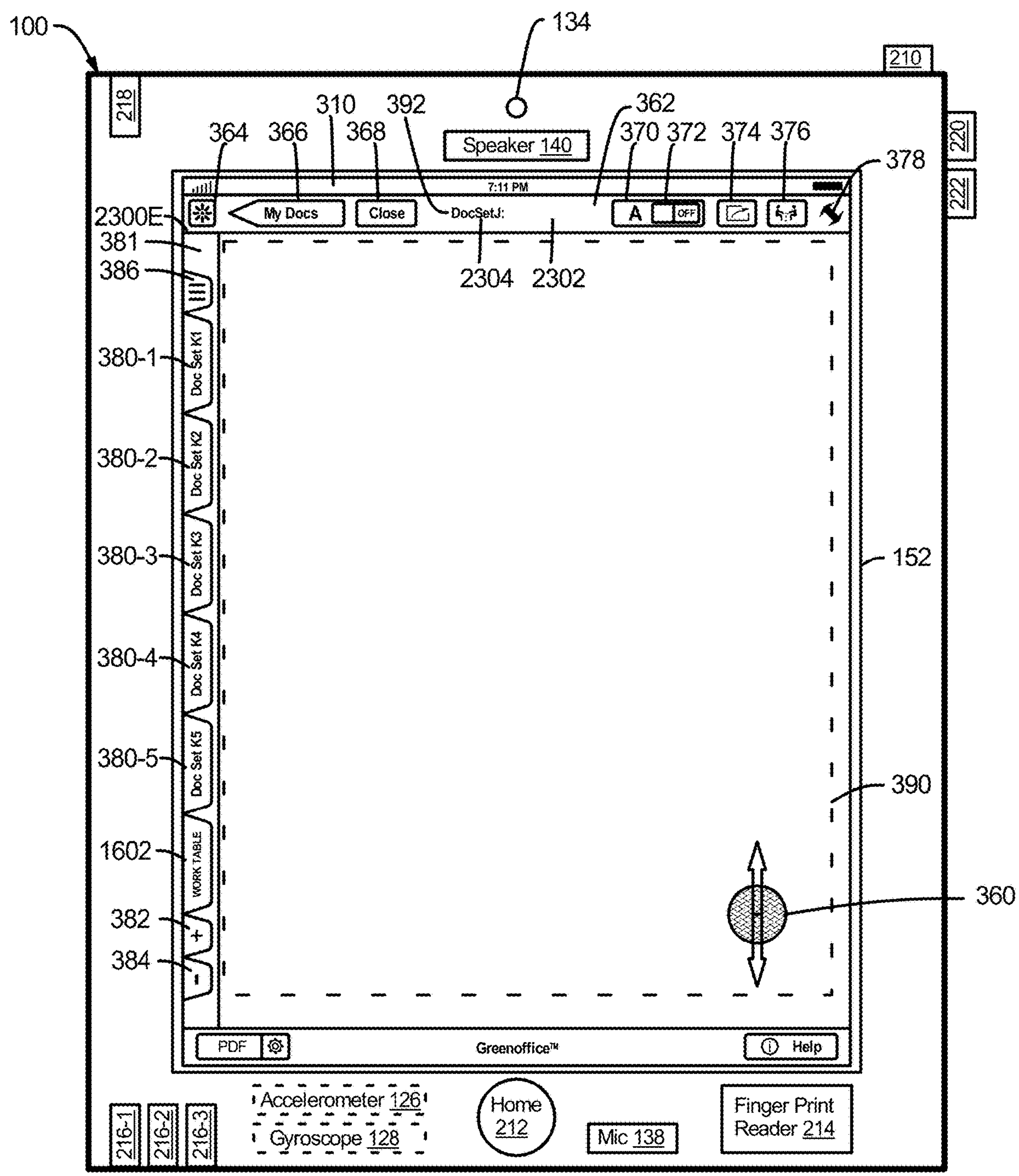

FIGS. 23A-23E illustrate exemplary user interfaces and methods for working with docs and doc sets within the View Docs UI in accordance with some embodiments. One exemplary View Docs UI 2300A is shown in FIG. 23A. The UI includes status bar 310, toolbar/navigation bar 362, brightness-adjustment icon 364, "My Docs" navigation icon 366, "Close" icon 368, currently-displayed doc name 392 ("Sales-FY12" in the example), annotation-toolbar-launch icon 370, annotation-enable "ON/OFF" icon 372, and action icon 374 where actions include those for sending or printing a doc or opening a doc in another application. Toolbar/navigation bar 362 also includes discuss icon 376 for initiating a discussion in one of three modes as outlined earlier in this disclosure. Finally, toolbar/navigation bar 362 includes full-screen-view icon 378. When full-screen-view icon 378 is selected, the displayed electronic doc is displayed in full-screen mode with all toolbars and tabs hidden until the user taps any location near the UI perimeter to revert to non-full-screen mode. The exemplary UI 2300A includes item tab bar 381 comprising tab icons 380-1 to 380-5 for each of the five items selected by the user as outlined in the method flow diagrams presented in FIGS. 9-13. In the example presented in UI 2300A (FIG. 23A) the currently selected doc is Sales-FY12 as shown by the highlighted tab 380-1 linked to the doc "Sales-FY12". The displayed doc name 392 includes only the doc name "Sales-FY12" and does not include the name of the parent doc set. This is similar to previous examples shown in previous FIGS. 3-8. Another exemplary UI and method may include displaying both the name of the selected doc and the name of the parent doc set. This is illustrated in exemplary View Docs UI 2300B presented in FIG. 23B. In this example, the five items "Sales-FY12", "Competition", "Products", "Drawings", and "Pricing" belong to a parent doc set "PROPAD". If the user selects tab 380-1 linked to the doc "Sales-FY12" in UI2300B, the device displays both the parent doc set name 2304 and the doc name 2302 as the currently-displayed doc name 392. As was discussed in reference to FIGS. 14A-14C, the user can view two docs in split screen view if the user simultaneously selects the two tabs linked to those two docs. The user may, for example, in UI 2300B (FIG. 23B) simultaneously select tab 380-2 linked to the doc "Competition" and the tab 380-3 linked to the doc "Products". The device displays UI 2300C (FIG. 23C) with those two docs in split screen view. The doc "Competition" is displayed in region 390-1 and the doc "Products" is displayed in region 390-2. The user may independently scroll either doc. The user may scroll the doc "Competition" using a scroll gesture 360-1. The device displays UI 2300C (FIG. 23C) and displays the parent doc set name "PROPAD™" and the doc name for the most recently scrolled doc—"Competition". The user may scroll the doc "Products" using a scroll gesture 360-2. The device displays UI 2300D (FIG. 23D) and displays the parent doc set name "PROPAD™" and the doc name for the most recently scrolled doc—"Products". Each time the user works with a particular doc by scrolling the doc, or selecting within the doc, the device displays the parent doc set name and doc name. Another exemplary View Docs UI 2300E is presented in FIG. 23E. In this example, the items linked to tab icons 380-1 to 380-5 are all doc sets and no doc is displayed. In this case, only name 2304 of the parent doc set is displayed on status bar 310.

In FIGS. 24-36 we present additional flow diagrams illustrating processes for working with electronic documents in accordance with some embodiments.

Figure 24:
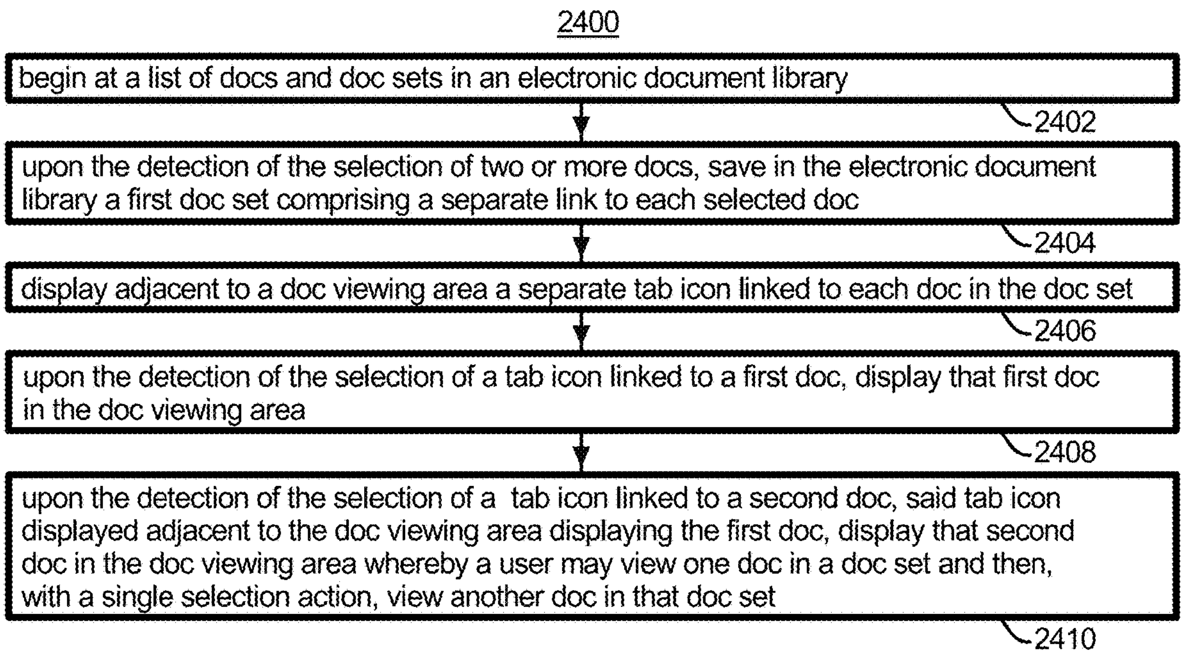
FIG. 24 is a flow diagram illustrating a process for working with electronic documents in accordance with some embodiments.

FIG. 24 is a flow diagram illustrating a process for working with electronic documents in accordance with some embodiments. FIGS. 4A-4P, FIGS. 5A-5N, FIGS. 6A-6N, FIGS. 7A-7F, FIGS. 8A-8I, FIGS. 14A-14C, FIGS. 15A-15C, FIGS. 16A-16F, FIGS. 17A-17L, FIGS. 18A-18H, FIGS. 22A-22D, and FIGS. 23A-23E illustrate exemplary user interfaces for use in implementing the methods presented in the flow diagram shown in FIG. 24.

Figure 25:
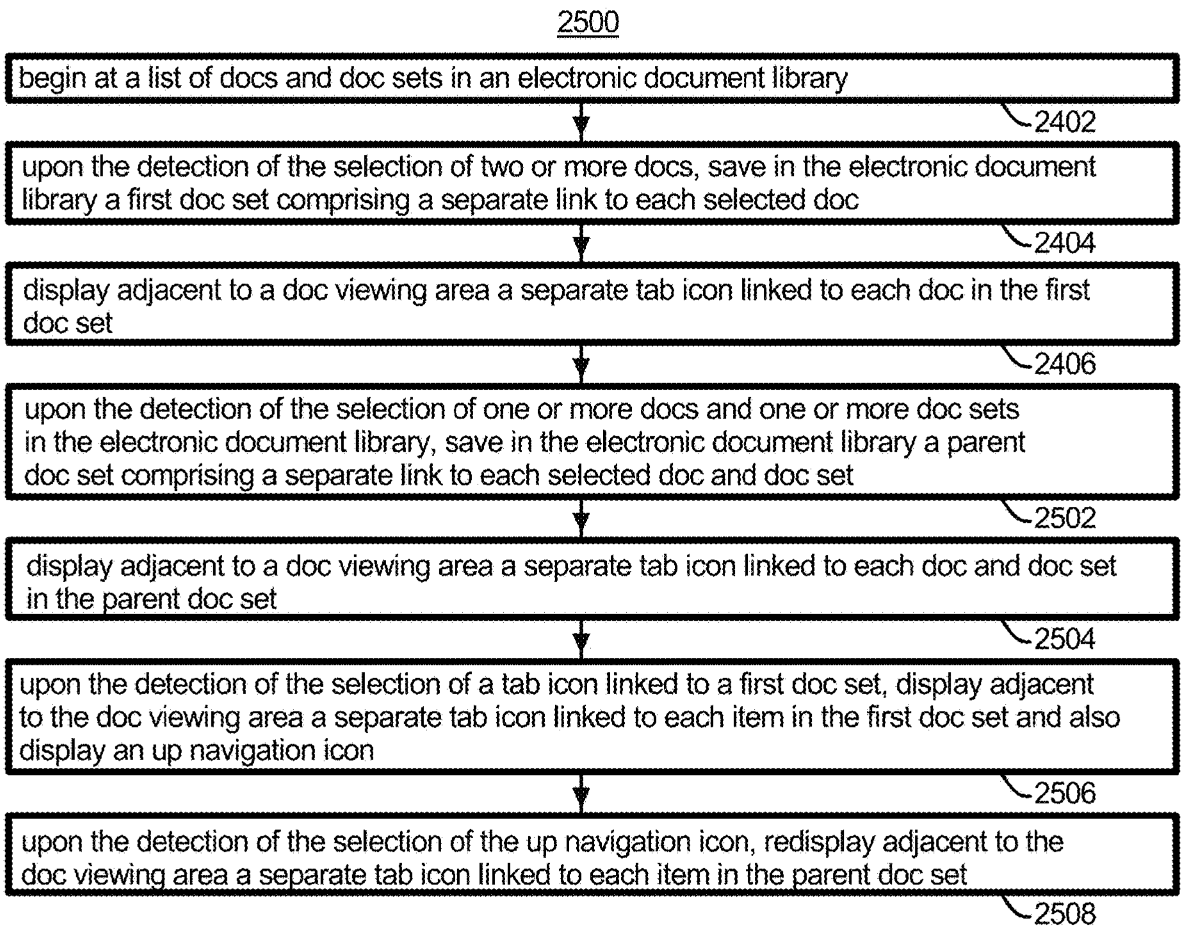
FIG. 25 is a flow diagram illustrating a process for working with electronic documents in accordance with some embodiments.

FIG. 25 is a flow diagram illustrating a process for working with electronic documents in accordance with some embodiments. FIGS. 4A-4P, FIGS. 5A-5N, FIGS. 6A-6N, FIGS. 7A-7F, FIGS. 8A-8I, FIGS. 14A-14C, FIGS. 15A-15C, FIGS. 16A-16F, FIGS. 17A-17L, FIGS. 18A-18H, FIGS. 22A-22D, and FIGS. 23A-23E illustrate exemplary user interfaces for use in implementing the methods presented in the flow diagram shown in FIG. 25.

Figure 26:
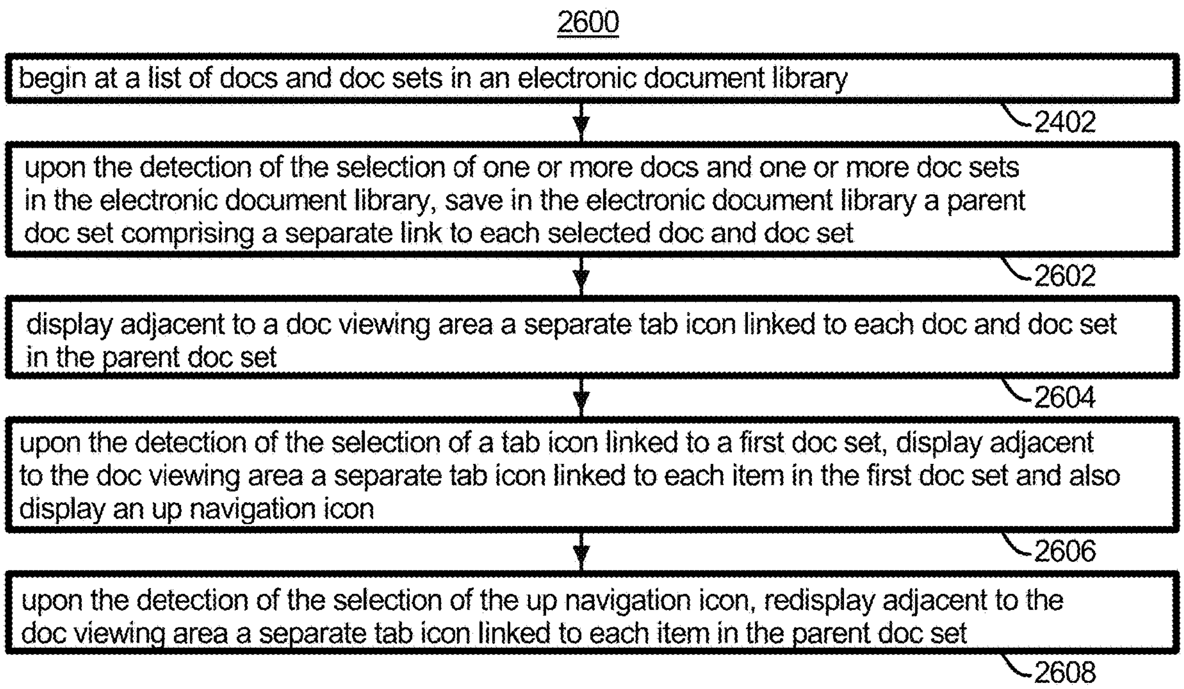
FIG. 26 is a flow diagram illustrating a process for working with electronic documents in accordance with some embodiments.

FIG. 26 is a flow diagram illustrating a process for working with electronic documents in accordance with some embodiments. FIGS. 4A-4P, FIGS. 5A-5N, FIGS. 6A-6N, FIGS. 7A-7F, FIGS. 8A-8I, FIGS. 14A-14C, FIGS. 15A-15C, FIGS. 16A-16F, FIGS. 17A-17L, FIGS. 18A-18H, FIGS. 22A-22D, and FIGS. 23A-23E illustrate exemplary user interfaces for use in implementing the methods presented in the flow diagram shown in FIG. 26.

Figure 27:
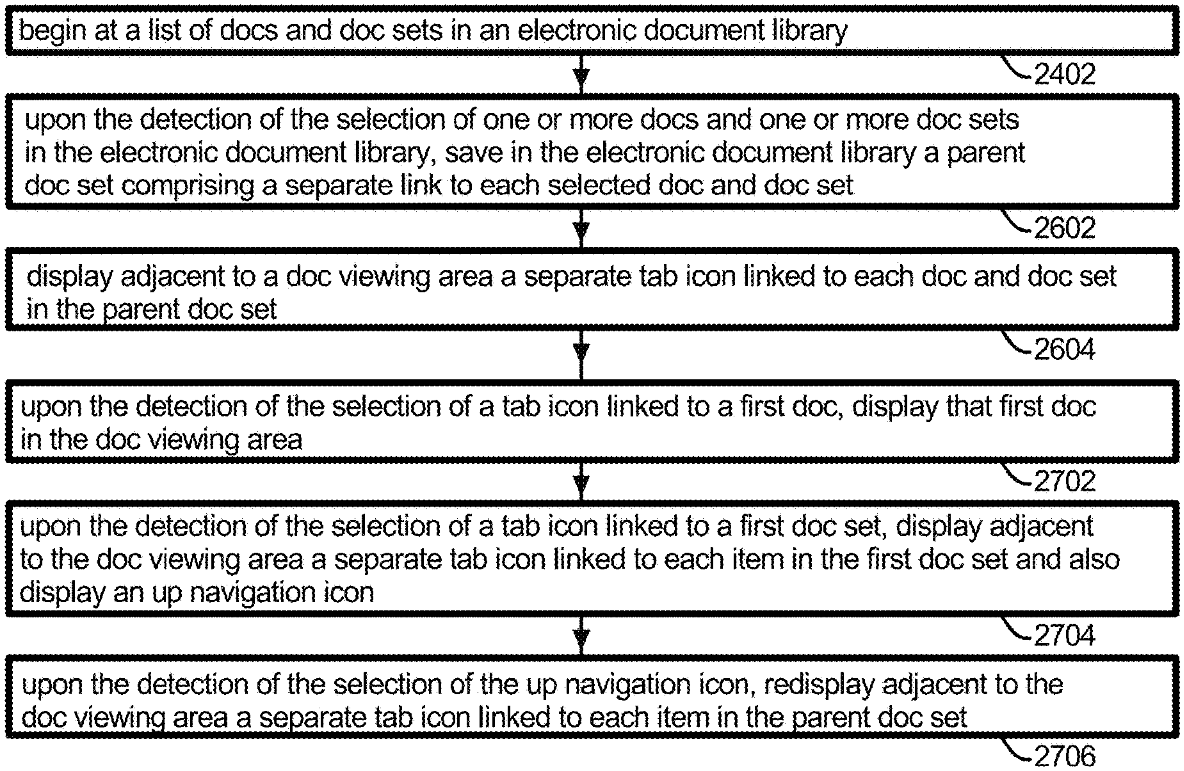
FIG. 27 is a flow diagram illustrating a process for working with electronic documents in accordance with some embodiments.

FIG. 27 is a flow diagram illustrating a process for working with electronic documents in accordance with some embodiments. FIGS. 4A-4P, FIGS. 5A-5N, FIGS. 6A-6N, FIGS. 7A-7F, FIGS. 8A-8I, FIGS. 14A-14C, FIGS. 15A-15C, FIGS. 16A-16F, FIGS. 17A-17L, FIGS. 18A-18H, FIGS. 22A-22D, and FIGS. 23A-23E illustrate exemplary user interfaces for use in implementing the methods presented in the flow diagram shown in FIG. 27.

Figure 28:
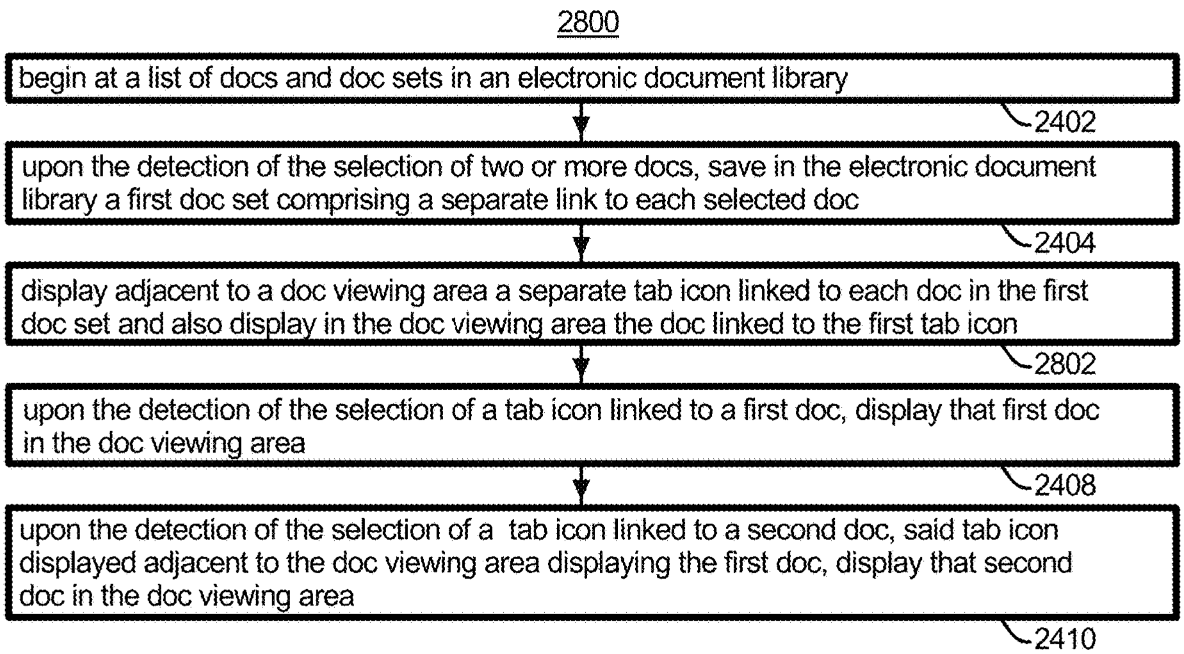
FIG. 28 is a flow diagram illustrating a process for working with electronic documents in accordance with some embodiments.

FIG. 28 is a flow diagram illustrating a process for working with electronic documents in accordance with some embodiments. FIGS. 4A-4P, FIGS. 5A-5N, and FIGS. 6A-6N illustrate exemplary user interfaces for use in implementing the methods presented in the flow diagram shown in FIG. 28

Figure 29:
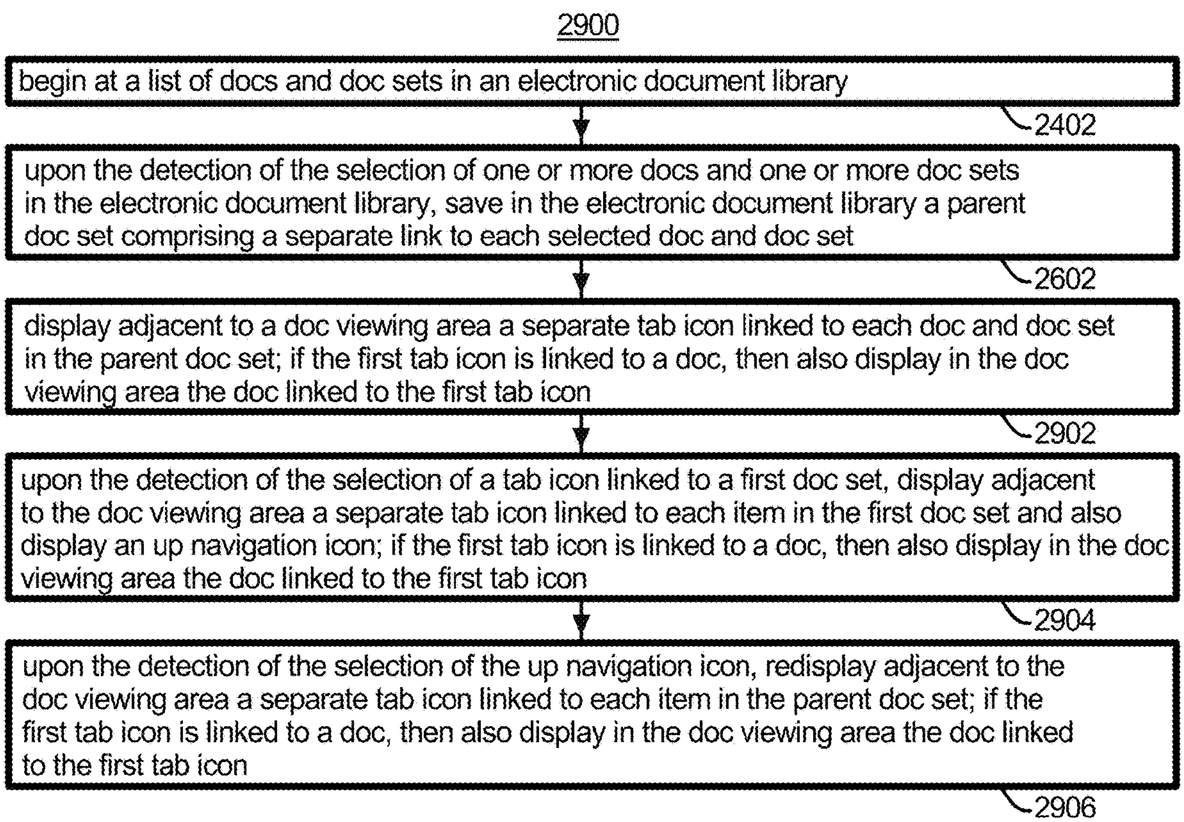
FIG. 29 is a flow diagram illustrating a process for working with electronic documents that includes methods for treating the first item in a doc set in accordance with some embodiments.

FIG. 29 is a flow diagram illustrating a process for working with electronic documents that includes methods for treating the first item in a doc set in accordance with some embodiments. FIGS. 4A-4P, FIGS. 5A-5N, and FIGS. 6A-6N illustrate exemplary user interfaces for use in implementing the methods presented in the flow diagram shown FIG. 29.

Figure 30:
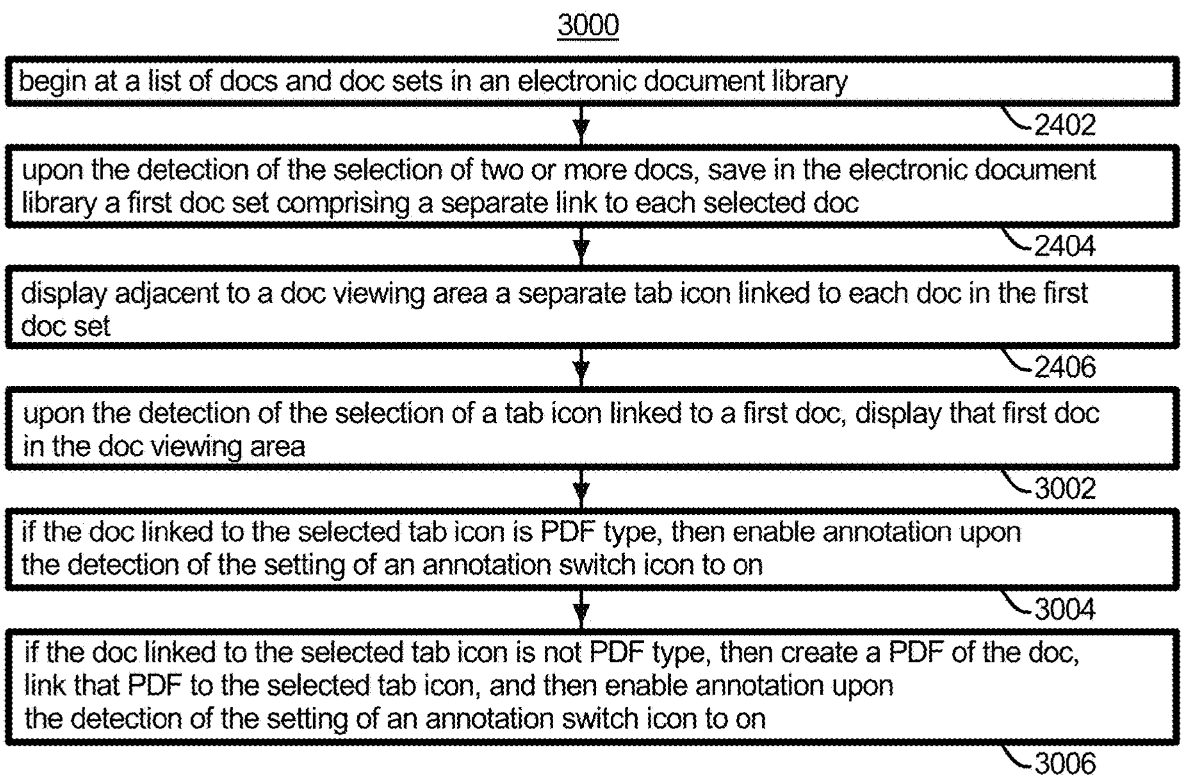
FIG. 30 is a flow diagram illustrating a process for working with electronic documents that includes methods for annotating a doc in a doc set in accordance with some embodiments.

FIG. 30 is a flow diagram illustrating a process for working with electronic documents that includes methods for annotating a doc in a doc set in accordance with some embodiments. FIGS. 4A-4P, FIGS. 5A-5N, FIGS. 6A-6N, and FIGS. 7A-7F illustrate exemplary user interfaces for use in implementing the methods presented in the flow diagram shown in FIG. 30.

Figure 31:
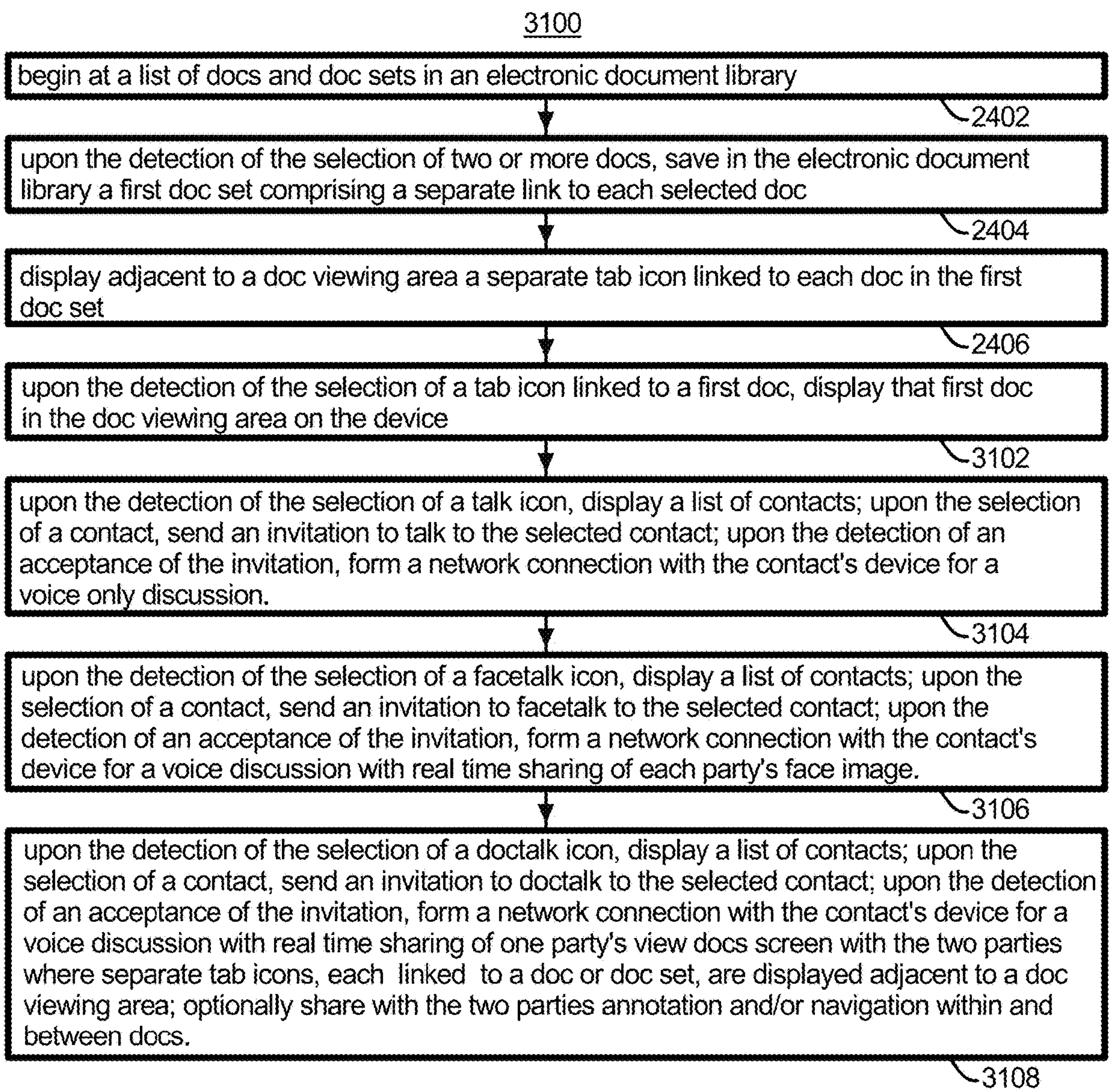
FIG. 31 is a flow diagram illustrating a process for working with electronic documents that includes methods for discussing a doc in a doc set in accordance with some embodiments.

FIG. 31 is a flow diagram illustrating a process for working with electronic documents that includes methods for discussing a doc in a doc set in accordance with some embodiments. FIGS. 4A-4P, FIGS. 5A-5N, FIGS. 6A-6N, and FIGS. 7A-7F, and FIGS. 8A-8I illustrate exemplary user interfaces for use in implementing the methods presented in the flow diagram shown in FIG. 31.

Figure 32:
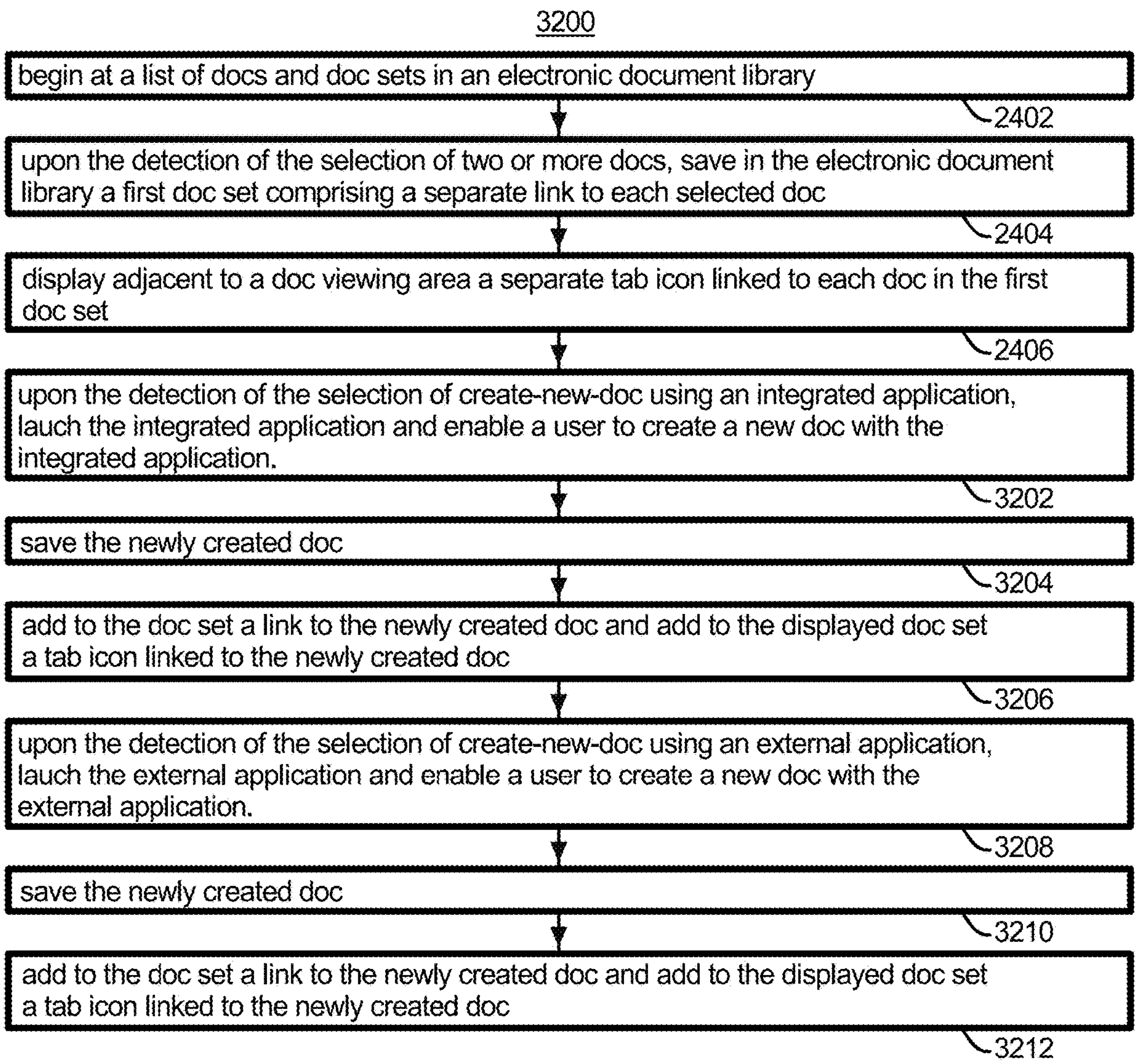
FIG. 32 is a flow diagram illustrating a process for working with electronic documents that includes methods for creating a new doc and adding that doc to a doc set in accordance with some embodiments.

FIG. 32 is a flow diagram illustrating a process for working with electronic documents that includes methods for creating a new doc and adding that doc to a doc set in accordance with some embodiments. FIGS. 4A-4P, FIGS. 5A-5N, and FIGS. 6A-6N illustrate exemplary user interfaces for use in implementing the methods presented in the flow diagram of FIG. 32.

Figure 33:
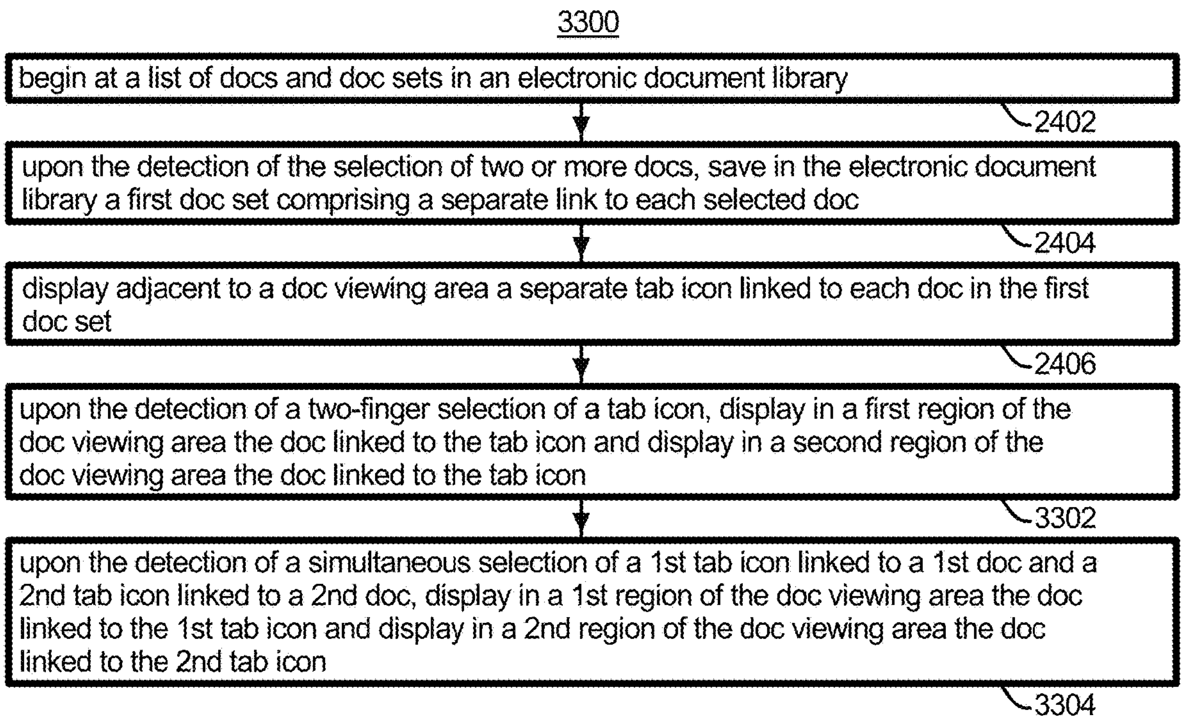
FIG. 33 is a flow diagram illustrating a process for working with electronic documents that includes methods for using gestures on a touch-sensitive display in accordance with some embodiments.

FIG. 33 is a flow diagram illustrating a process for working with electronic documents that includes methods for using gestures on a touch-sensitive display in accordance with some embodiments. FIGS. 4A-4P, FIGS. 5A-5N, FIGS. 6A-6N, and FIGS. 14A-14C illustrate exemplary user interfaces for use in implementing the methods presented in the flow diagram of FIG. 33.

Figure 34:
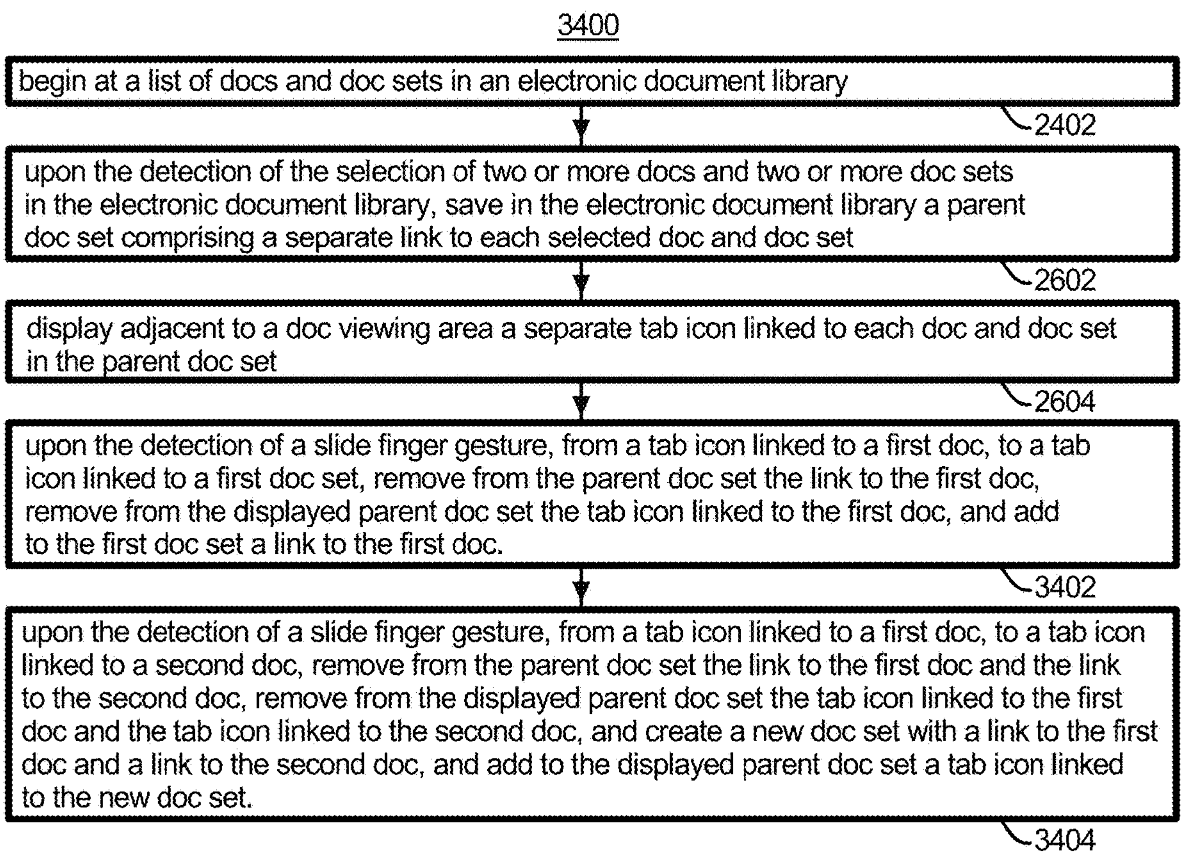
FIG. 34 is a flow diagram illustrating a process for working with electronic documents that includes methods for using gestures on a touch-sensitive display in accordance with some embodiments.

FIG. 34 is a flow diagram illustrating a process for working with electronic documents that includes methods for using gestures on a touch-sensitive display in accordance with some embodiments. FIGS. 4A-4P, FIGS. 5A-5N, FIGS. 6A-6N, and FIGS. 15A-15C illustrate exemplary user interfaces for use in implementing the methods presented in the flow diagram of FIG. 34.

Figure 35:
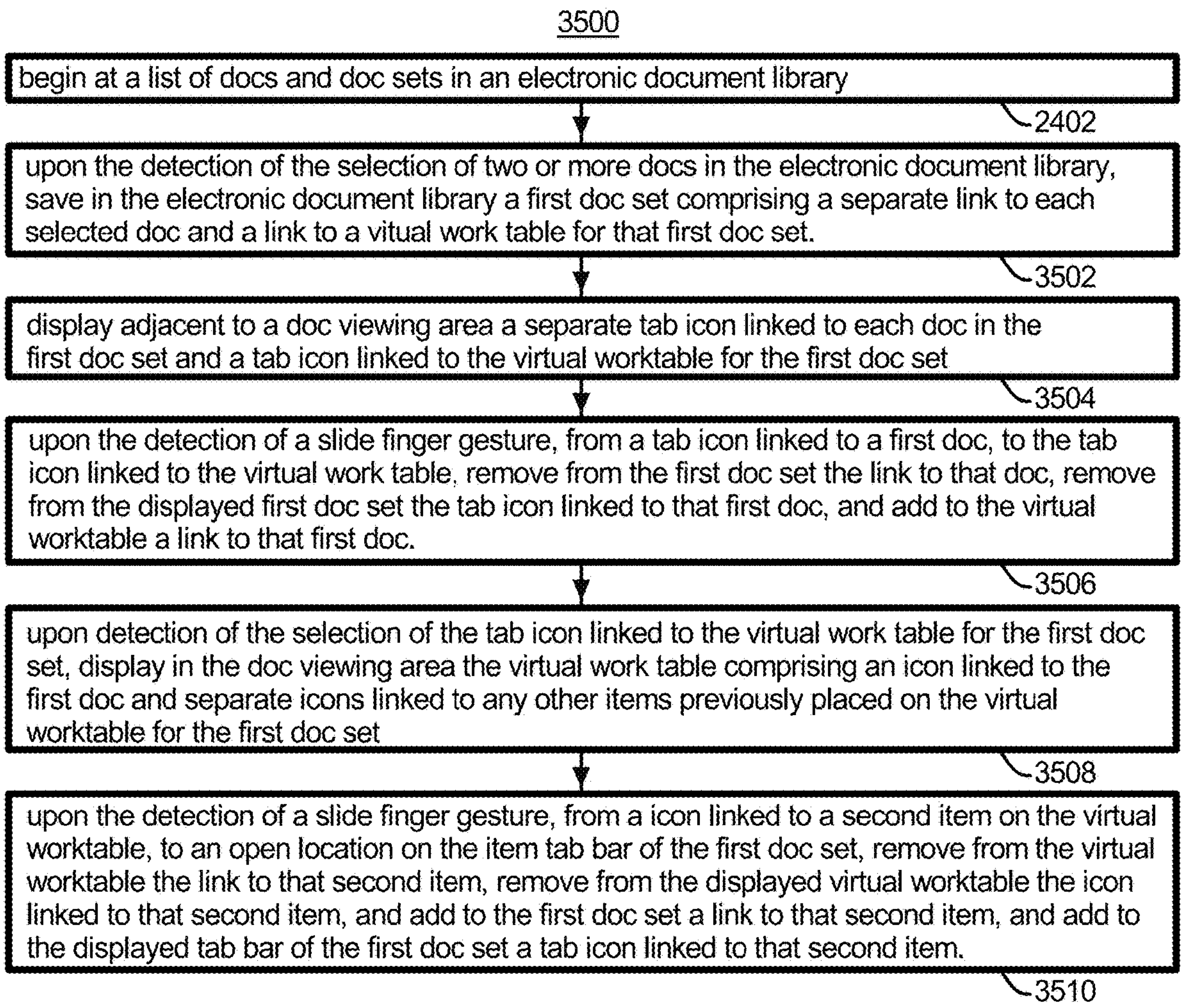
FIG. 35 is a flow diagram illustrating a process for working with electronic documents that includes methods for using a virtual worktable in accordance with some embodiments.

FIG. 35 is a flow diagram illustrating a process for working with electronic documents that includes methods for using a virtual worktable in accordance with some embodiments. FIGS. 4A-4P, FIGS. 5A-5N, FIGS. 6A-6N, and FIGS. 16A-16F, FIGS. 17A-17L, and FIGS. 18A-18H illustrate exemplary user interfaces for use in implementing the methods presented in the flow diagram of FIG. 35.

Figure 36:
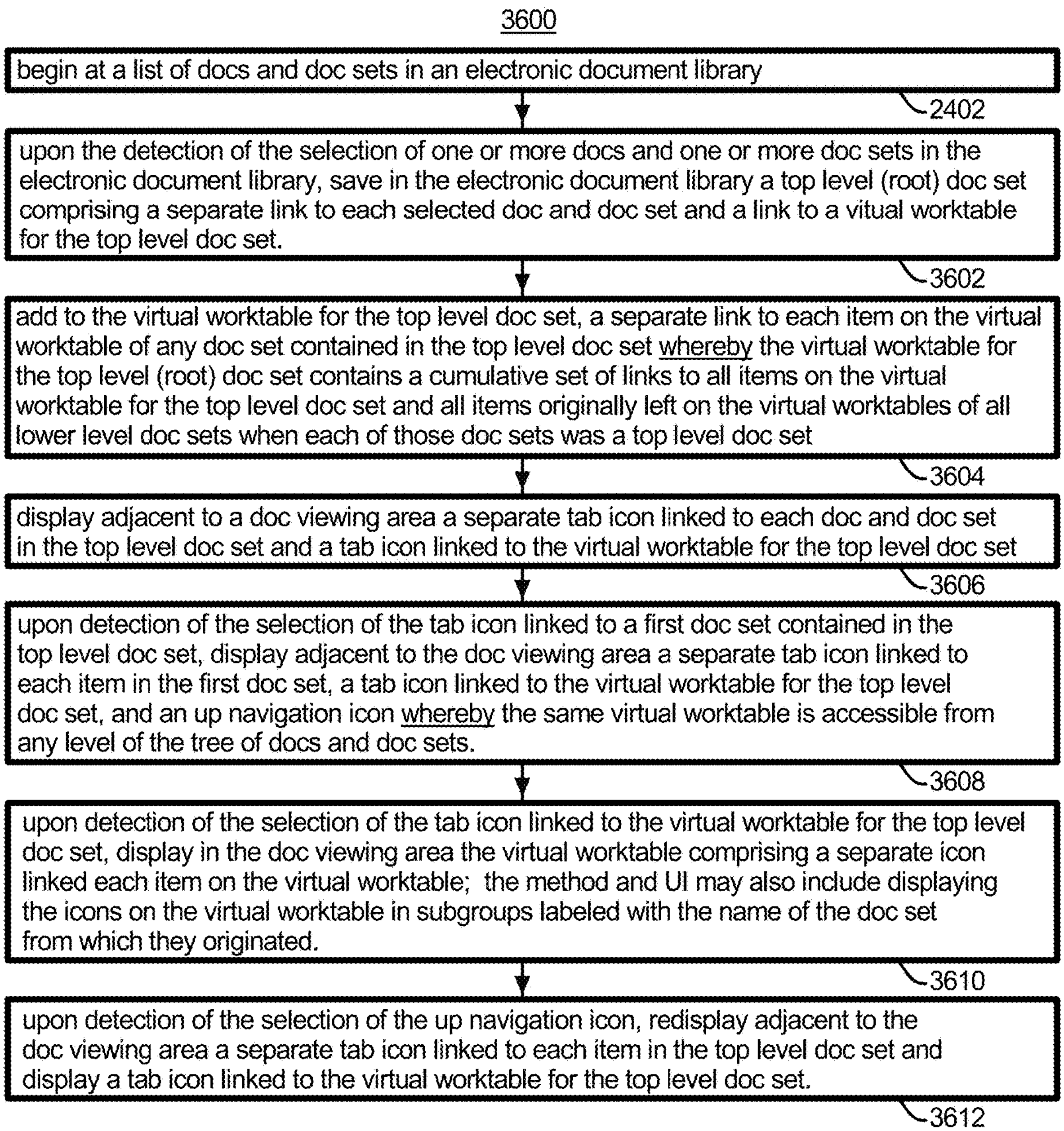
FIG. 36 is a flow diagram illustrating a process for working with electronic documents that includes methods for using a virtual worktable in accordance with some embodiments.

FIG. 36 is a flow diagram illustrating a process for working with electronic documents that includes methods for using a virtual worktable in accordance with some embodiments. FIGS. 4A-4P, FIGS. 5A-5N, FIGS. 6A-6N, and FIGS. 16A-16F, FIGS. 17A-17L, and FIGS. 18A-18H illustrate exemplary user interfaces for use in implementing the methods presented in the flow diagram of FIG. 36.

This disclosure includes methods comprising a handheld computing device with a touch-sensitive display carrying out one or more of the methods selected from those described in FIGS. 9A-9C, FIGS. 10A-10C, FIGS. 11A-11C, FIGS. 12A-12D, FIGS. 13A-13D, FIGS. 19A-19D, FIGS. 20A-20D, FIGS. 21A-21D, FIG. 24, FIG. 25, FIG. 26, FIG. 27, FIG. 28, FIG. 29, FIG. 30, FIG. 31, FIG. 32, FIG. 33, FIG. 34, FIG. 35, and FIG. 36.

In the methods presented in this disclosure, some operations in a method may be combined and/or the order of some operations may be changed. The example methods presented herein each include an example set of operations. Other methods within the scope of this disclosure may include operations from more than one of methods presented herein or omit particular operations from a method.

This disclosure includes methods comprising a handheld computing device with a touch-sensitive display carrying out one or more of the methods selected from those described in reference to the exemplary graphical user interfaces in FIGS. 4A-4P, FIGS. 5A-5N, FIGS. 6A-6N, FIGS. 7A-7F, FIGS. 8A-8I, FIGS. 14A-14C, FIGS. 15A-15C, FIGS. 16A-16F, FIGS. 17A-17L, FIGS. 18A-18H, FIGS. 22A-22D, and FIGS. 23A-23E.

This disclosure includes a computing device comprising a touch-sensitive display, one or more processors, memory, and one or more programs, wherein the one or more programs are stored in memory and configured to be executed by the one or more processors, and wherein the one or more programs include instructions for carrying out one or more of the methods selected from those described in FIGS. 9A-9C, FIGS. 10A-10C, FIGS. 11A-11C, FIGS. 12A-12D, FIGS. 13A-13D, FIGS. 19A-19D, FIGS. 20A-20D, FIGS. 21A-21D, FIG. 24, FIG. 25, FIG. 26, FIG. 27, FIG. 28, FIG. 29, FIG. 30, FIG. 31, FIG. 32, FIG. 33, FIG. 34, FIG. 35, and FIG. 36.

This disclosure includes a computing device comprising a touch-sensitive display, one or more processors, memory, and one or more programs, wherein the one or more programs are stored in memory and configured to be executed by the one or more processors, and wherein the one or more programs include instructions for carrying out one or more of the methods selected from those described in reference to the exemplary graphical user interfaces in FIGS. 4A-4P, FIGS. 5A-5N, FIGS. 6A-6N, FIGS. 7A-7F, FIGS. 8A-8I, FIGS. 14A-14C, FIGS. 15A-15C, FIGS. 16A-16F, FIGS. 17A-17L, FIGS. 18A-18H, FIGS. 22A-22D, and FIGS. 23A-23E.

This disclosure includes a computer readable storage medium storing one or more programs, the one or more programs comprising instructions, which when executed by a computing device with a touch-sensitive display, cause the device to carry out one or more of the methods selected from those described in FIGS. 9A-9C, FIGS. 10A-10C, FIGS. 11A-11C, FIGS. 12A-12D, FIGS. 13A-13D, FIGS. 19A-19D, FIGS. 20A-20D, FIGS. 21A-21D, FIG. 24, FIG. 25, FIG. 26, FIG. 27, FIG. 28, FIG. 29, FIG. 30, FIG. 31, FIG. 32, FIG. 33, FIG. 34, FIG. 35, and FIG. 36.

This disclosure includes a computer readable storage medium storing one or more programs, the one or more programs comprising instructions, which when executed by a computing device with a touch-sensitive display, cause the device to carry out one or more of the methods selected from those described in reference to the exemplary graphical user interfaces in FIGS. 4A-4P, FIGS. 5A-5N, FIGS. 6A-6N, FIGS. 7A-7F, FIGS. 8A-8I, FIGS. 14A-14C, FIGS. 15A-15C, FIGS. 16A-16F, FIGS. 17A-17L, FIGS. 18A-18H, FIGS. 22A-22D, and FIGS. 23A-23E.

These programs, comprising instructions for implementing the graphical user interfaces and methods disclosed herein, may be executed locally on a computing device. In other embodiments, some or all of these instructions may be executed on a server "in the cloud" and accessed via a client computing device. As the speed, worldwide availability, and reliability of networks increases, there will be an even greater opportunity to host applications on a remote server and access those applications via different client devices while providing an outstanding user experience. These devices may include a mix of thick clients and thin clients.

The example embodiments presented in this disclosure illustrate a number of aspects. These example embodiments include devices, methods, and graphical user interfaces to enable a user to perform a number of tasks. These include, but are not limited to, enabling the user to do the following:

Conveniently navigate among and read from any doc within a group of docs of different types with a single tap; for example, navigate among and read from any doc within a group of five docs of the following types: docx, pptx, pptx, dwg, and docx—all with a single tap selection.

Conveniently navigate among and read from a $1^{st}$ group of docs, return to a library of docs and select a $2^{nd}$ group of docs, navigate and read from that $2^{nd}$ group of docs, return to the library and retrieve again the $1^{st}$ group of docs with a single tap selection.

Conveniently save a group of docs under a name and enable the user to retrieve that group again with a single tap without having to assemble the group of docs by selecting each doc individually.

Conveniently assemble and organize a group of docs into sub-groups; conveniently assemble a hierarchical tree structure that comprises a top-level or root doc set that may contain lower-level or subordinate doc sets.

Conveniently navigate among and read from a particular doc at any level of the tree structure with a single tap selection.

Conveniently navigate between different levels of the tree structure with a single tap selection.

Conveniently save a group of items comprising docs and doc sets under a name and enable the user to retrieve that group again with a single tap without having to assemble the group of items again by selecting each item individually.

Conveniently navigate among and read from a $1^{st}$ group of items comprising docs and doc sets, return to a library of docs and select a $2^{nd}$ group of items, navigate and read from that $2^{nd}$ group of items, return to the library and retrieve again the $1^{st}$ group of items with a single tap selection.

Conveniently add one or more docs or doc sets to a group (set) of docs.

Conveniently remove one or more docs or doc sets from a group (set) of docs.

Conveniently move one or more docs into a doc set with a few simple gestures without needing to remove items, retrieve the removed items from the electronic document library, and add those items, to move items into a doc set.

Conveniently divide a doc set into two doc sets with a few simple gestures without needing to remove items, retrieve the removed items from the library, and add those items to effect the division of a doc set into two doc sets.

Conveniently view a single doc in split screen view with a single simple gesture; conveniently exit from the split screen view with a single simple gesture.

Conveniently view two docs in split screen view with a single simple gesture; conveniently exit from the split screen view with a single simple gesture.

Conveniently navigate among a group of docs, with some docs in split screen view and some docs in standard view, without needing to reform the split screen view with every new viewing of a doc or pair of docs.

Conveniently place one or more reference docs on a virtual worktable and enable those docs to be accessed from any level of the tree structure with a single tap selection.

Conveniently add to the virtual worktable of the root doc set a separate link to each item added to the virtual worktable of the root doc set, plus each item originally left on the virtual worktables of all lower level doc sets when each of those doc sets was a top level (root) doc set.

Conveniently place one or more docs or doc sets on a virtual worktable and provide a means for efficiently modifying the organization of docs to meet the needs of the user for the work at hand.

Conveniently save the virtual worktable with the root doc set to enable the user to access the items on the worktable whenever the doc set is subsequently accessed.

Conveniently send a group of docs to a colleague.

Conveniently annotate one or more docs in a group of docs.

Conveniently discuss a group of docs with a colleague.

The foregoing discussion, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principals of the invention and its practical applications, to thereby enable others skilled in the art to best utilize the invention and various embodiments with various modifications as are suited to the particular use contemplated.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

I claim:

1. A method, comprising: at a computing device with a display:

detecting a selection of one or more files in a list of files;

in response to detecting a selection of two one or more files selected from a group consisting of doc files and doc set files, displaying in a list of tab icons adjacent to a file-content-display-area a tab icon linked to each selected file;

saving in a list of files a new doc set file comprising links to each selected file;

in response to detecting a selection of the new doc set file in the list of files, displaying in a list of tab icons adjacent to a file-content-display-area a tab icon linked to each file in the new doc set file;

detecting a selection of a tab icon;

in response to detecting a selection in a first list of tab icons, a tab icon linked to a doc file, displaying the doc file content in the file-content-display-area; and in response to detecting a selection in a first list of tab icons, a tab icon linked to a doc set file:

displaying in a child list of tab icons a tab icon linked to each file in the doc set file;

displaying an up icon;

detecting a selection of the up icon; and in response to detecting the selection of the up icon, displaying the first list of tab icons;

wherein a doc file is selected from a group consisting of a word processor file, a spreadsheet file, a presentation file, an image file, a drawing file, a PDF file, and a text file.

2. The method of claim 1, further including:

in response to detecting a drag gesture beginning in a list of three-or-more tab icons at a first tab icon linked to a first doc file, and ending in the list of three-or-more tab icons at a second tab icon linked to a second doc file, replacing the first tab icon and second tab icon is replaced by with a third tab icon linked to a doc set file comprising links to the first doc file and the second doc file.

3. The method of claim 1, further including:

in response to detecting a drag gesture beginning in a list of three-or-more tab icons at a first tab icon linked to a first doc file, and ending in the list of three-or-more tab icons at a second tab icon linked to a first doc set file, replacing the first tab icon and second tab icon with a third tab icon linked to a doc set file comprising links to the first doc file and to each file in the first doc set file.

4. The method of claim 1, wherein: a tab icon is displayed as a rectangular icon comprising a label.

5. The method of claim 1, wherein: a list of files is a list of files stored on a server.

6. The method of claim 1, wherein: a list of files is a list of files stored locally on the computing device.

7. The method of claim 1, wherein: a link is a hard link.

8. The method of claim 1, wherein: the display is a touch-sensitive display and an item is selected with a tap gesture on the touch-sensitive display.

9. A computing device, comprising:

a display;

one or more processors; and a memory configured to store one or more programs;

wherein the one or more processors is configured to execute the one or more programs to cause the computing device to:

detect a selection of one or more files in a list of files;

in response to detecting a selection of two one or more files selected from a group consisting of doc files and doc set files, display in a list of tab icons adjacent to a file-content-display-area a tab icon linked to each selected file;

save in a list of files a new doc set file comprising links to each selected file;

in response to detecting a selection of the new doc set file in the list of files, display in a list of tab icons adjacent to a file-content-display-area a tab icon linked to each file in the new doc set file;

detect a selection of a tab icon; and in response to detecting a selection in a first list of tab icons, of a tab icon linked to a doc file, display the doc file content in the file-content-display-area; and in response to detecting a selection in a first list of tab icons, a tab icon linked to a doc set file:

display in a child list of tab icons a tab icon linked to each file in the doc set file;

display an up icon;

a selection of the up icon; and in response to detecting the selection of the up icon, display the first list of tab icons;

wherein a doc file is selected from a group consisting of a word processor file, a spreadsheet file, a presentation file, an image file, a drawing file, a PDF file, and a text file.

10. The computing device of claim 9, the one or more programs further including instructions to cause the computing device to:

in response to detecting a drag gesture beginning in a list of three-or-more tab icons at a first tab icon linked to a first doc file, and ending in the list of three-or-more tab icons at a second tab icon linked to a second doc file, replace the first tab icon and second tab icon by a third tab icon linked to a doc set file comprising links to the first doc file and the second doc file.

11. The computing device of claim 9, the one or more programs further including instructions to cause the computing device to:

in response to detecting a drag gesture beginning in a list of three-or-more tab icons at a first tab icon linked to a first doc file, and ending in the list of three-or-more tab icons at a second tab icon linked to a first doc set file, replace the first tab icon and second tab icon by a third tab icon linked to a doc set file comprising links to the first doc file and to each file in the first doc set file.

12. The computing device of claim 9, wherein: a tab icon is displayed as a rectangular icon comprising a label.

13. The computing device of claim 9, wherein: a list of files is a list of files stored on a server.

14. The computing device of claim 9, wherein: a list of files is a list of files stored locally on the computing device.

15. The computing device of claim 9, wherein: a link is a hard link.

16. The computing device of claim 9, wherein: the display is a touch sensitive display and an item is selected with a tap gesture on the touch-sensitive display.

17. A non-transitory computer readable storage medium storing one or more programs, the one or more programs comprising instructions, which when executed by a computing device, cause the computing device to:

detect a selection of one or more files in a list of files;

in response to detecting a selection of two one or more files selected from a group consisting of doc files and doc set files, display in a list of tab icons adjacent to a file-content-display-area a tab icon linked to each selected file;

save in a list of files a new doc set file comprising links to each selected file;

in response to detecting a selection of the new doc set file in the list of files, display in a list of tab icons adjacent to a file-content-display-area a tab icon linked to each file in the new doc set file;

detect a selection of a tab icon;

in response to detecting a selection in a first list of tab icons, a tab icon linked to a doc file, display the doc file content in the file-content-display-area; and in response to detecting a selection in a first list of tab icons, a tab icon linked to a doc set file:

display in a child list of tab icons a tab icon linked to each file in the doc set file;

display an up icon;

detect a selection of the up icon; and in response to detecting the selection of the up icon, display the first list of tab icons;

wherein a doc file is selected from a group consisting of a word processor file, a spreadsheet file, a presentation file, an image file, a drawing file, a PDF file, and a text file.

18. The non-transitory computer readable storage medium of claim 17, the one or more programs further including instructions, which cause the computing device to:

in response to detecting a drag gesture beginning in a list of three-or-more tab icons at a first tab icon linked to a first doc file, and ending in the list of three-or-more tab icons at a second tab icon linked to a second doc file, replace the first tab icon and second tab icon by a third tab icon linked to a doc set file comprising links to the first doc file and the second doc file.

19. The non-transitory computer readable storage medium of claim 17, the one or more programs further including instructions, which cause the computing device to:

in response to detecting a drag gesture beginning in a list of three-or-more tab icons at a first tab icon linked to a first doc file, and ending in the list of three-or-more tab icons at a second tab icon linked to a first doc set file, replace the first tab icon and second tab icon by a third tab icon linked to a doc set file comprising links to the first doc file and to each file in the first doc set file.

20. The non-transitory computer readable storage medium of claim 17, wherein a tab icon is displayed as a rectangular icon with comprising a label.

21. The non-transitory computer readable storage medium of claim 17, wherein: a list of files is a list of files stored on a server.

22. The non-transitory computer readable storage medium of claim 17, wherein: a list of files is a list of files stored locally on the computing device.

23. The non-transitory computer readable storage medium of claim 17, wherein: a link is a hard link.

24. The non-transitory computer readable storage medium of claim 17, wherein: the display is a touch-sensitive display and an item is selected with a tap gesture on the touch-sensitive display.

* * * * *